United States Patent
Kumakura et al.

(10) Patent No.: US 11,435,118 B2
(45) Date of Patent: Sep. 6, 2022

(54) HEAT SOURCE UNIT AND REFRIGERATION CYCLE APPARATUS

(71) Applicant: DAIKIN INDUSTRIES, LTD., Osaka (JP)

(72) Inventors: Eiji Kumakura, Osaka (JP); Takuro Yamada, Osaka (JP); Atsushi Yoshimi, Osaka (JP); Ikuhiro Iwata, Osaka (JP); Mitsushi Itano, Osaka (JP); Daisuke Karube, Osaka (JP); Yuuki Yotsumoto, Osaka (JP); Kazuhiro Takahashi, Osaka (JP); Tatsuya Takakuwa, Osaka (JP); Yuzo Komatsu, Osaka (JP); Shun Ohkubo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/912,068

(22) Filed: Jun. 25, 2020

(65) Prior Publication Data

US 2020/0326105 A1    Oct. 15, 2020

Related U.S. Application Data

(63) Continuation-in-part of application No. 16/954,745, filed as application No. PCT/JP2018/046428 on Dec. 17, 2018.

(30) Foreign Application Priority Data

Dec. 18, 2017  (JP) ............................. JP2017-242183
Dec. 18, 2017  (JP) ............................. JP2017-242185
(Continued)

(51) Int. Cl.
*F25B 13/00*  (2006.01)
*C09K 5/04*  (2006.01)

(52) U.S. Cl.
CPC .............. *F25B 13/00* (2013.01); *C09K 5/045* (2013.01); *C09K 2205/126* (2013.01); *C09K 2205/22* (2013.01)

(58) Field of Classification Search
CPC .......... F24F 1/0059; F24F 1/0063; F24F 1/24; F24F 1/38; F24F 5/001; F24F 1/14;
(Continued)

(56) References Cited

U.S. PATENT DOCUMENTS 5,185,092 A    2/1993  Fukuda et al.
5,344,069 A    9/1994  Narikiyo
(Continued)

FOREIGN PATENT DOCUMENTS

AU    2001284508    3/2002
CN       1288132    3/2001
(Continued)

OTHER PUBLICATIONS

International Search Report dated Mar. 19, 2019 in International Application No. PCT/JP2018/046531.
(Continued)

*Primary Examiner* — Kun Kai Ma
(74) *Attorney, Agent, or Firm* — Wenderoth, Lind & Ponack, L.L.P.

(57) ABSTRACT

A heat source unit and a refrigeration cycle apparatus that are able to reduce damage to a connection pipe when a refrigerant containing at least 1,2-difluoroethylene is used are provided. An outdoor unit (20) that is connected via a liquid-side connection pipe (6) and a gas-side connection pipe (5) to an indoor unit (30) including an indoor heat exchanger (31) and that is a component of an air conditioner (1) includes a compressor (21) and an outdoor heat exchanger (23). A refrigerant containing at least 1,2-difluoroethylene is used as a refrigerant. A design pressure of the
(Continued)

outdoor unit (20) is lower than 1.5 times a design pressure of each of the liquid-side connection pipe (6) and the gas-side connection pipe (5).

18 Claims, 20 Drawing Sheets

(30) Foreign Application Priority Data

| Dec. 18, 2017 | (JP) | JP2017-242186 |
|---|---|---|
| Dec. 18, 2017 | (JP) | JP2017-242187 |
| Oct. 5, 2018 | (WO) | PCT/JP2018/037483 |
| Oct. 17, 2018 | (WO) | PCT/JP2018/038746 |
| Oct. 17, 2018 | (WO) | PCT/JP2018/038747 |
| Oct. 17, 2018 | (WO) | PCT/JP2018/038748 |
| Oct. 17, 2018 | (WO) | PCT/JP2018/038749 |

(58) Field of Classification Search
CPC .. F24F 1/32; F25B 9/002; F25B 9/006; F25B 29/003; F25B 1/00; C09K 2205/128; C09K 2205/43; C09K 2205/106; C09K 2205/122; C09K 2205/24; C09K 2205/126; C09K 2205/22
See application file for complete search history.

(56) References Cited

U.S. PATENT DOCUMENTS

| 5,851,968 | A | 12/1998 | Schnur |
|---|---|---|---|
| 6,591,631 | B1 | 7/2003 | Taira |
| 6,667,285 | B1 | 12/2003 | Kawahara et al. |
| 8,358,040 | B2 | 1/2013 | Komuro et al. |
| 10,131,827 | B2 * | 11/2018 | Fukushima ............ C09K 5/045 |
| 10,883,745 | B2 | 1/2021 | Higashiiue et al. |
| 2002/0140309 | A1 | 10/2002 | Yanashima et al. |
| 2002/0193262 | A1 | 12/2002 | Kaimai et al. |
| 2004/0011062 | A1 | 1/2004 | Taira |
| 2006/0000224 | A1 | 1/2006 | Matsuoka |
| 2007/0209373 | A1 | 9/2007 | Taira et al. |
| 2008/0184723 | A1 | 8/2008 | Sato et al. |
| 2008/0184731 | A1 | 8/2008 | Sienel et al. |
| 2008/0188173 | A1 | 8/2008 | Chen et al. |
| 2009/0260382 | A1 | 10/2009 | Takeichi et al. |
| 2010/0067264 | A1 | 3/2010 | Ohashi et al. |
| 2010/0082162 | A1 | 4/2010 | Mundy et al. |
| 2010/0122545 | A1 | 5/2010 | Minor et al. |
| 2011/0108756 | A1 | 5/2011 | Tsuchiya et al. |
| 2011/0167848 | A1 | 7/2011 | Wakashima et al. |
| 2012/0260679 | A1 | 10/2012 | Huerta-Ochoa |
| 2014/0070132 | A1 | 3/2014 | Fukushima |
| 2014/0077123 | A1 | 3/2014 | Fukushima |
| 2014/0291411 | A1 | 10/2014 | Tamaki et al. |
| 2014/0314606 | A1 | 10/2014 | Maeyama et al. |
| 2014/0373569 | A1 | 12/2014 | Tsuboe et al. |
| 2015/0001981 | A1 | 1/2015 | Hattori et al. |
| 2015/0075203 | A1 | 3/2015 | Mochizuki et al. |
| 2015/0096321 | A1 | 4/2015 | Kawano et al. |
| 2015/0143841 | A1 | 5/2015 | Kawano et al. |
| 2015/0256038 | A1 | 9/2015 | Nigo et al. |
| 2015/0362199 | A1 | 12/2015 | Yumoto et al. |
| 2015/0376486 | A1 | 12/2015 | Hashimoto et al. |
| 2016/0018135 | A1 | 1/2016 | Yuzawa et al. |
| 2016/0075927 | A1 | 3/2016 | Fukushima |
| 2016/0131378 | A1 | 5/2016 | Hinokuma et al. |
| 2016/0276886 | A1 | 9/2016 | Baba et al. |
| 2016/0333241 | A1 | 11/2016 | Fukushima et al. |
| 2016/0333243 | A1 | 11/2016 | Fukushima et al. |
| 2016/0340565 | A1 | 11/2016 | Tasaka et al. |
| 2016/0348933 | A1 | 12/2016 | Takeuchi et al. |
| 2016/0355719 | A1 | 12/2016 | Fukushima et al. |
| 2017/0002245 | A1 | 1/2017 | Fukushima |
| 2017/0058172 | A1 | 3/2017 | Fukushima et al. |
| 2017/0058173 | A1 | 3/2017 | Fukushima |
| 2017/0058174 | A1 | 3/2017 | Fukushima et al. |
| 2017/0121581 | A1 | 5/2017 | Horiike et al. |
| 2017/0138642 | A1 * | 5/2017 | Ueno ...................... F04B 39/00 |
| 2017/0166831 | A1 | 6/2017 | Matsumoto |
| 2017/0248328 | A1 | 8/2017 | Eskew et al. |
| 2017/0328586 | A1 | 11/2017 | Maeyama |
| 2017/0336085 | A1 | 11/2017 | Yasuo et al. |
| 2017/0338707 | A1 | 11/2017 | Shono et al. |
| 2018/0051198 | A1 * | 2/2018 | Okamoto ............... C09K 5/044 |
| 2018/0094844 | A1 | 4/2018 | Suzuki |
| 2018/0138763 | A1 | 5/2018 | Nakamura et al. |
| 2018/0156217 | A1 | 6/2018 | Sakima et al. |
| 2018/0156511 | A1 | 6/2018 | Chikami et al. |
| 2018/0254676 | A1 | 9/2018 | Nigo et al. |
| 2018/0299175 | A1 | 10/2018 | Hayamizu et al. |
| 2018/0320942 | A1 | 11/2018 | Hayamizu et al. |
| 2018/0331436 | A1 | 11/2018 | Hayamizu et al. |
| 2018/0358861 | A1 | 12/2018 | Hayamizu et al. |
| 2019/0063773 | A1 | 2/2019 | Nagahashi et al. |
| 2019/0068015 | A1 | 2/2019 | Yabe et al. |
| 2019/0309963 | A1 | 10/2019 | Zaki et al. |
| 2020/0079985 | A1 | 3/2020 | Okamoto et al. |
| 2020/0321816 | A1 | 10/2020 | Watanabe |
| 2020/0325375 | A1 | 10/2020 | Kumakura et al. |
| 2020/0325376 | A1 | 10/2020 | Kumakura et al. |
| 2020/0325377 | A1 | 10/2020 | Kumakura et al. |
| 2020/0326100 | A1 | 10/2020 | Ukibune et al. |
| 2020/0326101 | A1 | 10/2020 | Itano et al. |
| 2020/0326102 | A1 | 10/2020 | Kumakura et al. |
| 2020/0326103 | A1 | 10/2020 | Kumakura et al. |
| 2020/0326105 | A1 | 10/2020 | Kumakura et al. |
| 2020/0326109 | A1 | 10/2020 | Kumakura et al. |
| 2020/0326110 | A1 | 10/2020 | Asano et al. |
| 2020/0332164 | A1 | 10/2020 | Itano et al. |
| 2020/0332166 | A1 | 10/2020 | Kumakura et al. |
| 2020/0333041 | A1 | 10/2020 | Itano et al. |
| 2020/0333054 | A1 | 10/2020 | Asano et al. |
| 2020/0347283 | A1 | 11/2020 | Itano et al. |
| 2020/0363085 | A1 | 11/2020 | Itano et al. |
| 2020/0363105 | A1 | 11/2020 | Kumakura et al. |
| 2020/0363106 | A1 | 11/2020 | Itano et al. |
| 2020/0363112 | A1 | 11/2020 | Ohtsuka et al. |
| 2020/0369934 | A1 | 11/2020 | Itano et al. |
| 2020/0385620 | A1 | 12/2020 | Itano et al. |
| 2020/0385621 | A1 | 12/2020 | Itano et al. |
| 2020/0385622 | A1 | 12/2020 | Itano et al. |
| 2020/0392387 | A1 | 12/2020 | Ohtsuka et al. |
| 2020/0392388 | A1 | 12/2020 | Itano et al. |
| 2020/0393178 | A1 | 12/2020 | Kumakura et al. |
| 2021/0018191 | A1 | 1/2021 | Itano et al. |
| 2021/0135520 | A1 | 5/2021 | Shimokawa et al. |
| 2021/0189209 | A1 | 6/2021 | Yotdumoto et al. |
| 2021/0222040 | A1 | 7/2021 | Fukushima et al. |
| 2021/0355359 | A1 | 11/2021 | Ohkubo et al. |

FOREIGN PATENT DOCUMENTS

| CN | 1447491 | 10/2003 |
|---|---|---|
| CN | 1455855 | 11/2003 |
| CN | 1723373 | 1/2006 |
| CN | 1987264 | 6/2007 |
| CN | 101235815 | 8/2008 |
| CN | 101441012 | 5/2009 |
| CN | 102401519 | 4/2012 |
| CN | 103562338 | 2/2014 |
| CN | 203704143 | 7/2014 |
| CN | 103975204 | 8/2014 |
| CN | 104094069 | 10/2014 |
| CN | 104456760 | 3/2015 |
| CN | 104578493 | 4/2015 |
| CN | 204534884 | 8/2015 |
| CN | 104903661 | 9/2015 |
| CN | 104937350 | 9/2015 |
| CN | 204648544 | 9/2015 |
| CN | 105102905 | 11/2015 |
| CN | 204943959 | 1/2016 |
| CN | 205261858 | 5/2016 |
| CN | 106029821 | 10/2016 |
| CN | 106030222 | 10/2016 |

(56) References Cited

FOREIGN PATENT DOCUMENTS

| | | |
|---|---|---|
| CN | 106062159 | 10/2016 |
| CN | 106085363 | 11/2016 |
| CN | 106103992 | 11/2016 |
| CN | 106133110 | 11/2016 |
| CN | 106414653 | 2/2017 |
| CN | 106414654 | 2/2017 |
| CN | 106415152 | 2/2017 |
| CN | 106574802 | 4/2017 |
| CN | 106661477 | 5/2017 |
| CN | 106839496 | 6/2017 |
| CN | 107110570 | 8/2017 |
| CN | 107112830 | 8/2017 |
| CN | 107429957 | 12/2017 |
| CN | 107614980 | 1/2018 |
| CN | 107925285 | 4/2018 |
| CN | 108139112 | 6/2018 |
| CN | 108431414 | 8/2018 |
| CN | 108469126 | 8/2018 |
| EP | 1 231 255 | 8/2002 |
| EP | 1 246 348 | 10/2002 |
| EP | 1 326 057 | 7/2003 |
| EP | 1 632 732 | 3/2006 |
| EP | 1 953 388 | 8/2008 |
| EP | 2 423 609 | 2/2012 |
| EP | 2 620 736 | 7/2013 |
| EP | 2 711 405 | 3/2014 |
| EP | 2 789 933 | 10/2014 |
| EP | 2 840 335 | 2/2015 |
| EP | 2 853 826 | 4/2015 |
| EP | 2 918 953 | 9/2015 |
| EP | 2 952 828 | 12/2015 |
| EP | 2 980 508 | 2/2016 |
| EP | 3 012 555 | 4/2016 |
| EP | 3 012 557 | 4/2016 |
| EP | 3 070 417 | 9/2016 |
| EP | 3 101 082 | 12/2016 |
| EP | 3 109 302 | 12/2016 |
| EP | 3 115 716 | 1/2017 |
| EP | 3 121 242 | 1/2017 |
| EP | 3 128 259 | 2/2017 |
| EP | 3 147 595 | 3/2017 |
| EP | 3 153 559 | 4/2017 |
| EP | 3 153 561 | 4/2017 |
| EP | 3 170 881 | 5/2017 |
| EP | 3 222 934 | 9/2017 |
| EP | 3 249 309 | 11/2017 |
| EP | 3 299 731 | 3/2018 |
| EP | 3 358 272 | 8/2018 |
| EP | 3 358 278 | 8/2018 |
| EP | 3 399 189 | 11/2018 |
| GB | 2530915 | 4/2016 |
| JP | 51-90115 | 7/1976 |
| JP | 52-13025 | 4/1977 |
| JP | 57-198968 | 12/1982 |
| JP | 59-39790 | 3/1984 |
| JP | 62-69066 | 3/1987 |
| JP | 63-69066 | 3/1987 |
| JP | 2-4163 | 1/1990 |
| JP | 5-264070 | 10/1993 |
| JP | 5-272823 | 10/1993 |
| JP | 7-19627 | 1/1995 |
| JP | 7-190571 | 7/1995 |
| JP | 8-200273 | 8/1996 |
| JP | 10-46170 | 2/1998 |
| JP | 10-300292 | 11/1998 |
| JP | 10-309050 | 11/1998 |
| JP | 10300292 A * | 11/1998 |
| JP | 10-318564 | 12/1998 |
| JP | 11-206001 | 7/1999 |
| JP | 11-256358 | 9/1999 |
| JP | 2000-161805 | 6/2000 |
| JP | 2000-220877 | 8/2000 |
| JP | 2000-234767 | 8/2000 |
| JP | 2000-304302 | 11/2000 |
| JP | 2001-82755 | 3/2001 |
| JP | 2001-139972 | 5/2001 |
| JP | 2002-54888 | 2/2002 |
| JP | 2002-89978 | 3/2002 |
| JP | 2002-257366 | 9/2002 |
| JP | 2002-272043 | 9/2002 |
| JP | 2002-318028 | 10/2002 |
| JP | 2003-18776 | 1/2003 |
| JP | 2003-83614 | 3/2003 |
| JP | 2003-174794 | 6/2003 |
| JP | 2004-28035 | 1/2004 |
| JP | 2004-132647 | 4/2004 |
| JP | 2004-215406 | 7/2004 |
| JP | 2004-251535 | 9/2004 |
| JP | 2004-361036 | 12/2004 |
| JP | 2005-61711 | 3/2005 |
| JP | 2005-241045 | 9/2005 |
| JP | 2005-288502 | 10/2005 |
| JP | 2006-162197 | 6/2006 |
| JP | 2006-211824 | 8/2006 |
| JP | 2006-313027 | 11/2006 |
| JP | 2008-39305 | 2/2008 |
| JP | 2008-54488 | 3/2008 |
| JP | 2008-190377 | 8/2008 |
| JP | 2008-245384 | 10/2008 |
| JP | 2008-286422 | 11/2008 |
| JP | 2009-63216 | 3/2009 |
| JP | 2009-92274 | 4/2009 |
| JP | 2009-121654 | 6/2009 |
| JP | 2009-150620 | 7/2009 |
| JP | 2009-299975 | 12/2009 |
| JP | 2010-28985 | 2/2010 |
| JP | 2010-103346 | 5/2010 |
| JP | 2010-119190 | 5/2010 |
| JP | 2010-164222 | 7/2010 |
| JP | 2010-230242 | 10/2010 |
| JP | 2011-4449 | 1/2011 |
| JP | 2011-43304 | 3/2011 |
| JP | 2011-52884 | 3/2011 |
| JP | 2011-94841 | 5/2011 |
| JP | 2011-135638 | 7/2011 |
| JP | 2011-202738 | 10/2011 |
| JP | 2011-252636 | 12/2011 |
| JP | 2012-42169 | 3/2012 |
| JP | 2012-112617 | 6/2012 |
| JP | 2012-132637 | 7/2012 |
| JP | 2012-151969 | 8/2012 |
| JP | 2013-124848 | 6/2013 |
| JP | 2013-126281 | 6/2013 |
| JP | 2013-139990 | 7/2013 |
| JP | 2013-155892 | 8/2013 |
| JP | 2013-155921 | 8/2013 |
| JP | 2013-172615 | 9/2013 |
| JP | 2013-200090 | 10/2013 |
| JP | 2013-221671 | 10/2013 |
| JP | 2014-70840 | 4/2014 |
| JP | 2014-75971 | 4/2014 |
| JP | 2014-89004 | 5/2014 |
| JP | 2014-129543 | 7/2014 |
| JP | 2014-152999 | 8/2014 |
| JP | 2014-167381 | 9/2014 |
| JP | 2015-23721 | 2/2015 |
| JP | 2015-55455 | 3/2015 |
| JP | 2015-78789 | 4/2015 |
| JP | 2015-82875 | 4/2015 |
| JP | 2015-111012 | 6/2015 |
| JP | 2015-114082 | 6/2015 |
| JP | 2015-145765 | 8/2015 |
| JP | 2015-158282 | 9/2015 |
| JP | 2015-218909 | 12/2015 |
| JP | 2015-218912 | 12/2015 |
| JP | 2015-229767 | 12/2015 |
| JP | 2016-1062 | 1/2016 |
| JP | 2016-11423 | 1/2016 |
| JP | 2016-56340 | 4/2016 |
| JP | 2016-125808 | 7/2016 |
| JP | 2016-133256 | 7/2016 |
| JP | 2016-172869 | 9/2016 |
| JP | 2016-174461 | 9/2016 |
| JP | 2017-36861 | 2/2017 |

(56) References Cited

FOREIGN PATENT DOCUMENTS

| | | | | |
|---|---|---|---|---|
| JP | 2017-46430 | 3/2017 | | |
| JP | 2017-53285 | 3/2017 | | |
| JP | 2017-67373 | 4/2017 | | |
| JP | 2017-67428 | 4/2017 | | |
| JP | 2017-122549 | 7/2017 | | |
| JP | 2017-145975 | 8/2017 | | |
| JP | 2017-192190 | 10/2017 | | |
| JP | 2018-25377 | 2/2018 | | |
| KR | 2001-0029975 | 4/2001 | | |
| KR | 2003-0028838 | 4/2003 | | |
| KR | 10-0939609 | 10/2003 | | |
| KR | 10-2004-0075737 | 8/2004 | | |
| KR | 10-2005-0044931 | 5/2005 | | |
| KR | 10-2017-0034887 | 3/2017 | | |
| RU | 2013 156 380 | 6/2015 | | |
| TW | 20030103482 | 2/2003 | | |
| WO | 01/36571 | 5/2001 | | |
| WO | 02/23100 | 3/2002 | | |
| WO | 2009/069679 | 6/2009 | | |
| WO | 2009/093345 | 7/2009 | | |
| WO | 2012/157764 | 11/2012 | | |
| WO | 2012/157765 | 11/2012 | | |
| WO | WO-2012157765 A1 * | 11/2012 | ............. | C09K 5/045 |
| WO | 2013/084301 | 6/2013 | | |
| WO | 2013/146103 | 10/2013 | | |
| WO | 2013/146208 | 10/2013 | | |
| WO | 2013/151043 | 10/2013 | | |
| WO | 2014/045400 | 3/2014 | | |
| WO | 2014/118945 | 8/2014 | | |
| WO | 2014/119149 | 8/2014 | | |
| WO | 2014/156190 | 10/2014 | | |
| WO | 2014/203353 | 12/2014 | | |
| WO | 2014/203354 | 12/2014 | | |
| WO | 2015/071967 | 5/2015 | | |
| WO | 2015/115252 | 8/2015 | | |
| WO | 2015/125763 | 8/2015 | | |
| WO | 2015/125884 | 8/2015 | | |
| WO | 2015/136981 | 9/2015 | | |
| WO | 2015/140827 | 9/2015 | | |
| WO | 2015/141678 | 9/2015 | | |
| WO | 2015/186557 | 12/2015 | | |
| WO | 2015/186670 | 12/2015 | | |
| WO | 2016/009884 | 1/2016 | | |
| WO | 2016/017460 | 2/2016 | | |
| WO | 2016/103711 | 6/2016 | | |
| WO | 2016/104418 | 6/2016 | | |
| WO | 2016/117443 | 7/2016 | | |
| WO | 2016/157538 | 10/2016 | | |
| WO | 2016/182030 | 11/2016 | | |
| WO | 2016/190232 | 12/2016 | | |
| WO | 2017/038489 | 3/2017 | | |
| WO | 2017/056789 | 4/2017 | | |
| WO | 2017/057004 | 4/2017 | | |
| WO | 2017/115636 | 7/2017 | | |
| WO | 2017/122517 | 7/2017 | | |
| WO | 2017/195248 | 11/2017 | | |
| WO | 2019/123782 | 6/2019 | | |
| WO | 2019/123804 | 6/2019 | | |
| WO | 2019/123805 | 6/2019 | | |
| WO | 2019/123806 | 6/2019 | | |
| WO | 2019/123807 | 6/2019 | | |
| WO | 2019/124400 | 6/2019 | | |
| WO | 2019/124401 | 6/2019 | | |
| WO | 2019/124402 | 6/2019 | | |
| WO | 2019/124403 | 6/2019 | | |
| WO | 2019/124404 | 6/2019 | | |

OTHER PUBLICATIONS

International Preliminary Report on Patentability dated Jun. 23, 2020 in International Application No. PCT/JP2018/046531.
International Preliminary Report on Patentability dated Jun. 23, 2020 in International Application No. PCT/JP2018/045978.
International Search Report dated Mar. 19, 2019 in International Application No. PCT/JP2018/045978.
International Preliminary Report on Patentability dated Jun. 23, 2020 in International Application No. PCT/JP2018/046532.
International Search Report dated Feb. 12, 2019 in International Application No. PCT/JP2018/046532.
International Preliminary Report on Patentability dated Jun. 23, 2020 in International Application No. PCT/JP2018/042027.
International Search Report dated Feb. 12, 2019 in International Application No. PCT/JP2018/042027.
International Preliminary Report on Patentability dated Jun. 23, 2020 in International Application No. PCT/JP2018/042032.
International Search Report dated Feb. 19, 2019 in International Application No. PCT/JP2018/042032.
International Preliminary Report on Patentability dated Jun. 23, 2020 in International Application No. PCT/JP2018/046666.
International Search Report dated Apr. 2, 2019 in International Application No. PCT/JP2018/046666.
International Preliminary Report on Patentability dated Jun. 23, 2020 in International Application No. PCT/JP2018/045336.
International Search Report dated Feb. 19, 2019 in International Application No. PCT/JP2018/045336.
International Preliminary Report on Patentability dated Jun. 23, 2020 in International Application No. PCT/JP2018/045557.
International Search Report dated Mar. 12, 2019 in International Application No. PCT/JP2018/045557.
International Preliminary Report on Patentability dated Jun. 23, 2020 in International Application No. PCT/JP2018/046426.
International Search Report dated Feb. 19, 2019 in International Application No. PCT/JP2018/046426.
International Preliminary Report on Patentability dated Jun. 23, 2020 in International Application No. PCT/JP2018/046427.
International Search Report dated Feb. 19, 2019 in International Application No. PCT/JP2018/046427.
International Preliminary Report on Patentability dated Jun. 23, 2020 in International Application No. PCT/JP2018/046428.
International Search Report dated Mar. 19, 2019 in International Application No. PCT/JP2018/046428.
International Preliminary Report on Patentability dated Jun. 23, 2020 in International Application No. PCT/JP2018/046581.
International Search Report dated Mar. 5, 2019 in International Application No. PCT/JP2018/046581.
International Preliminary Report on Patentability dated Jun. 23, 2020 in International Application No. PCT/JP2018/046630.
International Search Report dated Mar. 5, 2019 in International Application No. PCT/JP2018/046630.
International Preliminary Report on Patentability dated Jun. 23, 2020 in International Application No. PCT/JP2018/046582.
International Search Report dated Mar. 5, 2019 in International Application No. PCT/JP2018/046582.
International Preliminary Report on Patentability dated Jun. 23, 2020 in International Application No. PCT/JP2018/046631.
International Search Report dated Mar. 5, 2019 in International Application No. PCT/JP2018/046631.
International Preliminary Report on Patentability dated Jun. 23, 2020 in International Application No. PCT/JP2018/046627.
International Search Report dated Mar. 19, 2019 in International Application No. PCT/JP2018/046627.
International Preliminary Report on Patentability dated Jun. 23, 2020 in International Application No. PCT/JP2018/046628.
International Search Report dated Mar. 19, 2019 in International Application No. PCT/JP2018/046628.
International Preliminary Report on Patentability dated Jun. 23, 2020 in International Application No. PCT/JP2018/045979.
International Search Report dated Mar. 12, 2019 in International Application No. PCT/JP2018/045979.
International Preliminary Report on Patentability dated Jun. 23, 2020 in International Application No. PCT/JP2018/046434.
International Search Report dated Feb. 19, 2019 in International Application No. PCT/JP2018/046434.
International Preliminary Report on Patentability dated Jun. 23, 2020 in International Application No. PCT/JP2018/045290.
International Search Report dated Jan. 22, 2019 in International Application No. PCT/JP2018/045290.

(56) References Cited

OTHER PUBLICATIONS

International Preliminary Report on Patentability dated Jun. 23, 2020 in International Application No. PCT/JP2018/045288.
International Search Report dated Jan. 22, 2019 in International Application No. PCT/JP2018/045288.
International Preliminary Report on Patentability dated Jun. 23, 2020 in International Application No. PCT/JP2018/045289.
International Search Report dated Jan. 22, 2019 in International Application No. PCT/JP2018/045289.
International Preliminary Report on Patentability dated Jun. 23, 2020 in International Application No. PCT/JP2018/046639.
International Preliminary Report on Patentability dated Jun. 23, 2020 in International Application No. PCT/JP2018/046642.
International Preliminary Report on Patentability dated Jun. 23, 2020 in International Application No. PCT/JP2018/038746.
International Preliminary Report on Patentability dated Jun. 23, 2020 in International Application No. PCT/JP2018/046643.
International Preliminary Report on Patentability dated Jun. 23, 2020 in International Application No. PCT/JP2018/038748.
International Preliminary Report on Patentability dated Jun. 23, 2020 in International Application No. PCT/JP2018/046640.
International Preliminary Report on Patentability dated Jun. 23, 2020 in International Application No. PCT/JP2018/046644.
International Preliminary Report on Patentability dated Jun. 23, 2020 in International Application No. PCT/JP2018/038749.
International Preliminary Report on Patentability dated Jun. 23, 2020 in International Application No. PCT/JP2018/037483.
International Search Report dated Feb. 19, 2019 in International Application No. PCT/JP2018/045335.
International Preliminary Report on Patentability dated Jun. 23, 2020 in International Application No. PCT/JP2018/045335.
International Search Report dated Feb. 19, 2019 in International Application No. PCT/JP2018/046435.
International Preliminary Report on Patentability dated Jun. 23, 2020 in International Application No. PCT/JP2018/046435.
International Search Report dated Mar. 19, 2019 in International (PCT) Application No. PCT/JP2018/046530.
International Preliminary Report on Patentability dated Jun. 23, 2020 in International Application No. PCT/JP2018/046530.
International Search Report dated Feb. 12, 2019 in International (PCT) Application No. PCT/JP2018/046533.
International Preliminary Report on Patentability dated Jun. 23, 2020 in International Application No. PCT/JP2018/046533.
Hirahara et al., "Latest trend of alternative refrigerant: LCCP-analogy for HFO-1234yf Air Conditioners using a Simulation with R134a Properties", Refrigeration, Jan. 15, 2010, vol. 85, No. 987, pp. 15-20, with partial translation.
International Preliminary Report on Patentability dated Jun. 23, 2020 in International Application No. PCT/JP2018/038747.
International Search Report dated Mar. 12, 2019 in International (PCT) Application No. PCT/JP2018/046639.
International Search Report dated Mar. 12, 2019 in International (PCT) Application No. PCT/JP2018/046642.
International Search Report dated Dec. 18, 2018 in International (PCT) Application No. PCT/JP2018/038746.
International Search Report dated Mar. 19, 2019 in International (PCT) Application No. PCT/JP2018/046643.
International Search Report dated Dec. 18, 2018 in International (PCT) Application No. PCT/JP2018/038748.
International Search Report dated Mar. 12, 2019 in International (PCT) Application No. PCT/JP2018/046640.
International Search Report dated Mar. 19, 2019 in International (PCT) Application No. PCT/JP2018/046644.
International Search Report dated Dec. 18, 2018 in International (PCT) Application No. PCT/JP2018/038749.
International Search Report dated Dec. 18, 2018 in International (PCT) Application No. PCT/JP2018/037483.
International Search Report dated Dec. 18, 2018 in International (PCT) Application No. PCT/JP2018/038747.
Summary, Collection of Papers of the 2nd Symposium on New Technologies of Refrigeration and Air Conditioning, 2nd Edition, Ding Guoliang, Ed., published by Shanghai Jiatong University Press, 2003, with Concise Explanation.

* cited by examiner

HEAT SOURCE UNIT AND REFRIGERATION CYCLE APPARATUS

TECHNICAL FIELD

The present disclosure relates to a heat source unit and a refrigeration cycle apparatus.

BACKGROUND ART

Hitherto, in refrigeration cycle apparatuses, such as air conditioners, R410A is often used as a refrigerant. R410A is a two-component mixed refrigerant of difluoromethane ($CH_2F_2$; HFC-32, or R32) and pentafluoroethane ($C_2HF_5$; HFC-125, or R125) and is a pseudo-azeotropic composition.

However, the global warming potential (GWP) of R410A is 2088, and, in recent years, because of growing concern about global warming, R32 that is a refrigerant having a lower GWP is used more often.

For this reason, for example, PTL 1 (International Publication No. 2015/141678) suggests various types of low-GWP refrigerant mixtures as alternatives to R410A.

SUMMARY OF THE INVENTION

Technical Problem

However, for a case where a refrigerant containing at least 1,2-difluoroethylene is used as a refrigerant having a sufficiently low GWP, using a refrigeration cycle apparatus or its component device having any pressure resistance strength is not considered or suggested at all.

For example, for a refrigeration cycle apparatus in which a refrigerant, such as R410A and R32 that are often used so far, when existing connection pipes are used, and the refrigerant is replaced with a refrigerant containing at least 1,2-difluoroethylene, there are concerns about occurrence of damage to the existing connection pipes if a device that is a component of the refrigeration cycle apparatus operates under a pressure exceeding the withstanding pressure of the existing connection pipes.

The contents of the present disclosure are described in view of the above-described points, and it is an object to provide a heat source unit and a refrigeration cycle apparatus that are able to reduce damage to a connection pipe when a refrigerant containing at least 1,2-difluoroethylene is used.

Solution to Problem

A heat source unit according to a first aspect includes a compressor and a heat source-side heat exchanger. The heat source unit is connected via a connection pipe to a service unit and is a component of a refrigeration cycle apparatus. The service unit includes a service-side heat exchanger. In the heat source unit, a refrigerant containing at least 1,2-difluoroethylene is used as a refrigerant. A design pressure of the heat source unit is lower than 1.5 times a design pressure of the connection pipe.

A "design pressure" means a gauge pressure (hereinafter, the same applies).

Since the heat source unit has a design pressure lower than 1.5 times the design pressure of the connection pipe, the heat source unit is operated at a pressure lower than a withstanding pressure of the connection pipe. Therefore, even when the heat source unit is connected to the connection pipe and used, damage to the connection pipe can be reduced.

A refrigeration cycle apparatus according to a second aspect includes a service unit, a connection pipe, and the heat source unit of the first aspect. In the refrigeration cycle apparatus, a refrigerant containing at least 1,2-difluoroethylene is used. The design pressure of the heat source unit is equivalent to a design pressure in a refrigeration cycle apparatus in which refrigerant R22 or refrigerant R407C is used.

Here, the "equivalent" pressure preferably falls within the range of ±10% of the design pressure in a refrigeration cycle apparatus in which refrigerant R22 or refrigerant R407C is used.

With this refrigeration cycle apparatus, even when a refrigeration cycle apparatus in which refrigerant R22 or refrigerant R407C is used is modified to a refrigeration cycle apparatus in which a refrigerant containing at least 1,2-difluoroethylene is used while the original connection pipe is used, damage to the connection pipe can be reduced when the design pressure of the heat source unit, equivalent to or the same as that of the pre-modified one, is used.

A refrigeration cycle apparatus according to a third aspect is the refrigeration cycle apparatus of the second aspect, and the design pressure of the heat source unit is higher than or equal to 3.0 MPa and lower than or equal to 3.7 MPa.

A refrigeration cycle apparatus according to a fourth aspect includes a service unit, a connection pipe, and the heat source unit of the first aspect. In the refrigeration cycle apparatus, a refrigerant containing at least 1,2-difluoroethylene is used. The design pressure of the heat source unit is equivalent to a design pressure in a refrigeration cycle apparatus in which refrigerant R410A or refrigerant R32 is used.

Here, the "equivalent" pressure preferably falls within the range of ±10% of the design pressure in a refrigeration cycle apparatus in which refrigerant R410A or refrigerant R32 is used.

With this refrigeration cycle apparatus, even when a refrigeration cycle apparatus in which refrigerant R410A or refrigerant R32 is used is modified to a refrigeration cycle apparatus in which a refrigerant containing at least 1,2-difluoroethylene is used while the original connection pipe is used, damage to the connection pipe can be reduced when the design pressure of the heat source unit, equivalent to or the same as that of the pre-modified one, is used.

A refrigeration cycle apparatus according to a fifth aspect is the refrigeration cycle apparatus of the fourth aspect, and the design pressure of the heat source unit is higher than or equal to 4.0 MPa and lower than or equal to 4.8 MPa.

A refrigeration cycle apparatus according to a sixth aspect includes a heat source unit, a service unit, and a connection pipe. The heat source unit includes a compressor and a heat source-side heat exchanger. The service unit includes a service-side heat exchanger. The connection pipe connects the heat source unit and the service unit. In the refrigeration cycle apparatus, a refrigerant containing at least 1,2-difluoroethylene is used. A design pressure of the heat source unit is equivalent to a design pressure in a refrigeration cycle apparatus in which refrigerant R22 or refrigerant R407C is used.

Here, the "equivalent" pressure preferably falls within the range of ±10% of the design pressure in a refrigeration cycle apparatus in which refrigerant R22 or refrigerant R407C is used.

With this refrigeration cycle apparatus, even when a refrigeration cycle apparatus in which refrigerant R22 or refrigerant R407C is used is modified to a refrigeration cycle apparatus in which a refrigerant containing at least 1,2- difluoroethylene is used while the original connection pipe is used, damage to the connection pipe can be reduced when the design pressure of the heat source unit, equivalent to or the same as that of the pre-modified one, is used.

A refrigeration cycle apparatus according to a seventh aspect is the refrigeration cycle apparatus of the sixth aspect, and the design pressure of the heat source unit is higher than or equal to 3.0 MPa and lower than or equal to 3.7 MPa.

A refrigeration cycle apparatus according to an eighth aspect includes a heat source unit, a service unit, and a connection pipe. The heat source unit includes a compressor and a heat source-side heat exchanger. The service unit includes a service-side heat exchanger. The connection pipe connects the heat source unit and the service unit. In the refrigeration cycle apparatus, a refrigerant containing at least 1,2-difluoroethylene is used. A design pressure of the heat source unit is equivalent to a design pressure in a refrigeration cycle apparatus in which refrigerant R410A or refrigerant R32 is used.

Here, the "equivalent" pressure preferably falls within the range of ±10% of the design pressure in a refrigeration cycle apparatus in which refrigerant R410A or refrigerant R32 is used.

With this refrigeration cycle apparatus, even when a refrigeration cycle apparatus in which refrigerant R410A or refrigerant R32 is used is modified to a refrigeration cycle apparatus in which a refrigerant containing at least 1,2-difluoroethylene is used while the original connection pipe is used, damage to the connection pipe can be reduced when the design pressure of the heat source unit, equivalent to or the same as that of the pre-modified one, is used.

A refrigeration cycle apparatus according to a ninth aspect is the refrigeration cycle apparatus of the eighth aspect, and the design pressure of the heat source unit is higher than or equal to 4.0 MPa and lower than or equal to 4.8 MPa.

A heat source unit according to a tenth aspect includes a compressor, a heat source-side heat exchanger, and a control device. The heat source unit is connected via a connection pipe to a service unit and is a component of a refrigeration cycle apparatus. The service unit includes a service-side heat exchanger. In the heat source unit, a refrigerant containing at least 1,2-difluoroethylene is used as a refrigerant. The control device is configured to set or be able to set an upper limit of a controlled pressure of the refrigerant such that the upper limit is lower than 1.5 times a design pressure of the connection pipe.

The heat source unit is configured to set or be able to set an upper limit of a controlled pressure of the refrigerant made by the control device such that the upper limit is lower than 1.5 times a design pressure of the connection pipe. Therefore, even when the heat source unit is connected to the connection pipe and used, operation control is ensured at a pressure lower than the withstanding pressure of the connection pipe, so damage to the connection pipe can be reduced.

A refrigeration cycle apparatus according to an eleventh aspect includes a service unit, a connection pipe, and the heat source unit of the tenth aspect. In the refrigeration cycle apparatus, a refrigerant containing at least 1,2-difluoroethylene is used. The control device is configured to set or be able to set an upper limit of a controlled pressure of the refrigerant such that the upper limit is equivalent to an upper limit of a controlled pressure in a refrigeration cycle apparatus in which refrigerant R22 or refrigerant R407C is used.

Here, the "equivalent" pressure preferably falls within the range of ±10% of the controlled pressure in a refrigeration cycle apparatus in which refrigerant R22 or refrigerant R407C is used.

With this refrigeration cycle apparatus, even when a refrigeration cycle apparatus in which refrigerant R22 or refrigerant R407C is used is modified to a refrigeration cycle apparatus in which a refrigerant containing at least 1,2-difluoroethylene is used while the original connection pipe is used, the refrigeration cycle apparatus is configured to set or be able to set the upper limit of the controlled pressure of the refrigerant by the control device of the heat source unit such that the upper limit is equal to or the same as the upper limit of the controlled pressure of the heat source unit in a refrigeration cycle apparatus in which refrigerant R22 or refrigerant R407C is used, so damage to the connection pipe can be reduced.

A refrigeration cycle apparatus according to a twelfth aspect is the refrigeration cycle apparatus of the eleventh aspect, and the upper limit of the controlled pressure is set to be higher than or equal to 3.0 MPa and lower than or equal to 3.7 MPa.

A refrigeration cycle apparatus according to a thirteenth aspect includes a service unit, a connection pipe, and the heat source unit of the tenth aspect. In the refrigeration cycle apparatus, a refrigerant containing at least 1,2-difluoroethylene is used. The control device is configured to set or be able to set an upper limit of a controlled pressure of the refrigerant such that the upper limit is equivalent to an upper limit of a controlled pressure in a refrigeration cycle apparatus in which refrigerant R410A or refrigerant R32 is used.

Here, the "equivalent" pressure preferably falls within the range of ±10% of the controlled pressure in a refrigeration cycle apparatus in which refrigerant R410A or refrigerant R32 is used.

With this refrigeration cycle apparatus, even when a refrigeration cycle apparatus in which refrigerant R410A or refrigerant R32 is used is modified to a refrigeration cycle apparatus in which a refrigerant containing at least 1,2-difluoroethylene is used while the original connection pipe is used, the refrigeration cycle apparatus is configured to set or be able to set the upper limit of the controlled pressure of the refrigerant by the control device of the heat source unit such that the upper limit is equal to or the same as the upper limit of the controlled pressure of the heat source unit in a refrigeration cycle apparatus in which refrigerant R410A or refrigerant R32 is used, so damage to the connection pipe can be reduced.

A refrigeration cycle apparatus according to a fourteenth aspect is the refrigeration cycle apparatus of the thirteenth aspect, and the upper limit of the controlled pressure is set to be higher than or equal to 4.0 MPa and lower than or equal to 4.8 MPa.

A refrigeration cycle apparatus according to a fifteenth aspect includes a heat source unit, a service unit, a connection pipe, and a control device. The heat source unit includes a compressor and a heat source-side heat exchanger. The service unit includes a service-side heat exchanger. The connection pipe connects the heat source unit and the service unit. In the refrigeration cycle apparatus, a refrigerant containing at least 1,2-difluoroethylene is used. The control device is configured to set or be able to set an upper limit of a controlled pressure of the refrigerant such that the upper limit is equivalent to an upper limit of a controlled pressure in a refrigeration cycle apparatus in which refrigerant R22 or refrigerant R407C is used.

Here, the "equivalent" pressure preferably falls within the range of ±10% of the controlled pressure in a refrigeration cycle apparatus in which refrigerant R22 or refrigerant R407C is used.

With this refrigeration cycle apparatus, even when a refrigeration cycle apparatus in which refrigerant R22 or refrigerant R407C is used is modified to a refrigeration cycle apparatus in which a refrigerant containing at least 1,2-difluoroethylene is used while the original connection pipe is used, the refrigeration cycle apparatus is configured to set or be able to set the upper limit of the controlled pressure of the refrigerant by the control device of the heat source unit such that the upper limit is equal to or the same as the upper limit of the controlled pressure of the heat source unit in a refrigeration cycle apparatus in which refrigerant R22 or refrigerant R407C is used, so damage to the connection pipe can be reduced.

A refrigeration cycle apparatus according to a sixteenth aspect is the refrigeration cycle apparatus of the fifteenth aspect, and the upper limit of the controlled pressure is set to be higher than or equal to 3.0 MPa and lower than or equal to 3.7 MPa.

A refrigeration cycle apparatus according to a seventeenth aspect includes a heat source unit, a service unit, a connection pipe, and a control device. The heat source unit includes a compressor and a heat source-side heat exchanger. The service unit includes a service-side heat exchanger. The connection pipe connects the heat source unit and the service unit. In the refrigeration cycle apparatus, a refrigerant containing at least 1,2-difluoroethylene is used. The control device is configured to set or be able to set an upper limit of a controlled pressure of the refrigerant such that the upper limit is equivalent to an upper limit of a controlled pressure in a refrigeration cycle apparatus in which refrigerant R410A or refrigerant R32 is used.

Here, the "equivalent" pressure preferably falls within the range of ±10% of the controlled pressure in a refrigeration cycle apparatus in which refrigerant R410A or refrigerant R32 is used.

With this refrigeration cycle apparatus, even when a refrigeration cycle apparatus in which refrigerant R410A or refrigerant R32 is used is modified to a refrigeration cycle apparatus in which a refrigerant containing at least 1,2-difluoroethylene is used while the original connection pipe is used, the refrigeration cycle apparatus is configured to set or be able to set the upper limit of the controlled pressure of the refrigerant by the control device of the heat source unit such that the upper limit is equal to or the same as the upper limit of the controlled pressure of the heat source unit in a refrigeration cycle apparatus in which refrigerant R410A or refrigerant R32 is used, so damage to the connection pipe can be reduced.

A refrigeration cycle apparatus according to an eighteenth aspect is the refrigeration cycle apparatus of the seventeenth aspect, and the upper limit of the controlled pressure is set to be higher than or equal to 4.0 MPa and lower than or equal to 4.8 MPa.

A refrigeration cycle apparatus according to a nineteenth aspect is the refrigeration cycle apparatus according to any of the second to ninth and eleventh to eighteenth aspects, wherein
the refrigerant comprises trans-1,2-difluoroethylene (HFO-1132(E)), trifluoroethylene (HFO-1123), and 2,3,3,3-tetrafluoro-1-propene (R1234yf).

With this refrigeration cycle apparatus, a refrigerant having such performance that the refrigerant has a sufficiently low GWP and a refrigeration capacity (which may be referred to as cooling capacity or capacity) and a coefficient of performance (COP) equivalent to those of R410A is used, and damage to the connection pipe can be reduced.

A refrigeration cycle apparatus according to a twentieth aspect is the refrigeration cycle apparatus according to the nineteenth aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line segments BD, CO, and OA);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines.

A refrigeration cycle apparatus according to a twenty first aspect is the refrigeration cycle apparatus according to the nineteenth aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments IA, BD, and CG);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments GI, IA, BD, and CG are straight lines.

A refrigeration cycle apparatus according to a twenty second aspect is the refrigeration cycle apparatus according to the nineteenth aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments BD and CJ);
the line segment PN is represented by coordinates (x, $-0.1135x^2+12.112x-280.43$, $0.1135x^2-13.112x+380.43$),
the line segment NK is represented by coordinates (x, $0.2421x^2-29.955x+931.91$, $-0.2421x^2+28.955x-831.91$),
the line segment KA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments JP, BD, and CG are straight lines.

A refrigeration cycle apparatus according to a twenty third aspect is the refrigeration cycle apparatus according to the nineteenth aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:
point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments BD and CJ);
the line segment PL is represented by coordinates (x, $-0.1135x^2+12.112x-280.43$, $0.1135x^2-13.112x+380.43$)
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments JP, LM, BD, and CG are straight lines.

A refrigeration cycle apparatus according to a twenty fourth aspect is the refrigeration cycle apparatus according to the nineteenth aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments (excluding the points on the line segment BF);
the line segment PL is represented by coordinates (x, $-0.1135x^2+12.112x-280.43$, $0.1135x^2-13.112x+380.43$),
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2-0.2499x+38.2$),
the line segment TP is represented by coordinates (x, $0.00672x^2-0.7607x+63.525$, $-0.00672x^2-0.2393x+36.475$), and
the line segments LM and BF are straight lines.

A refrigeration cycle apparatus according to a twenty fifth aspect is the refrigeration cycle apparatus according to the nineteenth aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:
point P (55.8, 42.0, 2.2),
point L (63.1, 31.9, 5.0),
point Q (62.8, 29.6, 7.6), and
point R (49.8, 42.3, 7.9),
or on the above line segments;
the line segment PL is represented by coordinates (x, $-0.1135x^2+12.112x-280.43$, $0.1135x^2-13.112x+380.43$),
the line segment RP is represented by coordinates (x, $0.00672x^2-0.7607x+63.525$, $-0.00672x^2-0.2393x+36.475$), and
the line segments LQ and QR are straight lines.

A refrigeration cycle apparatus according to a twenty sixth aspect is the refrigeration cycle apparatus according to the nineteenth aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:
point S (62.6, 28.3, 9.1),
point M (60.3, 6.2, 33.5),
point A' (30.6, 30.0, 39.4),
point B (0.0, 58.7, 41.3), point F (0.0, 61.8, 38.2), and
point T (35.8, 44.9, 19.3),
or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TS is represented by coordinates (x, $-0.0017x^2-0.7869x+70.888$, $-0.0017x^2-0.2131x+29.112$), and the line segments SM and BF are straight lines.

A refrigeration cycle apparatus according to a twenty seventh aspect is the refrigeration cycle apparatus according to any of the second to ninth and eleventh to eighteenth aspects, wherein the refrigerant comprises trans-1,2-difluoroethylene (HFO-1132(E)) and trifluoroethylene (HFO-1123) in a total amount of 99.5 mass % or more based on the entire refrigerant, and the refrigerant comprises 62.0 mass % to 72.0 mass % of HFO-1132(E) based on the entire refrigerant.

With this refrigeration cycle apparatus, a refrigerant having such performance that the refrigerant has a sufficiently low GWP and a coefficient of performance (COP) and a refrigeration capacity (which may be referred to as cooling capacity or capacity) equivalent to those of R410A and is classified with lower flammability (class 2L) under the standard of American Society of Heating Refrigeration and Air Conditioning Engineers (ASHRAE) is used, and damage to the connection pipe can be reduced.

A refrigeration cycle apparatus according to a twenty eighth aspect is the refrigeration cycle apparatus according to any of the second to ninth and eleventh to eighteenth aspects, wherein the refrigerant comprises HFO-1132(E) and HFO-1123 in a total amount of 99.5 mass % or more based on the entire refrigerant, and the refrigerant comprises 45.1 mass % to 47.1 mass % of HFO-1132(E) based on the entire refrigerant.

With this refrigeration cycle apparatus, a refrigerant having such performance that the refrigerant has a sufficiently low GWP and a coefficient of performance (COP) and a refrigeration capacity (which may be referred to as cooling capacity or capacity) equivalent to those of R410A and is classified with lower flammabilitye (class 2L) under the standard of American Society of Heating Refrigeration and Air Conditioning Engineers (ASHRAE) is used, and damage to the connection pipe can be reduced.

A refrigeration cycle apparatus according to a twenty ninth aspect is the refrigeration cycle apparatus according to any of the second to ninth and eleventh to eighteenth aspects, wherein the refrigerant comprises trans-1,2-difluoroethylene (HFO-1132(E)), trifluoroethylene (HFO-1123), 2,3,3,3-tetrafluoro-1-propene (R1234yf), and difluoromethane (R32), wherein when the mass % of HFO-1132(E), HFO-1123, R1234yf, and R32 based on their sum in the refrigerant is respectively represented by x, y, z, and a, if $0<a\leq11.1$, coordinates (x,y,z) in a ternary composition diagram in which the sum of HFO-1132(E), HFO-1123, and R1234yf is (100−a) mass % are within the range of a figure surrounded by straight lines GI, IA, AB, BD', D' C, and CG that connect the following 6 points:

point G ($0.026a^2-1.7478a+72.0$, $-0.026a^2+0.7478a+28.0$, 0.0),
point I ($0.026a^2-1.7478a+72.0$, 0.0, $-0.026a^2+0.7478a+28.0$),
point A ($0.0134a^2-1.9681a+68.6$, 0.0, $-0.0134a^2+0.9681a+31.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines GI, AB, and D'C (excluding point G, point I, point A, point B, point D', and point C);

if $11.1<a\leq18.2$, coordinates (x,y,z) in the ternary composition diagram are within the range of a figure surrounded by straight lines GI, IA, AB, BW, and WG that connect the following 5 points:
point G ($0.02a^2-1.6013a+71.105$, $-0.02a^2+0.6013a+28.895$, 0.0),
point I ($0.02a^2-1.6013a+71.105$, 0.0, $-0.02a^2+0.6013a+28.895$),
point A ($0.0112a^2-1.9337a+68.484$, 0.0, $-0.0112a^2+0.9337a+31.516$),
point B (0.0, $0.0075a^2-1.5156a+58.199$, $-0.0075a^2+0.5156a+41.801$), and
point W (0.0, 100.0−a, 0.0),
or on the straight lines GI and AB (excluding point G, point I, point A, point B, and point W);

if $18.2<a\leq26.7$, coordinates (x,y,z) in the ternary composition diagram are within the range of a figure surrounded by straight lines GI, IA, AB, BW, and WG that connect the following 5 points:
point G ($0.0135a^2-1.4068a+69.727$, $-0.0135a^2+0.4068a+30.273$, 0.0),
point I ($0.0135a^2-1.4068a+69.727$, 0.0, $-0.0135a^2+0.4068a+30.273$),
point A ($0.0107a^2-1.9142a+68.305$, 0.0, $-0.0107a^2+0.9142a+31.695$),
point B (0.0, $0.009a^2-1.6045a+59.318$, $-0.009a^2+0.6045a+40.682$), and
point W (0.0, 100.0−a, 0.0),
or on the straight lines GI and AB (excluding point G, point I, point A, point B, and point W);

if $26.7<a\leq36.7$, coordinates (x,y,z) in the ternary composition diagram are within the range of a figure surrounded by straight lines GI, IA, AB, BW, and WG that connect the following 5 points:
point G ($0.0111a^2-1.3152a+68.986$, $-0.0111a^2+0.3152a+31.014$, 0.0),
point I ($0.0111a^2-1.3152a+68.986$, 0.0, $-0.0111a^2+0.3152a+31.014$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$), and
point W (0.0, 100.0−a, 0.0),
or on the straight lines GI and AB (excluding point G, point I, point A, point B, and point W);
and if $36.7<a\leq46.7$, coordinates (x,y,z) in the ternary composition diagram are within the range of a figure surrounded by straight lines GI, IA, AB, BW, and WG that connect the following 5 points:
point G ($0.0061a^2-0.9918a+63.902$, $-0.0061a^2-0.0082a+36.098$, 0.0), point I ($0.0061a^2-0.9918a+63.902$, 0.0, $-0.0061a^2-0.0082a+36.098$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$), and
point W (0.0, 100.0−a, 0.0),
or on the straight lines GI and AB (excluding point G, point I, point A, point B, and point W).

With this refrigeration cycle apparatus, a refrigerant having such performance that the refrigerant has a sufficiently low GWP and a refrigeration capacity (which may be referred to as cooling capacity or capacity) and a coefficient of performance (COP) equivalent to those of R410A is used, and damage to the connection pipe can be reduced.

A refrigeration cycle apparatus according to a thirtieth aspect is the refrigeration cycle apparatus according to any of the second to ninth and eleventh to eighteenth aspects, wherein the refrigerant comprises trans-1,2-difluoroethylene (HFO-1132(E)), trifluoroethylene (HFO-1123), 2,3,3,3-tetrafluoro-1-propene (R1234yf), and difluoromethane (R32), wherein when the mass % of HFO-1132(E), HFO-1123, R1234yf, and R32 based on their sum in the refrigerant is respectively represented by x, y, z, and a, if 0<a≤11.1, coordinates (x,y,z) in a ternary composition diagram in which the sum of HFO-1132(E), HFO-1123, and R1234yf is (100−a) mass % are within the range of a figure surrounded by straight lines JK', K'B, BD', D'C, and CJ that connect the following 5 points:
point J ($0.0049a^2-0.9645a+47.1$, $-0.0049a^2-0.0355a+52.9$, 0.0),
point K' ($0.0514a^2-2.4353a+61.7$, $-0.0323a^2+0.4122a+5.9$, $-0.0191a^2+1.0231a+32.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines JK', K'B, and D'C (excluding point J, point B, point D', and point C);

if 11.1<a≤18.2, coordinates (x,y,z) in the ternary composition diagram are within the range of a figure surrounded by straight lines JK', K'B, BW, and WJ that connect the following 4 points:
point J ($0.0243a^2-1.4161a+49.725$, $-0.0243a^2+0.4161a+50.275$, 0.0),
point K' ($0.0341a^2-2.1977a+61.187$, $-0.0236a^2+0.34a+5.636$, $-0.0105a^2+0.8577a+33.177$),
point B (0.0, $0.0075a^2-1.5156a+58.199$, $-0.0075a^2+0.5156a+41.801$), and
point W (0.0, 100.0−a, 0.0),
or on the straight lines JK' and K'B (excluding point J, point B, and point W);

if 18.2<a≤26.7, coordinates (x,y,z) in the ternary composition diagram are within the range of a figure surrounded by straight lines JK', K'B, BW, and WJ that connect the following 4 points:
point J ($0.0246a^2-1.4476a+50.184$, $-0.0246a^2+0.4476a+49.816$, 0.0),
point K' ($0.0196a^2-1.7863a+58.515$, $-0.0079a^2-0.1136a+8.702$, $-0.0117a^2+0.8999a+32.783$),
point B (0.0, $0.009a^2-1.6045a+59.318$, $-0.009a^2+0.6045a+40.682$), and
point W (0.0, 100.0−a, 0.0), or on the straight lines JK' and K'B (excluding point J, point B, and point W);

if 26.7<a≤36.7, coordinates (x,y,z) in the ternary composition diagram are within the range of a figure surrounded by straight lines JK', K'A, AB, BW, and WJ that connect the following 5 points:
point J ($0.0183a^2-1.1399a+46.493$, $-0.0183a^2+0.1399a+53.507$, 0.0),
point K' ($-0.0051a^2+0.0929a+25.95$, 0.0, $0.0051a^2-1.0929a+74.05$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$), and
point W (0.0, 100.0−a, 0.0),
or on the straight lines JK', K'A, and AB (excluding point J, point B, and point W); and if 36.7<a≤46.7, coordinates (x,y,z) in the ternary composition diagram are within the range of a figure surrounded by straight lines JK', K'A, AB, BW, and WJ that connect the following 5 points:
point J ($-0.0134a^2+1.0956a+7.13$, $0.0134a^2-2.0956a+92.87$, 0.0),
point K' (−1.892a+29.443, 0.0, 0.892a+70.557),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$), and
point W (0.0, 100.0−a, 0.0),
or on the straight lines JK', K'A, and AB (excluding point J, point B, and point W).

With this refrigeration cycle apparatus, a refrigerant having such performance that the refrigerant has a sufficiently low GWP and a refrigeration capacity (which may be referred to as cooling capacity or capacity) and a coefficient of performance (COP) equivalent to those of R410A is used, and damage to the connection pipe can be reduced.

A refrigeration cycle apparatus according to a thirty first aspect is the refrigeration cycle apparatus according to any of the second to ninth and eleventh to eighteenth aspects, wherein the refrigerant comprises trans-1,2-difluoroethylene (HFO-1132(E)), difluoromethane (R32), and 2,3,3,3-tetrafluoro-1-propene (R1234yf),
wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI;
the line segment IJ is represented by coordinates ($0.0236y^2-1.7616y+72.0$, y, $-0.0236y^2+0.7616y+28.0$);
the line segment NE is represented by coordinates ($0.012y^2-1.9003y+58.3$, y, $-0.012y^2+0.9003y+41.7$); and
the line segments JN and EI are straight lines.

With this refrigeration cycle apparatus, a refrigerant having such performance that the refrigerant has a sufficiently low GWP and a refrigeration capacity (which may be referred to as cooling capacity or capacity) equivalent to that of R410A and is classified with lower flammability (class 2L) under the standard of American Society of Heating Refrigeration and Air Conditioning Engineers (ASHRAE) is used, and damage to the connection pipe can be reduced.

A refrigeration cycle apparatus according to a thirty second aspect is the refrigeration cycle apparatus according to any of the second to ninth and eleventh to eighteenth aspects, wherein the refrigerant comprises HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', MN, NV, VG, and GM that connect the following 5 points:

point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);

the line segment MM' is represented by coordinates $(0.132y^2-3.34y+52.6, y, -0.132y^2+2.34y+47.4)$;

the line segment M'N is represented by coordinates $(0.0596y^2-2.2541y+48.98, y, -0.0596y^{2+1.2541}y+51.02)$;

the line segment VG is represented by coordinates $(0.0123y^2-1.8033y+39.6, y, -0.0123y^2+0.8033y+60.4)$; and the line segments NV and GM are straight lines.

With this refrigeration cycle apparatus, a refrigerant having such performance that the refrigerant has a sufficiently low GWP and a refrigeration capacity (which may be referred to as cooling capacity or capacity) equivalent to that of R410A and is classified with lower flammability (class 2L) under the standard of American Society of Heating Refrigeration and Air Conditioning Engineers (ASHRAE) is used, and damage to the connection pipe can be reduced.

A refrigeration cycle apparatus according to a thirty third aspect is the refrigeration cycle apparatus according to any of the second to ninth and eleventh to eighteenth aspects, wherein the refrigerant comprises HFO-1132(E), R32, and R1234yf, wherein when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:

point O (22.6, 36.8, 40.6),
point N (27.7, 18.2, 54.1), and
point U (3.9, 36.7, 59.4),
or on these line segments;

the line segment ON is represented by coordinates $(0.0072y^2-0.6701y+37.512, y, -0.0072y^2-0.3299y+62.488)$;

the line segment NU is represented by coordinates $(0.0083y^2-1.7403y+56.635, y, -0.0083y^2+0.7403y+43.365)$; and the line segment UO is a straight line.

With this refrigeration cycle apparatus, a refrigerant having such performance that the refrigerant has a sufficiently low GWP and a refrigeration capacity (which may be referred to as cooling capacity or capacity) equivalent to that of R410A and is classified with lower flammability (class 2L) under the standard of American Society of Heating Refrigeration and Air Conditioning Engineers (ASHRAE) is used, and damage to the connection pipe can be reduced.

A refrigeration cycle apparatus according to a thirty fourth aspect is the refrigeration cycle apparatus according to any of the second to ninth and eleventh to eighteenth aspects, wherein the refrigerant comprises HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:

point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;

the line segment QR is represented by coordinates $(0.0099y^2-1.975y+84.765, y, -0.0099y^2+0.975y+15.235)$;

the line segment RT is represented by coordinates $(0.0082y^2-1.8683y+83.126, y, -0.0082y^2+0.8683y+16.874)$;

the line segment LK is represented by coordinates $(0.0049y^2-0.8842y+61.488, y, -0.0049y^2-0.1158y+38.512)$;

the line segment KQ is represented by coordinates $(0.0095y^2-1.2222y+67.676, y, -0.0095y^2+0.2222y+32.324)$; and the line segment TL is a straight line.

With this refrigeration cycle apparatus, a refrigerant having such performance that the refrigerant has a sufficiently low GWP and a refrigeration capacity (which may be referred to as cooling capacity or capacity) equivalent to that of R410A and is classified with lower flammability (class 2L) under the standard of American Society of Heating Refrigeration and Air Conditioning Engineers (ASHRAE) is used, and damage to the connection pipe can be reduced.

A refrigeration cycle apparatus according to a thirty fifth aspect is the refrigeration cycle apparatus according to any of the second to ninth and eleventh to eighteenth aspects, wherein the refrigerant comprises HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:

point P (20.5, 51.7, 27.8),
point S (21.9, 39.7, 38.4), and
point T (8.6, 51.6, 39.8),
or on these line segments;

the line segment PS is represented by coordinates $(0.0064y^2-0.7103y+40.1, y, -0.0064y^2-0.2897y+59.9)$;

the line segment ST is represented by coordinates $(0.0082y^2-1.8683y+83.126, y, -0.0082y^2+0.8683y+16.874)$; and the line segment TP is a straight line.

With this refrigeration cycle apparatus, a refrigerant having such performance that the refrigerant has a sufficiently low GWP and a refrigeration capacity (which may be referred to as cooling capacity or capacity) equivalent to that of R410A and is classified with lower flammability (class 2L) under the standard of American Society of Heating Refrigeration and Air Conditioning Engineers (ASHRAE) is used, and damage to the connection pipe can be reduced.

A refrigeration cycle apparatus according to a thirty sixth aspect is the refrigeration cycle apparatus according to any of the second to ninth and eleventh to eighteenth aspects, wherein the refrigerant comprises trans-1,2-difluoroethylene (HFO-1132(E)), trifluoroethylene (HFO-1123), and difluoromethane (R32), wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments IK, KB', B'H, HR, RG, and GI that connect the following 6 points:

point I (72.0, 28.0, 0.0),
point K (48.4, 33.2, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GI);

the line segment IK is represented by coordinates $(0.025z^2-1.7429z+72.00, -0.025z^2+0.7429z+28.0, z)$, the line segment HR is represented by coordinates $(-0.3123z^2+4.234z+11.06, 0.3123z^2-5.234z+88.94, z)$, the line segment RG is represented by coordinates $(-0.0491z^2-1.1544z+38.5, 0.0491z^2+0.1544z+61.5, z)$, and the line segments KB' and GI are straight lines.

With this refrigeration cycle apparatus, a refrigerant having such performance that the refrigerant has a sufficiently low GWP and a coefficient of performance (COP) equivalent to that of R410A is used, and damage to the connection pipe can be reduced.

A refrigeration cycle apparatus according to a thirty seventh aspect is the refrigeration cycle apparatus according to any of the second to ninth and eleventh to eighteenth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments IJ, JR, RG, and GI that connect the following 4 points:

point I (72.0, 28.0, 0.0),
point J (57.7, 32.8, 9.5),
point R (23.1, 67.4, 9.5), and
point G (38.5, 61.5, 0.0),
or on these line segments (excluding the points on the line segment GI);

the line segment IJ is represented by coordinates $(0.025z^2-1.7429z+72.0, -0.025z^2+0.7429z+28.0, z)$, the line segment RG is represented by coordinates $(-0.0491z^2-1.1544z+38.5, 0.0491z^2+0.1544z+61.5, z)$, and the line segments JR and GI are straight lines.

With this refrigeration cycle apparatus, a refrigerant having such performance that the refrigerant has a sufficiently low GWP and a coefficient of performance (COP) equivalent to that of R410A is used, and damage to the connection pipe can be reduced.

A refrigeration cycle apparatus according to a thirty eighth aspect is the refrigeration cycle apparatus according to any of the second to ninth and eleventh to eighteenth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments MP, PB', B'H, HR, RG, and GM that connect the following 6 points:

point M (47.1, 52.9, 0.0),
point P (31.8, 49.8, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GM);

the line segment MP is represented by coordinates $(0.0083z^2-0.984z+47.1, -0.0083z^2-0.016z+52.9, z)$, the line segment HR is represented by coordinates $(-0.3123z^2+4.234z+11.06, 0.3123z^2-5.234z+88.94, z)$, the line segment RG is represented by coordinates $(-0.0491z^2-1.1544z+38.5, 0.0491z^2+0.1544z+61.5, z)$, and the line segments PB' and GM are straight lines.

With this refrigeration cycle apparatus, a refrigerant having such performance that the refrigerant has a sufficiently low GWP and a coefficient of performance (COP) equivalent to that of R410A is used, and damage to the connection pipe can be reduced.

A refrigeration cycle apparatus according to a thirty ninth aspect is the refrigeration cycle apparatus according to any of the second to ninth and eleventh to eighteenth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments MN, NR, RG, and GM that connect the following 4 points:

point M (47.1, 52.9, 0.0),
point N (38.5, 52.1, 9.5),
point R (23.1, 67.4, 9.5), and
point G (38.5, 61.5, 0.0),
or on these line segments (excluding the points on the line segment GM);

the line segment MN is represented by coordinates $(0.0083z^2-0.984z+47.1, -0.0083z^2-0.016z+52.9, z)$, the line segment RG is represented by coordinates ($-0.0491z^2-1.1544z+38.5$, $0.0491z^2+0.1544z+61.5$, z), and the line segments JR and GI are straight lines.

With this refrigeration cycle apparatus, a refrigerant having such performance that the refrigerant has a sufficiently low GWP and a coefficient of performance (COP) equivalent to that of R410A is used, and damage to the connection pipe can be reduced.

A refrigeration cycle apparatus according to a fortieth aspect is the refrigeration cycle apparatus according to any of the second to ninth and eleventh to eighteenth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments PS, ST, and TP that connect the following 3 points:

point P (31.8, 49.8, 18.4),
point S (25.4, 56.2, 18.4), and
point T (34.8, 51.0, 14.2),
or on these line segments;

the line segment ST is represented by coordinates ($-0.0982z^2+0.9622z+40.931$, $0.0982z^2-1.9622z+59.069$, z), the line segment TP is represented by coordinates ($0.0083z^2-0.984z+47.1$, $-0.0083z^2-0.016z+52.9$, z), and the line segment PS is a straight line.

With this refrigeration cycle apparatus, a refrigerant having such performance that the refrigerant has a sufficiently low GWP and a coefficient of performance (COP) equivalent to that of R410A is used, and damage to the connection pipe can be reduced.

A refrigeration cycle apparatus according to a forty first aspect is the refrigeration cycle apparatus according to any of the second to ninth and eleventh to eighteenth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments QB", B"D, DU, and UQ that connect the following 4 points:

point Q (28.6, 34.4, 37.0),
point B" (0.0, 63.0, 37.0),
point D (0.0, 67.0, 33.0), and
point U (28.7, 41.2, 30.1),
or on these line segments (excluding the points on the line segment B"D);

the line segment DU is represented by coordinates ($-3.4962z^2+210.71z-3146.1$, $3.4962z^2-211.71z+3246.1$, z), the line segment UQ is represented by coordinates ($0.0135z^2-0.9181z+44.133$, $-0.0135z^2-0.0819z+55.867$, z), and the line segments QB" and B"D are straight lines.

With this refrigeration cycle apparatus, a refrigerant having such performance that the refrigerant has a sufficiently low GWP and a coefficient of performance (COP) equivalent to that of R410A is used, and damage to the connection pipe can be reduced.

DESCRIPTION OF EMBODIMENTS

(1) Definition of Terms

Figure 1:
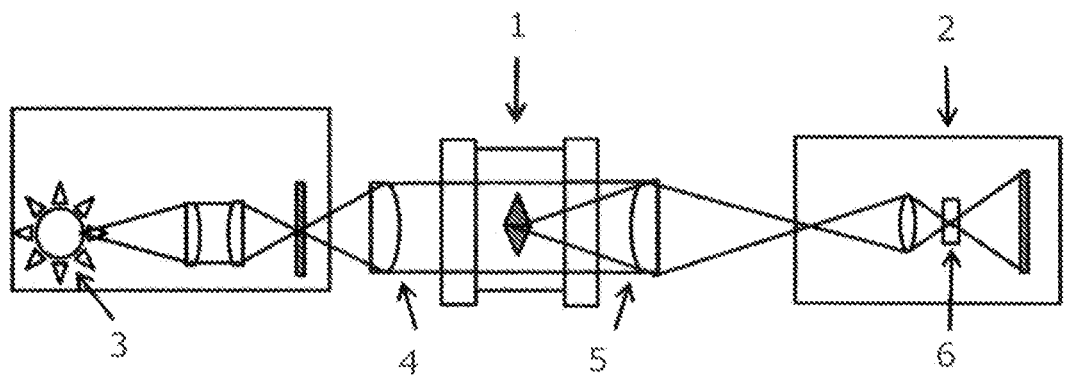
FIG. 1 is a schematic view of an instrument used for a flammability test.
Figure 2:
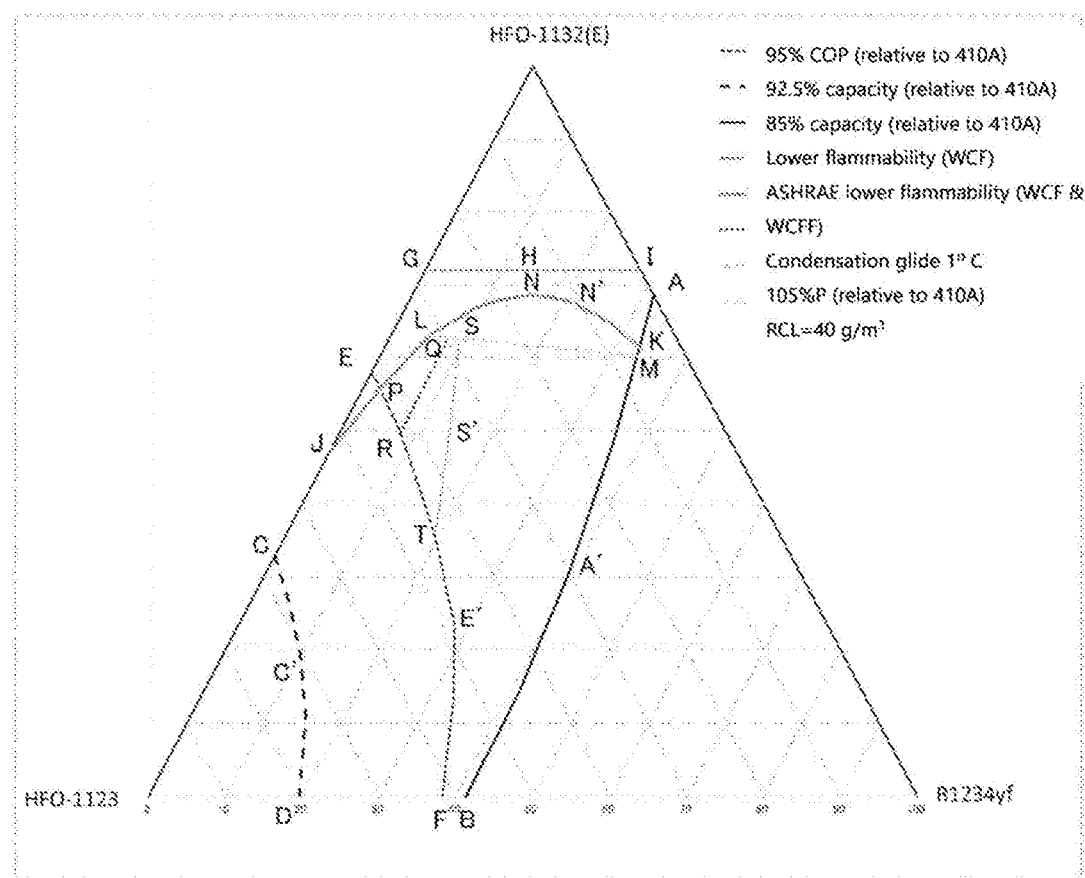
FIG. 2 is a diagram showing points A to T and line segments that connect these points in a ternary composition diagram in which the sum of HFO-1132(E), HFO-1123, and R1234yf is 100 mass %.

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having a "WCF lower flammability" means that the most flammable composition (worst case of formulation for flammability: WCF) has a burning velocity of 10 cm/s or less according to the US ANSI/ASHRAE Standard 34-2013. Further, in the present specification, a refrigerant having "ASHRAE lower flammability" means that the burning velocity of WCF is 10 cm/s or less, that the most flammable fraction composition (worst case of fractionation for flammability: WCFF), which is specified by performing a leakage test during storage, shipping, or use based on ANSI/ASHRAE 34-2013 using WCF, has a burning velocity of 10 cm/s or less, and that flammability classification according to the US ANSI/ASHRAE Standard 34-2013 is determined to classified as be "Class 2L."

In the present specification, a refrigerant having an "RCL of x % or more" means that the refrigerant has a refrigerant concentration limit (RCL), calculated in accordance with the US ANSI/ASHRAE Standard 34-2013, of x % or more. RCL refers to a concentration limit in the air in consideration of safety factors. RCL is an index for reducing the risk of acute toxicity, suffocation, and flammability in a closed space where humans are present. RCL is determined in accordance with the ASHRAE Standard. More specifically, RCL is the lowest concentration among the acute toxicity exposure limit (ATEL), the oxygen deprivation limit (ODL), and the flammable concentration limit (FCL), which are respectively calculated in accordance with sections 7.1.1, 7.1.2, and 7.1.3 of the ASHRAE Standard.

In the present specification, temperature glide refers to an absolute value of the difference between the initial temperature and the end temperature in the phase change process of a composition containing the refrigerant of the present disclosure in the heat exchanger of a refrigerant system.

(2) Refrigerant (2-1) Refrigerant Component

Any one of various refrigerants such as refrigerant A, refrigerant B, refrigerant C, refrigerant D, and refrigerant E, details of these refrigerant are to be mentioned later, can be used as the refrigerant.

(2-2) Use of Refrigerant

The refrigerant according to the present disclosure can be preferably used as a working fluid in a refrigerating machine.

The composition according to the present disclosure is suitable for use as an alternative refrigerant for HFC refrigerant such as R410A, R407C and R404 etc, or HCFC refrigerant such as R22 etc.

(3) Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

(3-1) Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

(3-2) Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers. Preferably, a compound that cannot be an impurity inevitably mixed in the refrigerant of the present disclosure is selected as the tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide (N20). The tracer is particularly preferably a hydrofluorocarbon, a hydrochlorofluorocarbon, a chlorofluorocarbon, a fluorocarbon, a hydrochlorocarbon, a fluorocarbon, or a fluoroether.

The following compounds are preferable as the tracer.
FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2\!=\!CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The tracer compound may be present in the refrigerant composition at a total concentration of about 10 parts per million (ppm) to about 1000 ppm. Preferably, the tracer compound is present in the refrigerant composition at a total concentration of about 30 ppm to about 500 ppm, and most preferably, the tracer compound is present at a total concentration of about 50 ppm to about 300 ppm.

(3-3) Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

(3-4) Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

(3-5) Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

(4) Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

(4-1) Refrigeration Oil

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication. The refrigeration oil-containing working fluid according to the present disclosure may further optionally contain at least one additive. Examples of additives include compatibilizing agents described below.

(4-2) Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

(5) Various Refrigerants

Hereinafter, the refrigerants A to E, which are the refrigerants used in the present embodiment, will be described in detail.

In addition, each description of the following refrigerant A, refrigerant B, refrigerant C, refrigerant D, and refrigerant E is each independent. The alphabet which shows a point or a line segment, the number of an Examples, and the number of a comparative examples are all independent of each other among the refrigerant A, the refrigerant B, the refrigerant C, the refrigerant D, and the refrigerant E. For example, the first embodiment of the refrigerant A and the first embodiment of the refrigerant B are different embodiment from each other.

(5-1) Refrigerant A

The refrigerant A according to the present disclosure is a mixed refrigerant comprising trans-1,2-difluoroethylene (HFO-1132(E)), trifluoroethylene (HFO-1123), and 2,3,3,3-tetrafluoro-1-propene (R1234yf).

The refrigerant A according to the present disclosure has various properties that are desirable as an R410A-alternative refrigerant, i.e., a refrigerating capacity and a coefficient of performance that are equivalent to those of R410A, and a sufficiently low GWP.

The refrigerant A according to the present disclosure is a composition comprising HFO-1132(E) and R1234yf, and optionally further comprising HFO-1123, and may further satisfy the following requirements. This refrigerant also has various properties desirable as an alternative refrigerant for R410A; i.e., it has a refrigerating capacity and a coefficient of performance that are equivalent to those of R410A, and a sufficiently low GWP.

Requirements

Preferable refrigerant A is as follows:

When the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:

point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0), or on the above line segments (excluding the points on the line CO);

the line segment AA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$, the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments BD, CO, and OA are straight lines.

When the requirements above are satisfied, the refrigerant according to the present disclosure has a refrigerating capacity ratio of 85% or more relative to that of R410A, and a COP of 92.5% or more relative to that of R410A.

When the mass % of HFO-1132(E), HFO-1123, and R1234yf, based on their sum in the refrigerant A according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CG);

the line segment AA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments GI, IA, BD, and CG are straight lines.

When the requirements above are satisfied, the refrigerant A according to the present disclosure has a refrigerating capacity ratio of 85% or more relative to that of R410A, and a COP of 92.5% or more relative to that of R410A; furthermore, the refrigerant A has a WCF lower flammability according to the ASHRAE Standard (the WCF composition has a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CJ);

the line segment PN is represented by coordinates (x, $-0.1135x^2+12.112x-280.43$, $0.1135x^2-13.112x+380.43$), the line segment NK is represented by coordinates (x, $0.2421x^2-29.955x+931.91$, $-0.2421x^2+28.955x-831.91$), the line segment KA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, BD, and CG are straight lines.

When the requirements above are satisfied, the refrigerant A according to the present disclosure has a refrigerating capacity ratio of 85% or more relative to that of R410A, and a COP of 92.5% or more relative to that of R410A; furthermore, the refrigerant exhibits a lower flammability (Class 2L) according to the ASHRAE Standard (the WCF composition and the WCFF composition have a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:
point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point (32.9, 67.1, 0.0),
or on the above line segments (excluding the points on the line segment CJ);

the line segment PL is represented by coordinates (x, $-0.1135x^2+12.112x-280.43$, $0.1135x^2-13.112x+380.43$), the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, LM, BD, and CG are straight lines.

When the requirements above are satisfied, the refrigerant according to the present disclosure has a refrigerating capacity ratio of 85% or more relative to that of R410A, and a COP of 92.5% or more relative to that of R410A; furthermore, the refrigerant has an RCL of 40 g/m$^3$ or more.

When the mass % of HFO-1132(E), HFO-1123, and R1234yf based on their sum in the refrigerant A according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments (excluding the points on the line segment BF);

the line segment PL is represented by coordinates (x, $-0.1135x^2+12.112x-280.43$, $0.1135x^2-13.112x+380.43$), the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TP is represented by coordinates (x, $0.00672x^2-0.7607x+63.525$, $-0.00672x^2-0.2393x+36.475$), and the line segments LM and BF are straight lines.

When the requirements above are satisfied, the refrigerant according to the present disclosure has a refrigerating capacity ratio of 85% or more relative to that of R410A, and a COP of 95% or more relative to that of R410A; furthermore, the refrigerant has an RCL of 40 g/m$^3$ or more.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:

point P (55.8, 42.0, 2.2),
point L (63.1, 31.9, 5.0),
point Q (62.8, 29.6, 7.6), and
point R (49.8, 42.3, 7.9),
or on the above line segments;

the line segment PL is represented by coordinates (x, $-0.1135x^2+12.112x-280.43$, $0.1135x^2-13.112x+380.43$), the line segment RP is represented by coordinates (x, $0.00672x^2-0.7607x+63.525$, $-0.00672x^2-0.2393x+36.475$), and the line segments LQ and QR are straight lines.

When the requirements above are satisfied, the refrigerant according to the present disclosure has a COP of 95% or more relative to that of R410A, and an RCL of 40 g/m$^3$ or more, furthermore, the refrigerant has a condensation temperature glide of 1° C. or less.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:

point S (62.6, 28.3, 9.1),
point M (60.3, 6.2, 33.5),
point A'(30.6, 30.0, 39.4),
point B (0.0, 58.7, 41.3),
point F (0.0, 61.8, 38.2), and
point T (35.8, 44.9, 19.3),
or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TS is represented by coordinates (x, $-0.0017x^2-0.7869x+70.888$, $-0.0017x^2-0.2131x+29.112$), and the line segments SM and BF are straight lines.

When the requirements above are satisfied, the refrigerant according to the present disclosure has a refrigerating capacity ratio of 85% or more relative to that of R410A, a COP of 95% or more relative to that of R410A, and an RCL of 40 g/m$^3$ or more furthermore, the refrigerant has a discharge pressure of 105% or more relative to that of R410A.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments Od, dg, gh, and hO that connect the following 4 points:

point d (87.6, 0.0, 12.4),
point g (18.2, 55.1, 26.7),
point h (56.7, 43.3, 0.0), and
point o (100.0, 0.0, 0.0),
or on the line segments Od, dg, gh, and hO (excluding the points O and h);

the line segment dg is represented by coordinates ($0.0047y^2-1.5177y+87.598$, y, $-0.0047y^2+0.5177y+12.402$), the line segment gh is represented by coordinates ($-0.0134z^2-1.0825z+56.692$, $0.0134z^2+0.0825z+43.308$, z), and the line segments hO and Od are straight lines.

When the requirements above are satisfied, the refrigerant according to the present disclosure has a refrigerating capacity ratio of 92.5% or more relative to that of R410A, and a COP ratio of 92.5% or more relative to that of R410A.

The refrigerant A according to the present disclosure is preferably a refrigerant
wherein
when the mass % of HFO-1132(E), HFO-1123, and R1234yf, based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments lg, gh, hi, and il that connect the following 4 points:

point l (72.5, 10.2, 17.3),
point g (18.2, 55.1, 26.7),
point h (56.7, 43.3, 0.0), and
point i (72.5, 27.5, 0.0) or
on the line segments lg, gh, and il (excluding the points h and i);

the line segment lg is represented by coordinates ($0.0047y^2-1.5177y+87.598$, y, $-0.0047y^2+0.5177y+12.402$), the line gh is represented by coordinates ($-0.0134z^2-1.0825z+56.692$, $0.0134z^2+0.0825z+43.308$, z), and the line segments hi and il are straight lines.

When the requirements above are satisfied, the refrigerant according to the present disclosure has a refrigerating capacity ratio of 92.5% or more relative to that of R410A, and a COP ratio of 92.5% or more relative to that of R410A; furthermore, the refrigerant has a lower flammability (Class 2L) according to the ASHRAE Standard.

The refrigerant A according to the present disclosure is preferably a refrigerant wherein
when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Od, de, ef, and fO that connect the following 4 points:

point d (87.6, 0.0, 12.4),
point e (31.1, 42.9, 26.0), point f (65.5, 34.5, 0.0), and
point O (100.0, 0.0, 0.0),
or on the line segments Od, de, and ef (excluding the points O and f);

the line segment de is represented by coordinates $(0.0047y^2-1.5177y+87.598, y, -0.0047y^2+0.5177y+12.402)$, the line segment ef is represented by coordinates $(-0.0064z^2-1.1565z+65.501, 0.0064z^2+0.1565z+34.499, z)$, and the line segments fO and Od are straight lines.

When the requirements above are satisfied, the refrigerant according to the present disclosure has a refrigerating capacity ratio of 93.5% or more relative to that of R410A, and a COP ratio of 93.5% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments le, ef, fi, and il that connect the following 4 points:
point l (72.5, 10.2, 17.3),
point e (31.1, 42.9, 26.0),
point f (65.5, 34.5, 0.0), and
point i (72.5, 27.5, 0.0),
or on the line segments le, ef, and il (excluding the points f and i);

the line segment le is represented by coordinates $(0.0047y^2-1.5177y+87.598, y, -0.0047y^2+0.5177y+12.402)$, the line segment ef is represented by coordinates $(-0.0134z^2-1.0825z+56.692, 0.0134z^2+0.0825z+43.308, z)$, and the line segments fi and il are straight lines.

When the requirements above are satisfied, the refrigerant according to the present disclosure has a refrigerating capacity ratio of 93.5% or more relative to that of R410A, and a COP ratio of 93.5% or more relative to that of R410A; furthermore, the refrigerant has a lower flammability (Class 2L) according to the ASHRAE Standard.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Oa, ab, bc, and cO that connect the following 4 points:
point a (93.4, 0.0, 6.6),
point b (55.6, 26.6, 17.8),
point c (77.6, 22.4, 0.0), and
point O (100.0, 0.0, 0.0),
or on the line segments Oa, ab, and bc (excluding the points O and c);

the line segment ab is represented by coordinates $(0.0052y^2-1.5588y+93.385, y, -0.0052y^2+0.5588y+6.615)$, the line segment bc is represented by coordinates $(-0.0032z^2-1.1791z+77.593, 0.0032z^2+0.1791z+22.407, z)$, and the line segments cO and Oa are straight lines.

When the requirements above are satisfied, the refrigerant according to the present disclosure has a refrigerating capacity ratio of 95% or more relative to that of R410A, and a COP ratio of 95% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments kb, bj, and jk that connect the following 3 points:
point k (72.5, 14.1, 13.4),
point b (55.6, 26.6, 17.8), and
point j (72.5, 23.2, 4.3),
or on the line segments kb, bj, and jk;

the line segment kb is represented by coordinates $(0.0052y^2-1.5588y+93.385, y, \text{ and } -0.0052y^2+0.5588y+6.615)$, the line segment bj is represented by coordinates $(-0.0032z^2-1.1791z+77.593, 0.0032z^2+0.1791z+22.407, z)$, and the line segment jk is a straight line.

When the requirements above are satisfied, the refrigerant according to the present disclosure has a refrigerating capacity ratio of 95% or more relative to that of R410A, and a COP ratio of 95% or more relative to that of R410A; furthermore, the refrigerant has a lower flammability (Class 2L) according to the ASHRAE Standard.

The refrigerant according to the present disclosure may further comprise other additional refrigerants in addition to HFO-1132(E), HFO-1123, and R1234yf, as long as the above properties and effects are not impaired. In this respect, the refrigerant according to the present disclosure preferably comprises HFO-1132(E), HFO-1123, and R1234yf in a total amount of 99.5 mass % or more, more preferably 99.75 mass % or more, and still more preferably 99.9 mass % or more, based on the entire refrigerant.

The refrigerant according to the present disclosure may comprise HFO-1132(E), HFO-1123, and R1234yf in a total amount of 99.5 mass % or more, 99.75 mass % or more, or 99.9 mass % or more, based on the entire refrigerant.

Additional refrigerants are not particularly limited and can be widely selected. The mixed refrigerant may contain one additional refrigerant, or two or more additional refrigerants.

(Examples of Refrigerant A)

The present disclosure is described in more detail below with reference to Examples of refrigerant A. However, refrigerant A is not limited to the Examples.

The GWP of R1234yf and a composition consisting of a mixed refrigerant R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of R410A and compositions each comprising a mixture of HFO-1132(E), HFO-1123, and R1234yf was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Further, the RCL of the mixture was calculated with the LFL of HFO-1132(E) being 4.7 vol. %, the LFL of HFO-1123 being 10 vol. %, and the LFL of R1234yf being 6.2 vol. %, in accordance with the ASHRAE Standard 34-2013.
Evaporating temperature: 5° C.
Condensation temperature: 45° C.
Degree of superheating: 5 K
Degree of subcooling: 5 K
Compressor efficiency: 70%

Tables 1 to 34 show these values together with the GWP of each mixed refrigerant.

TABLE 1

| Item | Unit | Comp. Ex. 1 | Comp. Ex. 2 O | Comp. Ex. 3 A | Example 1 | Example 2 A' | Example 3 | Comp. Ex. 4 B |
|---|---|---|---|---|---|---|---|---|
| HFO-1132(E) | mass % | R410A | 100.0 | 68.6 | 49.0 | 30.6 | 14.1 | 0.0 |
| HFO-1123 | mass % | | 0.0 | 0.0 | 14.9 | 30.0 | 44.8 | 58.7 |
| R1234yf | mass % | | 0.0 | 31.4 | 36.1 | 39.4 | 41.1 | 41.3 |
| GWP | — | 2088 | 1 | 2 | 2 | 2 | 2 | 2 |
| COP ratio | % (relative to 410A) | 100 | 99.7 | 100.0 | 98.6 | 97.3 | 96.3 | 95.5 |
| Refrigerating capacity ratio | % (relative to 410A) | 100 | 98.3 | 85.0 | 85.0 | 85.0 | 85.0 | 85.0 |
| Condensation glide | ° C. | | 0.1 | 0.00 | 1.98 | 3.36 | 4.46 | 5.15 | 5.35 |
| Discharge pressure | % (relative to 410A) | 100.0 | 99.3 | 87.1 | 88.9 | 90.6 | 92.1 | 93.2 |
| RCL | g/m³ | — | 30.7 | 37.5 | 44.0 | 52.7 | 64.0 | 78.6 |

TABLE 2

| Item | Unit | Comp. Ex. 5 C | Example 4 | Example 5 C' | Example 6 | Comp. Ex. 6 D | Comp. Ex. 7 E | Example 7 E' | Comp. Ex. 8 F |
|---|---|---|---|---|---|---|---|---|---|
| HFO-1132(E) | mass % | 32.9 | 26.6 | 19.5 | 10.9 | 0.0 | 58.0 | 23.4 | 0.0 |
| HFO-1123 | mass % | 67.1 | 68.4 | 70.5 | 74.1 | 80.4 | 42.0 | 48.5 | 61.8 |
| R1234yf | mass % | 0.0 | 5.0 | 10.0 | 15.0 | 19.6 | 0.0 | 28.1 | 38.2 |
| GWP | — | 1 | 1 | 1 | 1 | 2 | 1 | 2 | 2 |
| COP ratio | % (relative to 410A) | 92.5 | 92.5 | 92.5 | 92.5 | 92.5 | 95.0 | 95.0 | 95.0 |
| Refrigerating capacity ratio | % (relative to 410A) | 107.4 | 105.2 | 102.9 | 100.5 | 97.9 | 105.0 | 92.5 | 86.9 |
| Condensation glide | ° C. | 0.16 | 0.52 | 0.94 | 1.42 | 1.90 | 0.42 | 3.16 | 4.80 |
| Discharge pressure | % (relative to 410A) | 119.5 | 117.4 | 115.3 | 113.0 | 115.9 | 112.7 | 101.0 | 95.8 |
| RCL | g/m³ | 53.5 | 57.1 | 62.0 | 69.1 | 81.3 | 41.9 | 46.3 | 79.0 |

TABLE 3

| Item | Unit | Comp. Ex. 9 J | Example 8 P | Example 9 L | Example 10 N | Example 11 N' | Example 12 K |
|---|---|---|---|---|---|---|---|
| HFO-1132(E) | mass % | 47.1 | 55.8 | 63.1 | 68.6 | 65.0 | 61.3 |
| HFO-1123 | mass % | 52.9 | 42.0 | 31.9 | 16.3 | 7.7 | 5.4 |
| R1234yf | mass % | 0.0 | 2.2 | 5.0 | 15.1 | 27.3 | 33.3 |
| GWP | — | 1 | 1 | 1 | 1 | 2 | 2 |
| COP ratio | % (relative to 410A) | 93.8 | 95.0 | 96.1 | 97.9 | 99.1 | 99.5 |
| Refrigerating capacity ratio | % (relative to 410A) | 106.2 | 104.1 | 101.6 | 95.0 | 88.2 | 85.0 |
| Condensation glide | ° C. | 0.31 | 0.57 | 0.81 | 1.41 | 2.11 | 2.51 |
| Discharge pressure | % (relative to 410A) | 115.8 | 111.9 | 107.8 | 99.0 | 91.2 | 87.7 |
| RCL | g/m³ | 46.2 | 42.6 | 40.0 | 38.0 | 38.7 | 39.7 |

TABLE 4

| Item | Unit | Example 13 L | Example 14 M | Example 15 Q | Example 16 R | Example 17 S | Example 18 S' | Example 19 T |
|---|---|---|---|---|---|---|---|---|
| HFO-1132(E) | mass % | 63.1 | 60.3 | 62.8 | 49.8 | 62.6 | 50.0 | 35.8 |
| HFO-1123 | mass % | 31.9 | 6.2 | 29.6 | 42.3 | 28.3 | 35.8 | 44.9 |
| R1234yf | mass % | 5.0 | 33.5 | 7.6 | 7.9 | 9.1 | 14.2 | 19.3 |
| GWP | — | 1 | 2 | 1 | 1 | 1 | 1 | 2 |
| COP ratio | % (relative to 410A) | 96.1 | 99.4 | 96.4 | 95.0 | 96.6 | 95.8 | 95.0 |
| Refrigerating capacity ratio | % (relative to 410A) | 101.6 | 85.0 | 100.2 | 101.7 | 99.4 | 98.1 | 96.7 |
| Condensation glide | ° C. | 0.81 | 2.58 | 1.00 | 1.00 | 1.10 | 1.55 | 2.07 |
| Discharge pressure | % (relative to 410A) | 107.8 | 87.9 | 106.0 | 109.6 | 105.0 | 105.0 | 105.0 |
| RCL | g/m³ | 40.0 | 40.0 | 40.0 | 44.8 | 40.0 | 44.4 | 50.8 |

TABLE 5

| Item | Unit | Comp. Ex. 10 G | Example 20 H | Example 21 I |
|---|---|---|---|---|
| HFO-1132(E) | mass % | 72.0 | 72.0 | 72.0 |
| HFO-1123 | mass % | 28.0 | 14.0 | 0.0 |
| R1234yf | mass % | 0.0 | 14.0 | 28.0 |
| GWP | — | 1 | 1 | 2 |
| COP ratio | % (relative to 410A) | 96.6 | 98.2 | 99.9 |
| Refrigerating capacity ratio | % (relative to 410A) | 103.1 | 95.1 | 86.6 |
| Condensation glide | ° C. | 0.46 | 1.27 | 1.71 |
| Discharge pressure | % (relative to 410A) | 108.4 | 98.7 | 88.6 |
| RCL | g/m³ | 37.4 | 37.0 | 36.6 |

TABLE 6

| Item | Unit | Comp. Ex. 11 | Comp. Ex. 12 | Example 22 | Example 23 | Example 24 | Example 25 | Example 26 | Comp. Ex. 13 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R1234yf | mass % | 5.0 | 5.0 | 5.0 | 5.0 | 5.0 | 5.0 | 5.0 | 5.0 |
| GWP | — | 1 | 1 | 1 | 1 | 1 | 1 | 1 | 1 |
| COP ratio | % (relative to 410A) | 91.4 | 92.0 | 92.8 | 93.7 | 94.7 | 95.8 | 96.9 | 98.0 |
| Refrigerating capacity ratio | % (relative to 410A) | 105.7 | 105.5 | 105.0 | 104.3 | 103.3 | 102.0 | 100.6 | 99.1 |
| Condensation glide | ° C. | 0.40 | 0.46 | 0.55 | 0.66 | 0.75 | 0.80 | 0.79 | 0.67 |
| Discharge pressure | % (relative to 410A) | 120.1 | 118.7 | 116.7 | 114.3 | 111.6 | 108.7 | 105.6 | 102.5 |
| RCL | g/m³ | 71.0 | 61.9 | 54.9 | 49.3 | 44.8 | 41.0 | 37.8 | 35.1 |

TABLE 7

| Item | Unit | Comp. Ex. 14 | Example 27 | Example 28 | Example 29 | Example 30 | Example 31 | Example 32 | Comp. Ex. 15 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 80.0 | 70.0 | 60.0 | 50.0 | 40.0 | 30.0 | 20.0 | 10.0 |
| R1234yf | mass % | 10.0 | 10.0 | 10.0 | 10.0 | 10.0 | 10.0 | 10.0 | 10.0 |
| GWP | — | 1 | 1 | 1 | 1 | 1 | 1 | 1 | 1 |
| COP ratio | % (relative to 410A) | 91.9 | 92.5 | 93.3 | 94.3 | 95.3 | 96.4 | 97.5 | 98.6 |
| Refrigerating capacity ratio | % (relative to 410A) | 103.2 | 102.9 | 102.4 | 101.5 | 100.5 | 99.2 | 97.8 | 96.2 |
| Condensation glide | ° C. | 0.87 | 0.94 | 1.03 | 1.12 | 1.18 | 1.18 | 1.09 | 0.88 |
| Discharge pressure | % (relative to 410A) | 116.7 | 115.2 | 113.2 | 110.8 | 108.1 | 105.2 | 102.1 | 99.0 |
| RCL | g/m³ | 70.5 | 61.6 | 54.6 | 49.1 | 44.6 | 40.8 | 37.7 | 35.0 |

TABLE 8

| Item | Unit | Comp. Ex. 16 | Example 33 | Example 34 | Example 35 | Example 36 | Example 37 | Example 38 | Comp. Ex. 17 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 75.0 | 65.0 | 55.0 | 45.0 | 35.0 | 25.0 | 15.0 | 5.0 |
| R1234yf | mass % | 15.0 | 15.0 | 15.0 | 15.0 | 15.0 | 15.0 | 15.0 | 15.0 |
| GWP | — | 1 | 1 | 1 | 1 | 1 | 1 | 1 | 1 |
| COP ratio | % (relative to 410A) | 92.4 | 93.1 | 93.9 | 94.8 | 95.9 | 97.0 | 98.1 | 99.2 |
| Refrigerating capacity ratio | % (relative to 410A) | 100.5 | 100.2 | 99.6 | 98.7 | 97.7 | 96.4 | 94.9 | 93.2 |
| Condensation glide | ° C. | 1.41 | 1.49 | 1.56 | 1.62 | 1.63 | 1.55 | 1.37 | 1.05 |
| Discharge pressure | % (relative to 410A) | 113.1 | 111.6 | 109.6 | 107.2 | 104.5 | 101.6 | 98.6 | 95.5 |
| RCL | g/m³ | 70.0 | 61.2 | 54.4 | 48.9 | 44.4 | 40.7 | 37.5 | 34.8 |

TABLE 9

| Item | Unit | Example 39 | Example 40 | Example 41 | Example 42 | Example 43 | Example 44 | Example 45 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 70.0 | 60.0 | 50.0 | 40.0 | 30.0 | 20.0 | 10.0 |
| R1234yf | mass % | 20.0 | 20.0 | 20.0 | 20.0 | 20.0 | 20.0 | 20.0 |
| GWP | — | 2 | 2 | 2 | 2 | 2 | 2 | 2 |
| COP ratio | % (relative to 410A) | 93.0 | 93.7 | 94.5 | 95.5 | 96.5 | 97.6 | 98.7 |
| Refrigerating capacity ratio | % (relative to 410A) | 97.7 | 97.4 | 96.8 | 95.9 | 94.7 | 93.4 | 91.9 |
| Condensation glide | ° C. | 2.03 | 2.09 | 2.13 | 2.14 | 2.07 | 1.91 | 1.61 |
| Discharge pressure | % (relative to 410A) | 109.4 | 107.9 | 105.9 | 103.5 | 100.8 | 98.0 | 95.0 |
| RCL | g/m³ | 69.6 | 60.9 | 54.1 | 48.7 | 44.2 | 40.5 | 37.4 |

TABLE 10

| Item | Unit | Example 46 | Example 47 | Example 48 | Example 49 | Example 50 | Example 51 | Example 52 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 65.0 | 55.0 | 45.0 | 35.0 | 25.0 | 15.0 | 5.0 |
| R1234yf | mass % | 25.0 | 25.0 | 25.0 | 25.0 | 25.0 | 25.0 | 25.0 |
| GWP | — | 2 | 2 | 2 | 2 | 2 | 2 | 2 |
| COP ratio | % (relative to 410A) | 93.6 | 94.3 | 95.2 | 96.1 | 97.2 | 98.2 | 99.3 |
| Refrigerating capacity ratio | % (relative to 410A) | 94.8 | 94.5 | 93.8 | 92.9 | 91.8 | 90.4 | 88.8 |
| Condensation glide | ° C. | 2.71 | 2.74 | 2.73 | 2.66 | 2.50 | 2.22 | 1.78 |
| Discharge pressure | % (relative to 410A) | 105.5 | 104.0 | 102.1 | 99.7 | 97.1 | 94.3 | 91.4 |
| RCL | g/m³ | 69.1 | 60.5 | 53.8 | 48.4 | 44.0 | 40.4 | 37.3 |

TABLE 11

| Item | Unit | Example 53 | Example 54 | Example 55 | Example 56 | Example 57 | Example 58 |
|---|---|---|---|---|---|---|---|
| HFO-1132(E) | mass % | 10.0 | 20.0 | 30.0 | 40.0 | 50.0 | 60.0 |
| HFO-1123 | mass % | 60.0 | 50.0 | 40.0 | 30.0 | 20.0 | 10.0 |
| R1234yf | mass % | 30.0 | 30.0 | 30.0 | 30.0 | 30.0 | 30.0 |
| GWP | — | 2 | 2 | 2 | 2 | 2 | 2 |
| COP ratio | % (relative to 410A) | 94.3 | 95.0 | 95.9 | 96.8 | 97.8 | 98.9 |
| Refrigerating capacity ratio | % (relative to 410A) | 91.9 | 91.5 | 90.8 | 89.9 | 88.7 | 87.3 |
| Condensation glide | ° C. | 3.46 | 3.43 | 3.35 | 3.18 | 2.90 | 2.47 |

TABLE 11-continued

| Item | Unit | Example 53 | Example 54 | Example 55 | Example 56 | Example 57 | Example 58 |
|---|---|---|---|---|---|---|---|
| Discharge pressure | % (relative to 410A) | 101.6 | 100.1 | 98.2 | 95.9 | 93.3 | 90.6 |
| RCL | g/m³ | 68.7 | 60.2 | 53.5 | 48.2 | 43.9 | 40.2 |

TABLE 12

| Item | Unit | Example 59 | Example 60 | Example 61 | Example 62 | Example 63 | Comp. Ex. 18 |
|---|---|---|---|---|---|---|---|
| HFO-1132(E) | mass % | 10.0 | 20.0 | 30.0 | 40.0 | 50.0 | 60.0 |
| HFO-1123 | mass % | 55.0 | 45.0 | 35.0 | 25.0 | 15.0 | 5.0 |
| R1234yf | mass % | 35.0 | 35.0 | 35.0 | 35.0 | 35.0 | 35.0 |

TABLE 12-continued

| Item | Unit | Example 59 | Example 60 | Example 61 | Example 62 | Example 63 | Comp. Ex. 18 |
|---|---|---|---|---|---|---|---|
| GWP | — | 2 | 2 | 2 | 2 | 2 | 2 |
| COP ratio | % (relative to 410A) | 95.0 | 95.8 | 96.6 | 97.5 | 98.5 | 99.6 |
| Refrigerating capacity ratio | % (relative to 410A) | 88.9 | 88.5 | 87.8 | 86.8 | 85.6 | 84.1 |
| Condensation glide | ° C. | 4.24 | 4.15 | 3.96 | 3.67 | 3.24 | 2.64 |
| Discharge pressure | % (relative to 410A) | 97.6 | 96.1 | 94.2 | 92.0 | 89.5 | 86.8 |
| RCL | g/m³ | 68.2 | 59.8 | 53.2 | 48.0 | 43.7 | 40.1 |

TABLE 13

| Item | Unit | Example 64 | Example 65 | Comp. Ex. 19 | Comp. Ex. 20 | Comp. Ex. 21 |
|---|---|---|---|---|---|---|
| HFO-1132(E) | mass % | 10.0 | 20.0 | 30.0 | 40.0 | 50.0 |
| HFO-1123 | mass % | 50.0 | 40.0 | 30.0 | 20.0 | 10.0 |
| R1234yf | mass % | 40.0 | 40.0 | 40.0 | 40.0 | 40.0 |
| GWP | — | 2 | 2 | 2 | 2 | 2 |
| COP ratio | % (relative to 410A) | 95.9 | 96.6 | 97.4 | 98.3 | 99.2 |
| Refrigerating capacity ratio | % (relative to 410A) | 85.8 | 85.4 | 84.7 | 83.6 | 82.4 |
| Condensation glide | ° C. | 5.05 | 4.85 | 4.55 | 4.10 | 3.50 |
| Discharge pressure | % (relative to 410A) | 93.5 | 92.1 | 90.3 | 88.1 | 85.6 |
| RCL | g/m³ | 67.8 | 59.5 | 53.0 | 47.8 | 43.5 |

TABLE 14

| Item | Unit | Example 66 | Example 67 | Example 68 | Example 69 | Example 70 | Example 71 | Example 72 | Example 73 |
|---|---|---|---|---|---|---|---|---|---|
| HFO-1132(E) | mass % | 54.0 | 56.0 | 58.0 | 62.0 | 52.0 | 54.0 | 56.0 | 58.0 |
| HFO-1123 | mass % | 41.0 | 39.0 | 37.0 | 33.0 | 41.0 | 39.0 | 37.0 | 35.0 |
| R1234yf | mass % | 5.0 | 5.0 | 5.0 | 5.0 | 7.0 | 7.0 | 7.0 | 7.0 |
| GWP | — | 1 | 1 | 1 | 1 | 1 | 1 | 1 | 1 |
| COP ratio | % (relative to 410A) | 95.1 | 95.3 | 95.6 | 96.0 | 95.1 | 95.4 | 95.6 | 95.8 |
| Refrigerating capacity ratio | % (relative to 410A) | 102.8 | 102.6 | 102.3 | 101.8 | 101.9 | 101.7 | 101.5 | 101.2 |
| Condensation glide | ° C. | 0.78 | 0.79 | 0.80 | 0.81 | 0.93 | 0.94 | 0.95 | 0.95 |
| Discharge pressure | % (relative to 410A) | 110.5 | 109.9 | 109.3 | 108.1 | 109.7 | 109.1 | 108.5 | 107.9 |
| RCL | g/m³ | 43.2 | 42.4 | 41.7 | 40.3 | 43.9 | 43.1 | 42.4 | 41.6 |

TABLE 15

| Item | Unit | Example 74 | Example 75 | Example 76 | Example 77 | Example 78 | Example 79 | Example 80 | Example 81 |
|---|---|---|---|---|---|---|---|---|---|
| HFO-1132(E) | mass % | 60.0 | 62.0 | 61.0 | 58.0 | 60.0 | 62.0 | 52.0 | 54.0 |
| HFO-1123 | mass % | 33.0 | 31.0 | 29.0 | 30.0 | 28.0 | 26.0 | 34.0 | 32.0 |
| R1234yf | mass % | 7.0 | 7.0 | 10.0 | 12.0 | 12.0 | 12.0 | 14.0 | 14.0 |
| GWP | — | 1 | 1 | 1 | 1 | 1 | 1 | 1 | 1 |
| COP ratio | % (relative to 410A) | 96.0 | 96.2 | 96.5 | 96.4 | 96.6 | 96.8 | 96.0 | 96.2 |
| Refrigerating capacity ratio | % (relative to 410A) | 100.9 | 100.7 | 99.1 | 98.4 | 98.1 | 97.8 | 98.0 | 97.7 |

TABLE 15-continued

| Item | Unit | Example 74 | Example 75 | Example 76 | Example 77 | Example 78 | Example 79 | Example 80 | Example 81 |
|---|---|---|---|---|---|---|---|---|---|
| Condensation glide | °C. | 0.95 | 0.95 | 1.18 | 1.34 | 1.33 | 1.32 | 1.53 | 1.53 |
| Discharge pressure | % (relative to 410A) | 107.3 | 106.7 | 104.9 | 104.4 | 103.8 | 103.2 | 104.7 | 104.1 |
| RCL | g/m$^3$ | 40.9 | 40.3 | 40.5 | 41.5 | 40.8 | 40.1 | 43.6 | 42.9 |

TABLE 16

| Item | Unit | Example 82 | Example 83 | Example 84 | Example 85 | Example 86 | Example 87 | Example 88 | Example 89 |
|---|---|---|---|---|---|---|---|---|---|
| HFO-1132(E) | mass % | 56.0 | 58.0 | 60.0 | 48.0 | 50.0 | 52.0 | 54.0 | 56.0 |
| HFO-1123 | mass % | 30.0 | 28.0 | 26.0 | 36.0 | 34.0 | 32.0 | 30.0 | 28.0 |
| R1234yf | mass % | 14.0 | 14.0 | 14.0 | 16.0 | 16.0 | 16.0 | 16.0 | 16.0 |
| GWP | — | 1 | 1 | 1 | 1 | 1 | 1 | 1 | 1 |
| COP ratio | % (relative to 410A) | 96.4 | 96.6 | 96.9 | 95.8 | 96.0 | 96.2 | 96.4 | 96.7 |
| Refrigerating capacity ratio | % (relative to 410A) | 97.5 | 97.2 | 96.9 | 97.3 | 97.1 | 96.8 | 96.6 | 96.3 |
| Condensation glide | °C. | 1.51 | 1.50 | 1.48 | 1.72 | 1.72 | 1.71 | 1.69 | 1.67 |
| Discharge pressure | % (relative to 410A) | 103.5 | 102.9 | 102.3 | 104.3 | 103.8 | 103.2 | 102.7 | 102.1 |
| RCL | g/m$^3$ | 42.1 | 41.4 | 40.7 | 45.2 | 44.4 | 43.6 | 42.8 | 42.1 |

TABLE 17

| Item | Unit | Example 90 | Example 91 | Example 92 | Example 93 | Example 94 | Example 95 | Example 96 | Example 97 |
|---|---|---|---|---|---|---|---|---|---|
| HFO-1132(E) | mass % | 58.0 | 60.0 | 42.0 | 44.0 | 46.0 | 48.0 | 50.0 | 52.0 |
| HFO-1123 | mass % | 26.0 | 24.0 | 40.0 | 38.0 | 36.0 | 34.0 | 32.0 | 30.0 |
| R1234yf | mass % | 16.0 | 16.0 | 18.0 | 18.0 | 18.0 | 18.0 | 18.0 | 18.0 |
| GWP | — | 1 | 1 | 2 | 2 | 2 | 2 | 2 | 2 |
| COP ratio | % (relative to 410A) | 96.9 | 97.1 | 95.4 | 95.6 | 95.8 | 96.0 | 96.3 | 96.5 |
| Refrigerating capacity ratio | % (relative to 410A) | 96.1 | 95.8 | 96.8 | 96.6 | 96.4 | 96.2 | 95.9 | 95.7 |
| Condensation glide | °C. | 1.65 | 1.63 | 1.93 | 1.92 | 1.92 | 1.91 | 1.89 | 1.88 |
| Discharge pressure | % (relative to 410A) | 101.5 | 100.9 | 104.5 | 103.9 | 103.4 | 102.9 | 102.3 | 101.8 |
| RCL | g/m$^3$ | 41.4 | 40.7 | 47.8 | 46.9 | 46.0 | 45.1 | 44.3 | 43.5 |

TABLE 18

| Item | Unit | Example 98 | Example 99 | Example 100 | Example 101 | Example 102 | Example 103 | Example 104 | Example 105 |
|---|---|---|---|---|---|---|---|---|---|
| HFO-1132(E) | mass % | 54.0 | 56.0 | 58.0 | 60.0 | 36.0 | 38.0 | 42.0 | 44.0 |
| HFO-1123 | mass % | 28.0 | 26.0 | 24.0 | 22.0 | 44.0 | 42.0 | 38.0 | 36.0 |
| R1234yf | mass % | 18.0 | 18.0 | 18.0 | 18.0 | 20.0 | 20.0 | 20.0 | 20.0 |
| GWP | — | 2 | 2 | 2 | 2 | 2 | 2 | 2 | 2 |
| COP ratio | % (relative to 410A) | 96.7 | 96.9 | 97.1 | 97.3 | 95.1 | 95.3 | 95.7 | 95.9 |
| Refrigerating capacity ratio | % (relative to 410A) | 95.4 | 95.2 | 94.9 | 94.6 | 96.3 | 96.1 | 95.7 | 95.4 |
| Condensation glide | °C. | 1.86 | 1.83 | 1.80 | 1.77 | 2.14 | 2.14 | 2.13 | 2.12 |
| Discharge pressure | % (relative to 410A) | 101.2 | 100.6 | 100.0 | 99.5 | 104.5 | 104.0 | 103.0 | 102.5 |
| RCL | g/m$^3$ | 42.7 | 42.0 | 41.3 | 40.6 | 50.7 | 49.7 | 47.7 | 46.8 |

TABLE 19

| Item | Unit | Example 106 | Example 107 | Example 108 | Example 109 | Example 110 | Example 111 | Example 112 | Example 113 |
|---|---|---|---|---|---|---|---|---|---|
| HFO-1132(E) | mass % | 46.0 | 48.0 | 52.0 | 54.0 | 56.0 | 58.0 | 34.0 | 36.0 |
| HFO-1123 | mass % | 34.0 | 32.0 | 28.0 | 26.0 | 24.0 | 22.0 | 44.0 | 42.0 |
| R1234yf | mass % | 20.0 | 20.0 | 20.0 | 20.0 | 20.0 | 20.0 | 22.0 | 22.0 |
| GWP | — | 2 | 2 | 2 | 2 | 2 | 2 | 2 | 2 |
| COP ratio | % (relative to 410A) | 96.1 | 96.3 | 96.7 | 96.9 | 97.2 | 97.4 | 95.1 | 95.3 |
| Refrigerating capacity ratio | % (relative to 410A) | 95.2 | 95.0 | 94.5 | 94.2 | 94.0 | 93.7 | 95.3 | 95.1 |
| Condensation glide | ° C. | 2.11 | 2.09 | 2.05 | 2.02 | 1.99 | 1.95 | 2.37 | 2.36 |
| Discharge pressure | % (relative to 410A) | 101.9 | 101.4 | 100.3 | 99.7 | 99.2 | 98.6 | 103.4 | 103.0 |
| RCL | g/m$^3$ | 45.9 | 45.0 | 43.4 | 42.7 | 41.9 | 41.2 | 51.7 | 50.6 |

TABLE 20

| Item | Unit | Example 114 | Example 115 | Example 116 | Example 117 | Example 118 | Example 119 | Example 120 | Example 121 |
|---|---|---|---|---|---|---|---|---|---|
| HFO-1132(E) | mass % | 38.0 | 40.0 | 42.0 | 44.0 | 46.0 | 48.0 | 50.0 | 52.0 |
| HFO-1123 | mass % | 40.0 | 38.0 | 36.0 | 34.0 | 32.0 | 30.0 | 28.0 | 26.0 |
| R1234yf | mass % | 22.0 | 22.0 | 22.0 | 22.0 | 22.0 | 22.0 | 22.0 | 22.0 |
| GWP | — | 2 | 2 | 2 | 2 | 2 | 2 | 2 | 2 |
| COP ratio | % (relative to 410A) | 95.5 | 95.7 | 95.9 | 96.1 | 96.4 | 96.6 | 96.8 | 97.0 |
| Refrigerating capacity ratio | % (relative to 410A) | 94.9 | 94.7 | 94.5 | 94.3 | 94.0 | 93.8 | 93.6 | 93.3 |
| Condensation glide | ° C. | 2.36 | 2.35 | 2.33 | 2.32 | 2.30 | 2.27 | 2.25 | 2.21 |
| Discharge pressure | % (relative to 410A) | 102.5 | 102.0 | 101.5 | 101.0 | 100.4 | 99.9 | 99.4 | 98.8 |
| RCL | g/m$^3$ | 49.6 | 48.6 | 47.6 | 46.7 | 45.8 | 45.0 | 44.1 | 43.4 |

TABLE 21

| Item | Unit | Example 122 | Example 123 | Example 124 | Example 125 | Example 126 | Example 127 | Example 128 | Example 129 |
|---|---|---|---|---|---|---|---|---|---|
| HFO-1132(E) | mass % | 54.0 | 56.0 | 58.0 | 60.0 | 32.0 | 34.0 | 36.0 | 38.0 |
| HFO-1123 | mass % | 24.0 | 22.0 | 20.0 | 18.0 | 44.0 | 42.0 | 40.0 | 38.0 |
| R1234yf | mass % | 22.0 | 22.0 | 22.0 | 22.0 | 24.0 | 24.0 | 24.0 | 24.0 |
| GWP | — | 2 | 2 | 2 | 2 | 2 | 2 | 2 | 2 |
| COP ratio | % (relative to 410A) | 97.2 | 97.4 | 97.6 | 97.9 | 95.2 | 95.4 | 95.6 | 95.8 |
| Refrigerating capacity ratio | % (relative to 410A) | 93.0 | 92.8 | 92.5 | 92.2 | 94.3 | 94.1 | 93.9 | 93.7 |
| Condensation glide | ° C. | 2.18 | 2.14 | 2.09 | 2.04 | 2.61 | 2.60 | 2.59 | 2.58 |
| Discharge pressure | % (relative to 410A) | 98.2 | 97.7 | 97.1 | 96.5 | 102.4 | 101.9 | 101.5 | 101.0 |
| RCL | g/m$^3$ | 42.6 | 41.9 | 41.2 | 40.5 | 52.7 | 51.6 | 50.5 | 49.5 |

Table 22

| Item | Unit | Example 130 | Example 131 | Example 132 | Example 133 | Example 134 | Example 135 | Example 136 | Example 137 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 36.0 | 34.0 | 32.0 | 30.0 | 28.0 | 26.0 | 24.0 | 22.0 |
| R1234yf | mass % | 24.0 | 24.0 | 24.0 | 24.0 | 24.0 | 24.0 | 24.0 | 24.0 |
| GWP | — | 2 | 2 | 2 | 2 | 2 | 2 | 2 | 2 |
| COP ratio | % (relative to 410A) | 96.0 | 96.2 | 96.4 | 96.6 | 96.8 | 97.0 | 97.2 | 97.5 |

Table 22-continued

| Item | Unit | Example 130 | Example 131 | Example 132 | Example 133 | Example 134 | Example 135 | Example 136 | Example 137 |
|---|---|---|---|---|---|---|---|---|---|
| Refrigerating capacity ratio | % (relative to 410A) | 93.5 | 93.3 | 93.1 | 92.8 | 92.6 | 92.4 | 92.1 | 91.8 |
| Condensation glide | ° C. | 2.56 | 2.54 | 2.51 | 2.49 | 2.45 | 2.42 | 2.38 | 2.33 |
| Discharge pressure | % (relative to 410A) | 100.5 | 100.0 | 99.5 | 98.9 | 98.4 | 97.9 | 97.3 | 96.8 |
| RCL | g/m³ | 48.5 | 47.5 | 46.6 | 45.7 | 44.9 | 44.1 | 43.3 | 42.5 |

TABLE 23

| Item | Unit | Example 138 | Example 139 | Example 140 | Example 141 | Example 142 | Example 143 | Example 144 | Example 145 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 20.0 | 18.0 | 16.0 | 44.0 | 42.0 | 40.0 | 38.0 | 36.0 |
| R1234yf | mass % | 24.0 | 24.0 | 24.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 97.7 | 97.9 | 98.1 | 95.3 | 95.5 | 95.7 | 95.9 | 96.1 |
| Refrigerating capacity ratio | % (relative to 410A) | 91.6 | 91.3 | 91.0 | 93.2 | 93.1 | 92.9 | 92.7 | 92.5 |
| Condensation glide | ° C. | 2.28 | 2.22 | 2.16 | 2.86 | 2.85 | 2.83 | 2.81 | 2.79 |
| Discharge pressure | % (relative to 410A) | 96.2 | 95.6 | 95.1 | 101.3 | 100.8 | 100.4 | 99.9 | 99.4 |
| RCL | g/m³ | 41.8 | 41.1 | 40.4 | 53.7 | 52.6 | 51.5 | 50.4 | 49.4 |

TABLE 24

| Item | Unit | Example 146 | Example 147 | Example 148 | Example 149 | Example 150 | Example 151 | Example 152 | Example 153 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 34.0 | 32.0 | 30.0 | 28.0 | 26.0 | 24.0 | 22.0 | 20.0 |
| R1234yf | mass % | 26.0 | 26.0 | 26.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 96.3 | 96.5 | 96.7 | 96.9 | 97.1 | 97.3 | 97.5 | 97.7 |
| Refrigerating capacity ratio | % (relative to 410A) | 92.3 | 92.1 | 91.9 | 91.6 | 91.4 | 91.2 | 90.9 | 90.6 |
| Condensation glide | ° C. | 2.77 | 2.74 | 2.71 | 2.67 | 2.63 | 2.59 | 2.53 | 2.48 |
| Discharge pressure | % (relative to 410A) | 99.0 | 98.5 | 97.9 | 97.4 | 96.9 | 96.4 | 95.8 | 95.3 |
| RCL | g/m³ | 48.4 | 47.4 | 46.5 | 45.7 | 44.8 | 44.0 | 43.2 | 42.5 |

TABLE 25

| Item | Unit | Example 154 | Example 155 | Example 156 | Example 157 | Example 158 | Example 159 | Example 160 | Example 161 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 18.0 | 16.0 | 14.0 | 42.0 | 40.0 | 38.0 | 36.0 | 34.0 |
| R1234yf | mass % | 26.0 | 26.0 | 26.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 97.9 | 98.2 | 98.4 | 95.6 | 95.8 | 96.0 | 96.2 | 96.3 |
| Refrigerating capacity ratio | % (relative to 410A) | 90.3 | 90.1 | 89.8 | 92.1 | 91.9 | 91.7 | 91.5 | 91.3 |
| Condensation glide | ° C. | 2.42 | 2.35 | 2.27 | 3.10 | 3.09 | 3.06 | 3.04 | 3.01 |
| Discharge pressure | % (relative to 410A) | 94.7 | 94.1 | 93.6 | 99.7 | 99.3 | 98.8 | 98.4 | 97.9 |
| RCL | g/m³ | 41.7 | 41.0 | 40.3 | 53.6 | 52.5 | 51.4 | 50.3 | 49.3 |

TABLE 26

| Item | Unit | Example 162 | Example 163 | Example 164 | Example 165 | Example 166 | Example 167 | Example 168 | Example 169 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 32.0 | 30.0 | 28.0 | 26.0 | 24.0 | 22.0 | 20.0 | 18.0 |
| R1234yf | mass % | 28.0 | 28.0 | 28.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 96.5 | 96.7 | 96.9 | 97.2 | 97.4 | 97.6 | 97.8 | 98.0 |
| Refrigerating capacity ratio | % (relative to 410A) | 91.1 | 90.9 | 90.7 | 90.4 | 90.2 | 89.9 | 89.7 | 89.4 |
| Condensation glide | ° C. | 2.98 | 2.94 | 2.90 | 2.85 | 2.80 | 2.75 | 2.68 | 2.62 |
| Discharge pressure | % (relative to 410A) | 97.4 | 96.9 | 96.4 | 95.9 | 95.4 | 94.9 | 94.3 | 93.8 |
| RCL | g/m$^3$ | 48.3 | 47.4 | 46.4 | 45.6 | 44.7 | 43.9 | 43.1 | 42.4 |

TABLE 27

| Item | Unit | Example 170 | Example 171 | Example 172 | Example 173 | Example 174 | Example 175 | Example 176 | Example 177 |
|---|---|---|---|---|---|---|---|---|---|
| HFO-1132(E) | mass % | 56.0 | 58.0 | 60.0 | 32.0 | 34.0 | 36.0 | 38.0 | 42.0 |
| HFO-1123 | mass % | 16.0 | 14.0 | 12.0 | 38.0 | 36.0 | 34.0 | 32.0 | 28.0 |
| R1234yf | mass % | 28.0 | 28.0 | 28.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 98.2 | 98.4 | 98.6 | 96.1 | 96.2 | 96.4 | 96.6 | 97.0 |
| Refrigerating capacity ratio | % (relative to 410A) | 89.1 | 88.8 | 88.5 | 90.7 | 90.5 | 90.3 | 90.1 | 89.7 |
| Condensation glide | ° C. | 2.54 | 2.46 | 2.38 | 3.32 | 3.30 | 3.26 | 3.22 | 3.14 |
| Discharge pressure | % (relative to 410A) | 93.2 | 92.6 | 92.1 | 97.7 | 97.3 | 96.8 | 96.4 | 95.4 |
| RCL | g/m$^3$ | 41.7 | 41.0 | 40.3 | 52.4 | 51.3 | 50.2 | 49.2 | 47.3 |

Table 28

| Item | Unit | Example 178 | Example 179 | Example 180 | Example 181 | Example 182 | Example 183 | Example 184 | Example 185 |
|---|---|---|---|---|---|---|---|---|---|
| HFO-1132(E) | mass % | 44.0 | 46.0 | 48.0 | 50.0 | 52.0 | 54.0 | 56.0 | 58.0 |
| HFO-1123 | mass % | 26.0 | 24.0 | 22.0 | 20.0 | 18.0 | 16.0 | 14.0 | 12.0 |
| R1234yf | mass % | 30.0 | 30.0 | 30.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 97.2 | 97.4 | 97.6 | 97.8 | 98.0 | 98.3 | 98.5 | 98.7 |
| Refrigerating capacity ratio | % (relative to 410A) | 89.4 | 89.2 | 89.0 | 88.7 | 88.4 | 88.2 | 87.9 | 87.6 |
| Condensation glide | ° C. | 3.08 | 3.03 | 2.97 | 2.90 | 2.83 | 2.75 | 2.66 | 2.57 |
| Discharge pressure | % (relative to 410A) | 94.9 | 94.4 | 93.9 | 93.3 | 92.8 | 92.3 | 91.7 | 91.1 |
| RCL | g/m$^3$ | 46.4 | 45.5 | 44.7 | 43.9 | 43.1 | 42.3 | 41.6 | 40.9 |

TABLE 29

| Item | Unit | Example 186 | Example 187 | Example 188 | Example 189 | Example 190 | Example 191 | Example 192 | Example 193 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 38.0 | 36.0 | 34.0 | 32.0 | 30.0 | 28.0 | 26.0 | 24.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 96.2 | 96.3 | 96.5 | 96.7 | 96.9 | 97.1 | 97.3 | 97.5 |

TABLE 29-continued

| Item | Unit | Example 186 | Example 187 | Example 188 | Example 189 | Example 190 | Example 191 | Example 192 | Example 193 |
|---|---|---|---|---|---|---|---|---|---|
| Refrigerating capacity ratio | % (relative to 410A) | 89.6 | 89.5 | 89.3 | 89.1 | 88.9 | 88.7 | 88.4 | 88.2 |
| Condensation glide | ° C. | 3.60 | 3.56 | 3.52 | 3.48 | 3.43 | 3.38 | 3.33 | 3.26 |
| Discharge pressure | % (relative to 410A) | 96.6 | 96.2 | 95.7 | 95.3 | 94.8 | 94.3 | 93.9 | 93.4 |
| RCL | g/m³ | 53.4 | 52.3 | 51.2 | 50.1 | 49.1 | 48.1 | 47.2 | 46.3 |

TABLE 30

| Item | Unit | Example 194 | Example 195 | Example 196 | Example 197 | Example 198 | Example 199 | Example 200 | Example 201 |
|---|---|---|---|---|---|---|---|---|---|
| HFO-1132(E) | mass % | 46.0 | 48.0 | 50.0 | 52.0 | 54.0 | 56.0 | 58.0 | 60.0 |
| HFO-1123 | mass % | 22.0 | 20.0 | 18.0 | 16.0 | 14.0 | 12.0 | 10.0 | 8.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 97.7 | 97.9 | 98.1 | 98.3 | 98.5 | 98.7 | 98.9 | 99.2 |
| Refrigerating capacity ratio | % (relative to 410A) | 88.0 | 87.7 | 87.5 | 87.2 | 86.9 | 86.6 | 86.3 | 86.0 |
| Condensation glide | ° C. | 3.20 | 3.12 | 3.04 | 2.96 | 2.87 | 2.77 | 2.66 | 2.55 |
| Discharge pressure | % (relative to 410A) | 92.8 | 92.3 | 91.8 | 91.3 | 90.7 | 90.2 | 89.6 | 89.1 |
| RCL | g/m³ | 45.4 | 44.6 | 43.8 | 43.0 | 42.3 | 41.5 | 40.8 | 40.2 |

TABLE 31

| Item | Unit | Example 202 | Example 203 | Example 204 | Example 205 | Example 206 | Example 207 | Example 208 | Example 209 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 36.0 | 34.0 | 32.0 | 30.0 | 28.0 | 26.0 | 24.0 | 22.0 |
| R1234yf | mass % | 34.0 | 34.0 | 34.0 | 34.0 | 34.0 | 34.0 | 34.0 | 34.0 |
| GWP | — | 2 | 2 | 2 | 2 | 2 | 2 | 2 | 2 |
| COP ratio | % (relative to 410A) | 96.5 | 96.6 | 96.8 | 97.0 | 97.2 | 97.4 | 97.6 | 97.8 |
| Refrigerating capacity ratio | % (relative to 410A) | 88.4 | 88.2 | 88.0 | 87.8 | 87.6 | 87.4 | 87.2 | 87.0 |
| Condensation glide | ° C. | 3.84 | 3.80 | 3.75 | 3.70 | 3.64 | 3.58 | 3.51 | 3.43 |
| Discharge pressure | % (relative to 410A) | 95.0 | 94.6 | 94.2 | 93.7 | 93.3 | 92.8 | 92.3 | 91.8 |
| RCL | g/m³ | 53.3 | 52.2 | 51.1 | 50.0 | 49.0 | 48.0 | 47.1 | 46.2 |

TABLE 32

| Item | Unit | Example 210 | Example 211 | Example 212 | Example 213 | Example 214 | Example 215 | Example 216 | Example 217 |
|---|---|---|---|---|---|---|---|---|---|
| HFO-1132(E) | mass % | 46.0 | 48.0 | 50.0 | 52.0 | 54.0 | 30.0 | 32.0 | 34.0 |
| HFO-1123 | mass % | 20.0 | 18.0 | 16.0 | 14.0 | 12.0 | 34.0 | 32.0 | 30.0 |
| R1234yf | mass % | 34.0 | 34.0 | 34.0 | 34.0 | 34.0 | 36.0 | 36.0 | 36.0 |
| GWP | — | 2 | 2 | 2 | 2 | 2 | 2 | 2 | 2 |
| COP ratio | % (relative to 410A) | 98.0 | 98.2 | 98.4 | 98.6 | 98.8 | 96.8 | 96.9 | 97.1 |
| Refrigerating capacity ratio | % (relative to 410A) | 86.7 | 86.5 | 86.2 | 85.9 | 85.6 | 87.2 | 87.0 | 86.8 |
| Condensation glide | ° C. | 3.36 | 3.27 | 3.18 | 3.08 | 2.97 | 4.08 | 4.03 | 3.97 |

TABLE 32-continued

| Item | Unit | Example 210 | Example 211 | Example 212 | Example 213 | Example 214 | Example 215 | Example 216 | Example 217 |
|---|---|---|---|---|---|---|---|---|---|
| Discharge pressure | % (relative to 410A) | 91.3 | 90.8 | 90.3 | 89.7 | 89.2 | 93.4 | 93.0 | 92.6 |
| RCL | g/m$^3$ | 45.3 | 44.5 | 43.7 | 42.9 | 42.2 | 53.2 | 52.1 | 51.0 |

TABLE 33

| Item | Unit | Example 218 | Example 219 | Example 220 | Example 221 | Example 222 | Example 223 | Example 224 | Example 225 |
|---|---|---|---|---|---|---|---|---|---|
| HFO-1132(E) | mass % | 36.0 | 38.0 | 40.0 | 42.0 | 44.0 | 46.0 | 30.0 | 32.0 |
| HFO-1123 | mass % | 28.0 | 26.0 | 24.0 | 22.0 | 20.0 | 18.0 | 32.0 | 30.0 |
| R1234yf | mass % | 36.0 | 36.0 | 36.0 | 36.0 | 36.0 | 36.0 | 38.0 | 38.0 |
| GWP | — | 2 | 2 | 2 | 2 | 2 | 2 | 2 | 2 |
| COP ratio | % (relative to 410A) | 97.3 | 97.5 | 97.7 | 97.9 | 98.1 | 98.3 | 97.1 | 97.2 |
| Refrigerating capacity ratio | % (relative to 410A) | 86.6 | 86.4 | 86.2 | 85.9 | 85.7 | 85.5 | 85.9 | 85.7 |
| Condensation glide | ° C. | 3.91 | 3.84 | 3.76 | 3.68 | 3.60 | 3.50 | 4.32 | 4.25 |
| Discharge pressure | % (relative to 410A) | 92.1 | 91.7 | 91.2 | 90.7 | 90.3 | 89.8 | 91.9 | 91.4 |
| RCL | g/m$^3$ | 49.9 | 48.9 | 47.9 | 47.0 | 46.1 | 45.3 | 53.1 | 52.0 |

TABLE 34

| Item | Unit | Example 226 | Example 227 |
|---|---|---|---|
| HFO-1132(E) | mass % | 34.0 | 36.0 |
| HFO-1123 | mass % | 28.0 | 26.0 |
| R1234yf | mass % | 38.0 | 38.0 |
| GWP | — | 2 | 2 |
| COP ratio | % (relative to 410A) | 97.4 | 97.6 |
| Refrigerating capacity ratio | % (relative to 410A) | 85.6 | 85.3 |
| Condensation glide | ° C. | 4.18 | 4.11 |
| Discharge pressure | % (relative to 410A) | 91.0 | 90.6 |
| RCL | g/m$^3$ | 50.9 | 49.8 |

These results indicate that under the condition that the mass % of HFO-1132(E), HFO-1123, and R1234yf based on their sum is respectively represented by x, y, and z, when coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line segment CO);
the line segment AA' is represented by coordinates (x, 0.0016x$^2$−0.9473x+57.497, −0.0016x$^2$−0.0527x+42.503),
the line segment A'B is represented by coordinates (x, 0.0029x$^2$−1.0268x+58.7, −0.0029x$^2$+0.0268x+41.3,
the line segment DC' is represented by coordinates (x, 0.0082x$^2$−0.6671x+80.4, −0.0082x$^2$−0.3329x+19.6),
the line segment C'C is represented by coordinates (x, 0.0067x$^2$−0.6034x+79.729, −0.0067x$^2$−0.3966x+20.271), and
the line segments BD, CO, and OA are straight lines,
the refrigerant has a refrigerating capacity ratio of 85% or more relative to that of R410A, and a COP of 92.5% or more relative to that of R410A.

The point on the line segment AA' was determined by obtaining an approximate curve connecting point A, Example 1, and point A' by the least square method.

The point on the line segment A'B was determined by obtaining an approximate curve connecting point A', Example 3, and point B by the least square method.

The point on the line segment DC' was determined by obtaining an approximate curve connecting point D, Example 6, and point C' by the least square method.

The point on the line segment C'C was determined by obtaining an approximate curve connecting point C', Example 4, and point C by the least square method.

Likewise, the results indicate that when coordinates (x,y,z) are within the range of a figure surrounded by line segments AA', A'B, BF, FT, TE, EO, and OA that connect the following 7 points:
point A (68.6, 0.0, 31.4),
point A' (30.6, 30.0, 39.4),
point B (0.0, 58.7, 41.3),
point F (0.0, 61.8, 38.2),
point T (35.8, 44.9, 19.3),
point E (58.0, 42.0, 0.0) and
point O (100.0, 0.0, 0.0),
or on the above line segments (excluding the points on the line EO);
the line segment AA' is represented by coordinates (x, 0.0016x$^2$−0.9473x+57.497, −0.0016x$^2$−0.0527x+42.503),
the line segment A'B is represented by coordinates (x, 0.0029x$^2$−1.0268x+58.7, −0.0029x$^2$+0.0268x+41.3),
the line segment FT is represented by coordinates (x, 0.0078x$^2$−0.7501x+61.8, −0.0078x$^2$−0.2499x+38.2), and
the line segment TE is represented by coordinates (x, 0.0067x$^2$−0.7607x+63.525, −0.0067x$^2$−0.2393x+36.475), and the line segments BF, FO, and OA are straight lines, the refrigerant has a refrigerating capacity ratio of 85% or more relative to that of R410A, and a COP of 95% or more relative to that of R410A.

The point on the line segment FT was determined by obtaining an approximate curve connecting three points, i.e., points T, E', and F, by the least square method.

The point on the line segment TE was determined by obtaining an approximate curve connecting three points, i.e., points E, R, and T, by the least square method.

The results in Tables 1 to 34 clearly indicate that in a ternary composition diagram of the mixed refrigerant of HFO-1132(E), HFO-1123, and R1234yf in which the sum of these components is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below the line segment LM connecting point L (63.1, 31.9, 5.0) and point M (60.3, 6.2, 33.5), the refrigerant has an RCL of 40 g/m$^3$ or more.

The results in Tables 1 to 34 clearly indicate that in a ternary composition diagram of the mixed refrigerant of HFO-1132(E), HFO-1123 and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment QR connecting point Q (62.8, 29.6, 7.6) and point R (49.8, 42.3, 7.9) or on the left side of the line segment, the refrigerant has a temperature glide of 1° C. or less.

The results in Tables 1 to 34 clearly indicate that in a ternary composition diagram of the mixed refrigerant of HFO-1132(E), HFO-1123, and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment ST connecting point S (62.6, 28.3, 9.1) and point T (35.8, 44.9, 19.3) or on the right side of the line segment, the refrigerant has a discharge pressure of 105% or less relative to that of 410A.

In these compositions, R1234yf contributes to reducing flammability, and suppressing deterioration of polymerization etc. Therefore, the composition preferably contains R1234yf.

Further, the burning velocity of these mixed refrigerants whose mixed formulations were adjusted to WCF concentrations was measured according to the ANSI/ASHRAE Standard 34-2013. Compositions having a burning velocity of 10 cm/s or less were determined to be classified as "Class 2L (lower flammability)."

A burning velocity test was performed using the apparatus shown in FIG. 1 in the following manner. In FIG. 1, reference numeral 901 refers to a sample cell, 902 refers to a high-speed camera, 903 refers to a xenon lamp, 904 refers to a collimating lens, 905 refers to a collimating lens, and 906 refers to a ring filter. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Each WCFF concentration was obtained by using the WCF concentration as the initial concentration and performing a leak simulation using NIST Standard Reference Database REFLEAK Version 4.0.

Tables 35 and 36 show the results.

TABLE 35

| Item | | Unit | G | H | I |
|---|---|---|---|---|---|
| WCF | HFO-1132(E) | mass % | 72.0 | 72.0 | 72.0 |
| | HFO-1123 | mass % | 28.0 | 9.6 | 0.0 |
| | R1234yf | mass % | 0.0 | 18.4 | 28.0 |
| Burning velocity (WCF) | | cm/s | 10 | 10 | 10 |

TABLE 36

| | Item | Unit | J | P | L | N | N' | K |
|---|---|---|---|---|---|---|---|---|
| WCF | HFO-1132(E) | mass % | 47.1 | 55.8 | 63.1 | 68.6 | 65.0 | 61.3 |
| | HFO-1123 | mass % | 52.9 | 42.0 | 31.9 | 16.3 | 7.7 | 5.4 |
| | R1234yf | mass % | 0.0 | 2.2 | 5.0 | 15.1 | 27.3 | 33.3 |
| | Leak condition that results in WCFF | | Storage/Shipping −40° C., 92% release, liquid phase side | Storage/Shipping −40° C., 90% release, liquid phase side | Storage/Shipping −40° C., 90% release, gas phase side | Storage/Shipping −40° C., 66% release, gas phase side | Storage/Shipping −40° C., 12% release, gas phase side | Storage/Shipping, −40° C., 0% release, gas phase side |
| WCFF | HFO-1132(E) | mass % | 72.0 | 72.0 | 72.0 | 72.0 | 72.0 | 72.0 |
| | HFO-1123 | mass % | 28.0 | 17.8 | 17.4 | 13.6 | 12.3 | 9.8 |
| | R1234yf | mass % | 0.0 | 10.2 | 10.6 | 14.4 | 15.7 | 18.2 |

TABLE 36-continued

| Item | Unit | J | P | L | N | N' | K |
|---|---|---|---|---|---|---|---|
| Burning velocity (WCF) | cm/s | 8 or less | 8 or less | 8 or less | 9 | 9 | 8 or less |
| Burning velocity (WCFF) | cm/s | 10 | 10 | 10 | 10 | 10 | 10 |

The results in Table 35 clearly indicate that when a mixed refrigerant of HFO-1132(E), HFO-1123, and R1234yf contains HFO-1132(E) in a proportion of 72.0 mass % or less based on their sum, the refrigerant can be determined to have a WCF lower flammability.

The results in Tables 36 clearly indicate that in a ternary composition diagram of a mixed refrigerant of HFO-1132 (E), HFO-1123, and R1234yf in which their sum is 100 mass %, and a line segment connecting a point (0.0, 100.0, 0.0) and a point (0.0, 0.0, 100.0) is the base, when coordinates (x,y,z) are on or below the line segments JP, PN, and NK connecting the following 6 points:
point J (47.1, 52.9, 0.0),
point P (55.8, 42.0, 2.2),
point L (63.1, 31.9, 5.0)
point N' (65.0, 7.7, 27.3) and
point K (61.3, 5.4, 33.3),
the refrigerant can be determined to have a WCF lower flammability, and a WCFF lower flammability.
In the diagram, the line segment PN is represented by coordinates (x, $-0.1135x^2+12.112x-280.43$, $0.1135x^2-13.112x+380.43$),
and the line segment NK is represented by coordinates (x, $0.2421x^2-29.955x+931.91$, $-0.2421x^2+28.955x-831.91$).

The point on the line segment PN was determined by obtaining an approximate curve connecting three points, i.e., points P, L, and N, by the least square method.

The point on the line segment NK was determined by obtaining an approximate curve connecting three points, i.e., points N, N', and K, by the least square method.

(5-2) Refrigerant B

The refrigerant B according to the present disclosure is a mixed refrigerant comprising trans-1,2-difluoroethylene (HFO-1132(E)) and trifluoroethylene (HFO-1123) in a total amount of 99.5 mass % or more based on the entire refrigerant, and the refrigerant comprising 62.0 mass % to 72.0 mass % or 45.1 mass % to 47.1 mass % of HFO-1132 (E) based on the entire refrigerant, or a mixed refrigerant comprising HFO-1132(E) and HFO-1123 in a total amount of 99.5 mass % or more based on the entire refrigerant, and the refrigerant comprising 45.1 mass % to 47.1 mass % of HFO-1132(E) based on the entire refrigerant.

The refrigerant B according to the present disclosure has various properties that are desirable as an R410A-alternative refrigerant, i.e., (1) a coefficient of performance equivalent to that of R410A, (2) a refrigerating capacity equivalent to that of R410A, (3) a sufficiently low GWP, and (4) a lower flammability (Class 2L) according to the ASHRAE standard.

When the refrigerant B according to the present disclosure is a mixed refrigerant comprising 72.0 mass % or less of HFO-1132(E), it has WCF lower flammability. When the refrigerant B according to the present disclosure is a composition comprising 47.1% or less of HFO-1132(E), it has WCF lower flammability and WCFF lower flammability, and is determined to be "Class 2L," which is a lower flammable refrigerant according to the ASHRAE standard, and which is further easier to handle.

When the refrigerant B according to the present disclosure comprises 62.0 mass % or more of HFO-1132(E), it becomes superior with a coefficient of performance of 95% or more relative to that of R410A, the polymerization reaction of HFO-1132(E) and/or HFO-1123 is further suppressed, and the stability is further improved. When the refrigerant B according to the present disclosure comprises 45.1 mass % or more of HFO-1132(E), it becomes superior with a coefficient of performance of 93% or more relative to that of R410A, the polymerization reaction of HFO-1132(E) and/or HFO-1123 is further suppressed, and the stability is further improved.

The refrigerant B according to the present disclosure may further comprise other additional refrigerants in addition to HFO-1132(E) and HFO-1123, as long as the above properties and effects are not impaired. In this respect, the refrigerant according to the present disclosure preferably comprises HFO-1132(E) and HFO-1123 in a total amount of 99.75 mass % or more, and more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant B)

The present disclosure is described in more detail below with reference to Examples of refrigerant B. However, the refrigerant B is not limited to the Examples.

Mixed refrigerants were prepared by mixing HFO-1132 (E) and HFO-1123 at mass % based on their sum shown in Tables 37 and 38.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Evaporating temperature: 5° C.
Condensation temperature: 45° C.
Superheating temperature: 5 K
Subcooling temperature: 5 K
Compressor efficiency: 70%

The composition of each mixture was defined as WCF. A leak simulation was performed using NIST Standard Reference Data Base Refleak Version 4.0 under the conditions of Equipment, Storage, Shipping, Leak, and Recharge according to the ASHRAE Standard 34-2013. The most flammable fraction was defined as WCFF.

Tables 1 and 2 show GWP, COP, and refrigerating capacity, which were calculated based on these results. The COP and refrigerating capacity are ratios relative to R410A.

The coefficient of performance (COP) was determined by the following formula.

COP=(refrigerating capacity or heating capacity)/power consumption

For the flammability, the burning velocity was measured according to the ANSI/ASHRAE Standard 34-2013. Both WCF and WCFF having a burning velocity of 10 cm/s or less were determined to be "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

TABLE 37

| Item | Unit | Comparative Example 1 | Comparative Example 2 | Comparative Example 3 | Example 1 | Example 2 | Example 3 | Example 4 | Example 5 | Comparative Example 4 |
|---|---|---|---|---|---|---|---|---|---|---|
| FIFO-1132E | | R410A | HFO-1132E | | | | | | | |
| HFO-1132E (WCF) | mass % | — | 100 | 80 | 72 | 70 | 68 | 65 | 62 | 60 |
| HFO-1123 (WCF) | mass % | | 0 | 20 | 28 | 30 | 32 | 35 | 38 | 40 |
| GWP | — | 2088 | 1 | 1 | 1 | 1 | 1 | 1 | 1 | 1 |
| COP ratio | % (relative to R410A) | 100 | 99.7 | 97.5 | 96.6 | 96.3 | 96.1 | 95.8 | 95.4 | 95.2 |
| Refrigerating capacity ratio | % (relative to R410A) | 100 | 98.3 | 101.9 | 103.1 | 103.4 | 103.8 | 104.1 | 104.5 | 104.8 |
| Discharge pressure | Mpa | 2.73 | 2.71 | 2.89 | 2.96 | 2.98 | 3.00 | 3.02 | 3.04 | 3.06 |
| Burning velocity (WCF) | cm/sec | Non-flammable | 20 | 13 | 10 | 9 | 9 | 8 | 8 or less | 8 or less |

TABLE 38

| Item | Unit | Comparative Example 5 | Comparative Example 6 | Example 7 | Example 8 | Example 9 | Comparative Example 7 | Comparative Example 8 | Comparative Example 9 | Comparative Example 10 HFO-1123 |
|---|---|---|---|---|---|---|---|---|---|---|
| HFO-1132E (WCF) | mass % | 50 | 48 | 47.1 | 46.1 | 45.1 | 43 | 40 | 25 | 0 |
| HFO-1123 (WCF) | mass % | 50 | 52 | 52.9 | 53.9 | 54.9 | 57 | 60 | 75 | 100 |
| GWP | — | 1 | 1 | 1 | 1 | 1 | 1 | 1 | 1 | 1 |
| COP ratio | % (relative to R410A) | 94.1 | 93.9 | 93.8 | 93.7 | 93.6 | 93.4 | 93.1 | 91.9 | 90.6 |
| Refrigerating capacity ratio | % (relative to R410A) | 105.9 | 106.1 | 106.2 | 106.3 | 106.4 | 106.6 | 106.9 | 107.9 | 108.0 |
| Discharge pressure | Mpa | 3.14 | 3.16 | 3.16 | 3.17 | 3.18 | 3.20 | 3.21 | 3.31 | 3.39 |
| Leakage test conditions (WCFF) | | Storage/Shipping −40° C. 92% release, liquid phase side | Storage/Shipping −40° C. 92% release, liquid phase side | Storage/Shipping −40° C. 92% release, liquid phase side | Storage/Shipping −40° C. 92% release, liquid phase side | Storage/Shipping −40° C. 92% release, liquid phase side | Storage/Shipping −40° C. 92% release, liquid phase side | Storage/Shipping −40° C. 92% release, liquid phase side | Storage/Shipping −40° C. 90% release, liquid phase side | — |

TABLE 38-continued

| Item | Unit | Comparative Example 5 | Comparative Example 6 | Example 7 | Example 8 | Example 9 | Comparative Example 7 | Comparative Example 8 | Comparative Example 9 | Comparative Example 10 HFO-1123 |
|---|---|---|---|---|---|---|---|---|---|---|
| HFO-1132E (WCFF) | mass % | 74 | 73 | 72 | 71 | 70 | 67 | 63 | 38 | — |
| HFO-1123 (WCFF) | mass % | 26 | 27 | 28 | 29 | 30 | 33 | 37 | 62 | |
| Burning velocity (WCF) | cm/sec | 8 or less | 8 or less | 8 or less | 8 or less | 8 or less | 8 or less | 8 or less | 8 or less | 5 |
| Burning velocity (WCFF) | cm/sec | 11 | 10.5 | 10.0 | 9.5 | 9.5 | 8.5 | 8 or less | 8 or less | |
| ASHRAE flammability classification | | 2 | 2 | 2L | 2L | 2L | 2L | 2L | 2L | 2L |

The compositions each comprising 62.0 mass % to 72.0 mass % of HFO-1132(E) based on the entire composition are stable while having a low GWP (GWP=1), and they ensure WCF lower flammability. Further, surprisingly, they can ensure performance equivalent to that of R410A. Moreover, compositions each comprising 45.1 mass % to 47.1 mass % of HFO-1132(E) based on the entire composition are stable while having a low GWP (GWP=1), and they ensure WCFF lower flammability. Further, surprisingly, they can ensure performance equivalent to that of R410A.

(5-3) Refrigerant C

The refrigerant C according to the present disclosure is a composition comprising trans-1,2-difluoroethylene (HFO-1132(E)), trifluoroethylene (HFO-1123), 2,3,3,3-tetrafluoro-1-propene (R1234yf), and difluoromethane (R32), and satisfies the following requirements. The refrigerant C according to the present disclosure has various properties that are desirable as an alternative refrigerant for R410A; i.e. it has a coefficient of performance and a refrigerating capacity that are equivalent to those of R410A, and a sufficiently low GWP.

Requirements

Preferable refrigerant C is as follows:

When the mass % of HFO-1132(E), HFO-1123, R1234yf, and R32 based on their sum is respectively represented by x, y, z, and a, if $0 < a \leq 11.1$, coordinates (x,y,z) in a ternary composition diagram in which the sum of HFO-1132(E), HFO-1123, and R1234yf is (100−a) mass % are within the range of a figure surrounded by straight lines GI, IA, AB, BD', D'C, and CG that connect the following 6 points:

point G ($0.026a^2 - 1.7478a + 72.0$, $-0.026a^2 + 0.7478a + 28.0$, 0.0),
point I ($0.026a^2 - 1.7478a + 72.0$, 0.0, $-0.026a^2 + 0.7478a + 28.0$),
point A ($0.0134a^2 - 1.9681a + 68.6$, 0.0, $-0.0134a^2 + 0.9681a + 31.4$),
point B (0.0, $0.0144a^2 - 1.6377a + 58.7$, $-0.0144a^2 + 0.6377a + 41.3$),
point D' (0.0, $0.0224a^2 + 0.968a + 75.4$, $-0.0224a^2 - 1.968a + 24.6$), and
point C ($-0.2304a^2 - 0.4062a + 32.9$, $0.2304a^2 - 0.5938a + 67.1$, 0.0),
or on the straight lines GI, AB, and D'C (excluding point G, point I, point A, point B, point D', and point C);

if $11.1 < a \leq 18.2$, coordinates (x,y,z) in the ternary composition diagram are within the range of a figure surrounded by straight lines GI, IA, AB, BW, and WG that connect the following 5 points:

point G ($0.02a^2 - 1.6013a + 71.105$, $-0.02a^2 + 0.6013a + 28.895$, 0.0),
point I ($0.02a^2 - 1.6013a + 71.105$, 0.0, $-0.02a^2 + 0.6013a + 28.895$),
point A ($0.0112a^2 - 1.9337a + 68.484$, 0.0, $-0.0112a^2 + 0.9337a + 31.516$),
point B (0.0, $0.0075a^2 - 1.5156a + 58.199$, $-0.0075a^2 + 0.5156a + 41.801$) and
point W (0.0, 100.0−a, 0.0),
or on the straight lines GI and AB (excluding point G, point I, point A, point B, and point W);

if $18.2 < a \leq 26.7$, coordinates (x,y,z) in the ternary composition diagram are within the range of a figure surrounded by straight lines GI, IA, AB, BW, and WG that connect the following 5 points:

point G ($0.0135a^2 - 1.4068a + 69.727$, $-0.0135a^2 + 0.4068a + 30.273$, 0.0),
point I ($0.0135a^2 - 1.4068a + 69.727$, 0.0, $-0.0135a^2 + 0.4068a + 30.273$),
point A ($0.0107a^2 - 1.9142a + 68.305$, 0.0, $-0.0107a^2 + 0.9142a + 31.695$),
point B (0.0, $0.009a^2 - 1.6045a + 59.318$, $-0.009a^2 + 0.6045a + 40.682$) and
point W (0.0, 100.0−a, 0.0),
or on the straight lines GI and AB (excluding point G, point I, point A, point B, and point W);

if $26.7 < a \leq 36.7$, coordinates (x,y,z) in the ternary composition diagram are within the range of a figure surrounded by straight lines GI, IA, AB, BW, and WG that connect the following 5 points:

point G ($0.0111a^2 - 1.3152a + 68.986$, $-0.0111a^2 + 0.3152a + 31.014$, 0.0),
point I ($0.0111a^2 - 1.3152a + 68.986$, 0.0, $-0.0111a^2 + 0.3152a + 31.014$),
point A ($0.0103a^2 - 1.9225a + 68.793$, 0.0, $-0.0103a^2 + 0.9225a + 31.207$),
point B (0.0, $0.0046a^2 - 1.41a + 57.286$, $-0.0046a^2 + 0.41a + 42.714$) and
point W (0.0, 100.0−a, 0.0),
or on the straight lines GI and AB (excluding point G, point I, point A, point B, and point W); and if $36.7 < a \leq 46.7$, coordinates (x,y,z) in the ternary composition diagram are within the range of a figure surrounded by straight lines GI, IA, AB, BW, and WG that connect the following 5 points:

point G ($0.0061a^2 - 0.9918a + 63.902$, $-0.0061a^2 - 0.0082a + 36.098$, 0.0), point I ($0.0061a^2-0.9918a+63.902$, 0.0, $-0.0061a^2-0.0082a+36.098$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$) and
point W (0.0, 100.0−a, 0.0),
or on the straight lines GI and AB (excluding point G, point I, point A, point B, and point W). When the refrigerant according to the present disclosure satisfies the above requirements, it has a refrigerating capacity ratio of 85% or more relative to that of R410A, and a COP ratio of 92.5% or more relative to that of R410A, and further ensures a WCF lower flammability.

The refrigerant C according to the present disclosure is preferably a refrigerant wherein
when the mass % of HFO-1132(E), HFO-1123, and R1234yf based on their sum is respectively represented by x, y, and z, if $0<a\leq11.1$, coordinates (x,y,z) in a ternary composition diagram in which the sum of HFO-1132(E), HFO-1123, and R1234yf is (100−a) mass % are within the range of a figure surrounded by straight lines JK', K'B, BD', D'C, and CJ that connect the following 5 points:
point J ($0.0049a^2-0.9645a+47.1$, $-0.0049a^2-0.0355a+52.9$, 0.0),
point K' ($0.0514a^2-2.4353a+61.7$, $-0.0323a^2+0.4122a+5.9$, $-0.0191a^2+1.0231a+32.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines JK', K'B, and D'C (excluding point J, point B, point D', and point C);

if $11.1<a\leq18.2$, coordinates (x,y,z) in the ternary composition diagram are within the range of a figure surrounded by straight lines JK', K'B, BW, and WJ that connect the following 4 points:
point J ($0.0243a^2-1.4161a+49.725$, $-0.0243a^2+0.4161a+50.275$, 0.0),
point K' ($0.0341a^2-2.1977a+61.187$, $-0.0236a^2+0.34a+5.636$, $-0.0105a^2+0.8577a+33.177$),
point B (0.0, $0.0075a^2-1.5156a+58.199$, $-0.0075a^2+0.5156a+41.801$) and
point W (0.0, 100.0−a, 0.0),
or on the straight lines JK' and K'B (excluding point J, point B, and point W);

if $18.2<a\leq26.7$, coordinates (x,y,z) in the ternary composition diagram are within the range of a figure surrounded by straight lines JK', K'B, BW, and WJ that connect the following 4 points:
point J ($0.0246a^2-1.4476a+50.184$, $-0.0246a^2+0.4476a+49.816$, 0.0),
point K' ($0.0196a^2-1.7863a+58.515$, $-0.0079a^2-0.1136a+8.702$, $-0.0117a^2+0.8999a+32.783$),
point B (0.0, $0.009a^2-1.6045a+59.318$, $-0.009a^2+0.6045a+40.682$) and
point W (0.0, 100.0−a, 0.0),
or on the straight lines JK' and K'B (excluding point J, point B, and point W);

if $26.7<a\leq36.7$, coordinates (x,y,z) in the ternary composition diagram are within the range of a figure surrounded by straight lines JK', K'A, AB, BW, and WJ that connect the following 5 points:
point J ($0.0183a^2-1.1399a+46.493$, $-0.0183a^2+0.1399a+53.507$, 0.0),
point K' ($-0.0051a^2+0.0929a+25.95$, 0.0, $0.0051a^2-1.0929a+74.05$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$) and
point W (0.0, 100.0−a, 0.0),
or on the straight lines JK', K'A, and AB (excluding point J, point B, and point W); and if $36.7<a\leq46.7$, coordinates (x,y,z) in the ternary composition diagram are within the range of a figure surrounded by straight lines JK', K'A, AB, BW, and WJ that connect the following 5 points:
point J ($-0.0134a^2+1.0956a+7.13$, $0.0134a^2-2.0956a+92.87$, 0.0),
point K' ($-1.892a+29.443$, 0.0, $0.892a+70.557$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$) and
point W (0.0, 100.0−a, 0.0),
or on the straight lines JK', K'A, and AB (excluding point J, point B, and point W). When the refrigerant according to the present disclosure satisfies the above requirements, it has a refrigerating capacity ratio of 85% or more relative to that of R410A, and a COP ratio of 92.5% or more relative to that of R410A. Additionally, the refrigerant has a WCF lower flammability and a WCFF lower flammability, and is classified as "Class 2L," which is a lower flammable refrigerant according to the ASHRAE standard.

When the refrigerant C according to the present disclosure further contains R32 in addition to HFO-1132 (E), HFO-1123, and R1234yf, the refrigerant may be a refrigerant wherein when the mass % of HFO-1132(E), HFO-1123, R1234yf, and R32 based on their sum is respectively represented by x, y, z, and a, if $0<a\leq10.0$, coordinates (x,y,z) in a ternary composition diagram in which the sum of HFO-1132(E), HFO-1123, and R1234yf is (100−a) mass % are within the range of a figure surrounded by straight lines that connect the following 4 points:
point a ($0.02a^2-2.46a+93.4$, 0, $-0.02a^2+2.46a+6.6$),
point b' ($-0.008a^2-1.38a+56$, $0.018a^2-0.53a+26.3$, $-0.01a^2+1.91a+17.7$),
point c ($-0.016a^2+1.02a+77.6$, $0.016a^2-1.02a+22.4$, 0), and
point o (100.0−a, 0.0, 0.0)
or on the straight lines oa, ab', and b'c (excluding point o and point c);

if $10.0<a\leq16.5$, coordinates (x,y,z) in the ternary composition diagram are within the range of a figure surrounded by straight lines that connect the following 4 points:
point a ($0.0244a^2-2.5695a+94.056$, 0, $-0.0244a^2+2.5695a+5.944$),
point b' ($0.1161a^2-1.9959a+59.749$, $0.014a^2-0.3399a+24.8$, $-0.1301a^2+2.3358a+15.451$),
point c ($-0.0161a^2+1.02a+77.6$, $0.0161a^2-1.02a+22.4$, 0), and
point o (100.0−a, 0.0, 0.0),
or on the straight lines oa, ab', and b'c (excluding point o and point c); or if $16.5<a\leq21.8$, coordinates (x,y,z) in the ternary composition diagram are within the range of a figure surrounded by straight lines that connect the following 4 points:
point a ($0.0161a^2-2.3535a+92.742$, 0, $-0.0161a^2+2.3535a+7.258$), point b' ($-0.0435a^2-0.0435a+50.406$, $0.0304a^2+1.8991a-0.0661$, $0.0739a^2-1.8556a+49.6601$), point c ($-0.0161a^2+0.9959a+77.851$, $0.0161a^2-0.9959a+22.149$, 0), and point o (100.0–a, 0.0, 0.0), or on the straight lines oa, ab', and b'c (excluding point o and point c). Note that when point b in the ternary composition diagram is defined as a point where a refrigerating capacity ratio of 95% relative to that of R410A and a COP ratio of 95% relative to that of R410A are both achieved, point b' is the intersection of straight line ab and an approximate line formed by connecting the points where the COP ratio relative to that of R410A is 95%. When the refrigerant according to the present disclosure meets the above requirements, the refrigerant has a refrigerating capacity ratio of 95% or more relative to that of R410A, and a COP ratio of 95% or more relative to that of R410A.

The refrigerant C according to the present disclosure may further comprise other additional refrigerants in addition to HFO-1132(E), HFO-1123, R1234yf, and R32 as long as the above properties and effects are not impaired. In this respect, the refrigerant according to the present disclosure preferably comprises HFO-1132(E), HFO-1123, R1234yf, and R32 in a total amount of 99.5 mass % or more, more preferably 99.75 mass % or more, and still more preferably 99.9 mass % or more, based on the entire refrigerant.

The refrigerant C according to the present disclosure may comprise HFO-1132(E), HFO-1123, R1234yf, and R32 in a total amount of 99.5 mass % or more, 99.75 mass % or more, or 99.9 mass % or more, based on the entire refrigerant.

Additional refrigerants are not particularly limited and can be widely selected. The mixed refrigerant may contain one additional refrigerant, or two or more additional refrigerants.

(Examples of Refrigerant C)

The present disclosure is described in more detail below with reference to Examples of refrigerant C. However, the refrigerant C is not limited to the Examples.

Mixed refrigerants were prepared by mixing HFO-1132 (E), HFO-1123, R1234yf, and R32 at mass % based on their sum shown in Tables 39 to 96.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

For each of these mixed refrigerants, the COP ratio and the refrigerating capacity ratio relative to those of R410 were obtained. Calculation was conducted under the following conditions.

Evaporating temperature: 5° C.
Condensation temperature: 45° C.
Superheating temperature: 5 K
Subcooling temperature: 5 K
Compressor efficiency: 70%

Tables 39 to 96 show the resulting values together with the GWP of each mixed refrigerant. The COP and refrigerating capacity are ratios relative to R410A.

The coefficient of performance (COP) was determined by the following formula.

COP=(refrigerating capacity or heating capacity)/power consumption

TABLE 39

| Item | Unit | Comp. Ex. 1 | Comp. Ex. 2 A | Comp. Ex. 3 B | Comp. Ex. 4 C | Comp. Ex. 5 D' | Comp. Ex. 6 G | Comp. Ex. 7 I | Comp. Ex. 8 J | Ex. 1 K' |
|---|---|---|---|---|---|---|---|---|---|---|
| HFO-1132(E) | Mass % | R410A | 68.6 | 0.0 | 32.9 | 0.0 | 72.0 | 72.0 | 47.1 | 61.7 |
| HFO-1123 | Mass % | | 0.0 | 58.7 | 67.1 | 75.4 | 28.0 | 0.0 | 52.9 | 5.9 |
| R1234yf | Mass % | | 31.4 | 41.3 | 0.0 | 24.6 | 0.0 | 28.0 | 0.0 | 32.4 |
| R32 | Mass % | | 0.0 | 0.0 | 0.0 | 0.0 | 0.0 | 0.0 | 0.0 | 0.0 |
| GWP | — | 2088 | 2 | 2 | 1 | 2 | 1 | 2 | 1 | 2 |
| COP ratio | % (relative to R410A) | 100 | 100.0 | 95.5 | 92.5 | 93.1 | 96.6 | 99.9 | 93.8 | 99.4 |
| Refrigerating capacity ratio | % (relative to R410A) | 100 | 85.0 | 85.0 | 107.4 | 95.0 | 103.1 | 86.6 | 106.2 | 85.5 |

TABLE 40

| Item | Unit | Comp. Ex. 9 A | Comp. Ex. 10 B | Comp. Ex. 11 C | Comp. Ex. 12 D' | Comp. Ex. 13 G | Comp. Ex. 14 I | Comp. Ex. 15 J | Ex. 2 K' |
|---|---|---|---|---|---|---|---|---|---|
| HFO-1132(E) | Mass % | 55.3 | 0.0 | 18.4 | 0.0 | 60.9 | 60.9 | 40.5 | 47.0 |
| HFO-1123 | Mass % | 0.0 | 47.8 | 74.5 | 83.4 | 32.0 | 0.0 | 52.4 | 7.2 |
| R1234yf | Mass % | 37.6 | 45.1 | 0.0 | 9.5 | 0.0 | 32.0 | 0.0 | 38.7 |
| R32 | Mass % | 7.1 | 7.1 | 7.1 | 7.1 | 7.1 | 7.1 | 7.1 | 7.1 |
| GWP | — | 50 | 50 | 49 | 49 | 49 | 50 | 49 | 50 |
| COP ratio | % (relative to R410A) | 99.8 | 96.9 | 92.5 | 92.5 | 95.9 | 99.6 | 94.0 | 99.2 |

TABLE 40-continued

| Item | Unit | Comp. Ex. 9 A | Comp. Ex. 10 B | Comp. Ex. 11 C | Comp. Ex. 12 D' | Comp. Ex. 13 G | Comp. Ex. 14 I | Comp. Ex. 15 J | Ex. 2 K' |
|---|---|---|---|---|---|---|---|---|---|
| Refrigerating capacity ratio | % (relative to R410A) | 85.0 | 85.0 | 110.5 | 106.0 | 106.5 | 87.7 | 108.9 | 85.5 |

TABLE 41

| Item | Unit | Comp. Ex. 16 A | Comp. Ex. 17 B | Comp. Ex. 18 C = D' | Comp. Ex. 19 G | Comp. Ex. 20 I | Comp. Ex. 21 J | Ex. 3 K' |
|---|---|---|---|---|---|---|---|---|
| NEO-1132(E) | Mass % | 48.4 | 0.0 | 0.0 | 55.8 | 55.8 | 37.0 | 41.0 |
| HFO-1123 | Mass % | 0.0 | 42.3 | 88.9 | 33.1 | 0.0 | 51.9 | 6.5 |
| R1234yf | Mass % | 40.5 | 46.6 | 0.0 | 0.0 | 33.1 | 0.0 | 41.4 |
| R32 | Mass % | 11.1 | 11.1 | 11.1 | 11.1 | 11.1 | 11.1 | 11.1 |
| GWP | — | 77 | 77 | 76 | 76 | 77 | 76 | 77 |
| COP ratio | % (relative to R410A) | 99.8 | 97.6 | 92.5 | 95.8 | 99.5 | 94.2 | 99.3 |
| Refrigerating capacity ratio | % (relative to R410A) | 85.0 | 85.0 | 112.0 | 108.0 | 88.6 | 110.2 | 85.4 |

TABLE 42

| Item | Unit | Comp. Ex. 22 A | Comp. Ex. 23 B | Comp. Ex. 24 G | Comp. Ex. 25 I | Comp. Ex. 26 J | Ex. 4 K' |
|---|---|---|---|---|---|---|---|
| HFO-1132(E) | Mass % | 42.8 | 0.0 | 52.1 | 52.1 | 34.3 | 36.5 |
| HFO-1123 | Mass % | 0.0 | 37.8 | 33.4 | 0.0 | 51.2 | 5.6 |
| R1234yf | Mass % | 42.7 | 47.7 | 0.0 | 33.4 | 0.0 | 43.4 |
| R32 | Mass % | 14.5 | 14.5 | 14.5 | 14.5 | 14.5 | 14.5 |
| GWP | — | 100 | 100 | 99 | 100 | 99 | 100 |
| COP ratio | % (relative to R410A) | 99.9 | 98.1 | 95.8 | 99.5 | 94.4 | 99.5 |
| Refrigerating capacity ratio | % (relative to R410A) | 85.0 | 85.0 | 109.1 | 89.6 | 111.1 | 85.3 |

TABLE 43

| Item | Unit | Comp. Ex. 27 A | Comp. Ex. 28 B | Comp. Ex. 29 G | Comp. Ex. 30 I | Comp. Ex. 31 J | Ex. 5 K' |
|---|---|---|---|---|---|---|---|
| HFO-1132(E) | Mass % | 37.0 | 0.0 | 48.6 | 48.6 | 32.0 | 32.5 |
| HFO-1123 | Mass % | 0.0 | 33.1 | 33.2 | 0.0 | 49.8 | 4.0 |
| R1234yf | Mass % | 44.8 | 48.7 | 0.0 | 33.2 | 0.0 | 45.3 |
| R32 | Mass % | 18.2 | 18.2 | 18.2 | 18.2 | 18.2 | 18.2 |
| GWP | — | 125 | 125 | 124 | 125 | 124 | 125 |
| COP ratio | % (relative to R410A) | 100.0 | 98.6 | 95.9 | 99.4 | 94.7 | 99.8 |
| Refrigerating capacity ratio | % (relative to R410A) | 85.0 | 85.0 | 110.1 | 90.8 | 111.9 | 85.2 |

TABLE 44

| Item | Unit | Comp. Ex. 32 A | Comp. Ex. 33 B | Comp. Ex. 34 G | Comp. Ex. 35 I | Comp. Ex. 36 J | Ex. 6 K' |
|---|---|---|---|---|---|---|---|
| HFO-1132(E) | Mass % | 31.5 | 0.0 | 45.4 | 45.4 | 30.3 | 28.8 |
| HFO-1123 | Mass % | 0.0 | 28.5 | 32.7 | 0.0 | 47.8 | 2.4 |
| R1234yf | Mass % | 46.6 | 49.6 | 0.0 | 32.7 | 0.0 | 46.9 |
| R32 | Mass % | 21.9 | 21.9 | 21.9 | 21.9 | 21.9 | 21.9 |
| GWP | — | 150 | 150 | 149 | 150 | 149 | 150 |
| COP ratio | % (relative to R410A) | 100.2 | 99.1 | 96.0 | 99.4 | 95.1 | 100.0 |
| Refrigerating capacity ratio | % (relative to R410A) | 85.0 | 85.0 | 111.0 | 92.1 | 112.6 | 85.1 |

TABLE 45

| Item | Unit | Comp. Ex. 37 A | Comp. Ex. 38 B | Comp. Ex. 39 G | Comp. Ex. 40 I | Comp. Ex. 41 J | Comp. Ex. 42 K' |
|---|---|---|---|---|---|---|---|
| HFO-1132(E) | Mass % | 24.8 | 0.0 | 41.8 | 41.8 | 29.1 | 24.8 |
| HFO-1123 | Mass % | 0.0 | 22.9 | 31.5 | 0.0 | 44.2 | 0.0 |
| R1234yf | Mass % | 48.5 | 50.4 | 0.0 | 31.5 | 0.0 | 48.5 |
| R32 | Mass % | 26.7 | 26.7 | 26.7 | 26.7 | 26.7 | 26.7 |
| GWP | — | 182 | 182 | 181 | 182 | 181 | 182 |
| COP ratio | % (relative to R410A) | 100.4 | 99.8 | 96.3 | 99.4 | 95.6 | 100.4 |
| Refrigerating capacity ratio | % (relative to R410A) | 85.0 | 85.0 | 111.9 | 93.8 | 113.2 | 85.0 |

TABLE 46

| Item | Unit | Comp. Ex. 43 A | Comp. Ex. 44 B | Comp. Ex. 45 G | Comp. Ex. 46 I | Comp. Ex. 47 J | Comp. Ex. 48 K' |
|---|---|---|---|---|---|---|---|
| HFO-1132(E) | Mass % | 21.3 | 0.0 | 40.0 | 40.0 | 28.8 | 24.3 |
| HFO-1123 | Mass % | 0.0 | 19.9 | 30.7 | 0.0 | 41.9 | 0.0 |
| R1234yf | Mass % | 49.4 | 50.8 | 0.0 | 30.7 | 0.0 | 46.4 |
| R32 | Mass % | 29.3 | 29.3 | 29.3 | 29.3 | 29.3 | 29.3 |
| GWP | — | 200 | 200 | 198 | 199 | 198 | 200 |
| COP ratio | % (relative to R410A) | 100.6 | 100.1 | 96.6 | 99.5 | 96.1 | 100.4 |
| Refrigerating capacity ratio | % (relative to R410A) | 85.0 | 85.0 | 112.4 | 94.8 | 113.6 | 86.7 |

TABLE 47

| Item | Unit | Comp. Ex. 49 A | Comp. Ex. 50 B | Comp. Ex. 51 G | Comp. Ex. 52 I | Comp. Ex. 53 J | Comp. Ex. 54 K' |
|---|---|---|---|---|---|---|---|
| HFO-1132(E) | Mass % | 12.1 | 0.0 | 35.7 | 35.7 | 29.3 | 22.5 |
| HFO-1123 | Mass % | 0.0 | 11.7 | 27.6 | 0.0 | 34.0 | 0.0 |
| R1234yf | Mass % | 51.2 | 51.6 | 0.0 | 27.6 | 0.0 | 40.8 |
| R32 | Mass % | 36.7 | 36.7 | 36.7 | 36.7 | 36.7 | 36.7 |
| GWP | — | 250 | 250 | 248 | 249 | 248 | 250 |
| COP ratio | % (relative to R410A) | 101.2 | 101.0 | 96.4 | 99.6 | 97.0 | 100.4 |
| Refrigerating capacity ratio | % (relative to R410A) | 85.0 | 85.0 | 113.2 | 97.6 | 113.9 | 90.9 |

TABLE 48

| Item | Unit | Comp. Ex. 55 A | Comp. Ex. 56 B | Comp. Ex. 57 G | Comp. Ex. 58 I | Comp. Ex. 59 J | Comp. Ex. 60 K' |
|---|---|---|---|---|---|---|---|
| HFO-1132(E) | Mass % | 3.8 | 0.0 | 32.0 | 32.0 | 29.4 | 21.1 |
| HFO-1123 | Mass % | 0.0 | 3.9 | 23.9 | 0.0 | 26.5 | 0.0 |
| R1234yf | Mass % | 52.1 | 52.0 | 0.0 | 23.9 | 0.0 | 34.8 |
| R32 | Mass % | 44.1 | 44.1 | 44.1 | 44.1 | 44.1 | 44.1 |
| GWP | — | 300 | 300 | 298 | 299 | 298 | 299 |
| COP ratio | % (relative to R410A) | 101.8 | 101.8 | 97.9 | 99.8 | 97.8 | 100.5 |
| Refrigerating capacity ratio | % (relative to R410A) | 85.0 | 85.0 | 113.7 | 100.4 | 113.9 | 94.9 |

TABLE 49

| Item | Unit | Comp. Ex. 61 A = B | Comp. Ex. 62 G | Comp. Ex. 63 I | Comp. Ex. 64 J | Comp. Ex. 65 K' |
|---|---|---|---|---|---|---|
| HFO-1132(E) | Mass % | 0.0 | 30.4 | 30.4 | 28.9 | 20.4 |
| HFO-1123 | Mass % | 0.0 | 21.8 | 0.0 | 23.3 | 0.0 |
| R1234yf | Mass % | 52.2 | 0.0 | 21.8 | 0.0 | 31.8 |
| R32 | Mass % | 47.8 | 47.8 | 47.8 | 47.8 | 47.8 |
| GWP | — | 325 | 323 | 324 | 323 | 324 |
| COP ratio | % (relative to R410A) | 102.1 | 98.2 | 100.0 | 98.2 | 100.6 |
| Refrigerating capacity ratio | % (relative to R410A) | 85.0 | 113.8 | 101.8 | 113.9 | 96.8 |

TABLE 50

| Item | Unit | Comp. Ex. 66 | Ex. 7 | Ex. 8 | Ex. 9 | Ex. 10 | Ex. 11 | Ex. 12 | Ex. 13 |
|---|---|---|---|---|---|---|---|---|---|
| HFO-1132(E) | Mass % | 5.0 | 10.0 | 15.0 | 20.0 | 25.0 | 30.0 | 35.0 | 40.0 |
| HFO-1123 | Mass % | 82.9 | 77.9 | 72.9 | 67.9 | 62.9 | 57.9 | 52.9 | 47.9 |
| R1234yf | Mass % | 5.0 | 5.0 | 5.0 | 5.0 | 5.0 | 5.0 | 5.0 | 5.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 92.4 | 92.6 | 92.8 | 93.1 | 93.4 | 93.7 | 94.1 | 94.5 |
| Refrigerating capacity ratio | % (relative to R410A) | 108.4 | 108.3 | 108.2 | 107.9 | 107.6 | 107.2 | 106.8 | 106.3 |

TABLE 51

| Item | Unit | Ex. 14 | Ex. 15 | Ex. 16 | Ex. 17 | Comp. Ex. 67 | Ex. 18 | Ex. 19 | Ex. 20 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 42.9 | 37.9 | 32.9 | 27.9 | 22.9 | 72.9 | 67.9 | 62.9 |
| R1234yf | Mass % | 5.0 | 5.0 | 5.0 | 5.0 | 5.0 | 10.0 | 10.0 | 10.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 95.0 | 95.4 | 95.9 | 96.4 | 96.9 | 93.0 | 93.3 | 93.6 |
| Refrigerating capacity ratio | % (relative to R410A) | 105.8 | 105.2 | 104.5 | 103.9 | 103.1 | 105.7 | 105.5 | 105.2 |

TABLE 52

| Item | Unit | Ex. 21 | Ex. 22 | Ex. 23 | Ex. 24 | Ex. 25 | Ex. 26 | Ex. 27 | Ex. 28 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 57.9 | 52.9 | 47.9 | 42.9 | 37.9 | 32.9 | 27.9 | 22.9 |
| R1234yf | Mass % | 10.0 | 10.0 | 10.0 | 10.0 | 10.0 | 10.0 | 10.0 | 10.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 93.9 | 94.2 | 94.6 | 95.0 | 95.5 | 96.0 | 96.4 | 96.9 |

TABLE 52-continued

| Item | Unit | Ex. 21 | Ex. 22 | Ex. 23 | Ex. 24 | Ex. 25 | Ex. 26 | Ex. 27 | Ex. 28 |
|---|---|---|---|---|---|---|---|---|---|
| Refrigerating capacity ratio | % (relative to R410A) | 104.9 | 104.5 | 104.1 | 103.6 | 103.0 | 102.4 | 101.7 | 101.0 |

TABLE 53

| Item | Unit | Comp. Ex. 68 | Ex. 29 | Ex. 30 | Ex. 31 | Ex. 32 | Ex. 33 | Ex. 34 | Ex. 35 |
|---|---|---|---|---|---|---|---|---|---|
| HFO-1132(E) | Mass % | 65.0 | 10.0 | 15.0 | 20.0 | 25.0 | 30.0 | 35.0 | 40.0 |
| HFO-1123 | Mass % | 17.9 | 67.9 | 62.9 | 57.9 | 52.9 | 47.9 | 42.9 | 37.9 |
| R1234yf | Mass % | 10.0 | 15.0 | 15.0 | 15.0 | 15.0 | 15.0 | 15.0 | 15.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 97.4 | 93.5 | 93.8 | 94.1 | 94.4 | 94.8 | 95.2 | 95.6 |
| Refrigerating capacity ratio | % (relative to R410A) | 100.3 | 102.9 | 102.7 | 102.5 | 102.1 | 101.7 | 101.2 | 100.7 |

TABLE 54

| Item | Unit | Ex. 36 | Ex. 37 | Ex. 38 | Ex. 39 | Comp. Ex. 69 | Ex. 40 | Ex. 41 | Ex. 42 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 32.9 | 27.9 | 22.9 | 17.9 | 12.9 | 62.9 | 57.9 | 52.9 |
| R1234yf | Mass % | 15.0 | 15.0 | 15.0 | 15.0 | 15.0 | 20.0 | 20.0 | 20.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 96.0 | 96.5 | 97.0 | 97.5 | 98.0 | 94.0 | 94.3 | 94.6 |
| Refrigerating capacity ratio | % (relative to R410A) | 100.1 | 99.5 | 98.9 | 98.1 | 97.4 | 100.1 | 99.9 | 99.6 |

TABLE 55

| Item | Unit | Ex. 43 | Ex. 44 | Ex. 45 | Ex. 46 | Ex. 47 | Ex. 48 | Ex. 49 | Ex. 50 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 47.9 | 42.9 | 37.9 | 32.9 | 27.9 | 22.9 | 17.9 | 12.9 |
| R1234yf | Mass % | 20.0 | 20.0 | 20.0 | 20.0 | 20.0 | 20.0 | 20.0 | 20.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 95.0 | 95.3 | 95.7 | 96.2 | 96.6 | 97.1 | 97.6 | 98.1 |
| Refrigerating capacity ratio | % (relative to R410A) | 99.2 | 98.8 | 98.3 | 97.8 | 97.2 | 96.6 | 95.9 | 95.2 |

TABLE 56

| Item | Unit | Comp. Ex. 70 | Ex. 51 | Ex. 52 | Ex. 53 | Ex. 54 | Ex. 55 | Ex. 56 | Ex. 57 |
|---|---|---|---|---|---|---|---|---|---|
| HFO-1132(E) | Mass % | 65.0 | 10.0 | 15.0 | 20.0 | 25.0 | 30.0 | 35.0 | 40.0 |
| HFO-1123 | Mass % | 7.9 | 57.9 | 52.9 | 47.9 | 42.9 | 37.9 | 32.9 | 27.9 |
| R1234yf | Mass % | 20.0 | 25.0 | 25.0 | 25.0 | 25.0 | 25.0 | 25.0 | 25.0 |
| R32 | Mass % | 7.1 | 7.1 | 7.1 | 7.1 | 7.1 | 7.1 | 7.1 | 7.1 |
| GWP | — | 49 | 50 | 50 | 50 | 50 | 50 | 50 | 50 |
| COP ratio | % (relative to R410A) | 98.6 | 94.6 | 94.9 | 95.2 | 95.5 | 95.9 | 96.3 | 96.8 |
| Refrigerating capacity ratio | % (relative to R410A) | 94.4 | 97.1 | 96.9 | 96.7 | 96.3 | 95.9 | 95.4 | 94.8 |

TABLE 57

| Item | Unit | Ex. 58 | Ex. 59 | Ex. 60 | Ex. 61 | Comp. Ex. 71 | Ex. 62 | Ex. 63 | Ex. 64 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 7.1 | 7.1 | 7.1 | 7.1 | 7.1 | 7.1 | 7.1 | 7.1 |
| R1234yf | Mass % | 25.0 | 25.0 | 25.0 | 25.0 | 25.0 | 30.0 | 30.0 | 30.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 97.2 | 97.7 | 98.2 | 98.7 | 99.2 | 95.2 | 95.5 | 95.8 |
| Refrigerating capacity ratio | % (relative to R410A) | 94.2 | 93.6 | 92.9 | 92.2 | 91.4 | 94.2 | 93.9 | 93.7 |

TABLE 58

| Item | Unit | Ex. 65 | Ex. 66 | Ex. 67 | Ex. 68 | Ex. 69 | Ex. 70 | Ex. 71 | Ex. 72 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 37.9 | 32.9 | 27.9 | 22.9 | 17.9 | 12.9 | 7.9 | 2.9 |
| R1234yf | Mass % | 30.0 | 30.0 | 30.0 | 30.0 | 30.0 | 30.0 | 30.0 | 30.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 96.2 | 96.6 | 97.0 | 97.4 | 97.9 | 98.3 | 98.8 | 99.3 |
| Refrigerating capacity ratio | % (relative to R410A) | 93.3 | 92.9 | 92.4 | 91.8 | 91.2 | 90.5 | 89.8 | 89.1 |

TABLE 59

| Item | Unit | Ex. 73 | Ex. 74 | Ex. 75 | Ex. 76 | Ex. 77 | Ex. 78 | Ex. 79 | Ex. 80 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 47.9 | 42.9 | 37.9 | 32.9 | 27.9 | 22.9 | 17.9 | 12.9 |
| R1234yf | Mass % | 35.0 | 35.0 | 35.0 | 35.0 | 35.0 | 35.0 | 35.0 | 35.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 95.9 | 96.2 | 96.5 | 96.9 | 97.2 | 97.7 | 98.1 | 98.5 |
| Refrigerating capacity ratio | % (relative to R410A) | 91.1 | 90.9 | 90.6 | 90.2 | 89.8 | 89.3 | 88.7 | 88.1 |

TABLE 60

| Item | Unit | Ex. 81 | Ex. 82 | Ex. 83 | Ex. 84 | Ex. 85 | Ex. 86 | Ex. 87 | Ex. 88 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 7.9 | 2.9 | 42.9 | 37.9 | 32.9 | 27.9 | 22.9 | 17.9 |
| R1234yf | Mass % | 35.0 | 35.0 | 40.0 | 40.0 | 40.0 | 40.0 | 40.0 | 40.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 99.0 | 99.4 | 96.6 | 96.9 | 97.2 | 97.6 | 98.0 | 98.4 |
| Refrigerating capacity ratio | % (relative to R410A) | 87.4 | 86.7 | 88.0 | 87.8 | 87.5 | 87.1 | 86.6 | 86.1 |

TABLE 61

| Item | Unit | Comp. Ex. 72 | Comp. Ex. 73 | Comp. Ex. 74 | Comp. Ex. 75 | Comp. Ex. 76 | Comp. Ex. 77 | Comp. Ex. 78 | Comp. Ex. 79 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 12.9 | 7.9 | 2.9 | 37.9 | 32.9 | 27.9 | 22.9 | 17.9 |
| R1234yf | Mass % | 40.0 | 40.0 | 40.0 | 45.0 | 45.0 | 45.0 | 45.0 | 45.0 |
| R32 | Mass % | 7.1 | 7.1 | 7.1 | 7.1 | 7.1 | 7.1 | 7.1 | 7.1 |

TABLE 61-continued

| Item | Unit | Comp. Ex. 72 | Comp. Ex. 73 | Comp. Ex. 74 | Comp. Ex. 75 | Comp. Ex. 76 | Comp. Ex. 77 | Comp. Ex. 78 | Comp. Ex. 79 |
|---|---|---|---|---|---|---|---|---|---|
| GWP | — | 50 | 50 | 50 | 50 | 50 | 50 | 50 | 50 |
| COP ratio | % (relative to R410A) | 98.8 | 99.2 | 99.6 | 97.4 | 97.7 | 98.0 | 98.3 | 98.7 |
| Refrigerating capacity ratio | % (relative to R410A) | 85.5 | 84.9 | 84.2 | 84.9 | 84.6 | 84.3 | 83.9 | 83.5 |

TABLE 62

| Item | Unit | Comp. Ex. 80 | Comp. Ex. 81 | Comp. Ex. 82 |
|---|---|---|---|---|
| HFO-1132(E) | Mass % | 35.0 | 40.0 | 45.0 |
| HFO-1123 | Mass % | 12.9 | 7.9 | 2.9 |
| R1234yf | Mass % | 45.0 | 45.0 | 45.0 |
| R32 | Mass % | 7.1 | 7.1 | 7.1 |
| GWP | — | 50 | 50 | 50 |
| COP ratio | % (relative to R410A) | 99.1 | 99.5 | 99.9 |
| Refrigerating capacity ratio | % (relative to R410A) | 82.9 | 82.3 | 81.7 |

TABLE 63

| Item | Unit | Ex. 89 | Ex. 90 | Ex. 91 | Ex. 92 | Ex. 93 | Ex. 94 | Ex. 95 | Ex. 96 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 70.5 | 65.5 | 60.5 | 55.5 | 50.5 | 45.5 | 40.5 | 35.5 |
| R1234yf | Mass % | 5.0 | 5.0 | 5.0 | 5.0 | 5.0 | 5.0 | 5.0 | 5.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 93.7 | 93.9 | 94.1 | 94.4 | 94.7 | 95.0 | 95.4 | 95.8 |
| Refrigerating capacity ratio | % (relative to R410A) | 110.2 | 110.0 | 109.7 | 109.3 | 108.9 | 108.4 | 107.9 | 107.3 |

TABLE 64

| Item | Unit | Ex. 97 | Comp. Ex. 83 | Ex. 98 | Ex. 99 | Ex. 100 | Ex. 101 | Ex. 102 | Ex. 103 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 30.5 | 25.5 | 65.5 | 60.5 | 55.5 | 50.5 | 45.5 | 40.5 |
| R1234yf | Mass % | 5.0 | 5.0 | 10.0 | 10.0 | 10.0 | 10.0 | 10.0 | 10.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 96.2 | 96.6 | 94.2 | 94.4 | 94.6 | 94.9 | 95.2 | 95.5 |
| Refrigerating capacity ratio | % (relative to R410A) | 106.6 | 106.0 | 107.5 | 107.3 | 107.0 | 106.6 | 106.1 | 105.6 |

TABLE 65

| Item | Unit | Ex. 104 | Ex. 105 | Ex. 106 | Comp. Ex. 84 | Ex. 107 | Ex. 108 | Ex. 109 | Ex. 110 |
|---|---|---|---|---|---|---|---|---|---|
| HFO-1132(E) | Mass % | 40.0 | 45.0 | 50.0 | 55.0 | 10.0 | 15.0 | 20.0 | 25.0 |
| HFO-1123 | Mass % | 35.5 | 30.5 | 25.5 | 20.5 | 60.5 | 55.5 | 50.5 | 45.5 |
| R1234yf | Mass % | 10.0 | 10.0 | 10.0 | 10.0 | 15.0 | 15.0 | 15.0 | 15.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.9 | 96.3 | 96.7 | 97.1 | 94.6 | 94.8 | 95.1 | 95.4 |
| Refrigerating capacity ratio | % (relative to R410A) | 105.1 | 104.5 | 103.8 | 103.1 | 104.7 | 104.5 | 104.1 | 103.7 |

TABLE 66

| Item | Unit | Ex. 111 | Ex. 112 | Ex. 113 | Ex. 114 | Ex. 115 | Comp. Ex. 85 | Ex. 116 | Ex. 117 |
|---|---|---|---|---|---|---|---|---|---|
| HFO-1132(E) | Mass % | 30.0 | 35.0 | 40.0 | 45.0 | 50.0 | 55.0 | 10.0 | 15.0 |
| HFO-1123 | Mass % | 40.5 | 35.5 | 30.5 | 25.5 | 20.5 | 15.5 | 55.5 | 50.5 |
| R1234yf | Mass % | 15.0 | 15.0 | 15.0 | 15.0 | 15.0 | 15.0 | 20.0 | 20.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.7 | 96.0 | 96.4 | 96.8 | 97.2 | 97.6 | 95.1 | 95.3 |
| Refrigerating capacity ratio | % (relative to R410A) | 103.3 | 102.8 | 102.2 | 101.6 | 101.0 | 100.3 | 101.8 | 101.6 |

TABLE 67

| Item | Unit | Ex. 118 | Ex. 119 | Ex. 120 | Ex. 121 | Ex. 122 | Ex. 123 | Ex. 124 | Comp. Ex. 86 |
|---|---|---|---|---|---|---|---|---|---|
| HFO-1132(E) | Mass % | 20.0 | 25.0 | 30.0 | 35.0 | 40.0 | 45.0 | 50.0 | 55.0 |
| HFO-1123 | Mass % | 45.5 | 40.5 | 35.5 | 30.5 | 25.5 | 20.5 | 15.5 | 10.5 |
| R1234yf | Mass % | 20.0 | 20.0 | 20.0 | 20.0 | 20.0 | 20.0 | 20.0 | 20.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.6 | 95.9 | 96.2 | 96.5 | 96.9 | 97.3 | 97.7 | 98.2 |
| Refrigerating capacity ratio | % (relative to R410A) | 101.2 | 100.8 | 100.4 | 99.9 | 99.3 | 98.7 | 98.0 | 97.3 |

TABLE 68

| Item | Unit | Ex. 125 | Ex. 126 | Ex. 127 | Ex. 128 | Ex. 129 | Ex. 130 | Ex. 131 | Ex. 132 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 50.5 | 45.5 | 40.5 | 35.5 | 30.5 | 25.5 | 20.5 | 15.5 |
| R1234yf | Mass % | 25.0 | 25.0 | 25.0 | 25.0 | 25.0 | 25.0 | 25.0 | 25.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.6 | 95.9 | 96.1 | 96.4 | 96.7 | 97.1 | 97.5 | 97.9 |
| Refrigerating capacity ratio | % (relative to R410A) | 98.9 | 98.6 | 98.3 | 97.9 | 97.4 | 96.9 | 96.3 | 95.7 |

TABLE 69

| Item | Unit | Ex. 133 | Comp. Ex. 87 | Ex. 134 | Ex. 135 | Ex. 136 | Ex. 137 | Ex. 138 | Ex. 139 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 10.5 | 5.5 | 45.5 | 40.5 | 35.5 | 30.5 | 25.5 | 20.5 |
| R1234yf | Mass % | 25.0 | 25.0 | 30.0 | 30.0 | 30.0 | 30.0 | 30.0 | 30.0 |
| R32 | Mass % | 14.5 | 14.5 | 14.5 | 14.5 | 14.5 | 14.5 | 14.5 | 14.5 |
| GWP | — | 99 | 99 | 100 | 100 | 100 | 100 | 100 | 100 |
| COP ratio | % (relative to R410A) | 98.3 | 98.7 | 96.2 | 96.4 | 96.7 | 97.0 | 97.3 | 97.7 |
| Refrigerating capacity ratio | % (relative to R410A) | 95.0 | 94.3 | 95.8 | 95.6 | 95.2 | 94.8 | 94.4 | 93.8 |

TABLE 70

| Item | Unit | Ex. 140 | Ex. 141 | Ex. 142 | Ex. 143 | Ex. 144 | Ex. 145 | Ex. 146 | Ex. 147 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 15.5 | 10.5 | 5.5 | 40.5 | 35.5 | 30.5 | 25.5 | 20.5 |

TABLE 70-continued

| Item | Unit | Ex. 140 | Ex. 141 | Ex. 142 | Ex. 143 | Ex. 144 | Ex. 145 | Ex. 146 | Ex. 147 |
|---|---|---|---|---|---|---|---|---|---|
| R1234yf | Mass % | 30.0 | 30.0 | 30.0 | 35.0 | 35.0 | 35.0 | 35.0 | 35.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.1 | 98.5 | 98.9 | 96.8 | 97.0 | 97.3 | 97.6 | 97.9 |
| Refrigerating capacity ratio | % (relative to R410A) | 93.3 | 92.6 | 92.0 | 92.8 | 92.5 | 92.2 | 91.8 | 91.3 |

TABLE 71

| Item | Unit | Ex. 148 | Ex. 149 | Ex. 150 | Ex. 151 | Ex. 152 | Ex. 153 | Ex. 154 | Ex. 155 |
|---|---|---|---|---|---|---|---|---|---|
| HFO-1132(E) | Mass % | 35.0 | 40.0 | 45.0 | 10.0 | 15.0 | 20.0 | 25.0 | 30.0 |
| HFO-1123 | Mass % | 15.5 | 10.5 | 5.5 | 35.5 | 30.5 | 25.5 | 20.5 | 15.5 |
| R1234yf | Mass % | 35.0 | 35.0 | 35.0 | 40.0 | 40.0 | 40.0 | 40.0 | 40.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.3 | 98.7 | 99.1 | 97.4 | 97.7 | 98.0 | 98.3 | 98.6 |
| Refrigerating capacity ratio | % (relative to R410A) | 90.8 | 90.2 | 89.6 | 89.6 | 89.4 | 89.0 | 88.6 | 88.2 |

TABLE 72

| Item | Unit | Ex. 156 | Ex. 157 | Ex. 158 | Ex. 159 | Ex. 160 | Comp. Ex. 88 | Comp. Ex. 89 | Comp. Ex. 90 |
|---|---|---|---|---|---|---|---|---|---|
| HFO-1132(E) | Mass % | 35.0 | 40.0 | 10.0 | 15.0 | 20.0 | 25.0 | 30.0 | 35.0 |
| HFO-1123 | Mass % | 10.5 | 5.5 | 30.5 | 25.5 | 20.5 | 15.5 | 10.5 | 5.5 |
| R1234yf | Mass % | 40.0 | 40.0 | 45.0 | 45.0 | 45.0 | 45.0 | 45.0 | 45.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.9 | 99.3 | 98.1 | 98.4 | 98.7 | 98.9 | 99.3 | 99.6 |
| Refrigerating capacity ratio | % (relative to R410A) | 87.6 | 87.1 | 86.5 | 86.2 | 85.9 | 85.5 | 85.0 | 84.5 |

TABLE 73

| Item | Unit | Comp. Ex. 91 | Comp. Ex. 92 | Comp. Ex. 93 | Comp. Ex. 94 | Comp. Ex. 95 |
|---|---|---|---|---|---|---|
| HFO-1132(E) | Mass % | 10.0 | 15.0 | 20.0 | 25.0 | 30.0 |
| HFO-1123 | Mass % | 25.5 | 20.5 | 15.5 | 10.5 | 5.5 |
| R1234yf | Mass % | 50.0 | 50.0 | 50.0 | 50.0 | 50.0 |
| R32 | Mass % | 14.5 | 14.5 | 14.5 | 14.5 | 14.5 |
| GWP | — | 100 | 100 | 100 | 100 | 100 |
| COP ratio | % (relative to R410A) | 98.9 | 99.1 | 99.4 | 99.7 | 100.0 |
| Refrigerating capacity ratio | % (relative to R410A) | 83.3 | 83.0 | 82.7 | 82.2 | 81.8 |

TABLE 74

| Item | Unit | Ex. 161 | Ex. 162 | Ex. 163 | Ex. 164 | Ex. 165 | Ex. 166 | Ex. 167 | Ex. 168 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 63.1 | 58.1 | 53.1 | 48.1 | 43.1 | 38.1 | 33.1 | 28.1 |

TABLE 74-continued

| Item | Unit | Ex. 161 | Ex. 162 | Ex. 163 | Ex. 164 | Ex. 165 | Ex. 166 | Ex. 167 | Ex. 168 |
|---|---|---|---|---|---|---|---|---|---|
| R1234yf | Mass % | 5.0 | 5.0 | 5.0 | 5.0 | 5.0 | 5.0 | 5.0 | 5.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 94.8 | 95.0 | 95.2 | 95.4 | 95.7 | 95.9 | 96.2 | 96.6 |
| Refrigerating capacity ratio | % (relative to R410A) | 111.5 | 111.2 | 110.9 | 110.5 | 110.0 | 109.5 | 108.9 | 108.3 |

TABLE 75

| Item | Unit | Comp. Ex. 96 | Ex. 169 | Ex. 170 | Ex. 171 | Ex. 172 | Ex. 173 | Ex. 174 | Ex. 175 |
|---|---|---|---|---|---|---|---|---|---|
| HFO-1132(E) | Mass % | 50.0 | 10.0 | 15.0 | 20.0 | 25.0 | 30.0 | 35.0 | 40.0 |
| HFO-1123 | Mass % | 23.1 | 58.1 | 53.1 | 48.1 | 43.1 | 38.1 | 33.1 | 28.1 |
| R1234yf | Mass % | 5.0 | 10.0 | 10.0 | 10.0 | 10.0 | 10.0 | 10.0 | 10.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 96.9 | 95.3 | 95.4 | 95.6 | 95.8 | 96.1 | 96.4 | 96.7 |
| Refrigerating capacity ratio | % (relative to R410A) | 107.7 | 108.7 | 108.5 | 108.1 | 107.7 | 107.2 | 106.7 | 106.1 |

TABLE 76

| Item | Unit | Ex. 176 | Comp. Ex. 97 | Ex. 177 | Ex. 178 | Ex. 179 | Ex. 180 | Ex. 181 | Ex. 182 |
|---|---|---|---|---|---|---|---|---|---|
| HFO-1132(E) | Mass % | 45.0 | 50.0 | 10.0 | 15.0 | 20.0 | 25.0 | 30.0 | 35.0 |
| HFO-1123 | Mass % | 23.1 | 18.1 | 53.1 | 48.1 | 43.1 | 38.1 | 33.1 | 28.1 |
| R1234yf | Mass % | 10.0 | 10.0 | 15.0 | 15.0 | 15.0 | 15.0 | 15.0 | 15.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.0 | 97.4 | 95.7 | 95.9 | 96.1 | 96.3 | 96.6 | 96.9 |
| Refrigerating capacity ratio | % (relative to R410A) | 105.5 | 104.9 | 105.9 | 105.6 | 105.3 | 104.8 | 104.4 | 103.8 |

TABLE 77

| Item | Unit | Ex. 183 | Ex. 184 | Comp. Ex. 98 | Ex. 185 | Ex. 186 | Ex. 187 | Ex. 188 | Ex. 189 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 23.1 | 18.1 | 13.1 | 48.1 | 43.1 | 38.1 | 33.1 | 28.1 |
| R1234yf | Mass % | 15.0 | 15.0 | 15.0 | 20.0 | 20.0 | 20.0 | 20.0 | 20.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.2 | 97.5 | 97.9 | 96.1 | 96.3 | 96.5 | 96.8 | 97.1 |
| Refrigerating capacity ratio | % (relative to R410A) | 103.3 | 102.6 | 102.0 | 103.0 | 102.7 | 102.3 | 101.9 | 101.4 |

TABLE 78

| Item | Unit | Ex. 190 | Ex. 191 | Ex. 192 | Comp. Ex. 99 | Ex. 193 | Ex. 194 | Ex. 195 | Ex. 196 |
|---|---|---|---|---|---|---|---|---|---|
| HFO-1132(E) | Mass % | 35.0 | 40.0 | 45.0 | 50.0 | 10.0 | 15.0 | 20.0 | 25.0 |
| HFO-1123 | Mass % | 23.1 | 18.1 | 13.1 | 8.1 | 43.1 | 38.1 | 33.1 | 28.1 |

TABLE 78-continued

| Item | Unit | Ex. 190 | Ex. 191 | Ex. 192 | Comp. Ex. 99 | Ex. 193 | Ex. 194 | Ex. 195 | Ex. 196 |
|---|---|---|---|---|---|---|---|---|---|
| R1234yf | Mass % | 20.0 | 20.0 | 20.0 | 20.0 | 25.0 | 25.0 | 25.0 | 25.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.4 | 97.7 | 98.0 | 98.4 | 96.6 | 96.8 | 97.0 | 97.3 |
| Refrigerating capacity ratio | % (relative to R410A) | 100.9 | 100.3 | 99.7 | 99.1 | 100.0 | 99.7 | 99.4 | 98.9 |

TABLE 79

| Item | Unit | Ex. 197 | Ex. 198 | Ex. 199 | Ex. 200 | Comp. Ex. 100 | Ex. 201 | Ex. 202 | Ex. 203 |
|---|---|---|---|---|---|---|---|---|---|
| HFO-1132(E) | Mass % | 30.0 | 35.0 | 40.0 | 45.0 | 50.0 | 10.0 | 15.0 | 20.0 |
| HFO-1123 | Mass % | 23.1 | 18.1 | 13.1 | 8.1 | 3.1 | 38.1 | 33.1 | 28.1 |
| R1234yf | Mass % | 25.0 | 25.0 | 25.0 | 25.0 | 25.0 | 30.0 | 30.0 | 30.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 150 | 150 | 150 |
| COP ratio | % (relative to R410A) | 97.6 | 97.9 | 98.2 | 98.5 | 98.9 | 97.1 | 97.3 | 97.6 |
| Refrigerating capacity ratio | % (relative to R410A) | 98.5 | 97.9 | 97.4 | 96.8 | 96.1 | 97.0 | 96.7 | 96.3 |

TABLE 80

| Item | Unit | Ex. 204 | Ex. 205 | Ex. 206 | Ex. 207 | Ex. 208 | Ex. 209 | Ex. 210 | Ex. 211 |
|---|---|---|---|---|---|---|---|---|---|
| HFO-1132(E) | Mass % | 25.0 | 30.0 | 35.0 | 40.0 | 45.0 | 10.0 | 15.0 | 20.0 |
| HFO-1123 | Mass % | 23.1 | 18.1 | 13.1 | 8.1 | 3.1 | 33.1 | 28.1 | 23.1 |
| R1234yf | Mass % | 30.0 | 30.0 | 30.0 | 30.0 | 30.0 | 35.0 | 35.0 | 35.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 97.8 | 98.1 | 98.4 | 98.7 | 99.1 | 97.7 | 97.9 | 98.1 |
| Refrigerating capacity ratio | % (relative to R410A) | 95.9 | 95.4 | 94.9 | 94.4 | 93.8 | 93.9 | 93.6 | 93.3 |

TABLE 81

| Item | Unit | Ex. 212 | Ex. 213 | Ex. 214 | Ex. 215 | Ex. 216 | Ex. 217 | Ex. 218 | Ex. 219 |
|---|---|---|---|---|---|---|---|---|---|
| HFO-1132(E) | Mass % | 25.0 | 30.0 | 35.0 | 40.0 | 10.0 | 15.0 | 20.0 | 25.0 |
| HFO-1123 | Mass % | 18.1 | 13.1 | 8.1 | 3.1 | 28.1 | 23.1 | 18.1 | 13.1 |
| R1234yf | Mass % | 35.0 | 35.0 | 35.0 | 35.0 | 40.0 | 40.0 | 40.0 | 40.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 98.4 | 98.7 | 99.0 | 99.3 | 98.3 | 98.5 | 98.7 | 99.0 |
| Refrigerating capacity ratio | % (relative to R410A) | 92.9 | 92.4 | 91.9 | 91.3 | 90.8 | 90.5 | 90.2 | 89.7 |

TABLE 82

| Item | Unit | Ex. 220 | Ex. 221 | Ex. 222 | Ex. 223 | Ex. 224 | Ex. 225 | Ex. 226 | Comp. Ex. 101 |
|---|---|---|---|---|---|---|---|---|---|
| HFO-1132(E) | Mass % | 30.0 | 35.0 | 10.0 | 15.0 | 20.0 | 25.0 | 30.0 | 10.0 |
| HFO-1123 | Mass % | 8.1 | 3.1 | 23.1 | 18.1 | 13.1 | 8.1 | 3.1 | 18.1 |

TABLE 82-continued

| Item | Unit | Ex. 220 | Ex. 221 | Ex. 222 | Ex. 223 | Ex. 224 | Ex. 225 | Ex. 226 | Comp. Ex. 101 |
|---|---|---|---|---|---|---|---|---|---|
| R1234yf | Mass % | 40.0 | 40.0 | 45.0 | 45.0 | 45.0 | 45.0 | 45.0 | 50.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 99.3 | 99.6 | 98.9 | 99.1 | 99.3 | 99.6 | 99.9 | 99.6 |
| Refrigerating capacity ratio | % (relative to R410A) | 89.3 | 88.8 | 87.6 | 87.3 | 87.0 | 86.6 | 86.2 | 84.4 |

TABLE 83

| Item | Unit | Comp. Ex. 102 | Comp. Ex. 103 | Comp. Ex. 104 |
|---|---|---|---|---|
| HFO-1132(E) | Mass % | 15.0 | 20.0 | 25.0 |
| HFO-1123 | Mass % | 13.1 | 8.1 | 3.1 |
| R1234yf | Mass % | 50.0 | 50.0 | 50.0 |
| R32 | Mass % | 21.9 | 21.9 | 21.9 |
| GWP | — | 150 | 150 | 150 |
| COP ratio | % (relative to R410A) | 99.8 | 100.0 | 100.2 |
| Refrigerating capacity ratio | % (relative to R410A) | 84.1 | 83.8 | 83.4 |

TABLE 84

| Item | Unit | Ex. 227 | Ex. 228 | Ex. 229 | Ex. 230 | Ex. 231 | Ex. 232 | Ex. 233 | Comp. Ex. 105 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 55.7 | 50.7 | 45.7 | 40.7 | 35.7 | 30.7 | 25.7 | 20.7 |
| R1234yf | Mass % | 5.0 | 5.0 | 5.0 | 5.0 | 5.0 | 5.0 | 5.0 | 5.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 95.9 | 96.0 | 96.2 | 96.3 | 96.6 | 96.8 | 97.1 | 97.3 |
| Refrigerating capacity ratio | % (relative to R410A) | 112.2 | 111.9 | 111.6 | 111.2 | 110.7 | 110.2 | 109.6 | 109.0 |

TABLE 85

| Item | Unit | Ex. 234 | Ex. 235 | Ex. 236 | Ex. 237 | Ex. 238 | Ex. 239 | Ex. 240 | Comp. Ex. 106 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 50.7 | 45.7 | 40.7 | 35.7 | 30.7 | 25.7 | 20.7 | 15.7 |
| R1234yf | Mass % | 10.0 | 10.0 | 10.0 | 10.0 | 10.0 | 10.0 | 10.0 | 10.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 96.3 | 96.4 | 96.6 | 96.8 | 97.0 | 97.2 | 97.5 | 97.8 |
| Refrigerating capacity ratio | % (relative to R410A) | 109.4 | 109.2 | 108.8 | 108.4 | 107.9 | 107.4 | 106.8 | 106.2 |

TABLE 86

| Item | Unit | Ex. 241 | Ex. 242 | Ex. 243 | Ex. 244 | Ex. 245 | Ex. 246 | Ex. 247 | Comp. Ex. 107 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 45.7 | 40.7 | 35.7 | 30.7 | 25.7 | 20.7 | 15.7 | 10.7 |
| R1234yf | Mass % | 15.0 | 15.0 | 15.0 | 15.0 | 15.0 | 15.0 | 15.0 | 15.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 96.7 | 96.8 | 97.0 | 97.2 | 97.4 | 97.7 | 97.9 | 98.2 |
| Refrigerating capacity ratio | % (relative to R410A) | 106.6 | 106.3 | 106.0 | 105.5 | 105.1 | 104.5 | 104.0 | 103.4 |

TABLE 87

| Item | Unit | Ex. 248 | Ex. 249 | Ex. 250 | Ex. 251 | Ex. 252 | Ex. 253 | Ex. 254 | Comp. Ex. 108 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 40.7 | 35.7 | 30.7 | 25.7 | 20.7 | 15.7 | 10.7 | 5.7 |
| R1234yf | Mass % | 20.0 | 20.0 | 20.0 | 20.0 | 20.0 | 20.0 | 20.0 | 20.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 97.1 | 97.3 | 97.5 | 97.7 | 97.9 | 98.1 | 98.4 | 98.7 |
| Refrigerating capacity ratio | % (relative to R410A) | 103.7 | 103.4 | 103.0 | 102.6 | 102.2 | 101.6 | 101.1 | 100.5 |

TABLE 88

| Item | Unit | Ex. 255 | Ex. 256 | Ex. 257 | Ex. 258 | Ex. 259 | Ex. 260 | Ex. 261 | Ex. 262 |
|---|---|---|---|---|---|---|---|---|---|
| HFO-1132(E) | Mass % | 10.0 | 15.0 | 20.0 | 25.0 | 30.0 | 35.0 | 40.0 | 10.0 |
| HFO-1123 | Mass % | 35.7 | 30.7 | 25.7 | 20.7 | 15.7 | 10.7 | 5.7 | 30.7 |
| R1234yf | Mass % | 25.0 | 25.0 | 25.0 | 25.0 | 25.0 | 25.0 | 25.0 | 30.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 97.6 | 97.7 | 97.9 | 98.1 | 98.4 | 98.6 | 98.9 | 98.1 |
| Refrigerating capacity ratio | % (relative to R410A) | 100.7 | 100.4 | 100.1 | 99.7 | 99.2 | 98.7 | 98.2 | 97.7 |

TABLE 89

| Item | Unit | Ex. 263 | Ex. 264 | Ex. 265 | Ex. 266 | Ex. 267 | Ex. 268 | Ex. 269 | Ex. 270 |
|---|---|---|---|---|---|---|---|---|---|
| HFO-1132(E) | Mass % | 15.0 | 20.0 | 25.0 | 30.0 | 35.0 | 10.0 | 15.0 | 20.0 |
| HFO-1123 | Mass % | 25.7 | 20.7 | 15.7 | 10.7 | 5.7 | 25.7 | 20.7 | 15.7 |
| R1234yf | Mass % | 30.0 | 30.0 | 30.0 | 30.0 | 30.0 | 35.0 | 35.0 | 35.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 200 | 200 | 200 |
| COP ratio | % (relative to R410A) | 98.2 | 98.4 | 98.6 | 98.9 | 99.1 | 98.6 | 98.7 | 98.9 |
| Refrigerating capacity ratio | % (relative to R410A) | 97.4 | 97.1 | 96.7 | 96.2 | 95.7 | 94.7 | 94.4 | 94.0 |

TABLE 90

| Item | Unit | Ex. 271 | Ex. 272 | Ex. 273 | Ex. 274 | Ex. 275 | Ex. 276 | Ex. 277 | Ex. 278 |
|---|---|---|---|---|---|---|---|---|---|
| HFO-1132(E) | Mass % | 25.0 | 30.0 | 10.0 | 15.0 | 20.0 | 25.0 | 10.0 | 15.0 |
| HFO-1123 | Mass % | 10.7 | 5.7 | 20.7 | 15.7 | 10.7 | 5.7 | 15.7 | 10.7 |
| R1234yf | Mass % | 35.0 | 35.0 | 40.0 | 40.0 | 40.0 | 40.0 | 45.0 | 45.0 |
| R32 | Mass % | 29.3 | 29.3 | 29.3 | 29.3 | 29.3 | 29.3 | 29.3 | 29.3 |
| GWP | — | 200 | 200 | 200 | 200 | 200 | 200 | 200 | 200 |
| COP ratio | % (relative to R410A) | 99.2 | 99.4 | 99.1 | 99.3 | 99.5 | 99.7 | 99.7 | 99.8 |
| Refrigerating capacity ratio | % (relative to R410A) | 93.6 | 93.2 | 91.5 | 91.3 | 90.9 | 90.6 | 88.4 | 88.1 |

TABLE 91

| Item | Unit | Ex. 279 | Ex. 280 | Comp. Ex. 109 | Comp. Ex. 110 |
|---|---|---|---|---|---|
| HFO-1132(E) | Mass % | 20.0 | 10.0 | 15.0 | 10.0 |
| HFO-1123 | Mass % | 5.7 | 10.7 | 5.7 | 5.7 |
| R1234yf | Mass % | 45.0 | 50.0 | 50.0 | 55.0 |
| R32 | Mass % | 29.3 | 29.3 | 29.3 | 29.3 |
| GWP | — | 200 | 200 | 200 | 200 |
| COP ratio | % (relative to R410A) | 100.0 | 100.3 | 100.4 | 100.9 |
| Refrigerating capacity ratio | % (relative to R410A) | 87.8 | 85.2 | 85.0 | 82.0 |

TABLE 92

| Item | Unit | Ex. 281 | Ex. 282 | Ex. 283 | Ex. 284 | Ex. 285 | Comp. Ex. 111 | Ex. 286 | Ex. 287 |
|---|---|---|---|---|---|---|---|---|---|
| HFO-1132(E) | Mass % | 10.0 | 15.0 | 20.0 | 25.0 | 30.0 | 35.0 | 10.0 | 15.0 |
| HFO-1123 | Mass % | 40.9 | 35.9 | 30.9 | 25.9 | 20.9 | 15.9 | 35.9 | 30.9 |
| R1234yf | Mass % | 5.0 | 5.0 | 5.0 | 5.0 | 5.0 | 5.0 | 10.0 | 10.0 |
| R32 | Mass % | 44.1 | 44.1 | 44.1 | 44.1 | 44.1 | 44.1 | 44.1 | 44.1 |
| GWP | — | 298 | 298 | 298 | 298 | 298 | 298 | 299 | 299 |
| COP ratio | % (relative to R410A) | 97.8 | 97.9 | 97.9 | 98.1 | 98.2 | 98.4 | 98.2 | 98.2 |
| Refrigerating capacity ratio | % (relative to R410A) | 112.5 | 112.3 | 111.9 | 111.6 | 111.2 | 110.7 | 109.8 | 109.5 |

TABLE 93

| Item | Unit | Ex. 288 | Ex. 289 | Ex. 290 | Comp. Ex. 112 | Ex. 291 | Ex. 292 | Ex. 293 | Ex. 294 |
|---|---|---|---|---|---|---|---|---|---|
| HFO-1132(E) | Mass % | 20.0 | 25.0 | 30.0 | 35.0 | 10.0 | 15.0 | 20.0 | 25.0 |
| HFO-1123 | Mass % | 25.9 | 20.9 | 15.9 | 10.9 | 30.9 | 25.9 | 20.9 | 15.9 |
| R1234yf | Mass % | 10.0 | 10.0 | 10.0 | 10.0 | 15.0 | 15.0 | 15.0 | 15.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 98.3 | 98.5 | 98.6 | 98.8 | 98.6 | 98.6 | 98.7 | 98.9 |
| Refrigerating capacity ratio | % (relative to R410A) | 109.2 | 108.8 | 108.4 | 108.0 | 107.0 | 106.7 | 106.4 | 106.0 |

TABLE 94

| Item | Unit | Ex. 295 | Comp. Ex. 113 | Ex. 296 | Ex. 297 | Ex. 298 | Ex. 299 | Ex. 300 | Ex. 301 |
|---|---|---|---|---|---|---|---|---|---|
| HFO-1132(E) | Mass % | 30.0 | 35.0 | 10.0 | 15.0 | 20.0 | 25.0 | 30.0 | 10.0 |
| HFO-1123 | Mass % | 10.9 | 5.9 | 25.9 | 20.9 | 15.9 | 10.9 | 5.9 | 20.9 |
| R1234yf | Mass % | 15.0 | 15.0 | 20.0 | 20.0 | 20.0 | 20.0 | 20.0 | 25.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 99.0 | 99.2 | 99.0 | 99.0 | 99.2 | 99.3 | 99.4 | 99.4 |
| Refrigerating capacity ratio | % (relative to R410A) | 105.6 | 105.2 | 104.1 | 103.9 | 103.6 | 103.2 | 102.8 | 101.2 |

TABLE 95

| Item | Unit | Ex. 302 | Ex. 303 | Ex. 304 | Ex. 305 | Ex. 306 | Ex. 307 | Ex. 308 | Ex. 309 |
|---|---|---|---|---|---|---|---|---|---|
| HFO-1132(E) | Mass % | 15.0 | 20.0 | 25.0 | 10.0 | 15.0 | 20.0 | 10.0 | 15.0 |
| HFO-1123 | Mass % | 15.9 | 10.9 | 5.9 | 15.9 | 10.9 | 5.9 | 10.9 | 5.9 |
| R1234yf | Mass % | 25.0 | 25.0 | 25.0 | 30.0 | 30.0 | 30.0 | 35.0 | 35.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 99.5 | 99.6 | 99.7 | 99.8 | 99.9 | 100.0 | 100.3 | 100.4 |
| Refrigerating capacity ratio | % (relative to R410A) | 101.0 | 100.7 | 100.3 | 98.3 | 98.0 | 97.8 | 95.3 | 95.1 |

TABLE 96

| Item | Unit | Ex. 400 |
|---|---|---|
| HFO-1132(E) | Mass % | 10.0 |
| HFO-1123 | Mass % | 5.9 |
| R1234yf | Mass % | 40.0 |
| R32 | Mass % | 44.1 |
| GWP | — | 299 |
| COP ratio | % (relative to R410A) | 100.7 |
| Refrigerating capacity ratio | % (relative to R410A) | 92.3 |

The above results indicate that the refrigerating capacity ratio relative to R410A is 85% or more in the following cases:

When the mass % of HFO-1132(E), HFO-1123, R1234yf, and R32 based on their sum is respectively represented by x, y, z, and a, in a ternary composition diagram in which the sum of HFO-1132(E), HFO-1123, and R1234yf is (100−a) mass %, a straight line connecting a point (0.0, 100.0−a, 0.0) and a point (0.0, 0.0, 100.0−a) is the base, and the point (0.0, 100.0−a, 0.0) is on the left side, if 0<a≤11.1, coordinates (x,y,z) in the ternary composition diagram are on, or on the left side of, a straight line AB that connects point A (0.0134a²−1.9681a+68.6, 0.0, −0.0134a²+0.9681a+31.4) and point B (0.0, 0.0144a²−1.6377a+58.7, −0.0144a²+0.6377a+41.3);

if 11.1<a≤18.2, coordinates (x,y,z) in the ternary composition diagram are on, or on the left side of, a straight line AB that connects point A (0.0112a²−1.9337a+68.484, 0.0, −0.0112a²+0.9337a+31.516) and point B (0.0, 0.0075a²−1.5156a+58.199, −0.0075a²+0.5156a+41.801);

if 18.2a<a≤26.7, coordinates (x,y,z) in the ternary composition diagram are on, or on the left side of, a straight line AB that connects point A (0.0107a²−1.9142a+68.305, 0.0, −0.0107a²+0.9142a+31.695) and point B(0.0, 0.009a²−1.6045a+59.318, −0.009a²+0.6045a+40.682);

if 26.7<a≤36.7, coordinates (x,y,z) in the ternary composition diagram are on, or on the left side of, a straight line AB that connects point A (0.0103a²−1.9225a+68.793, 0.0, −0.0103a²+0.9225a+31.207) and point B (0.0, 0.0046a²−1.41a+57.286, −0.0046a²+0.41a+42.714); and if 36.7<a≤46.7, coordinates (x,y,z) in the ternary composition diagram are on, or on the left side of, a straight line AB that connects point A (0.0085a²−1.8102a+67.1, 0.0, −0.0085a²+0.8102a+32.9) and point B (0.0, 0.0012a²−1.1659a+52.95, −0.0012a²+0.1659a+47.05).

Figure 3:
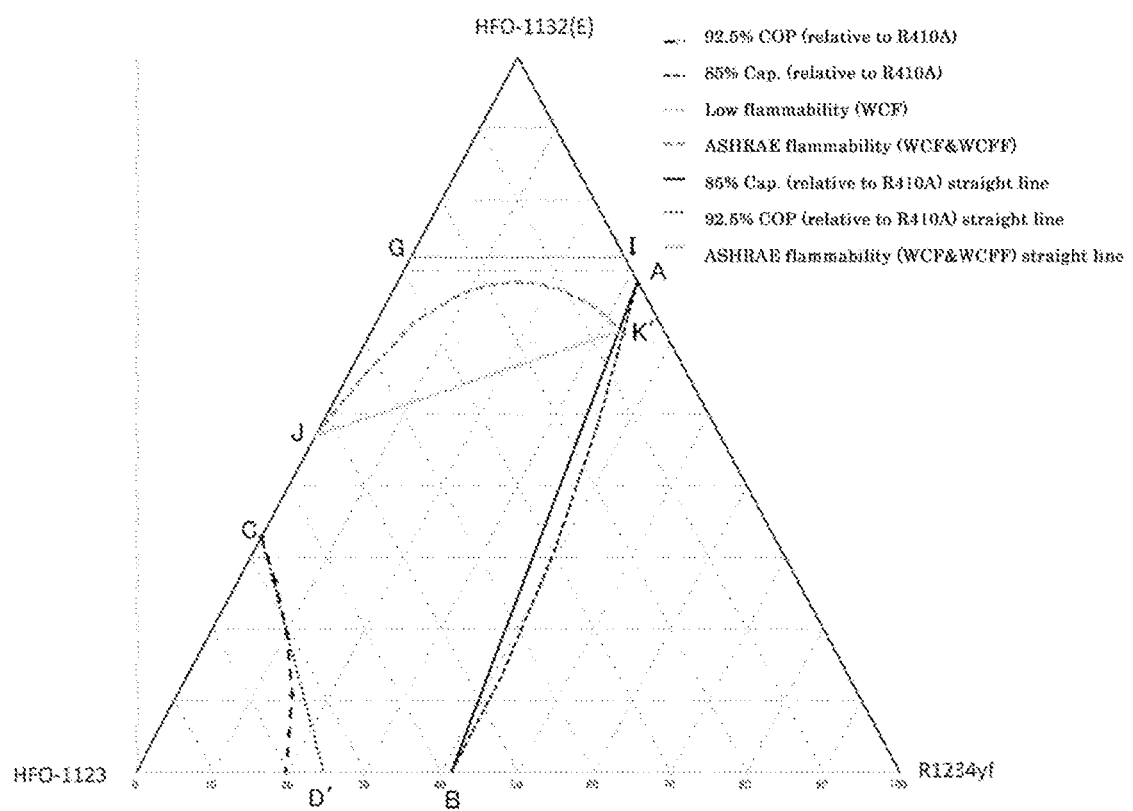
FIG. 3 is a diagram showing points A to C, D', G, I, J, and K', and line segments that connect these points to each other in a ternary composition diagram in which the sum of HFO-1132(E), HFO-1123, and R1234yf is (100−a) mass %.

Actual points having a refrigerating capacity ratio of 85% or more form a curved line that connects point A and point B in FIG. 3, and that extends toward the 1234yf side. Accordingly, when coordinates are on, or on the left side of, the straight line AB, the refrigerating capacity ratio relative to R410A is 85% or more.

Similarly, it was also found that in the ternary composition diagram, if 0<a≤11.1, when coordinates (x,y,z) are on, or on the left side of, a straight line D'C that connects point D' (0.0, 0.0224a²+0.968a+75.4, −0.0224a²−1.968a+24.6) and point C (−0.2304a²−0.4062a+32.9, 0.2304a²−0.5938a+67.1, 0.0); or if 11.1<a≤46.7, when coordinates are in the entire region, the COP ratio relative to that of R410A is 92.5% or more.

Figure 4:
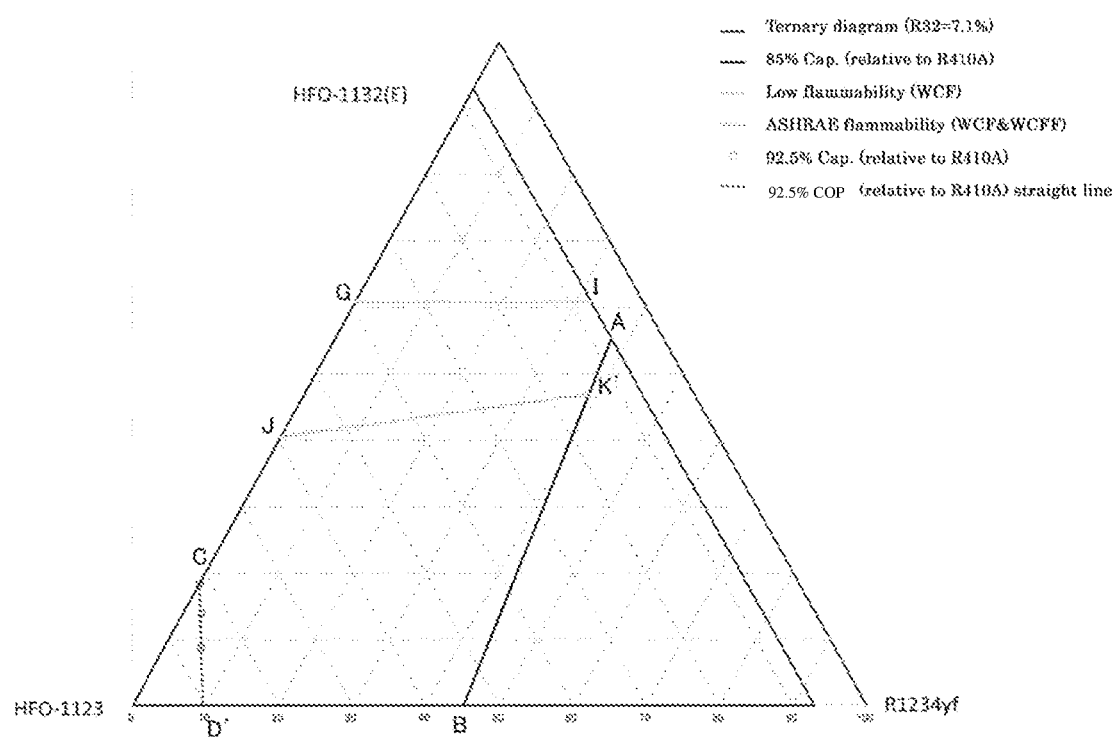
FIG. 4 is a diagram showing points A to C, D', G, I, J, and K', and line segments that connect these points to each other in a ternary composition diagram in which the sum of HFO-1132(E), HFO-1123, and R1234yf is 92.9 mass % (the content of R32 is 7.1 mass %).
Figure 5:
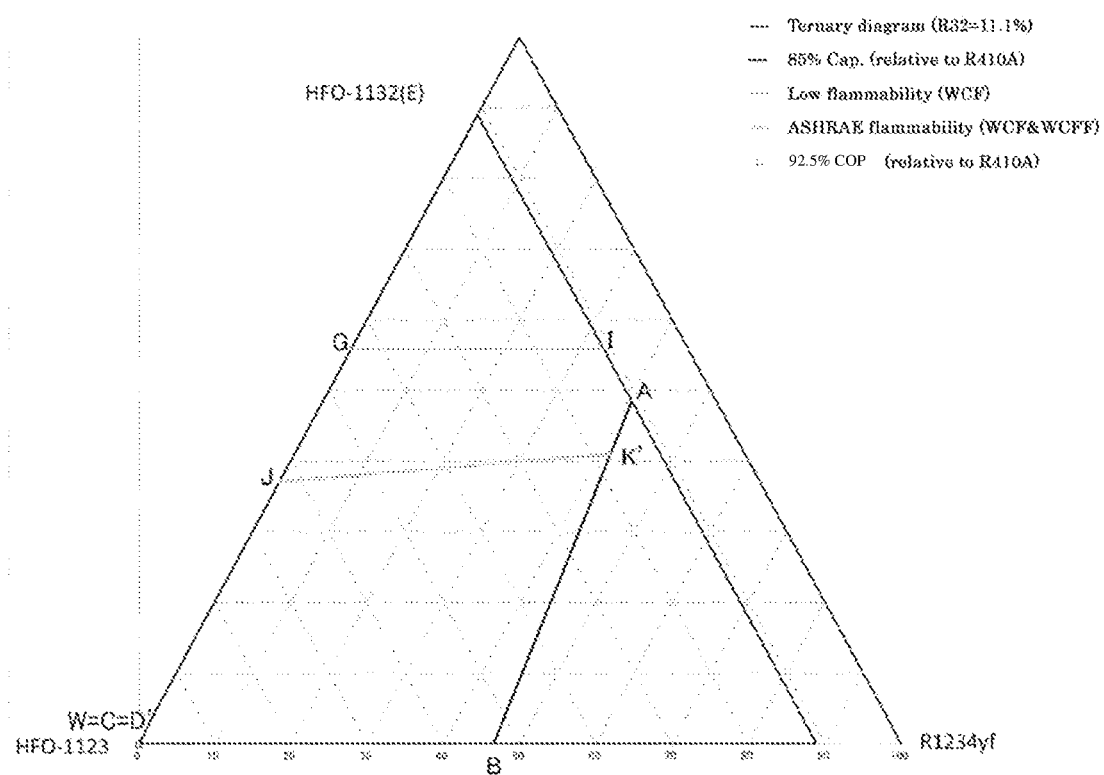
FIG. 5 is a diagram showing points A to C, D', G, I, J, K', and W, and line segments that connect these points to each other in a ternary composition diagram in which the sum of HFO-1132(E), HFO-1123, and R1234yf is 88.9 mass % (the content of R32 is 11.1 mass %).
Figure 6:
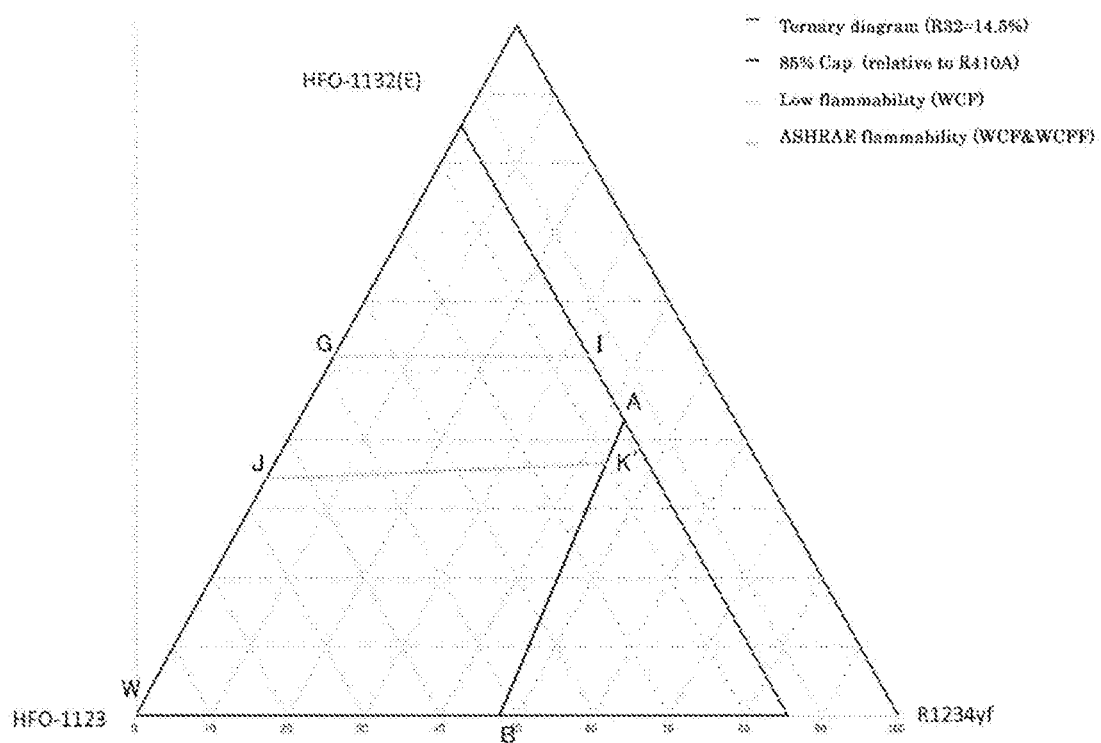
FIG. 6 is a diagram showing points A, B, G, I, J, K', and W, and line segments that connect these points to each other in a ternary composition diagram in which the sum of HFO-1132(E), HFO-1123, and R1234yf is 85.5 mass % (the content of R32 is 14.5 mass %).
Figure 7:
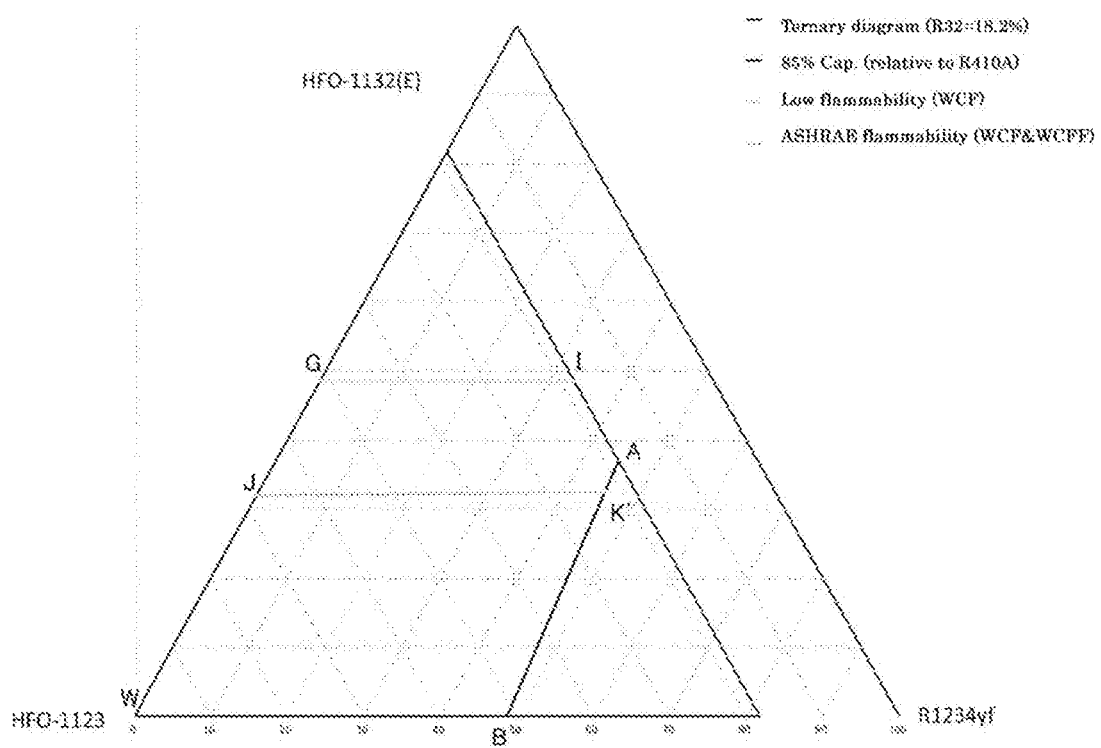
FIG. 7 is a diagram showing points A, B, G, I, J, K', and W, and line segments that connect these points to each other in a ternary composition diagram in which the sum of HFO-1132(E), HFO-1123, and R1234yf is 81.8 mass % (the content of R32 is 18.2 mass %).
Figure 8:
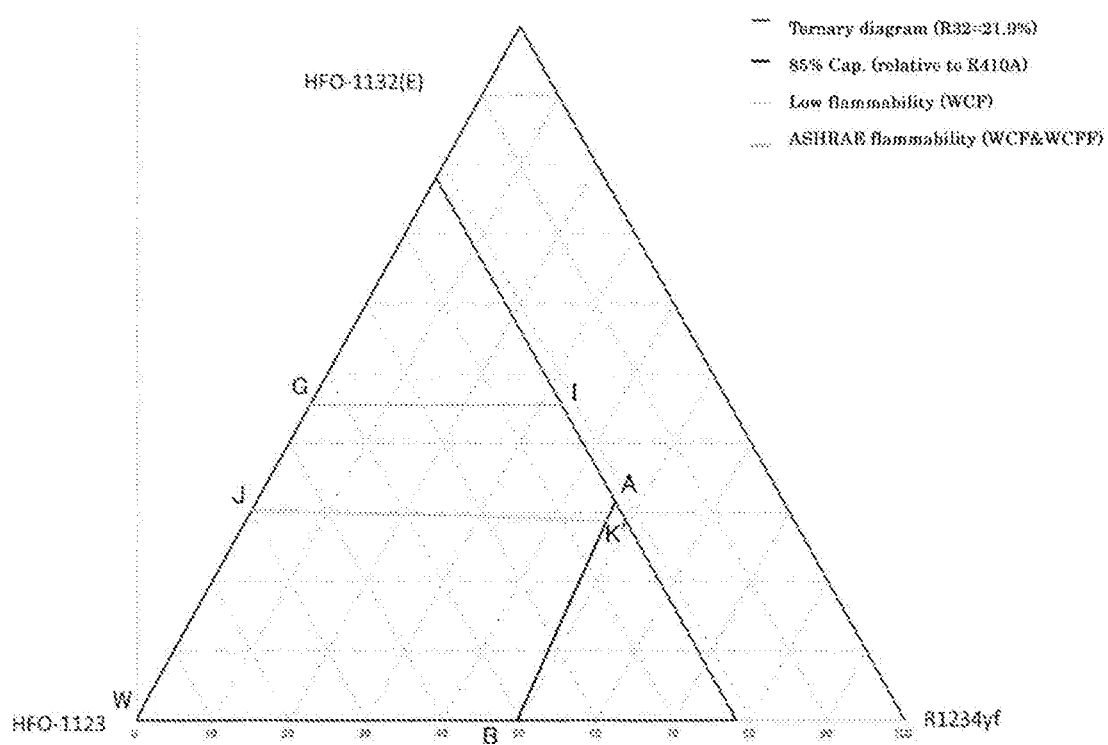
FIG. 8 is a diagram showing points A, B, G, I, J, K', and W, and line segments that connect these points to each other in a ternary composition diagram in which the sum of HFO-1132(E), HFO-1123, and R1234yf is 78.1 mass % (the content of R32 is 21.9 mass %).
Figure 9:
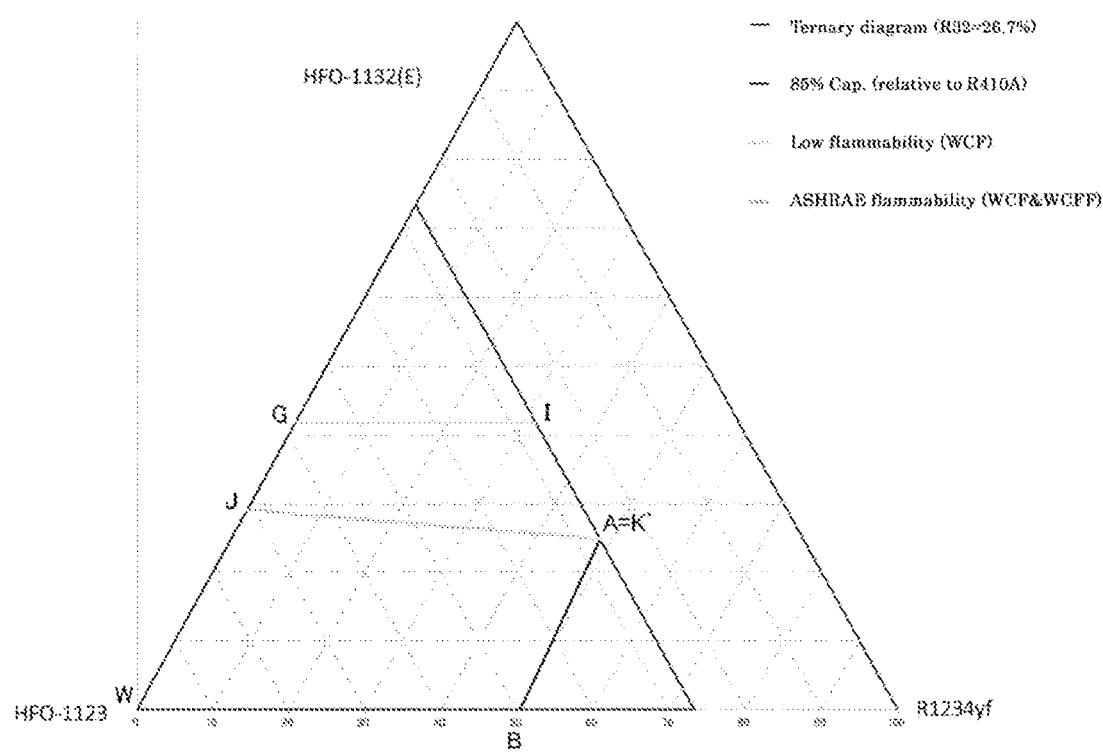
FIG. 9 is a diagram showing points A, B, G, I, J, K', and W, and line segments that connect these points to each other in a ternary composition diagram in which the sum of HFO-1132(E), HFO-1123, and R1234yf is 73.3 mass % (the content of R32 is 26.7 mass %).
Figure 10:
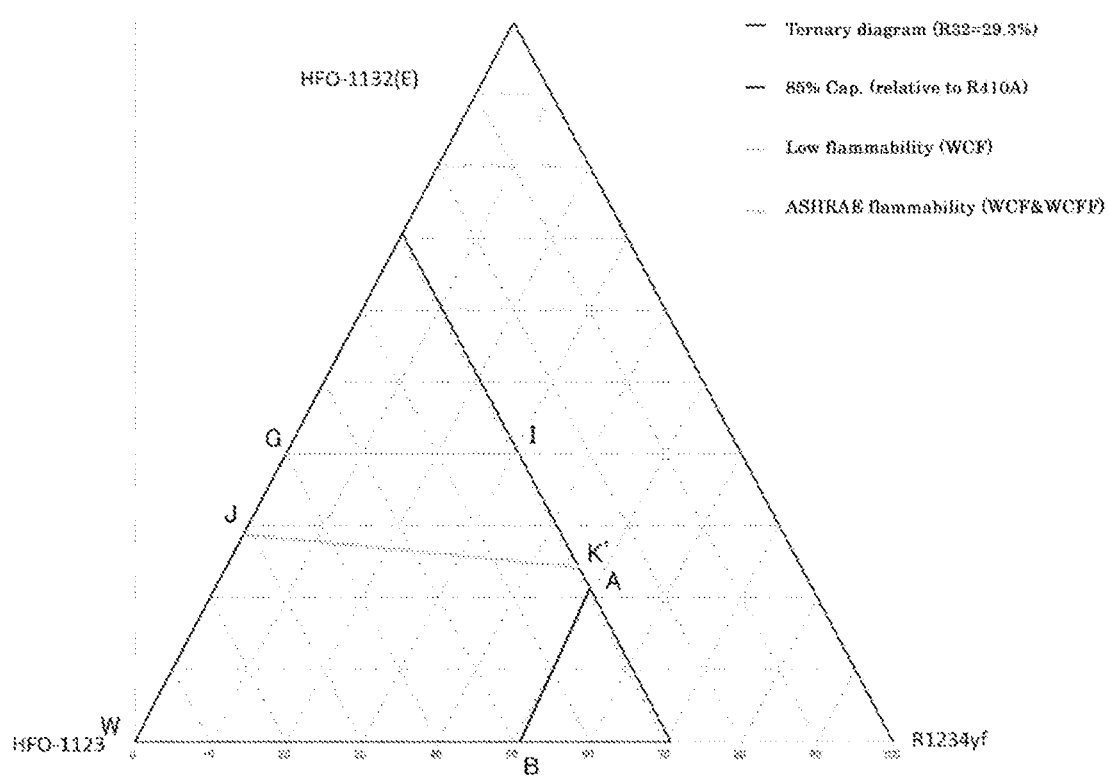
FIG. 10 is a diagram showing points A, B, G, I, J, K', and W, and line segments that connect these points to each other in a ternary composition diagram in which the sum of HFO-1132(E), HFO-1123, and R1234yf is 70.7 mass % (the content of R32 is 29.3 mass %).
Figure 11:
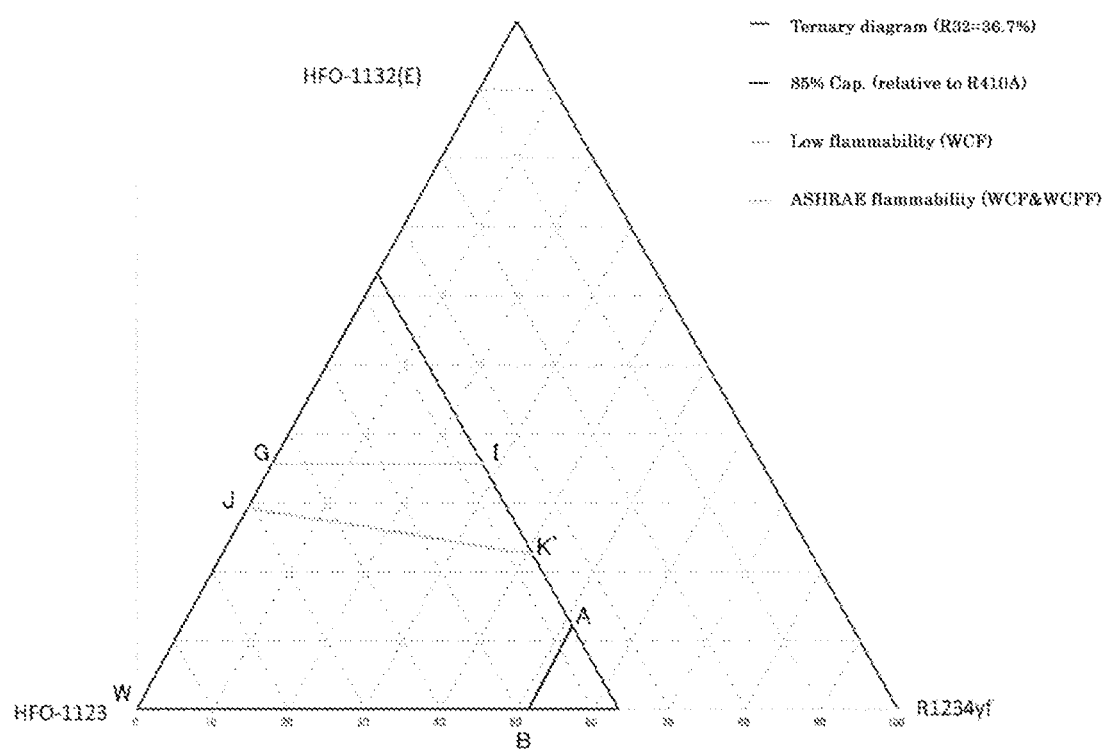
FIG. 11 is a diagram showing points A, B, G, I, J, K', and W, and line segments that connect these points to each other in a ternary composition diagram in which the sum of HFO-1132(E), HFO-1123, and R1234yf is 63.3 mass % (the content of R32 is 36.7 mass %).
Figure 12:
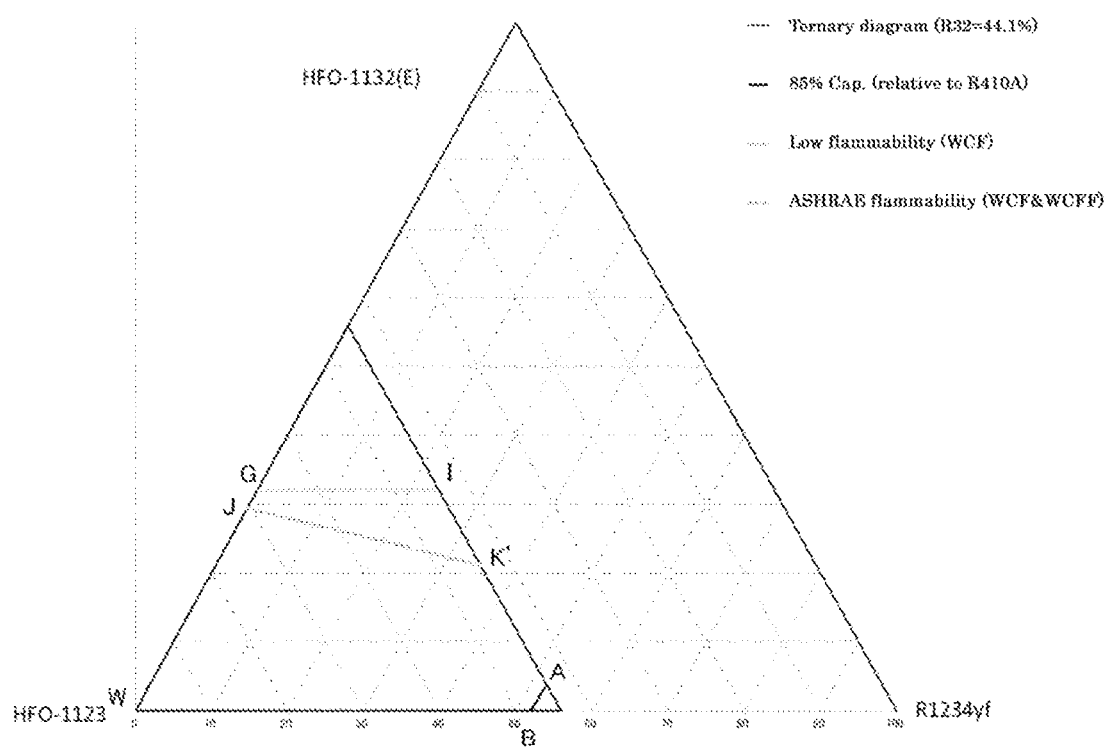
FIG. 12 is a diagram showing points A, B, G, I, J, K', and W, and line segments that connect these points to each other in a ternary composition diagram in which the sum of HFO-1132(E), HFO-1123, and R1234yf is 55.9 mass % (the content of R32 is 44.1 mass %).
Figure 13:
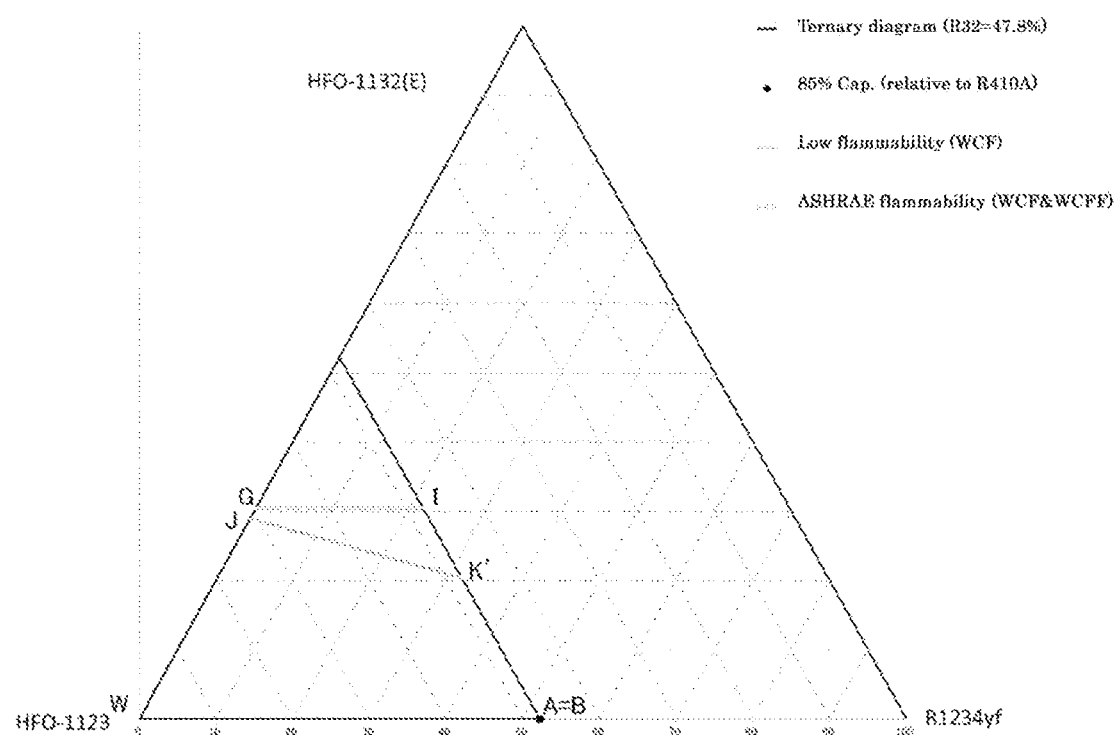
FIG. 13 is a diagram showing points A, B, G, I, J, K', and W, and line segments that connect these points to each other in a ternary composition diagram in which the sum of HFO-1132(E), HFO-1123, and R1234yf is 52.2 mass % (the content of R32 is 47.8 mass %).

In FIG. 3, the COP ratio of 92.5% or more forms a curved line CD. In FIG. 3, an approximate line formed by connecting three points: point C (32.9, 67.1, 0.0) and points (26.6, 68.4, 5) (19.5, 70.5, 10) where the COP ratio is 92.5% when the concentration of R1234yf is 5 mass % and 10 mass was obtained, and a straight line that connects point C and point D' (0, 75.4, 24.6), which is the intersection of the approximate line and a point where the concentration of HFO-1132 (E) is 0.0 mass % was defined as a line segment D'C. In FIG. 4, point D'(0, 83.4, 9.5) was similarly obtained from an approximate curve formed by connecting point C (18.4, 74.5, 0) and points (13.9, 76.5, 2.5) (8.7, 79.2, 5) where the COP ratio is 92.5%, and a straight line that connects point C and point D' was defined as the straight line D'C.

The composition of each mixture was defined as WCF. A leak simulation was performed using NIST Standard Reference Database REFLEAK Version 4.0 under the conditions of Equipment, Storage, Shipping, Leak, and Recharge according to the ASHRAE Standard 34-2013. The most flammable fraction was defined as WCFF.

For the flammability, the burning velocity was measured according to the ANSI/ASHRAE Standard 34-2013. Both WCF and WCFF having a burning velocity of 10 cm/s or less were determined to be classified as "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

The results are shown in Tables 97 to 104.

TABLE 97

| | Item | | Comp. Ex. 6 | Comp. Ex. 13 | Comp. Ex. 19 | Comp. Ex. 24 | Comp. Ex. 29 | Comp. Ex. 34 |
|---|---|---|---|---|---|---|---|---|
| WCF | HFO-1132(E) | Mass % | 72.0 | 60.9 | 55.8 | 52.1 | 48.6 | 45.4 |
| | HFO-1123 | Mass % | 28.0 | 32.0 | 33.1 | 33.4 | 33.2 | 32.7 |
| | R1234yf | Mass % | 0.0 | 0.0 | 0.0 | 0 | 0 | 0 |
| | R32 | Mass % | 0.0 | 7.1 | 11.1 | 14.5 | 18.2 | 21.9 |
| | Burning velocity (WCF) | cm/s | 10 | 10 | 10 | 10 | 10 | 10 |

TABLE 98

| | Item | | Comp. Ex. 39 | Comp. Ex. 45 | Comp. Ex. 51 | Comp. Ex. 57 | Comp. Ex. 62 |
|---|---|---|---|---|---|---|---|
| WCF | HFO-1132(E) | Mass % | 41.8 | 40 | 35.7 | 32 | 30.4 |
| | HFO-1123 | Mass % | 31.5 | 30.7 | 23.6 | 23.9 | 21.8 |
| | R1234yf | Mass % | 0 | 0 | 0 | 0 | 0 |
| | R32 | Mass % | 26.7 | 29.3 | 36.7 | 44.1 | 47.8 |
| | Burning velocity (WCF) | cm/s | 10 | 10 | 10 | 10 | 10 |

TABLE 99

| Item | | | Comp. Ex. 7 | Comp. Ex. 14 | Comp. Ex. 20 | Comp. Ex. 25 | Comp. Ex. 30 | Comp. Ex. 35 |
|---|---|---|---|---|---|---|---|---|
| WCF | HFO-1132(E) | Mass % | 72.0 | 60.9 | 55.8 | 52.1 | 48.6 | 45.4 |
| | HFO-1123 | Mass % | 0.0 | 0.0 | 0.0 | 0 | 0 | 0 |
| | R1234yf | Mass % | 28.0 | 32.0 | 33.1 | 33.4 | 33.2 | 32.7 |
| | R32 | Mass % | 0.0 | 7.1 | 11.1 | 14.5 | 18.2 | 21.9 |
| | Burning velocity (WCF) | cm/s | 10 | 10 | 10 | 10 | 10 | 10 |

TABLE 100

| Item | | | Comp. Ex. 40 | Comp. Ex. 46 | Comp. Ex. 52 | Comp. Ex. 58 | Comp. Ex. 63 |
|---|---|---|---|---|---|---|---|
| WCF | HFO-1132(E) | Mass % | 41.8 | 40 | 35.7 | 32 | 30.4 |
| | HFO-1123 | Mass % | 0 | 0 | 0 | 0 | 0 |
| | R1234yf | Mass % | 31.5 | 30.7 | 23.6 | 23.9 | 21.8 |
| | R32 | Mass % | 26.7 | 29.3 | 36.7 | 44.1 | 47.8 |
| | Burning velocity (WCF) | cm/s | 10 | 10 | 10 | 10 | 10 |

TABLE 101

| Item | | | Comp. Ex. 8 | Comp. Ex. 15 | Comp. Ex. 21 | Comp. Ex. 26 | Comp. Ex. 31 | Comp. Ex. 36 |
|---|---|---|---|---|---|---|---|---|
| WCF | HFO-1132(E) | Mass % | 47.1 | 40.5 | 37.0 | 34.3 | 32.0 | 30.3 |
| | HFO-1123 | Mass % | 52.9 | 52.4 | 51.9 | 51.2 | 49.8 | 47.8 |
| | R1234yf | Mass % | 0.0 | 0.0 | 0.0 | 0.0 | 0.0 | 0.0 |
| | R32 | Mass % | 0.0 | 7.1 | 11.1 | 14.5 | 18.2 | 21.9 |
| Leak condition that results in WCFF | | | Storage/Shipping −40° C., 92% release, liquid phases ide | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side |
| WCFF | HFO-1132(E) | Mass % | 72.0 | 62.4 | 56.2 | 50.6 | 45.1 | 40.0 |
| | HFO-1123 | Mass % | 28.0 | 31.6 | 33.0 | 33.4 | 32.5 | 30.5 |
| | R1234yf | Mass % | 0.0 | 0.0 | 0.0 | 20.4 | 0.0 | 0.0 |
| | R32 | Mass % | 0.0 | 50.9 | 10.8 | 16.0 | 22.4 | 29.5 |
| Burning velocity (WCF) | | cm/s | 8 or less | 8 or less | 8 or less | 8 or less | 8 or less | 8 or less |
| Burning velocity (WCFF) | | cm/s | 10 | 10 | 10 | 10 | 10 | 10 |

TABLE 102

| Item | | | Comp. Ex. 41 | Comp. Ex. 47 | Comp. Ex. 53 | Comp. Ex. 59 | Comp. Ex. 64 |
|---|---|---|---|---|---|---|---|
| WCF | HFO-1132(E) | Mass % | 29.1 | 28.8 | 29.3 | 29.4 | 28.9 |
| | HFO-1123 | Mass % | 44.2 | 41.9 | 34.0 | 26.5 | 23.3 |
| | R1234yf | Mass % | 0.0 | 0.0 | 0.0 | 0.0 | 0.0 |
| | R32 | Mass % | 26.7 | 29.3 | 36.7 | 44.1 | 47.8 |
| Leak condition that results in WCFF | | | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 90% release, gas phase side | Storage/Shipping −40° C., 86% release, gas phase side |
| WCFF | HFO-1132(E) | Mass % | 34.6 | 32.2 | 27.7 | 28.3 | 27.5 |
| | HFO-1123 | Mass % | 26.5 | 23.9 | 17.5 | 18.2 | 16.7 |
| | R1234yf | Mass % | 0.0 | 0.0 | 0.0 | 0.0 | 0.0 |
| | R32 | Mass % | 38.9 | 43.9 | 54.8 | 53.5 | 55.8 |
| Burning velocity (WCF) | | cm/s | 8 or less | 8 or less | 8.3 | 9.3 | 9.6 |
| Burning velocity (WCFF) | | cm/s | 10 | 10 | 10 | 10 | 10 |

TABLE 103

| Item | | | Comp. Ex. 9 | Comp. Ex. 16 | Comp. Ex. 22 | Comp. Ex. 27 | Comp. Ex. 32 | Comp. Ex. 37 |
|---|---|---|---|---|---|---|---|---|
| WCF | HFO-1132(E) | Mass % | 61.7 | 47.0 | 41.0 | 36.5 | 32.5 | 28.8 |
| | HFO-1123 | Mass % | 5.9 | 7.2 | 6.5 | 5.6 | 4.0 | 2.4 |
| | R1234yf | Mass % | 32.4 | 38.7 | 41.4 | 43.4 | 45.3 | 46.9 |
| | R32 | Mass % | 0.0 | 7.1 | 11.1 | 14.5 | 18.2 | 21.9 |
| Leak condition that results in WCFF | | | Storage/ Shipping −40° C., 0% release, gas phase side | Storage/ Shipping −40° C., 0% release, gas phase side | Storage/ Shipping −40° C., 0% release, gas phase side | Storage/ Shipping −40° C., 92% release, liquid phase side | Storage/ Shipping −40° C., 0% release, gas phase side | Storage/ Shipping −40° C., 0% release, gas phase side |
| WCFF | HFO-1132(E) | Mass % | 72.0 | 56.2 | 50.4 | 46.0 | 42.4 | 39.1 |
| | HFO-1123 | Mass % | 10.5 | 12.6 | 11.4 | 10.1 | 7.4 | 4.4 |
| | R1234yf | Mass % | 17.5 | 20.4 | 21.8 | 22.9 | 24.3 | 25.7 |
| | R32 | Mass % | 0.0 | 10.8 | 16.3 | 21.0 | 25.9 | 30.8 |
| Burning velocity (WCF) | | cm/s | 8 or less | 8 or less | 8 or less | 8 or less | 8 or less | 8 or less |
| Burning velocity (WCFF) | | cm/s | 10 | 10 | 10 | 10 | 10 | 10 |

TABLE 104

| Item | | | Comp. Ex. 42 | Comp. Ex. 48 | Comp. Ex. 54 | Comp. Ex. 60 | Comp. Ex. 65 |
|---|---|---|---|---|---|---|---|
| WCF | HFO-1132(E) | Mass % | 24.8 | 24.3 | 22.5 | 21.1 | 20.4 |
| | HFO-1123 | Mass % | 0.0 | 0.0 | 0.0 | 0.0 | 0.0 |
| | R1234yf | Mass % | 48.5 | 46.4 | 40.8 | 34.8 | 31.8 |
| | R32 | Mass % | 26.7 | 29.3 | 36.7 | 44.1 | 47.8 |
| Leak condition that results in WCFF | | | Storage/ Shipping −40° C., 0% release, gas phase side | Storage/ Shipping −40° C., 0% release, gas phase side | Storage/ Shipping −40° C., 0% release, gas phase side | Storage/ Shipping −40° C., 0% release, gas phase side | Storage/ Shipping −40° C., 0% release, gas phase side |
| WCFF | HFO-1132(E) | Mass % | 35.3 | 34.3 | 31.3 | 29.1 | 28.1 |
| | HFO-1123 | Mass % | 0.0 | 0.0 | 0.0 | 0.0 | 0.0 |
| | R1234yf | Mass % | 27.4 | 26.2 | 23.1 | 19.8 | 18.2 |
| | R32 | Mass % | 37.3 | 39.6 | 45.6 | 51.1 | 53.7 |
| Burning velocity (WCF) | | cm/s | 8 or less | 8 or less | 8 or less | 8 or less | 8 or less |
| Burning velocity (WCFF) | | cm/s | 10 | 10 | 10 | 10 | 10 |

The results in Tables 97 to 100 indicate that the refrigerant has a WCF lower flammability in the following cases:

When the mass % of HFO-1132(E), HFO-1123, R1234yf, and R32 based on their sum in the mixed refrigerant of HFO-1132(E), HFO-1123, R1234yf, and R32 is respectively represented by x, y, z, and a, coordinates (x,y,z) in a ternary composition diagram in which the sum of HFO-1132(E), HFO-1123, and R1234yf is (100−a) mass % and a straight line connecting a point (0.0, 100.0−a, 0.0) and a point (0.0, 0.0, 100.0−a) is the base, if 0<a≤11.1, coordinates (x,y,z) in the ternary composition diagram are on or below a straight line GI that connects point G $(0.026a^2-1.7478a+72.0, -0.026a^2+0.7478a+28.0, 0.0)$ and point I $(0.026a^2-1.7478a+72.0, 0.0, -0.026a^2+0.7478a+28.0)$;
if 11.1<a≤18.2, coordinates (x,y,z) in the ternary composition diagram are on or below a straight line GI that connects point G $(0.02a^2-1.6013a+71.105, -0.02a^2+0.6013a+28.895, 0.0)$ and point I $(0.02a^2-1.6013a+71.105, 0.0, -0.02a^2+0.6013a+28.895)$; if 18.2<a≤26.7, coordinates (x,y,z) in the ternary composition diagram are on or below a straight line GI that connects point G $(0.0135a^2-1.4068a+69.727, -0.0135a^2+0.4068a+30.273, 0.0)$ and point I $(0.0135a^2-1.4068a+69.727, 0.0, -0.0135a^2+0.4068a+30.273)$; if 26.7<a≤36.7, coordinates (x,y,z) in the ternary composition diagram are on or below a straight line GI that connects point G $(0.0111a^2-1.3152a+68.986, -0.0111a^2+0.3152a+31.014, 0.0)$ and point I $(0.0111a^2-1.3152a+68.986, 0.0, -0.0111a^2+0.3152a+31.014)$; and if 36.7<a≤46.7, coordinates (x,y,z) in the ternary composition diagram are on or below a straight line GI that connects point G $(0.0061a^2-0.9918a+63.902, -0.0061a^2-0.0082a+36.098, 0.0)$ and point I $(0.0061a^2-0.9918a+63.902, 0.0, -0.0061a^2-0.0082a+36.098)$.

Three points corresponding to point G (Table 105) and point I (Table 106) were individually obtained in each of the following five ranges by calculation, and their approximate expressions were obtained.

TABLE 105

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 72.0 | 60.9 | 55.8 | 55.8 | 52.1 | 48.6 | 48.6 | 45.4 | 41.8 |

TABLE 105-continued

| | | | | | | | | | |
|---|---|---|---|---|---|---|---|---|---|
| HFO-1123 | 28.0 | 32.0 | 33.1 | 33.1 | 33.4 | 33.2 | 33.2 | 32.7 | 31.5 |
| R1234yf | 0 | 0 | 0 | 0 | 0 | 0 | 0 | 0 | 0 |
| R32 Approximate expression | | a | | | a | | | a | |
| HFO-1132(E) Approximate expression | $0.026a^2 - 1.7478a + 72.0$ | | | $0.02a^2 - 1.6013a + 71.105$ | | | $0.0135a^2 - 1.4068a + 69.727$ | | |
| HFO-1123 Approximate expression | $-0.026a^2 + 0..7478a + 28.0$ | | | $-0.02a^2 + 0..6013a + 28.895$ | | | $-0.0135a^2 + 0.4068a +3\ 0.273$ | | |
| R1234yf Approximate expression | | 0 | | | 0 | | | 0 | |

| Item | $36.7 \geq R32 \geq 26.7$ | | | $46.7 \geq R32 \geq 36.7$ | | |
|---|---|---|---|---|---|---|
| R32 | 26.7 | 29.3 | 36.7 | 36.7 | 44.1 | 47.8 |
| HFO-1132(E) | 41.8 | 40.0 | 35.7 | 35.7 | 32.0 | 30.4 |
| HFO-1123 | 31.5 | 30.7 | 27.6 | 27.6 | 23.9 | 21.8 |
| R1234yf | 0 | 0 | 0 | 0 | 0 | 0 |
| R32 Approximate expression | | a | | | a | |
| HFO-1132(E) Approximate expression | $0.0111a2 - 1.3152a + 68.986$ | | | $0.0061a^2 - 0.9918a + 63.902$ | | |
| HFO-1123 Approximate expression | $-0.0111a^2 + 0.3152a + 31.014$ | | | $-0.0061a^2 - 0.0082a + 36.098$ | | |
| R1234yf Approximate expression | | 0 | | | 0 | |

TABLE 106

| Item | $11.1 \geq R32 > 0$ | | | $18.2 \geq R32 \geq 11.1$ | | | $26.7 \geq R32 \geq 18.2$ | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 72.0 | 60.9 | 55.8 | 55.8 | 52.1 | 48.6 | 48.6 | 45.4 | 41.8 |
| HFO-1123 | 0 | 0 | 0 | 0 | 0 | 0 | 0 | 0 | 0 |
| R1234yf | 28.0 | 32.0 | 33.1 | 33.1 | 33.4 | 33.2 | 33.2 | 32.7 | 31.5 |
| R32 | | a | | | a | | | a | |
| HFO-1132(E) Approximate expression | $0.026a^2 - 1.7478a + 72.0$ | | | $0.02a^2 - 1.6013a + 71.105$ | | | $0.0135a^2 - 1.4068a + 69.727$ | | |
| HFO-1123 Approximate expression | | 0 | | | 0 | | | 0 | |
| R1234yf Approximate expression | $-0.026a^2 + 0.7478a + 28.0$ | | | $-0.02a^2 + 0.6013a + 28.895$ | | | $-0.0135a^2 + 0.4068a + 30.273$ | | |

| Item | $36.7 \geq R32 \geq 26.7$ | | | $46.7 \geq R32 \geq 36.7$ | | |
|---|---|---|---|---|---|---|
| R32 | 26.7 | 29.3 | 36.7 | 36.7 | 44.1 | 47.8 |
| HFO-1132(E) | 41.8 | 40.0 | 35.7 | 35.7 | 32.0 | 30.4 |
| HFO-1123 | 0 | 0 | 0 | 0 | 0 | 0 |
| R1234yf | 31.5 | 30.7 | 23.6 | 23.6 | 23.5 | 21.8 |
| R32 | | x | | | x | |
| HFO-1132(E) Approximate expression | $0.0111a^2 - 1.3152a + 68.986$ | | | $0.0061a^2 - 0.9918a + 63.902$ | | |
| HFO-1123 Approximate expression | | 0 | | | 0 | |
| R1234yf Approximate expression | $-0.0111a^2 + 0.3152a + 31.014$ | | | $-0.0061a^2 - 0.0082a + 36.098$ | | |

The results in Tables 101 to 104 indicate that the refrigerant is determined to have a WCFF lower flammability, and the flammability classification according to the ASHRAE Standard is "2L (flammability)" in the following cases:

When the mass % of HFO-1132(E), HFO-1123, R1234yf, and R32 based on their sum in the mixed refrigerant of HFO-1132(E), HFO-1123, R1234yf, and R32 is respectively represented by x, y, z, and a, in a ternary composition diagram in which the sum of HFO-1132(E), HFO-1123, and R1234yf is (100−a) mass % and a straight line connecting a point (0.0, 100.0−a, 0.0) and a point (0.0, 0.0, 100.0−a) is the base, if 0<a≤11.1, coordinates (x,y,z) in the ternary composition diagram are on or below a straight line JK' that connects point J ($0.0049a^2-0.9645a+47.1$, $-0.0049a^2-$ 0.0355a+52.9, 0.0) and point K'(0.0514a² −2.4353a+61.7, −0.0323a²+0.4122a+5.9, −0.0191a²+1.0231a+32.4); if 11.1<a≤18.2, coordinates are on a straight line JK' that connects point J (0.0243a²−1.4161a+49.725, −0.0243a²+0.4161a+50.275, 0.0) and point K'(0.0341a²−2.1977a+61.187, −0.0236a²+0.34a+5.636, −0.0105a²+0.8577a+33.177); if 18.2<a≤26.7, coordinates are on or below a straight line JK' that connects point J (0.0246a²−1.4476a+50.184, −0.0246a²+0.4476a+49.816, 0.0) and point K' (0.0196a²−1.7863a+58.515, −0.0079a²−0.1136a+8.702, −0.0117a²+0.8999a+32.783); if 26.7<a≤36.7, coordinates are on or below a straight line JK' that connects point J (0.0183a²−1.1399a+46.493, −0.0183a²+0.1399a+53.507, 0.0) and point K' (−0.0051a²+0.0929a+25.95, 0.0, 0.0051a²−1.0929a+74.05); and if 36.7<a≤46.7, coordinates are on or below a straight line JK' that connects point J (−0.0134a²+1.0956a+7.13, 0.0134a²−2.0956a+92.87, 0.0) and point K'(−1.892a+29.443, 0.0, 0.892a+70.557).

Actual points having a WCFF lower flammability form a curved line that connects point J and point K' (on the straight line AB) in FIG. 3 and extends toward the HFO-1132(E) side. Accordingly, when coordinates are on or below the straight line JK', WCFF lower flammability is achieved.

Three points corresponding to point J (Table 107) and point K' (Table 108) were individually obtained in each of the following five ranges by calculation, and their approximate expressions were obtained.

TABLE 107

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 47.1 | 40.5 | 37 | 37.0 | 34.3 | 32.0 | 32.0 | 30.3 | 29.1 |
| HFO-1123 | 52.9 | 52.4 | 51.9 | 51.9 | 51.2 | 49.8 | 49.8 | 47.8 | 44.2 |
| R1234yf | 0 | 0 | 0 | 0 | 0 | 0 | 0 | 0 | 0 |
| R32 | a | | | a | | | a | | |
| HFO-1132(E) Approximate expression | 0.0049a² − 0.9645a + 47.1 | | | 0.0243a² − 1.4161a + 49.725 | | | 0.0246a² − 1.4476a + 50.184 | | |
| HFO-1123 Approximate expression | −0.0049a² − 0.0355a + 52.9 | | | −0.0243a² + 0.4161a + 50.275 | | | −0.0246a² + 0.4476a + 49.816 | | |
| R1234yf Approximate expression | 0 | | | 0 | | | 0 | | |

| Item | 36.7 ≥ R32 ≥ 26.7 | | | 47.8 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 29.1 | 28.8 | 29.3 | 29.3 | 29.4 | 28.9 |
| HFO-1123 | 44.2 | 41.9 | 34.0 | 34.0 | 26.5 | 23.3 |
| R1234yf | 0 | 0 | 0 | 0 | 0 | 0 |
| R32 | a | | | a | | |
| HFO-1132(E) Approximate expression | 0.0183a² − 1.1399a + 46.493 | | | −0.0134a² + 1.0956a + 7.13 | | |
| HFO-1123 Approximate expression | −0.0183a² + 0.1399a + 53.507 | | | 0.0134a² − 2.0956a + 92.87 | | |
| R1234yf Approximate expression | 0 | | | 0 | | |

TABLE 108

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 61.7 | 47.0 | 41.0 | 41.0 | 36.5 | 32.5 | 32.5 | 28.8 | 24.8 |
| HFO-1123 | 5.9 | 7.2 | 6.5 | 6.5 | 5.6 | 4.0 | 4.0 | 2.4 | 0 |
| R1234yf | 32.4 | 38.7 | 41.4 | 41.4 | 43.4 | 45.3 | 45.3 | 46.9 | 48.5 |
| R32 | x | | | x | | | x | | |
| HFO-1132(E) Approximate expression | 0.0514a² − 2.4353a + 61.7 | | | 0.0341a² − 2.1977a + 61.187 | | | 0.0196a² − 1.7863a + 58.515 | | |
| HFO-1123 Approximate expression | −0.0323a² + 0.4122a + 5.9 | | | −0.0236a² + 0.34a + 5.636 | | | −0.0079a² − 0.1136a + 8.702 | | |
| R1234yf Approximate expression | −0.0191a² + 1.0231a + 32.4 | | | −0.0105a² + 0.8577a + 33.177 | | | −0.0117a² + 0.8999a + 32.783 | | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 24.8 | 24.3 | 22.5 | 22.5 | 21.1 | 20.4 |
| HFO-1123 | 0 | 0 | 0 | 0 | 0 | 0 |

TABLE 108-continued

| | | | | | | | |
|---|---|---|---|---|---|---|---|
| R1234yf | 48.5 | 46.4 | 40.8 | 40.8 | 34.8 | | 31.8 |
| R32 | | x | | | x | | |
| HFO-1132(E) Approximate expression | $-0.0051a^2 + 0.0929a + 25.95$ | | | | $-1.892a + 29.443$ | | |
| HFO-1123 Approximate expression | | 0 | | | 0 | | |
| R1234yf Approximate expression | $0.0051a^2 - 1.0929a + 74.05$ | | | | $0.892a + 70.557$ | | |

FIGS. 3 to 13 show compositions whose R32 content a (mass %) is 0 mass %, 7.1 mass %, 11.1 mass %, 14.5 mass %, 18.2 mass %, 21.9 mass %, 26.7 mass %, 29.3 mass %, 36.7 mass %, 44.1 mass %, and 47.8 mass %, respectively.

Points A, B, C, and D' were obtained in the following manner according to approximate calculation.

Point A is a point where the content of HFO-1123 is 0 mass %, and a refrigerating capacity ratio of 85% relative to that of R410A is achieved. Three points corresponding to point A were obtained in each of the following five ranges by calculation, and their approximate expressions were obtained (Table 109).

TABLE 109

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 68.6 | 55.3 | 48.4 | 48.4 | 42.8 | 37 | 37 | 31.5 | 24.8 |
| HFO-1123 | 0 | 0 | 0 | 0 | 0 | 0 | 0 | 0 | 0 |
| R1234yf | 31.4 | 37.6 | 40.5 | 40.5 | 42.7 | 44.8 | 44.8 | 46.6 | 48.5 |
| R32 | | a | | | a | | | a | |
| HFO-1132(E) Approximate expression | $0.0134a^2 - 1.9681a + 68.6$ | | | $0.0112a^2 - 1.9337a + 68.484$ | | | $0.0107a^2 - 1.9142a + 68.305$ | | |
| HFO-1123 Approximate expression | 0 | | | 0 | | | 0 | | |
| R1234yf Approximate expression | $-0.0134a^2 + 0.9681a + 31.4$ | | | $-0.0112a^2 + 0.9337a + 31.516$ | | | $-0.0107a^2 + 0.9142a + 31.695$ | | |
| Item | 36.7 ≥ R32 ≥ 26.7 | | | 46.7 ≥ R32 ≥ 36.7 | | | | | |
| R32 | 26.7 | 29.3 | 36.7 | 36.7 | 44.1 | 47.8 | | | |
| HFO-1132(E) | 24.8 | 21.3 | 12.1 | 12.1 | 3.8 | 0 | | | |
| HFO-1123 | 0 | 0 | 0 | 0 | 0 | 0 | | | |
| R1234yf | 48.5 | 49.4 | 51.2 | 51.2 | 52.1 | 52.2 | | | |
| R32 | | a | | | a | | | | |
| HFO-1132(E) Approximate expression | $0.0103a^2 - 1.9225a + 68.793$ | | | $0.0085a^2 - 1.8102a + 67.1$ | | | | | |
| HFO-1123 Approximate expression | 0 | | | 0 | | | | | |
| R1234yf Approximate expression | $-0.0103a^2 + 0.9225a + 31..207$ | | | $-0.0085a^2 + 0.8102a + 32.9$ | | | | | |

Point B is a point where the content of HFO-1132(E) is 0 mass %, and a refrigerating capacity ratio of 85% relative to that of R410A is achieved.

Three points corresponding to point B were obtained in each of the following five ranges by calculation, and their approximate expressions were obtained (Table 110).

TABLE 110

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 0 | 0 | 0 | 0 | 0 | 0 | 0 | 0 | 0 |
| HFO-1123 | 58.7 | 47.8 | 42.3 | 42.3 | 37.8 | 33.1 | 33.1 | 28.5 | 22.9 |
| R1234yf | 41.3 | 45.1 | 46.6 | 46.6 | 47.7 | 48.7 | 48.7 | 49.6 | 50.4 |

TABLE 110-continued

| | | | |
|---|---|---|---|
| R32 | a | a | a |
| HFO-1132(E) | 0 | 0 | 0 |
| Approximate expression | | | |
| HFO-1123 Approximate expression | $0.0144a^2 - 1.6377a + 58.7$ | $0.0075a^2 - 1.5156a + 58.199$ | $0.009a^2 - 1.6045a + 59.318$ |
| R1234yf Approximate expression | $-0.0144a^2 + 0.6377a + 41.3$ | $-0.0075a^2 + 0.5156a + 41.801$ | $-0.009a^2 + 0.6045a + 40.682$ |

| Item | $36.7 \geq R32 \geq 26.7$ | | | | $46.7 \geq R32 \geq 36.7$ | |
|---|---|---|---|---|---|---|
| R32 | 26.7 | 29.3 | 36.7 | 36.7 | 44.1 | 47.8 |
| HFO-1132(E) | 0 | 0 | 0 | 0 | 0 | 0 |
| HFO-1123 | 22.9 | 19.9 | 11.7 | 11.8 | 3.9 | 0 |
| R1234yf | 50.4 | 50.8 | 51.6 | 51.5 | 52.0 | 52.2 |
| R32 | | a | | | | a |
| HFO-1132(E) | | 0 | | | | 0 |
| Approximate expression | | | | | | |
| HFO-1123 Approximate expression | | $0.0046a^2 - 1.41a + 57.286$ | | | | $0.0012a^2 - 1.1659a + 52.95$ |
| R1234yf Approximate expression | | $-0.0046a^2 + 0.41a + 42.714$ | | | | $-0.0012a^2 + 0.1659a + 47.05$ |

Point D' is a point where the content of HFO-1132(E) is 0 mass %, and a COP ratio of 95.5% relative to that of R410A is achieved.

Three points corresponding to point D' were obtained in each of the following by calculation, and their approximate expressions were obtained (Table 111).

TABLE 111

| Item | $11.1 \geq R32 > 0$ | | |
|---|---|---|---|
| R32 | 0 | 7.1 | 11.1 |
| HFO-1132(E) | 0 | 0 | 0 |
| HFO-1123 | 75.4 | 83.4 | 88.9 |
| R1234yf | 24.6 | 9.5 | 0 |
| R32 | a | | |
| HFO-1132(E) | 0 | | |
| Approximate expression | | | |
| HFO-1123 Approximate expression | $0.0224a^2 + 0.968a + 75.4$ | | |
| R1234yf Approximate expression | $-0.0224a^2 - 1.968a + 24.6$ | | |

Point C is a point where the content of R1234yf is 0 mass %, and a COP ratio of 95.5% relative to that of R410A is achieved.

Three points corresponding to point C were obtained in each of the following by calculation, and their approximate expressions were obtained (Table 112).

TABLE 112

| Item | $11.1 \geq R32 > 0$ | | |
|---|---|---|---|
| R32 | 0 | 7.1 | 11.1 |
| HFO-1132(E) | 32.9 | 18.4 | 0 |
| HFO-1123 | 67.1 | 74.5 | 88.9 |
| R1234yf | 0 | 0 | 0 |
| R32 | a | | |
| HFO-1132(E) Approximate expression | $-0.2304a^2 - 0.4062a + 32.9$ | | |

TABLE 112-continued

| Item | $11.1 \geq R32 > 0$ |
|---|---|
| HFO-1123 Approximate expression | $0.2304a^2 - 0.5938a + 67.1$ |
| R1234yf Approximate expression | 0 |

(5-4) Refrigerant D

The refrigerant D according to the present disclosure is a mixed refrigerant comprising trans-1,2-difluoroethylene (HFO-1132(E)), difluoromethane (R32), and 2,3,3,3-tetrafluoro-1-propene (R1234yf).

The refrigerant D according to the present disclosure has various properties that are desirable as an R410A-alternative refrigerant; i.e., a refrigerating capacity equivalent to that of R410A, a sufficiently low GWP, and a lower flammability (Class 2L) according to the ASHRAE standard.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI);
the line segment IJ is represented by coordinates $(0.0236y^2 - 1.7616y + 72.0, y, -0.0236y^2 + 0.7616y + 28.0)$;
the line segment NE is represented by coordinates $(0.012y^2 - 1.9003y + 58.3, y, -0.012y^2 + 0.9003y + 41.7)$; and
the line segments JN and EI are straight lines. When the requirements above are satisfied, the refrigerant according to the present disclosure has a refrigerating capacity ratio of 80% or more relative to R410A, a GWP of 125 or less, and a WCF lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);

the line segment MM' is represented by coordinates $(0.132y^2-3.34y+52.6, y, -0.132y^2+2.34y+47.4)$;

the line segment M'N is represented by coordinates $(0.0596y^2-2.2541y+48.98, y, -0.0596y^2+1.2541y+51.02)$;

the line segment VG is represented by coordinates $(0.0123y^2-1.8033y+39.6, y, -0.0123y^2+0.8033y+60.4)$; and the line segments NV and GM are straight lines. When the requirements above are satisfied, the refrigerant according to the present disclosure has a refrigerating capacity ratio of 70% or more relative to R410A, a GWP of 125 or less, and an ASHRAE lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;

the line segment ON is represented by coordinates $(0.0072y^2-0.6701y+37.512, y, -0.0072y^2-0.3299y+62.488)$;

the line segment NU is represented by coordinates $(0.0083y^2-1.7403y+56.635, y, -0.0083y^2+0.7403y+43.365)$; and the line segment UO is a straight line. When the requirements above are satisfied, the refrigerant according to the present disclosure has a refrigerating capacity ratio of 80% or more relative to R410A, a GWP of 250 or less, and an ASHRAE lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;

the line segment QR is represented by coordinates $(0.0099y^2-1.975y+84.765, y, -0.0099y^2+0.975y+15.235)$;

the line segment RT is represented by coordinates $(0.0082y^2-1.8683y+83.126, y, -0.0082y^2+0.8683y+16.874)$;

the line segment LK is represented by coordinates $(0.0049y^2-0.8842y+61.488, y, -0.0049y^2-0.1158y+38.512)$;

the line segment KQ is represented by coordinates $(0.0095y^2-1.2222y+67.676, y, -0.0095y^2+0.2222y+32.324)$; and the line segment TL is a straight line. When the requirements above are satisfied, the refrigerant according to the present disclosure has a refrigerating capacity ratio of 92.5% or more relative to R410A, a GWP of 350 or less, and a WCF lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;

the line segment PS is represented by coordinates $(0.0064y^2-0.7103y+40.1, y, -0.0064y^2-0.2897y+59.9)$;

the line segment ST is represented by coordinates $(0.0082y^2-1.8683y+83.126, y, -0.0082y^2+0.8683y+16.874)$; and the line segment TP is a straight line. When the requirements above are satisfied, the refrigerant according to the present disclosure has a refrigerating capacity ratio of 92.5% or more relative to R410A, a GWP of 350 or less, and an ASHRAE lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ac, cf, fd, and da that connect the following 4 points:
point a (71.1, 0.0, 28.9),
point c (36.5, 18.2, 45.3),
point f (47.6, 18.3, 34.1), and
point d (72.0, 0.0, 28.0),
or on these line segments;

the line segment ac is represented by coordinates $(0.0181y^2-2.2288y+71.096, y, -0.0181y^2+1.2288y+28.904)$;

the line segment fd is represented by coordinates $(0.02y^2-1.7y+72, y, -0.02y^2+0.7y+28)$; and the line segments cf and da are straight lines. When the requirements above are satisfied, the refrigerant according to the present disclosure has a refrigerating capacity ratio of 85% or more relative to R410A, a GWP of 125 or less, and a lower flammability (Class 2L) according to the ASHRAE standard.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ab, be, ed, and da that connect the following 4 points:
point a (71.1, 0.0, 28.9),
point b (42.6, 14.5, 42.9),
point e (51.4, 14.6, 34.0), and
point d (72.0, 0.0, 28.0),
or on these line segments;

the line segment ab is represented by coordinates $(0.0181y^2-2.2288y+71.096, y, -0.0181y^2+1.2288y+28.904)$;

the line segment ed is represented by coordinates $(0.02y^2-1.7y+72, y, -0.02y^2+0.7y+28)$; and the line segments be and da are straight lines. When the requirements above are satisfied, the refrigerant according to the present disclosure has a refrigerating capacity ratio of 85% or more relative to R410A, a GWP of 100 or less, and a lower flammability (Class 2L) according to the ASHRAE standard.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gi, ij, and jg that connect the following 3 points:
point g (77.5, 6.9, 15.6),
point i (55.1, 18.3, 26.6), and
point j (77.5, 18.4, 4.1),
or on these line segments;

the line segment gi is represented by coordinates $(0.02y^2-2.4583y+93.396, y, -0.02y^2+1.4583y+6.604)$; and the line segments ij and jg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gh, hk, and kg that connect the following 3 points:
point g (77.5, 6.9, 15.6),
point h (61.8, 14.6, 23.6), and
point k (77.5, 14.6, 7.9),
or on these line segments;

the line segment gh is represented by coordinates $(0.02y^2-2.4583y+93.396, y, -0.02y^2+1.4583y+6.604)$; and the line segments hk and kg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure may further comprise other additional refrigerants in addition to HFO-1132(E), R32, and R1234yf, as long as the above properties and effects are not impaired. In this respect, the refrigerant according to the present disclosure preferably comprises HFO-1132(E), R32, and R1234yf in a total amount of 99.5 mass % or more, more preferably 99.75 mass % or more, and still more preferably 99.9 mass % or more based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant D)

The present disclosure is described in more detail below with reference to Examples of refrigerant D. However, the refrigerant D is not limited to the Examples.

The composition of each mixed refrigerant of HFO-1132 (E), R32, and R1234yf was defined as WCF. A leak simulation was performed using the NIST Standard Reference Database REFLEAK Version 4.0 under the conditions of Equipment, Storage, Shipping, Leak, and Recharge according to the ASHRAE Standard 34-2013. The most flammable fraction was defined as WCFF.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC. Tables 113 to 115 show the results.

TABLE 113

| Item | | Unit | Comparative Example 13 I | Example 11 | Example 12 J | Example 13 | Example 14 K | Example 15 | Example 16 L |
|---|---|---|---|---|---|---|---|---|---|
| WCF | HFO-1132(E) | Mass % | 72 | 57.2 | 48.5 | 41.2 | 35.6 | 32 | 28.9 |
| | R32 | Mass % | 0 | 10 | 18.3 | 27.6 | 36.8 | 44.2 | 51.7 |
| | R1234yf | Mass % | 28 | 32.8 | 33.2 | 31.2 | 27.6 | 23.8 | 19.4 |
| | Burning Velocity (WCF) | cm/s | 10 | 10 | 10 | 10 | 10 | 10 | 10 |

TABLE 114

| | Item | Unit | Comparative Example 14 M | Example 18 | Example 19 W | Example 20 | Example 21 N | Example 22 |
|---|---|---|---|---|---|---|---|---|
| WCF | HFO-1132(E) | Mass % | 52.6 | 39.2 | 32.4 | 29.3 | 27.7 | 24.6 |
| | R32 | Mass % | 0.0 | 5.0 | 10.0 | 14.5 | 18.2 | 27.6 |
| | R1234yf | Mass % | 47.4 | 55.8 | 57.6 | 56.2 | 54.1 | 47.8 |
| Leak condition that results in WCFF | | | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side |
| WCF | HFO-1132(E) | Mass % | 72.0 | 57.8 | 48.7 | 43.6 | 40.6 | 34.9 |
| | R32 | Mass % | 0.0 | 9.5 | 17.9 | 24.2 | 28.7 | 38.1 |
| | R1234yf | Mass % | 28.0 | 32.7 | 33.4 | 32.2 | 30.7 | 27.0 |
| Burning Velocity (WCF) | | cm/s | 8 or less | 8 or less | 8 or less | 8 or less | 8 or less | 8 or less |
| Burning Velocity (WCFF) | | cm/s | 10 | 10 | 10 | 10 | 10 | 10 |

TABLE 115

| | Item | Unit | Example 23 O | Example 24 | Example 25 P |
|---|---|---|---|---|---|
| WCF | HFO-1132(E) | Mass % | 22.6 | 21.2 | 20.5 |
| | HFO-1123 | Mass % | 36.8 | 44.2 | 51.7 |
| | R1234yf | Mass % | 40.6 | 34.6 | 27.8 |
| Leak condition that results in WCFF | | | Storage, Shipping, −40° C., 0% release, on the gas phase side | Storage, Shipping, −40° C., 0% release, on the gas phase side | Storage, Shipping, −40° C., 0% release, on the gas phase side |
| WCFF | HFO-1132(E) | Mass % | 31.4 | 29.2 | 27.1 |
| | HFO-1123 | Mass % | 45.7 | 51.1 | 56.4 |
| | R1234yf | Mass % | 23.0 | 19.7 | 16.5 |
| Burning Velocity (WCF) | | cm/s | 8 or less | 8 or less | 8 or less |
| Burning Velocity (WCFF) | | cm/s | 10 | 10 | 10 |

The results indicate that under the condition that the mass % of HFO-1132(E), R32, and R1234yf based on their sum is respectively represented by x, y, and z, when coordinates (x,y,z) in the ternary composition diagram shown in FIG. 14 in which the sum of HFO-1132(E), R32, and R1234yf is 100 mass % are on the line segment that connects point I, point J, point K, and point L, or below these line segments, the refrigerant has a WCF lower flammability.

Figure 14:
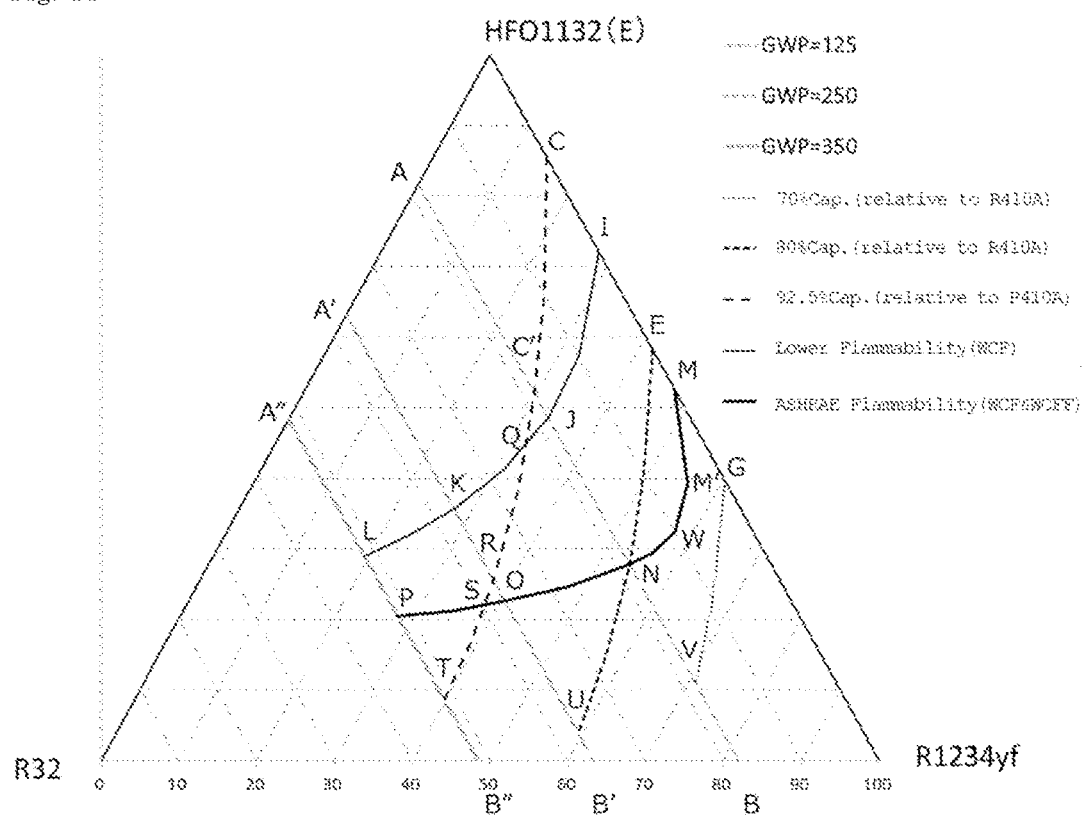
FIG. 14 is a view showing points A to C, E, G, and I to W; and line segments that connect points A to C, E, G, and I to W in a ternary composition diagram in which the sum of HFO-1132(E), R32, and R1234yf is 100 mass %.
Figure 15:
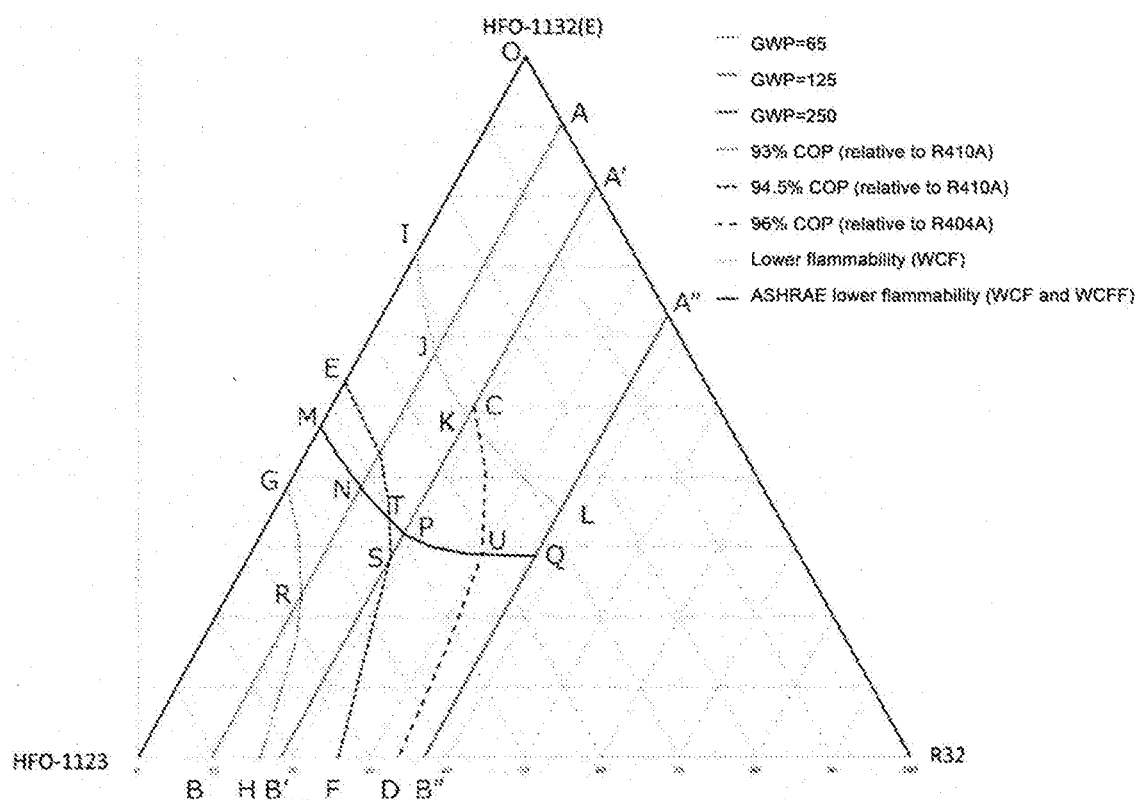
FIG. 15 is a view showing points A to U; and line segments that connect the
points in a ternary composition diagram in which the sum of HFO-1132(E), HFO-1123, and R32 is 100 mass %.

The results also indicate that when coordinates (x,y,z) in the ternary composition diagram shown in FIG. 14 are on the line segments that connect point M, point M', point W, point J, point N, and point P, or below these line segments, the refrigerant has an ASHRAE lower flammability.

Mixed refrigerants were prepared by mixing HFO-1132 (E), R32, and R1234yf in amounts (mass %) shown in Tables 116 to 144 based on the sum of HFO-1132(E), R32, and R1234yf. The coefficient of performance (COP) ratio and the refrigerating capacity ratio relative to R410 of the mixed refrigerants shown in Tables 116 to 144 were determined. The conditions for calculation were as described below.

Evaporating temperature: 5° C.

Condensation temperature: 45° C.

Degree of superheating: 5 K

Degree of subcooling: 5 K

Compressor efficiency: 70%

Tables 116 to 144 show these values together with the GWP of each mixed refrigerant.

TABLE 116

| Item | Unit | Comparative Example 1 | Comparative Example 2 A | Comparative Example 3 B | Comparative Example 4 A' | Comparative Example 5 B' | Comparative Example 6 A" | Comparative Example 7 B" |
|---|---|---|---|---|---|---|---|---|
| HFO-1132(E) | Mass % | R410A | 81.6 | 0.0 | 63.1 | 0.0 | 48.2 | 0.0 |
| R32 | Mass % | | 18.4 | 18.1 | 36.9 | 36.7 | 51.8 | 51.5 |
| R1234yf | Mass % | | 0.0 | 81.9 | 0.0 | 63.3 | 0.0 | 48.5 |
| GWP | — | 2088 | 125 | 125 | 250 | 250 | 350 | 350 |
| COP Ratio | % (relative to R410A) | 100 | 98.7 | 103.6 | 98.7 | 102.3 | 99.2 | 102.2 |
| Refrigerating Capacity Ratio | % (relative to R410A) | 100 | 105.3 | 62.5 | 109.9 | 77.5 | 112.1 | 87.3 |

TABLE 117

| Item | Unit | Comparative Example 8 C | Comparative Example 9 | Comparative Example 10 C' | Example 1 | Example 2 R | Example 3 | Example 4 T |
|---|---|---|---|---|---|---|---|---|
| HFO-1132 (E) | Mass % | 85.5 | 66.1 | 52.1 | 37.8 | 25.5 | 16.6 | 8.6 |
| R32 | Mass % | 0.0 | 10.0 | 18.2 | 27.6 | 36.8 | 44.2 | 51.6 |
| R1234yf | Mass % | 14.5 | 23.9 | 29.7 | 34.6 | 37.7 | 39.2 | 39.8 |
| GWP | — | 1 | 69 | 125 | 188 | 250 | 300 | 350 |
| COP Ratio | % (relative to R410A) | 99.8 | 99.3 | 99.3 | 99.6 | 100.2 | 100.8 | 101.4 |
| Refrigerating Capacity Ratio | % (relative to R410A) | 92.5 | 92.5 | 92.5 | 92.5 | 92.5 | 92.5 | 92.5 |

TABLE 118

| Item | Unit | Comparative Example 11 E | Example 5 | Example 6 N | Example 7 | Example 8 U | Comparative Example 12 G | Example 9 | Example 10 V |
|---|---|---|---|---|---|---|---|---|---|
| HFO-1132 (E) | Mass % | 58.3 | 40.5 | 27.7 | 14.9 | 3.9 | 39.6 | 22.8 | 11.0 |
| R32 | Mass % | 0.0 | 10.0 | 18.2 | 27.6 | 36.7 | 0.0 | 10.0 | 18.1 |
| R1234yf | Mass % | 41.7 | 49.5 | 54.1 | 57.5 | 59.4 | 60.4 | 67.2 | 70.9 |
| GWP | — | 2 | 70 | 125 | 189 | 250 | 3 | 70 | 125 |
| COP Ratio | % (relative to R410A) | 100.3 | 100.3 | 100.7 | 101.2 | 101.9 | 101.4 | 101.8 | 102.3 |
| Refrigerating Capacity Ratio | % (relative to R410A) | 80.0 | 80.0 | 80.0 | 80.0 | 80.0 | 70.0 | 70.0 | 70.0 |

TABLE 119

| Item | Unit | Comparative Example 13 I | Example 11 | Example 12 J | Example 13 | Example 14 K | Example 15 | Example 16 L | Example 17 Q |
|---|---|---|---|---|---|---|---|---|---|
| HFO-1132 (E) | Mass % | 72.0 | 57.2 | 48.5 | 41.2 | 35.6 | 32.0 | 28.9 | 44.6 |
| R32 | Mass % | 0.0 | 10.0 | 18.3 | 27.6 | 36.8 | 44.2 | 51.7 | 23.0 |
| R1234yf | Mass % | 28.0 | 32.8 | 33.2 | 31.2 | 27.6 | 23.8 | 19.4 | 32.4 |
| GWP | — | 2 | 69 | 125 | 188 | 250 | 300 | 350 | 157 |
| COP Ratio | % (relative to R410A) | 99.9 | 99.5 | 99.4 | 99.5 | 99.6 | 99.8 | 100.1 | 99.4 |
| Refrigerating Capacity Ratio | % (relative to R410A) | 86.6 | 88.4 | 90.9 | 94.2 | 97.7 | 100.5 | 103.3 | 92.5 |

TABLE 120

| Item | Unit | Comparative Example 14 M | Example 18 | Example 19 W | Example 20 | Example 21 N | Example 22 |
|---|---|---|---|---|---|---|---|
| HFO-1132 (E) | Mass % | 52.6 | 39.2 | 32.4 | 29.3 | 27.7 | 24.5 |
| R32 | Mass % | 0.0 | 5.0 | 10.0 | 14.5 | 18.2 | 27.6 |
| R1234yf | Mass % | 47.4 | 55.8 | 57.6 | 56.2 | 54.1 | 47.9 |
| GWP | — | 2 | 36 | 70 | 100 | 125 | 188 |
| COP Ratio | % (relative to R410A) | 100.5 | 100.9 | 100.9 | 100.8 | 100.7 | 100.4 |
| Refrigerating Capacity Ratio | % (relative to R410A) | 77.1 | 74.8 | 75.6 | 77.8 | 80.0 | 85.5 |

TABLE 121

| Item | Unit | Example 23 O | Example 24 | Example 25 P | Example 26 S |
|---|---|---|---|---|---|
| HFO-1132(E) | Mass % | 22.6 | 21.2 | 20.5 | 21.9 |
| R32 | Mass % | 36.8 | 44.2 | 51.7 | 39.7 |
| R1234yf | Mass % | 40.6 | 34.6 | 27.8 | 38.4 |
| GWP | — | 250 | 300 | 350 | 270 |

TABLE 121-continued

| Item | Unit | Example 23 O | Example 24 | Example 25 P | Example 26 S |
|---|---|---|---|---|---|
| COP Ratio | % (relative to R410A) | 100.4 | 100.5 | 100.6 | 100.4 |
| Refrigerating Capacity Ratio | % (relative to R410A) | 91.0 | 95.0 | 99.1 | 92.5 |

TABLE 122

| Item | Unit | Comparative Example 15 | Comparative Example 16 | Comparative Example 17 | Comparative Example 18 | Example 27 | Example 28 | Comparative Example 19 | Comparative Example 20 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 5.0 | 5.0 | 5.0 | 5.0 | 5.0 | 5.0 | 5.0 | 5.0 |
| R1234yf | Mass % | 85.0 | 75.0 | 65.0 | 55.0 | 45.0 | 35.0 | 25.0 | 15.0 |
| GWP | — | 37 | 37 | 37 | 36 | 36 | 36 | 35 | 35 |
| COP Ratio | % (relative to R410A) | 103.4 | 102.6 | 101.6 | 100.8 | 100.2 | 99.8 | 99.6 | 99.4 |
| Refrigerating Capacity Ratio | % (relative to R410A) | 56.4 | 63.3 | 69.5 | 75.2 | 80.5 | 85.4 | 90.1 | 94.4 |

TABLE 123

| Item | Unit | Comparative Example 21 | Comparative Example 22 | Example 29 | Comparative Example 23 | Example 30 | Comparative Example 24 | Comparative Example 25 | Comparative Example 26 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 10.0 | 10.0 | 10.0 | 10.0 | 10.0 | 10.0 | 10.0 | 10.0 |
| R1234yf | Mass % | 80.0 | 70.0 | 60.0 | 50.0 | 40.0 | 30.0 | 20.0 | 10.0 |
| GWP | — | 71 | 71 | 70 | 70 | 70 | 69 | 69 | 69 |
| COP Ratio | % (relative to R410A) | 103.1 | 102.1 | 101.1 | 100.4 | 99.8 | 99.5 | 99.2 | 99.1 |
| Refrigerating Capacity Ratio | % (relative to R410A) | 61.8 | 68.3 | 74.3 | 79.7 | 84.9 | 89.7 | 94.2 | 98.4 |

TABLE 124

| Item | Unit | Comparative Example 27 | Example 31 | Comparative Example 28 | Example 32 | Example 33 | Comparative Example 29 | Comparative Example 30 | Comparative Example 31 |
|---|---|---|---|---|---|---|---|---|---|
| HFO-1132 (E) | Mass % | 10.0 | 20.0 | 30.0 | 40.0 | 50.0 | 60.0 | 70.0 | 80.0 |
| R32 | Mass % | 15.0 | 15.0 | 15.0 | 15.0 | 15.0 | 15.0 | 15.0 | 15.0 |
| R1234yf | Mass % | 75.0 | 65.0 | 55.0 | 45.0 | 35.0 | 25.0 | 15.0 | 5.0 |
| GWP | — | 104 | 104 | 104 | 103 | 103 | 103 | 103 | 103 |
| COP Ratio | % (relative to R410A) | 102.7 | 101.6 | 100.7 | 100.0 | 99.5 | 99.2 | 99.0 | 98.9 |
| Refrigerating Capacity Ratio | % (relative to R410A) | 66.6 | 72.9 | 78.6 | 84.0 | 89.0 | 93.7 | 98.1 | 102.2 |

TABLE 125

| Item | Unit | Comparative Example 32 | Comparative Example 33 | Comparative Example 34 | Comparative Example 35 | Comparative Example 36 | Comparative Example 37 | Comparative Example 38 | Comparative Example 39 |
|---|---|---|---|---|---|---|---|---|---|
| HFO-1132 (E) | Mass % | 10.0 | 20.0 | 30.0 | 40.0 | 50.0 | 60.0 | 70.0 | 10.0 |
| R32 | Mass % | 20.0 | 20.0 | 20.0 | 20.0 | 20.0 | 20.0 | 20.0 | 25.0 |
| R1234yf | Mass % | 70.0 | 60.0 | 50.0 | 40.0 | 30.0 | 20.0 | 10.0 | 65.0 |
| GWP | — | 138 | 138 | 137 | 137 | 137 | 136 | 136 | 171 |
| COP Ratio | % (relative to R410A) | 102.3 | 101.2 | 100.4 | 99.7 | 99.3 | 99.0 | 98.8 | 101.9 |

TABLE 125-continued

| Item | Unit | Comparative Example 32 | Comparative Example 33 | Comparative Example 34 | Comparative Example 35 | Comparative Example 36 | Comparative Example 37 | Comparative Example 38 | Comparative Example 39 |
|---|---|---|---|---|---|---|---|---|---|
| Refrigerating Capacity Ratio | % (relative to R410A) | 71.0 | 77.1 | 82.7 | 88.0 | 92.9 | 97.5 | 101.7 | 75.0 |

TABLE 126

| Item | Unit | Example 34 | Comparative Example 40 | Comparative Example 41 | Comparative Example 42 | Comparative Example 43 | Comparative Example 44 | Comparative Example 45 | Example 35 |
|---|---|---|---|---|---|---|---|---|---|
| HFO-1132 (E) | Mass % | 20.0 | 30.0 | 40.0 | 50.0 | 60.0 | 70.0 | 10.0 | 20.0 |
| R32 | Mass % | 25.0 | 25.0 | 25.0 | 25.0 | 25.0 | 25.0 | 30.0 | 30.0 |
| R1234yf | Mass % | 55.0 | 45.0 | 35.0 | 25.0 | 15.0 | 5.0 | 60.0 | 50.0 |
| GWP | — | 171 | 171 | 171 | 170 | 170 | 170 | 205 | 205 |
| COP Ratio | % (relative to R410A) | 100.9 | 100.1 | 99.6 | 99.2 | 98.9 | 98.7 | 101.6 | 100.7 |
| Refrigerating Capacity Ratio | % (relative to R410A) | 81.0 | 86.6 | 91.7 | 96.5 | 101.0 | 105.2 | 78.9 | 84.8 |

TABLE 127

| Item | Unit | Comparative Example 46 | Comparative Example 47 | Comparative Example 48 | Comparative Example 49 | Example 36 | Example 37 | Example 38 | Comparative Example 50 |
|---|---|---|---|---|---|---|---|---|---|
| HFO-1132 (E) | Mass % | 30.0 | 40.0 | 50.0 | 60.0 | 10.0 | 20.0 | 30.0 | 40.0 |
| R32 | Mass % | 30.0 | 30.0 | 30.0 | 30.0 | 35.0 | 35.0 | 35.0 | 35.0 |
| R1234yf | Mass % | 40.0 | 30.0 | 20.0 | 10.0 | 55.0 | 45.0 | 35.0 | 25.0 |
| GWP | — | 204 | 204 | 204 | 204 | 239 | 238 | 238 | 238 |
| COP Ratio | % (relative to R410A) | 100.0 | 99.5 | 99.1 | 98.8 | 101.4 | 100.6 | 99.9 | 99.4 |
| Refrigerating Capacity Ratio | % (relative to R410A) | 90.2 | 95.3 | 100.0 | 104.4 | 82.5 | 88.3 | 93.7 | 98.6 |

TABLE 128

| Item | Unit | Comparative Example 51 | Comparative Example 52 | Comparative Example 53 | Comparative Example 54 | Example 39 | Comparative Example 55 | Comparative Example 56 | Comparative Example 57 |
|---|---|---|---|---|---|---|---|---|---|
| HFO-1132 (E) | Mass % | 50.0 | 60.0 | 10.0 | 20.0 | 30.0 | 40.0 | 50.0 | 10.0 |
| R32 | Mass % | 35.0 | 35.0 | 40.0 | 40.0 | 40.0 | 40.0 | 40.0 | 45.0 |
| R1234yf | Mass % | 15.0 | 5.0 | 50.0 | 40.0 | 30.0 | 20.0 | 10.0 | 45.0 |
| GWP | — | 237 | 237 | 272 | 272 | 272 | 271 | 271 | 306 |
| COP Ratio | % (relative to R410A) | 99.0 | 98.8 | 101.3 | 100.6 | 99.9 | 99.4 | 99.0 | 101.3 |
| Refrigerating Capacity Ratio | % (relative to R410A) | 103.2 | 107.5 | 86.0 | 91.7 | 96.9 | 101.8 | 106.3 | 89.3 |

TABLE 129

| Item | Unit | Example 40 | Example 41 | Comparative Example 58 | Comparative Example 59 | Comparative Example 60 | Example 42 | Comparative Example 61 | Comparative Example 62 |
|---|---|---|---|---|---|---|---|---|---|
| HFO-1132 (E) | Mass % | 20.0 | 30.0 | 40.0 | 50.0 | 10.0 | 20.0 | 30.0 | 40.0 |
| R32 | Mass % | 45.0 | 45.0 | 45.0 | 45.0 | 50.0 | 50.0 | 50.0 | 50.0 |
| R1234yf | Mass % | 35.0 | 25.0 | 15.0 | 5.0 | 40.0 | 30.0 | 20.0 | 10.0 |
| GWP | — | 305 | 305 | 305 | 304 | 339 | 339 | 339 | 338 |
| COP Ratio | % (relative to R410A) | 100.6 | 100.0 | 99.5 | 99.1 | 101.3 | 100.6 | 100.0 | 99.5 |

TABLE 129-continued

| Item | Unit | Example 40 | Example 41 | Comparative Example 58 | Comparative Example 59 | Comparative Example 60 | Example 42 | Comparative Example 61 | Comparative Example 62 |
|---|---|---|---|---|---|---|---|---|---|
| Refrigerating Capacity Ratio | % (relative to R410A) | 94.9 | 100.0 | 104.7 | 109.2 | 92.4 | 97.8 | 102.9 | 107.5 |

TABLE 130

| Item | Unit | Comparative Example 63 | Comparative Example 64 | Comparative Example 65 | Comparative Example 66 | Example 43 | Example 44 | Example 45 | Example 46 |
|---|---|---|---|---|---|---|---|---|---|
| HFO-1132 (E) | Mass % | 10.0 | 20.0 | 30.0 | 40.0 | 56.0 | 59.0 | 62.0 | 65.0 |
| R32 | Mass % | 55.0 | 55.0 | 55.0 | 55.0 | 3.0 | 3.0 | 3.0 | 3.0 |
| R1234yf | Mass % | 35.0 | 25.0 | 15.0 | 5.0 | 41.0 | 38.0 | 35.0 | 32.0 |
| GWP | — | 373 | 372 | 372 | 372 | 22 | 22 | 22 | 22 |
| COP Ratio | % (relative to R410A) | 101.4 | 100.7 | 100.1 | 99.6 | 100.1 | 100.0 | 99.9 | 99.8 |
| Refrigerating Capacity Ratio | % (relative to R410A) | 95.3 | 100.6 | 105.6 | 110.2 | 81.7 | 83.2 | 84.6 | 86.0 |

TABLE 131

| Item | Unit | Example 47 | Example 48 | Example 49 | Example 50 | Example 51 | Example 52 | Example 53 | Example 54 |
|---|---|---|---|---|---|---|---|---|---|
| HFO-1132 (E) | Mass % | 49.0 | 52.0 | 55.0 | 58.0 | 61.0 | 43.0 | 46.0 | 49.0 |
| R32 | Mass % | 6.0 | 6.0 | 6.0 | 6.0 | 6.0 | 9.0 | 9.0 | 9.0 |
| R1234yf | Mass % | 45.0 | 42.0 | 39.0 | 36.0 | 33.0 | 48.0 | 45.0 | 42.0 |
| GWP | — | 43 | 43 | 43 | 43 | 42 | 63 | 63 | 63 |
| COP Ratio | % (relative to R410A) | 100.2 | 100.0 | 99.9 | 99.8 | 99.7 | 100.3 | 100.1 | 99.9 |
| Refrigerating Capacity Ratio | % (relative to R410A) | 80.9 | 82.4 | 83.9 | 85.4 | 86.8 | 80.4 | 82.0 | 83.5 |

TABLE 132

| Item | Unit | Example 55 | Example 56 | Example 57 | Example 58 | Example 59 | Example 60 | Example 61 | Example 62 |
|---|---|---|---|---|---|---|---|---|---|
| HFO-1132 (E) | Mass % | 52.0 | 55.0 | 58.0 | 38.0 | 41.0 | 44.0 | 47.0 | 50.0 |
| R32 | Mass % | 9.0 | 9.0 | 9.0 | 12.0 | 12.0 | 12.0 | 12.0 | 12.0 |
| R1234yf | Mass % | 39.0 | 36.0 | 33.0 | 50.0 | 47.0 | 44.0 | 41.0 | 38.0 |
| GWP | — | 63 | 63 | 63 | 83 | 83 | 83 | 83 | 83 |
| COP Ratio | % (relative to R410A) | 99.8 | 99.7 | 99.6 | 100.3 | 100.1 | 100.0 | 99.8 | 99.7 |
| Refrigerating Capacity Ratio | % (relative to R410A) | 85.0 | 86.5 | 87.9 | 80.4 | 82.0 | 83.5 | 85.1 | 86.6 |

TABLE 133

| Item | Unit | Example 63 | Example 64 | Example 65 | Example 66 | Example 67 | Example 68 | Example 69 | Example 70 |
|---|---|---|---|---|---|---|---|---|---|
| HFO-1132 (E) | Mass % | 53.0 | 33.0 | 36.0 | 39.0 | 42.0 | 45.0 | 48.0 | 51.0 |
| R32 | Mass % | 12.0 | 15.0 | 15.0 | 15.0 | 15.0 | 15.0 | 15.0 | 15.0 |
| R1234yf | Mass % | 35.0 | 52.0 | 49.0 | 46.0 | 43.0 | 40.0 | 37.0 | 34.0 |
| GWP | — | 83 | 104 | 104 | 103 | 103 | 103 | 103 | 103 |
| COP Ratio | % (relative to R410A) | 99.6 | 100.5 | 100.3 | 100.1 | 99.9 | 99.7 | 99.6 | 99.5 |

TABLE 133-continued

| Item | Unit | Example 63 | Example 64 | Example 65 | Example 66 | Example 67 | Example 68 | Example 69 | Example 70 |
|---|---|---|---|---|---|---|---|---|---|
| Refrigerating Capacity Ratio | % (relative to R410A) | 88.0 | 80.3 | 81.9 | 83.5 | 85.0 | 86.5 | 88.0 | 89.5 |

TABLE 134

| Item | Unit | Example 71 | Example 72 | Example 73 | Example 74 | Example 75 | Example 76 | Example 77 | Example 78 |
|---|---|---|---|---|---|---|---|---|---|
| HFO-1132 (E) | Mass % | 29.0 | 32.0 | 35.0 | 38.0 | 41.0 | 44.0 | 47.0 | 36.0 |
| R32 | Mass % | 18.0 | 18.0 | 18.0 | 18.0 | 18.0 | 18.0 | 18.0 | 3.0 |
| R1234yf | Mass % | 53.0 | 50.0 | 47.0 | 44.0 | 41.0 | 38.0 | 35.0 | 61.0 |
| GWP | — | 124 | 124 | 124 | 124 | 124 | 123 | 123 | 23 |
| COP Ratio | % (relative to R410A) | 100.6 | 100.3 | 100.1 | 99.9 | 99.8 | 99.6 | 99.5 | 101.3 |
| Refrigerating Capacity Ratio | % (relative to R410A) | 80.6 | 82.2 | 83.8 | 85.4 | 86.9 | 88.4 | 89.9 | 71.0 |

TABLE 135

| Item | Unit | Example 79 | Example 80 | Example 81 | Example 82 | Example 83 | Example 84 | Example 85 | Example 86 |
|---|---|---|---|---|---|---|---|---|---|
| HFO-1132(E) | Mass % | 39.0 | 42.0 | 30.0 | 33.0 | 36.0 | 26.0 | 29.0 | 32.0 |
| R32 | Mass % | 3.0 | 3.0 | 6.0 | 6.0 | 6.0 | 9.0 | 9.0 | 9.0 |
| R1234yf | Mass % | 58.0 | 55.0 | 64.0 | 61.0 | 58.0 | 65.0 | 62.0 | 59.0 |
| GWP | — | 23 | 23 | 43 | 43 | 43 | 64 | 64 | 63 |
| COP Ratio | % (relative to R410A) | 101.1 | 100.9 | 101.5 | 101.3 | 101.0 | 101.6 | 101.3 | 101.1 |
| Refrigerating Capacity Ratio | % (relative to R410A) | 72.7 | 74.4 | 70.5 | 72.2 | 73.9 | 71.0 | 72.8 | 74.5 |

TABLE 136

| Item | Unit | Example 87 | Example 88 | Example 89 | Example 90 | Example 91 | Example 92 | Example 93 | Example 94 |
|---|---|---|---|---|---|---|---|---|---|
| HFO-1132(E) | Mass % | 21.0 | 24.0 | 27.0 | 30.0 | 16.0 | 19.0 | 22.0 | 25.0 |
| R32 | Mass % | 12.0 | 12.0 | 12.0 | 12.0 | 15.0 | 15.0 | 15.0 | 15.0 |
| R1234yf | Mass % | 67.0 | 64.0 | 61.0 | 58.0 | 69.0 | 66.0 | 63.0 | 60.0 |
| GWP | — | 84 | 84 | 84 | 84 | 104 | 104 | 104 | 104 |
| COP Ratio | % (relative to R410A) | 101.8 | 101.5 | 101.2 | 101.0 | 102.1 | 101.8 | 101.4 | 101.2 |
| Refrigerating Capacity Ratio | % (relative to R410A) | 70.8 | 72.6 | 74.3 | 76.0 | 70.4 | 72.3 | 74.0 | 75.8 |

TABLE 137

| Item | Unit | Example 95 | Example 96 | Example 97 | Example 98 | Example 99 | Example 100 | Example 101 | Example 102 |
|---|---|---|---|---|---|---|---|---|---|
| HFO-1132(E) | Mass % | 28.0 | 12.0 | 15.0 | 18.0 | 21.0 | 24.0 | 27.0 | 25.0 |
| R32 | Mass % | 15.0 | 18.0 | 18.0 | 18.0 | 18.0 | 18.0 | 18.0 | 21.0 |
| R1234yf | Mass % | 57.0 | 70.0 | 67.0 | 64.0 | 61.0 | 58.0 | 55.0 | 54.0 |
| GWP | — | 104 | 124 | 124 | 124 | 124 | 124 | 124 | 144 |
| COP Ratio | % (relative to R410A) | 100.9 | 102.2 | 101.9 | 101.6 | 101.3 | 101.0 | 100.7 | 100.7 |

TABLE 137-continued

| Item | Unit | Example 95 | Example 96 | Example 97 | Example 98 | Example 99 | Example 100 | Example 101 | Example 102 |
|---|---|---|---|---|---|---|---|---|---|
| Refrigerating Capacity Ratio | % (relative to R410A) | 77.5 | 70.5 | 72.4 | 74.2 | 76.0 | 77.7 | 79.4 | 80.7 |

TABLE 138

| Item | Unit | Example 103 | Example 104 | Example 105 | Example 106 | Example 107 | Example 108 | Example 109 | Example 110 |
|---|---|---|---|---|---|---|---|---|---|
| HFO-1132(E) | Mass % | 21.0 | 24.0 | 17.0 | 20.0 | 23.0 | 13.0 | 16.0 | 19.0 |
| R32 | Mass % | 24.0 | 24.0 | 27.0 | 27.0 | 27.0 | 30.0 | 30.0 | 30.0 |
| R1234yf | Mass % | 55.0 | 52.0 | 56.0 | 53.0 | 50.0 | 57.0 | 54.0 | 51.0 |
| GWP | — | 164 | 164 | 185 | 185 | 184 | 205 | 205 | 205 |
| COP Ratio | % (relative to R410A) | 100.9 | 100.6 | 101.1 | 100.8 | 100.6 | 101.3 | 101.0 | 100.8 |
| Refrigerating Capacity Ratio | % (relative to R410A) | 80.8 | 82.5 | 80.8 | 82.5 | 84.2 | 80.7 | 82.5 | 84.2 |

TABLE 139

| Item | Unit | Example 111 | Example 112 | Example 113 | Example 114 | Example 115 | Example 116 | Example 117 | Example 118 |
|---|---|---|---|---|---|---|---|---|---|
| HFO-1132(E) | Mass % | 22.0 | 9.0 | 12.0 | 15.0 | 18.0 | 21.0 | 8.0 | 12.0 |
| R32 | Mass % | 30.0 | 33.0 | 33.0 | 33.0 | 33.0 | 33.0 | 36.0 | 36.0 |
| R1234yf | Mass % | 48.0 | 58.0 | 55.0 | 52.0 | 49.0 | 46.0 | 56.0 | 52.0 |
| GWP | — | 205 | 225 | 225 | 225 | 225 | 225 | 245 | 245 |
| COP Ratio | % (relative to R410A) | 100.5 | 101.6 | 101.3 | 101.0 | 100.8 | 100.5 | 101.6 | 101.2 |
| Refrigerating Capacity Ratio | % (relative to R410A) | 85.9 | 80.5 | 82.3 | 84.1 | 85.8 | 87.5 | 82.0 | 84.4 |

TABLE 140

| Item | Unit | Example 119 | Example 120 | Example 121 | Example 122 | Example 123 | Example 124 | Example 125 | Example 126 |
|---|---|---|---|---|---|---|---|---|---|
| HFO-1132(E) | Mass % | 15.0 | 18.0 | 21.0 | 42.0 | 39.0 | 34.0 | 37.0 | 30.0 |
| R32 | Mass % | 36.0 | 36.0 | 36.0 | 25.0 | 28.0 | 31.0 | 31.0 | 34.0 |
| R1234yf | Mass % | 49.0 | 46.0 | 43.0 | 33.0 | 33.0 | 35.0 | 32.0 | 36.0 |
| GWP | — | 245 | 245 | 245 | 170 | 191 | 211 | 211 | 231 |
| COP Ratio | % (relative to R410A) | 101.0 | 100.7 | 100.5 | 99.5 | 99.5 | 99.8 | 99.6 | 99.9 |
| Refrigerating Capacity Ratio | % (relative to R410A) | 86.2 | 87.9 | 89.6 | 92.7 | 93.4 | 93.0 | 94.5 | 93.0 |

TABLE 141

| Item | Unit | Example 127 | Example 128 | Example 129 | Example 130 | Example 131 | Example 132 | Example 133 | Example 134 |
|---|---|---|---|---|---|---|---|---|---|
| HFO-1132(E) | Mass % | 33.0 | 36.0 | 24.0 | 27.0 | 30.0 | 33.0 | 23.0 | 26.0 |
| R32 | Mass % | 34.0 | 34.0 | 37.0 | 37.0 | 37.0 | 37.0 | 40.0 | 40.0 |
| R1234yf | Mass % | 33.0 | 30.0 | 39.0 | 36.0 | 33.0 | 30.0 | 37.0 | 34.0 |
| GWP | — | 231 | 231 | 252 | 251 | 251 | 251 | 272 | 272 |
| COP Ratio | % (relative to R410A) | 99.8 | 99.6 | 100.3 | 100.1 | 99.9 | 99.8 | 100.4 | 100.2 |

TABLE 141-continued

| Item | Unit | Example 127 | Example 128 | Example 129 | Example 130 | Example 131 | Example 132 | Example 133 | Example 134 |
|---|---|---|---|---|---|---|---|---|---|
| Refrigerating Capacity Ratio | % (relative to R410A) | 94.5 | 96.0 | 91.9 | 93.4 | 95.0 | 96.5 | 93.3 | 94.9 |

TABLE 142

| Item | Unit | Example 135 | Example 136 | Example 137 | Example 138 | Example 139 | Example 140 | Example 141 | Example 142 |
|---|---|---|---|---|---|---|---|---|---|
| HFO-1132(E) | Mass % | 29.0 | 32.0 | 19.0 | 22.0 | 25.0 | 28.0 | 31.0 | 18.0 |
| R32 | Mass % | 40.0 | 40.0 | 43.0 | 43.0 | 43.0 | 43.0 | 43.0 | 46.0 |
| R1234yf | Mass % | 31.0 | 28.0 | 38.0 | 35.0 | 32.0 | 29.0 | 26.0 | 36.0 |
| GWP | — | 272 | 271 | 292 | 292 | 292 | 292 | 292 | 312 |
| COP Ratio | % (relative to R410A) | 100.0 | 99.8 | 100.6 | 100.4 | 100.2 | 100.1 | 99.9 | 100.7 |
| Refrigerating Capacity Ratio | % (relative to R410A) | 96.4 | 97.9 | 93.1 | 94.7 | 96.2 | 97.8 | 99.3 | 94.4 |

TABLE 143

| Item | Unit | Example 143 | Example 144 | Example 145 | Example 146 | Example 147 | Example 148 | Example 149 | Example 150 |
|---|---|---|---|---|---|---|---|---|---|
| HFO-1132(E) | Mass % | 21.0 | 23.0 | 26.0 | 29.0 | 13.0 | 16.0 | 19.0 | 22.0 |
| R32 | Mass % | 46.0 | 46.0 | 46.0 | 46.0 | 49.0 | 49.0 | 49.0 | 49.0 |
| R1234yf | Mass % | 33.0 | 31.0 | 28.0 | 25.0 | 38.0 | 35.0 | 32.0 | 29.0 |
| GWP | — | 312 | 312 | 312 | 312 | 332 | 332 | 332 | 332 |
| COP Ratio | % (relative to R410A) | 100.5 | 100.4 | 100.2 | 100.0 | 101.1 | 100.9 | 100.7 | 100.5 |
| Refrigerating Capacity Ratio | % (relative to R410A) | 96.0 | 97.0 | 98.6 | 100.1 | 93.5 | 95.1 | 96.7 | 98.3 |

TABLE 144

| Item | Unit | Example 151 | Example 152 |
|---|---|---|---|
| HFO-1132(E) | Mass % | 25.0 | 28.0 |
| R32 | Mass % | 49.0 | 49.0 |
| R1234yf | Mass % | 26.0 | 23.0 |
| GWP | — | 332 | 332 |
| COP Ratio | % (relative to R410A) | 100.3 | 100.1 |
| Refrigerating Capacity Ratio | % (relative to R410A) | 99.8 | 101.3 |

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI),
the line segment IJ is represented by coordinates $(0.0236y^2-1.7616y+72.0, y, -0.0236y^2+0.7616y+28.0)$,
the line segment NE is represented by coordinates $(0.012y^2-1.9003y+58.3, y, -0.012y^2+0.9003y+41.7)$, and
the line segments JN and EI are straight lines, the refrigerant D has a refrigerating capacity ratio of 80% or more relative to R410A, a GWP of 125 or less, and a WCF lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM),
the line segment MM' is represented by coordinates $(0.132y^2-3.34y+52.6, y, -0.132y^2+2.34y+47.4)$,
the line segment M'N is represented by coordinates $(0.0596y^2-2.2541y+48.98, y, -0.0596y^2+1.2541y+51.02)$,
the line segment VG is represented by coordinates $(0.0123y^2-1.8033y+39.6, y, -0.0123y^2+0.8033y+60.4)$, and
the line segments NV and GM are straight lines, the refrigerant D according to the present disclosure has a refrigerating capacity ratio of 70% or more relative to R410A, a GWP of 125 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments, the line segment ON is represented by coordinates $(0.0072y^2-0.6701y+37.512, y, -0.0072y^2-0.3299y+62.488)$, the line segment NU is represented by coordinates $(0.0083y^2-1.7403y+56.635, y, -0.0083y^2+0.7403y+43.365)$, and the line segment UO is a straight line, the refrigerant D according to the present disclosure has a refrigerating capacity ratio of 80% or more relative to R410A, a GWP of 250 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments, the line segment QR is represented by coordinates $(0.0099y^2-1.975y+84.765, y, -0.0099y^2+0.975y+15.235)$, the line segment RT is represented by coordinates $(0.0082y^2-1.8683y+83.126, y, -0.0082y^2+0.8683y+16.874)$, the line segment LK is represented by coordinates $(0.0049y^2-0.8842y+61.488, y, -0.0049y^2-0.1158y+38.512)$, the line segment KQ is represented by coordinates $(0.0095y^2-1.2222y+67.676, y, -0.0095y^2+0.2222y+32.324)$, and the line segment TL is a straight line, the refrigerant D according to the present disclosure has a refrigerating capacity ratio of 92.5% or more relative to R410A, a GWP of 350 or less, and a WCF lower flammability.

The results further indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments, the line segment PS is represented by coordinates $(0.0064y^2-0.7103y+40.1, y, -0.0064y^2-0.2897y+59.9)$, the line segment ST is represented by coordinates $(0.0082y^2-1.8683y+83.126, y, -0.0082y^2+0.8683y+16.874)$, and the line segment TP is a straight line, the refrigerant D according to the present disclosure has a refrigerating capacity ratio of 92.5% or more relative to R410A, a GWP of 350 or less, and an ASHRAE lower flammability.

(5-5) Refrigerant E

The refrigerant E according to the present disclosure is a mixed refrigerant comprising trans-1,2-difluoroethylene (HFO-1132(E)), trifluoroethylene (HFO-1123), and difluoromethane (R32).

The refrigerant E according to the present disclosure has various properties that are desirable as an R410A-alternative refrigerant, i.e., a coefficient of performance equivalent to that of R410A and a sufficiently low GWP.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments IK, KB', B'H, HR, RG, and GI that connect the following 6 points:
point I (72.0, 28.0, 0.0),
point K (48.4, 33.2, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GI);

the line segment IK is represented by coordinates $(0.025z^2-1.7429z+72.00, -0.025z^2+0.7429z+28.0, z)$, the line segment HR is represented by coordinates $(-0.3123z^2+4.234z+11.06, 0.3123z^2-5.234z+88.94, z)$, the line segment RG is represented by coordinates $(-0.0491z^2-1.1544z+38.5, 0.0491z^2+0.1544z+61.5, z)$, and the line segments KB' and GI are straight lines. When the requirements above are satisfied, the refrigerant according to the present disclosure has WCF lower flammability, a COP ratio of 93% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments IJ, JR, RG, and GI that connect the following 4 points:
point I (72.0, 28.0, 0.0),
point J (57.7, 32.8, 9.5),
point R (23.1, 67.4, 9.5), and
point G (38.5, 61.5, 0.0),
or on these line segments (excluding the points on the line segment GI);

the line segment IJ is represented by coordinates $(0.025z^2-1.7429z+72.0, -0.025z^2+0.7429z+28.0, z)$, the line segment RG is represented by coordinates $(-0.0491z^2-1.1544z+38.5, 0.0491z^2+0.1544z+61.5, z)$, and the line segments JR and GI are straight lines. When the requirements above are satisfied, the refrigerant according to the present disclosure has WCF lower flammability, a COP ratio of 93% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments MP, PB', B'H, HR, RG, and GM that connect the following 6 points:
point M (47.1, 52.9, 0.0),
point P (31.8, 49.8, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GM);
the line segment MP is represented by coordinates $(0.0083z^2-0.984z+47.1, -0.0083z^2-0.016z+52.9, z)$,
the line segment HR is represented by coordinates $(-0.3123z^2+4.234z+11.06, 0.3123z^2-5.234z+88.94, z)$,
the line segment RG is represented by coordinates $(-0.0491z^2-1.1544z+38.5, 0.0491z^2+0.1544z+61.5, z)$, and
the line segments PB' and GM are straight lines. When the requirements above are satisfied, the refrigerant according to the present disclosure has ASHRAE lower flammability, a COP ratio of 93% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments MN, NR, RG, and GM that connect the following 4 points:
point M (47.1, 52.9, 0.0),
point N (38.5, 52.1, 9.5),
point R (23.1, 67.4, 9.5), and
point G (38.5, 61.5, 0.0),
or on these line segments (excluding the points on the line segment GM);
the line segment MN is represented by coordinates $(0.0083z^2-0.984z+47.1, -0.0083z^2-0.016z+52.9, z)$,
the line segment RG is represented by coordinates $(-0.0491z^2-1.1544z+38.5, 0.0491z^2+0.1544z+61.5, z)$,
the line segments NR and GM are straight lines. When the requirements above are satisfied, the refrigerant according to the present disclosure has ASHRAE lower flammability, a COP ratio of 93% or more relative to that of R410A, and a GWP of 65 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments PS, ST, and TP that connect the following 3 points:
point P (31.8, 49.8, 18.4),
point S (25.4, 56.2, 18.4), and
point T (34.8, 51.0, 14.2),
or on these line segments;

the line segment ST is represented by coordinates $(-0.0982z^2+0.9622z+40.931, 0.0982z^2-1.9622z+59.069, z)$,
the line segment TP is represented by coordinates $(0.0083z^2-0.984z+47.1, -0.0083z^2-0.016z+52.9, z)$, and
the line segment PS is a straight line. When the requirements above are satisfied, the refrigerant according to the present disclosure has ASHRAE lower flammability, a COP ratio of 94.5% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments QB", B"D, DU, and UQ that connect the following 4 points:
point Q (28.6, 34.4, 37.0),
point B" (0.0, 63.0, 37.0),
point D (0.0, 67.0, 33.0), and
point U (28.7, 41.2, 30.1),
or on these line segments (excluding the points on the line segment B"D);
the line segment DU is represented by coordinates $(-3.4962z^2+210.71z-3146.1, 3.4962z^2-211.71z+3246.1, z)$,
the line segment UQ is represented by coordinates $(0.0135z^2-0.9181z+44.133, -0.0135z^2-0.0819z+55.867, z)$, and
the line segments QB" and B"D are straight lines. When the requirements above are satisfied, the refrigerant according to the present disclosure has ASHRAE lower flammability, a COP ratio of 96% or more relative to that of R410A, and a GWP of 250 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc', c'd', d'e', e'a', and a'O that connect the following 5 points:
point O (100.0, 0.0, 0.0),
point c' (56.7, 43.3, 0.0),
point d' (52.2, 38.3, 9.5),
point e' (41.8, 39.8, 18.4), and
point a' (81.6, 0.0, 18.4),
or on the line segments c'd', d'e', and e'a' (excluding the points c' and a');
the line segment c'd' is represented by coordinates $(-0.0297z^2-0.1915z+56.7, 0.0297z^2+1.1915z+43.3, z)$,
the line segment d'e' is represented by coordinates $(-0.0535z^2+0.3229z+53.957, 0.0535z^2+0.6771z+46.043, z)$, and
the line segments Oc', e'a', and a'O are straight lines. When the requirements above are satisfied, the refrigerant according to the present disclosure has a COP ratio of 92.5% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc, cd, de, ea', and a'O that connect the following 5 points:

point O (100.0, 0.0, 0.0),
point c (77.7, 22.3, 0.0),
point d (76.3, 14.2, 9.5),
point e (72.2, 9.4, 18.4), and
point a' (81.6, 0.0, 18.4),
or on the line segments cd, de, and ea' (excluding the points c and a');

the line segment cde is represented by coordinates ($-0.017z^2+0.0148z+77.684$, $0.017z^2+0.9852z+22.316$, z), and the line segments Oc, ea', and a'O are straight lines. When the requirements above are satisfied, the refrigerant according to the present disclosure has a COP ratio of 95% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc', c'd', d'a, and aO that connect the following 5 points:

point O (100.0, 0.0, 0.0),
point c' (56.7, 43.3, 0.0),
point d' (52.2, 38.3, 9.5), and
point a (90.5, 0.0, 9.5),
or on the line segments c'd' and d'a (excluding the points c' and a);

the line segment c'd' is represented by coordinates ($-0.0297z^2-0.1915z+56.7$, $0.0297z^2+1.1915z+43.3$, z), and the line segments Oc', d'a, and aO are straight lines. When the requirements above are satisfied, the refrigerant according to the present disclosure has a COP ratio of 93.5% or more relative to that of R410A, and a GWP of 65 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc, cd, da, and aO that connect the following 4 points:

point O (100.0, 0.0, 0.0),
point c (77.7, 22.3, 0.0),
point d (76.3, 14.2, 9.5), and
point a (90.5, 0.0, 9.5),
or on the line segments cd and da (excluding the points c and a);

the line segment cd is represented by coordinates ($-0.017z^2+0.0148z+77.684$, $0.017z^2+0.9852z+22.316$, z), and the line segments Oc, da, and aO are straight lines. When the requirements above are satisfied, the refrigerant according to the present disclosure has a COP ratio of 95% or more relative to that of R410A, and a GWP of 65 or less.

The refrigerant E according to the present disclosure may further comprise other additional refrigerants in addition to HFO-1132(E), HFO-1123, and R32, as long as the above properties and effects are not impaired. In this respect, the refrigerant according to the present disclosure preferably comprises HFO-1132(E), HFO-1123, and R32 in a total amount of 99.5 mass % or more, more preferably 99.75 mass % or more, and even more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant E)

The present disclosure is described in more detail below with reference to Examples of refrigerant E. However, the refrigerant E is not limited to the Examples.

Mixed refrigerants were prepared by mixing HFO-1132 (E), HFO-1123, and R32 at mass % based on their sum shown in Tables 145 and 146.

The composition of each mixture was defined as WCF. A leak simulation was performed using National Institute of Science and Technology (NIST) Standard Reference Data Base Refleak Version 4.0 under the conditions for equipment, storage, shipping, leak, and recharge according to the ASHRAE Standard 34-2013. The most flammable fraction was defined as WCFF.

For each mixed refrigerant, the burning velocity was measured according to the ANSI/ASHRAE Standard 34-2013. When the burning velocities of the WCF composition and the WCFF composition are 10 cm/s or less, the flammability of such a refrigerant is classified as Class 2L (lower flammability) in the ASHRAE flammability classification.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Tables 145 and 146 show the results.

TABLE 145

| Item | | Unit | I | J | K | L |
|---|---|---|---|---|---|---|
| WCF | HFO-1132(E) | mass % | 72.0 | 57.7 | 48.4 | 35.5 |
| | HFO-1123 | mass % | 28.0 | 32.8 | 33.2 | 27.5 |
| | R32 | mass % | 0.0 | 9.5 | 18.4 | 37.0 |
| Burning velocity (WCF) | | cm/s | 10 | 10 | 10 | 10 |

TABLE 146

| Item | | Unit | M | N | T | P | U | Q |
|---|---|---|---|---|---|---|---|---|
| WCF | HFO-1132(E) | mass % | 47.1 | 38.5 | 34.8 | 31.8 | 28.7 | 28.6 |
| | HFO-1123 | mass % | 52.9 | 52.1 | 51.0 | 49.8 | 41.2 | 34.4 |
| | R32 | mass % | 0.0 | 9.5 | 14.2 | 18.4 | 30.1 | 37.0 |
| Leak condition that results in WCFF | | | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side |
| WCFF | HFO-1132(E) | mass % | 72.0 | 58.9 | 51.5 | 44.6 | 31.4 | 27.1 |
| | HFO-1123 | mass % | 28.0 | 32.4 | 33.1 | 32.6 | 23.2 | 18.3 |
| | R32 | mass % | 0.0 | 8.7 | 15.4 | 22.8 | 45.4 | 54.6 |
| Burning velocity (WCF) | | cm/s | 8 or less | 8 or less | 8 or less | 8 or less | 8 or less | 8 or less |
| Burning velocity (WCFF) | | cm/s | 10 | 10 | 10 | 10 | 10 | 10 |

The results in Table 1 indicate that in a ternary composition diagram of a mixed refrigerant of HFO-1132(E), HFO-1123, and R32 in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below line segments IK and KL that connect the following 3 points:
point I (72.0, 28.0, 0.0),
point K (48.4, 33.2, 18.4), and
point L (35.5, 27.5, 37.0);
the line segment IK is represented by coordinates $(0.025z^2-1.7429z+72.00, -0.025z^2+0.7429z+28.00, z)$, and
the line segment KL is represented by coordinates $(0.0098z^2-1.238z+67.852, -0.0098z^2+0.238z+32.148, z)$,
it can be determined that the refrigerant has WCF lower flammability.

For the points on the line segment IK, an approximate curve $(x=0.025z^2-1.7429z+72.00)$ was obtained from three points, i.e., I (72.0, 28.0, 0.0), J (57.7, 32.8, 9.5), and K (48.4, 33.2, 18.4) by using the least-square method to determine coordinates $(x=0.025z^2-1.7429z+72.00, y=100-z-x=-0.00922z^2+0.2114z+32.443, z)$.

Likewise, for the points on the line segment KL, an approximate curve was determined from three points, i.e., K (48.4, 33.2, 18.4), Example 10 (41.1, 31.2, 27.7), and L (35.5, 27.5, 37.0) by using the least-square method to determine coordinates.

The results in Table 146 indicate that in a ternary composition diagram of a mixed refrigerant of HFO-1132(E), HFO-1123, and R32 in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below line segments MP and PQ that connect the following 3 points:
point M (47.1, 52.9, 0.0),
point P (31.8, 49.8, 18.4), and
point Q (28.6, 34.4, 37.0),
it can be determined that the refrigerant has ASHRAE lower flammability.

In the above, the line segment MP is represented by coordinates $(0.0083z^2-0.984z+47.1, -0.0083z^2-0.016z+52.9, z)$, and the line segment PQ is represented by coordinates $(0.0135z^2-0.9181z+44.133, -0.0135z^2-0.0819z+55.867, z)$.

For the points on the line segment MP, an approximate curve was obtained from three points, i.e., points M, N, and P, by using the least-square method to determine coordinates. For the points on the line segment PQ, an approximate curve was obtained from three points, i.e., points P, U, and Q, by using the least-square method to determine coordinates.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP ratio and the refrigerating capacity (which may be referred to as "cooling capacity" or "capacity") ratio relative to those of R410 of the mixed refrigerants were determined. The conditions for calculation were as described below.
Evaporating temperature: 5° C.
Condensation temperature: 45° C.
Degree of superheating: 5K
Degree of subcooling: 5K
Compressor efficiency: 70%

Tables 147 to 166 show these values together with the GWP of each mixed refrigerant.

TABLE 147

| Item | Unit | Comparative Example 1 | Comparative Example 2 A | Comparative Example 3 B | Comparative Example 4 A' | Comparative Example 5 B' | Comparative Example 6 A" | Comparative Example 7 B" |
|---|---|---|---|---|---|---|---|---|
| HFO-1132(E) | mass % | R410A | 90.5 | 0.0 | 81.6 | 0.0 | 63.0 | 0.0 |
| HFO-1123 | mass % | | 0.0 | 90.5 | 0.0 | 81.6 | 0.0 | 63.0 |

TABLE 147-continued

| Item | Unit | Comparative Example 1 | Comparative Example 2 A | Comparative Example 3 B | Comparative Example 4 A' | Comparative Example 5 B' | Comparative Example 6 A" | Comparative Example 7 B" |
|---|---|---|---|---|---|---|---|---|
| R32 | mass % | | 9.5 | 9.5 | 18.4 | 18.4 | 37.0 | 37.0 |
| GWP | — | 2088 | 65 | 65 | 125 | 125 | 250 | 250 |
| COP ratio | % (relative to R410A) | 100 | 99.1 | 92.0 | 98.7 | 93.4 | 98.7 | 96.1 |
| Refrigerating capacity ratio | % (relative to R410A) | 100 | 102.2 | 111.6 | 105.3 | 113.7 | 110.0 | 115.4 |

TABLE 148

| Item | Unit | Comparative Example 8 O | Comparative Example 9 C | Comparative Example 10 | Example 1 U | Example 2 | Comparative Example 11 D |
|---|---|---|---|---|---|---|---|
| HFO-1132(E) | mass % | 100.0 | 50.0 | 41.1 | 28.7 | 15.2 | 0.0 |
| HFO-1123 | mass % | 0.0 | 31.6 | 34.6 | 41.2 | 52.7 | 67.0 |
| R32 | mass % | 0.0 | 18.4 | 24.3 | 30.1 | 32.1 | 33.0 |
| GWP | — | 1 | 125 | 165 | 204 | 217 | 228 |
| COP ratio | % (relative to R410A) | 99.7 | 96.0 | 96.0 | 96.0 | 96.0 | 96.0 |
| Refrigerating capacity ratio | % (relative to R410A) | 98.3 | 109.9 | 111.7 | 113.5 | 114.8 | 115.4 |

TABLE 149

| Item | Unit | Comparative Example 12 E | Comparative Example 13 | Example 3 T | Example 4 S | Comparative Example 14 F |
|---|---|---|---|---|---|---|
| HFO-1132(E) | mass % | 53.4 | 43.4 | 34.8 | 25.4 | 0.0 |
| HFO-1123 | mass % | 46.6 | 47.1 | 51.0 | 56.2 | 74.1 |
| R32 | mass % | 0.0 | 9.5 | 14.2 | 18.4 | 25.9 |
| GWP | — | 1 | 65 | 97 | 125 | 176 |
| COP ratio | % (relative to R410A) | 94.5 | 94.5 | 94.5 | 94.5 | 94.5 |
| Refrigerating capacity ratio | % (relative to R410A) | 105.6 | 109.2 | 110.8 | 112.3 | 114.8 |

TABLE 150

| Item | Unit | Comparative Example 15 G | Example 5 | Example 6 R | Example 7 | Comparative Example 16 H |
|---|---|---|---|---|---|---|
| HFO-1132(E) | mass % | 38.5 | 31.5 | 23.1 | 16.9 | 0.0 |
| HFO-1123 | mass % | 61.5 | 63.5 | 67.4 | 71.1 | 84.2 |
| R32 | mass % | 0.0 | 5.0 | 9.5 | 12.0 | 15.8 |
| GWP | — | 1 | 35 | 65 | 82 | 107 |
| COP ratio | % (relative to R410A) | 93.0 | 93.0 | 93.0 | 93.0 | 93.0 |
| Refrigerating capacity ratio | % (relative to R410A) | 107.0 | 109.1 | 110.9 | 111.9 | 113.2 |

TABLE 151

| Item | Unit | Comparative Example 17 I | Example 8 J | Example 9 K | Comparative Example 18 | Comparative Example 19 L |
|---|---|---|---|---|---|---|
| HFO-1132(E) | mass % | 72.0 | 57.7 | 48.4 | 41.1 | 35.5 |
| HFO-1123 | mass % | 28.0 | 32.8 | 33.2 | 31.2 | 27.5 |
| R32 | mass % | 0.0 | 9.5 | 18.4 | 27.7 | 37.0 |
| GWP | — | 1 | 65 | 125 | 188 | 250 |
| COP ratio | % (relative to R410A) | 96.6 | 95.8 | 95.9 | 96.4 | 97.1 |
| Refrigerating capacity ratio | % (relative to R410A) | 103.1 | 107.4 | 110.1 | 112.1 | 113.2 |

TABLE 152

| Item | Unit | Comparative Example 20 M | Example 10 N | Example 11 P | Example 12 Q |
|---|---|---|---|---|---|
| HFO-1132(E) | mass % | 47.1 | 38.5 | 31.8 | 28.6 |
| HFO-1123 | mass % | 52.9 | 52.1 | 49.8 | 34.4 |
| R32 | mass % | 0.0 | 9.5 | 18.4 | 37.0 |
| GWP | — | 1 | 65 | 125 | 250 |
| COP ratio | % (relative to R410A) | 93.9 | 94.1 | 94.7 | 96.9 |
| Refrigerating capacity ratio | % (relative to R410A) | 106.2 | 109.7 | 112.0 | 114.1 |

TABLE 153

| Item | Unit | Comparative Example 22 | Comparative Example 23 | Comparative Example 24 | Example 14 | Example 15 | Example 16 | Comparative Example 25 | Comparative Example 26 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R32 | mass % | 5.0 | 5.0 | 5.0 | 5.0 | 5.0 | 5.0 | 5.0 | 5.0 |
| GWP | — | 35 | 35 | 35 | 35 | 35 | 35 | 35 | 35 |
| COP ratio | % (relative to R410A) | 91.7 | 92.2 | 92.9 | 93.7 | 94.6 | 95.6 | 96.7 | 97.7 |
| Refrigerating capacity ratio | % (relative to R410A) | 110.1 | 109.8 | 109.2 | 108.4 | 107.4 | 106.1 | 104.7 | 103.1 |

TABLE 154

| Item | Unit | Comparative Example 27 | Comparative Example28 | Comparative Example 29 | Example 17 | Example 18 | Example 19 | Comparative Example 30 | Comparative Example 31 |
|---|---|---|---|---|---|---|---|---|---|
| HFO-1132(E) | mass % | 90.0 | 10.0 | 20.0 | 30.0 | 40.0 | 50.0 | 60.0 | 70.0 |
| HFO-1123 | mass % | 5.0 | 80.0 | 70.0 | 60.0 | 50.0 | 40.0 | 30.0 | 20.0 |
| R32 | mass % | 5.0 | 10.0 | 10.0 | 10.0 | 10.0 | 10.0 | 10.0 | 10.0 |
| GWP | — | 35 | 68 | 68 | 68 | 68 | 68 | 68 | 68 |
| COP ratio | % (relative to R410A) | 98.8 | 92.4 | 92.9 | 93.5 | 94.3 | 95.1 | 96.1 | 97.0 |
| Refrigerating capacity ratio | % (relative to R410A) | 101.4 | 111.7 | 111.3 | 110.6 | 109.6 | 108.5 | 107.2 | 105.7 |

TABLE 155

| Item | Unit | Comparative Example 32 | Example 20 | Example 21 | Example 22 | Example 23 | Example 24 | Comparative Example 33 | Comparative Example 34 |
|---|---|---|---|---|---|---|---|---|---|
| HFO-1132(E) | mass % | 80.0 | 10.0 | 20.0 | 30.0 | 40.0 | 50.0 | 60.0 | 70.0 |
| HFO-1123 | mass % | 10.0 | 75.0 | 65.0 | 55.0 | 45.0 | 35.0 | 25.0 | 15.0 |

TABLE 155-continued

| Item | Unit | Comparative Example 32 | Example 20 | Example 21 | Example 22 | Example 23 | Example 24 | Comparative Example 33 | Comparative Example 34 |
|---|---|---|---|---|---|---|---|---|---|
| R32 | mass % | 10.0 | 15.0 | 15.0 | 15.0 | 15.0 | 15.0 | 15.0 | 15.0 |
| GWP | — | 68 | 102 | 102 | 102 | 102 | 102 | 102 | 102 |
| COP ratio | % (relative to R410A) | 98.0 | 93.1 | 93.6 | 94.2 | 94.9 | 95.6 | 96.5 | 97.4 |
| Refrigerating capacity ratio | % (relative to R410A) | 104.1 | 112.9 | 112.4 | 111.6 | 110.6 | 109.4 | 108.1 | 106.6 |

TABLE 156

| Item | Unit | Comparative Example 35 | Comparative Example 36 | Comparative Example 37 | Comparative Example 38 | Comparative Example 39 | Comparative Example 40 | Comparative Example 41 | Comparative Example 42 |
|---|---|---|---|---|---|---|---|---|---|
| HFO-1132(E) | mass % | 80.0 | 10.0 | 20.0 | 30.0 | 40.0 | 50.0 | 60.0 | 70.0 |
| HFO-1123 | mass % | 5.0 | 70.0 | 60.0 | 50.0 | 40.0 | 30.0 | 20.0 | 10.0 |
| R32 | mass % | 15.0 | 20.0 | 20.0 | 20.0 | 20.0 | 20.0 | 20.0 | 20.0 |
| GWP | — | 102 | 136 | 136 | 136 | 136 | 136 | 136 | 136 |
| COP ratio | % (relative to R410A) | 98.3 | 93.9 | 94.3 | 94.8 | 95.4 | 96.2 | 97.0 | 97.8 |
| Refrigerating capacity ratio | % (relative to R410A) | 105.0 | 113.8 | 113.2 | 112.4 | 111.4 | 110.2 | 108.8 | 107.3 |

TABLE 157

| Item | Unit | Comparative Example 43 | Comparative Example 44 | Comparative Example 45 | Comparative Example 46 | Comparative Example 47 | Comparative Example 48 | Comparative Example 49 | Comparative Example 50 |
|---|---|---|---|---|---|---|---|---|---|
| HFO-1132(E) | mass % | 10.0 | 20.0 | 30.0 | 40.0 | 50.0 | 60.0 | 70.0 | 10.0 |
| HFO-1123 | mass % | 65.0 | 55.0 | 45.0 | 35.0 | 25.0 | 15.0 | 5.0 | 60.0 |
| R32 | mass % | 25.0 | 25.0 | 25.0 | 25.0 | 25.0 | 25.0 | 25.0 | 30.0 |
| GWP | — | 170 | 170 | 170 | 170 | 170 | 170 | 170 | 203 |
| COP ratio | % (relative to R410A) | 94.6 | 94.9 | 95.4 | 96.0 | 96.7 | 97.4 | 98.2 | 95.3 |
| Refrigerating capacity ratio | % (relative to R410A) | 114.4 | 113.8 | 113.0 | 111.9 | 110.7 | 109.4 | 107.9 | 114.8 |

TABLE 158

| Item | Unit | Comparative Example 51 | Comparative Example 52 | Comparative Example 53 | Comparative Example 54 | Comparative Example 55 | Example 25 | Example 26 | Comparative Example 58 |
|---|---|---|---|---|---|---|---|---|---|
| HFO-1132(E) | mass % | 20.0 | 30.0 | 40.0 | 50.0 | 60.0 | 10.0 | 20.0 | 30.0 |
| HFO-1123 | mass % | 50.0 | 40.0 | 30.0 | 20.0 | 10.0 | 55.0 | 45.0 | 35.0 |
| R32 | mass % | 30.0 | 30.0 | 30.0 | 30.0 | 30.0 | 35.0 | 35.0 | 35.0 |
| GWP | — | 203 | 203 | 203 | 203 | 203 | 237 | 237 | 237 |
| COP ratio | % (relative to R410A) | 95.6 | 96.0 | 96.6 | 97.2 | 97.9 | 96.0 | 96.3 | 96.6 |
| Refrigerating capacity ratio | % (relative to R410A) | 114.2 | 113.4 | 112.4 | 111.2 | 109.8 | 115.1 | 114.5 | 113.6 |

TABLE 159

| Item | Unit | Comparative Example 57 | Comparative Example 58 | Comparative Example 59 | Comparative Example 60 | Comparative Example 61 | Comparative Example 62 | Comparative Example 63 | Comparative Example 64 |
|---|---|---|---|---|---|---|---|---|---|
| HFO-1132(E) | mass % | 40.0 | 50.0 | 60.0 | 10.0 | 20.0 | 30.0 | 40.0 | 50.0 |
| HFO-1123 | mass % | 25.0 | 15.0 | 5.0 | 50.0 | 40.0 | 30.0 | 20.0 | 10.0 |
| R32 | mass % | 35.0 | 35.0 | 35.0 | 40.0 | 40.0 | 40.0 | 40.0 | 40.0 |

TABLE 159-continued

| Item | Unit | Comparative Example 57 | Comparative Example 58 | Comparative Example 59 | Comparative Example 60 | Comparative Example 61 | Comparative Example 62 | Comparative Example 63 | Comparative Example 64 |
|---|---|---|---|---|---|---|---|---|---|
| GWP | — | 237 | 237 | 237 | 271 | 271 | 271 | 271 | 271 |
| COP ratio | % (relative to R410A) | 97.1 | 97.7 | 98.3 | 96.6 | 96.9 | 97.2 | 97.7 | 98.2 |
| Refrigerating capacity ratio | % (relative to R410A) | 112.6 | 111.5 | 110.2 | 115.1 | 114.6 | 113.8 | 112.8 | 111.7 |

TABLE 160

| Item | Unit | Example 27 | Example 28 | Example 29 | Example 30 | Example 31 | Example 32 | Example 33 | Example 34 |
|---|---|---|---|---|---|---|---|---|---|
| HFO-1132(E) | mass % | 38.0 | 40.0 | 42.0 | 44.0 | 35.0 | 37.0 | 39.0 | 41.0 |
| HFO-1123 | mass % | 60.0 | 58.0 | 56.0 | 54.0 | 61.0 | 59.0 | 57.0 | 55.0 |
| R32 | mass % | 2.0 | 2.0 | 2.0 | 2.0 | 4.0 | 4.0 | 4.0 | 4.0 |
| GWP | — | 14 | 14 | 14 | 14 | 28 | 28 | 28 | 28 |
| COP ratio | % (relative to R410A) | 93.2 | 93.4 | 93.6 | 93.7 | 93.2 | 93.3 | 93.5 | 93.7 |
| Refrigerating capacity ratio | % (relative to R410A) | 107.7 | 107.5 | 107.3 | 107.2 | 108.6 | 108.4 | 108.2 | 108.0 |

TABLE 161

| Item | Unit | Example 35 | Example 36 | Example 37 | Example 38 | Example 39 | Example 40 | Example 41 | Example 42 |
|---|---|---|---|---|---|---|---|---|---|
| HFO-1132(E) | mass % | 43.0 | 31.0 | 33.0 | 35.0 | 37.0 | 39.0 | 41.0 | 27.0 |
| HFO-1123 | mass % | 53.0 | 63.0 | 61.0 | 59.0 | 57.0 | 55.0 | 53.0 | 65.0 |
| R32 | mass % | 4.0 | 6.0 | 6.0 | 6.0 | 6.0 | 6.0 | 6.0 | 8.0 |
| GWP | — | 28 | 41 | 41 | 41 | 41 | 41 | 41 | 55 |
| COP ratio | % (relative to R410A) | 93.9 | 93.1 | 93.2 | 93.4 | 93.6 | 93.7 | 93.9 | 93.0 |
| Refrigerating capacity ratio | % (relative to R410A) | 107.8 | 109.5 | 109.3 | 109.1 | 109.0 | 108.8 | 108.6 | 110.3 |

TABLE 162

| Item | Unit | Example 43 | Example 44 | Example 45 | Example 46 | Example 47 | Example 48 | Example 49 | Example 50 |
|---|---|---|---|---|---|---|---|---|---|
| HFO-1132(E) | mass % | 29.0 | 31.0 | 33.0 | 35.0 | 37.0 | 39.0 | 32.0 | 32.0 |
| HFO-1123 | mass % | 63.0 | 61.0 | 59.0 | 57.0 | 55.0 | 53.0 | 51.0 | 50.0 |
| R32 | mass % | 8.0 | 8.0 | 8.0 | 8.0 | 8.0 | 8.0 | 17.0 | 18.0 |
| GWP | — | 55 | 55 | 55 | 55 | 55 | 55 | 116 | 122 |
| COP ratio | % (relative to R410A) | 93.2 | 93.3 | 93.5 | 93.6 | 93.8 | 94.0 | 94.5 | 94.7 |
| Refrigerating capacity ratio | % (relative to R410A) | 110.1 | 110.0 | 109.8 | 109.6 | 109.5 | 109.3 | 111.8 | 111.9 |

TABLE 163

| Item | Unit | Example 51 | Example 52 | Example 53 | Example 54 | Example 55 | Example 56 | Example 57 | Example 58 |
|---|---|---|---|---|---|---|---|---|---|
| HFO-1132(E) | mass % | 30.0 | 27.0 | 21.0 | 23.0 | 25.0 | 27.0 | 11.0 | 13.0 |
| HFO-1123 | mass % | 52.0 | 42.0 | 46.0 | 44.0 | 42.0 | 40.0 | 54.0 | 52.0 |
| R32 | mass % | 18.0 | 31.0 | 33.0 | 33.0 | 33.0 | 33.0 | 35.0 | 35.0 |
| GWP | — | 122 | 210 | 223 | 223 | 223 | 223 | 237 | 237 |

TABLE 163-continued

| Item | Unit | Example 51 | Example 52 | Example 53 | Example 54 | Example 55 | Example 56 | Example 57 | Example 58 |
|---|---|---|---|---|---|---|---|---|---|
| COP ratio | % (relative to R410A) | 94.5 | 96.0 | 96.0 | 96.1 | 96.2 | 96.3 | 96.0 | 96.0 |
| Refrigerating capacity ratio | % (relative to R410A) | 112.1 | 113.7 | 114.3 | 114.2 | 114.0 | 113.8 | 115.0 | 114.9 |

TABLE 164

| Item | Unit | Example 59 | Example 60 | Example 61 | Example 62 | Example 63 | Example 64 | Example 65 | Example 66 |
|---|---|---|---|---|---|---|---|---|---|
| HFO-1132(E) | mass % | 15.0 | 17.0 | 19.0 | 21.0 | 23.0 | 25.0 | 27.0 | 11.0 |
| HFO-1123 | mass % | 50.0 | 48.0 | 46.0 | 44.0 | 42.0 | 40.0 | 38.0 | 52.0 |
| R32 | mass % | 35.0 | 35.0 | 35.0 | 35.0 | 35.0 | 35.0 | 35.0 | 37.0 |
| GWP | — | 237 | 237 | 237 | 237 | 237 | 237 | 237 | 250 |
| COP ratio | % (relative to R410A) | 96.1 | 96.2 | 96.2 | 96.3 | 96.4 | 96.4 | 96.5 | 96.2 |
| Refrigerating capacity ratio | % (relative to R410A) | 114.8 | 114.7 | 114.5 | 114.4 | 114.2 | 114.1 | 113.9 | 115.1 |

TABLE 165

| Item | Unit | Example 67 | Example 68 | Example 69 | Example 70 | Example 71 | Example 72 | Example 73 | Example 74 |
|---|---|---|---|---|---|---|---|---|---|
| HFO-1132(E) | mass % | 13.0 | 15.0 | 17.0 | 15.0 | 17.0 | 19.0 | 21.0 | 23.0 |
| HFO-1123 | mass % | 50.0 | 48.0 | 46.0 | 50.0 | 48.0 | 46.0 | 44.0 | 42.0 |
| R32 | mass % | 37.0 | 37.0 | 37.0 | 0.0 | 0.0 | 0.0 | 0.0 | 0.0 |
| GWP | — | 250 | 250 | 250 | 237 | 237 | 237 | 237 | 237 |
| COP ratio | % (relative to R410A) | 96.3 | 96.4 | 96.4 | 96.1 | 96.2 | 96.2 | 96.3 | 96.4 |
| Refrigerating capacity ratio | % (relative to R410A) | 115.0 | 114.9 | 114.7 | 114.8 | 114.7 | 114.5 | 114.4 | 114.2 |

TABLE 166

| Item | Unit | Example 75 | Example 76 | Example 77 | Example 78 | Example 79 | Example 80 | Example 81 | Example 82 |
|---|---|---|---|---|---|---|---|---|---|
| HFO-1132(E) | mass % | 25.0 | 27.0 | 11.0 | 19.0 | 21.0 | 23.0 | 25.0 | 27.0 |
| HFO-1123 | mass % | 40.0 | 38.0 | 52.0 | 44.0 | 42.0 | 40.0 | 38.0 | 36.0 |
| R32 | mass % | 0.0 | 0.0 | 0.0 | 37.0 | 37.0 | 37.0 | 37.0 | 37.0 |
| GWP | — | 237 | 237 | 250 | 250 | 250 | 250 | 250 | 250 |
| COP ratio | % (relative to R410A) | 96.4 | 96.5 | 96.2 | 96.5 | 96.5 | 96.6 | 96.7 | 96.8 |
| Refrigerating capacity ratio | % (relative to R410A) | 114.1 | 113.9 | 115.1 | 114.6 | 114.5 | 114.3 | 114.1 | 114.0 |

The above results indicate that under the condition that the mass % of HFO-1132(E), HFO-1123, and R32 based on their sum is respectively represented by x, y, and z, when coordinates (x,y,z) in a ternary composition diagram in which the sum of HFO-1132(E), HFO-1123, and R32 is 100 mass %, a line segment connecting a point (0.0, 100.0, 0.0) and a point (0.0, 0.0, 100.0) is the base, and the point (0.0, 100.0, 0.0) is on the left side are within the range of a figure surrounded by line segments that connect the following 4 points:
point O (100.0, 0.0, 0.0),
point A" (63.0, 0.0, 37.0),
point B" (0.0, 63.0, 37.0), and
point (0.0, 100.0, 0.0),
or on these line segments,
the refrigerant has a GWP of 250 or less.

The results also indicate that when coordinates (x,y,z) are within the range of a figure surrounded by line segments that connect the following 4 points:
point O (100.0, 0.0, 0.0),
point A' (81.6, 0.0, 18.4),
point B' (0.0, 81.6, 18.4), and
point (0.0, 100.0, 0.0),
or on these line segments,
the refrigerant has a GWP of 125 or less.

The results also indicate that when coordinates (x,y,z) are within the range of a figure surrounded by line segments that connect the following 4 points:
point O (100.0, 0.0, 0.0),
point A (90.5, 0.0, 9.5), point B (0.0, 90.5, 9.5), and
point (0.0, 100.0, 0.0),
or on these line segments,
the refrigerant has a GWP of 65 or less.

The results also indicate that when coordinates (x,y,z) are on the left side of line segments that connect the following 3 points:
point C (50.0, 31.6, 18.4),
point U (28.7, 41.2, 30.1), and
point D (52.2, 38.3, 9.5),
or on these line segments,
the refrigerant has a COP ratio of 96% or more relative to that of R410A.

In the above, the line segment CU is represented by coordinates $(-0.0538z^2+0.7888z+53.701, 0.0538z^2-1.7888z+46.299, z)$, and the line segment UD is represented by coordinates $(-3.4962z^2+210.71z-3146.1, 3.4962z^2-211.71z+3246.1, z)$.

The points on the line segment CU are determined from three points, i.e., point C, Comparative Example 10, and point U, by using the least-square method.

The points on the line segment UD are determined from three points, i.e., point U, Example 2, and point D, by using the least-square method.

The results also indicate that when coordinates (x,y,z) are on the left side of line segments that connect the following 3 points:
point E (55.2, 44.8, 0.0),
point T (34.8, 51.0, 14.2), and
point F (0.0, 76.7, 23.3),
or on these line segments,
the refrigerant has a COP ratio of 94.5% or more relative to that of R410A.

In the above, the line segment ET is represented by coordinates $(-0.0547z^2-0.5327z+53.4, 0.0547z^2-0.4673z+46.6, z)$, and the line segment TF is represented by coordinates $(-0.0982z^2+0.9622z+40.931, 0.0982z^2-1.9622z+59.069, z)$.

The points on the line segment ET are determined from three points, i.e., point E, Example 2, and point T, by using the least-square method.

The points on the line segment TF are determined from three points, i.e., points T, S, and F, by using the least-square method.

The results also indicate that when coordinates (x,y,z) are on the left side of line segments that connect the following 3 points:
point G (0.0, 76.7, 23.3),
point R (21.0, 69.5, 9.5), and
point H (0.0, 85.9, 14.1),
or on these line segments,
the refrigerant has a COP ratio of 93% or more relative to that of R410A.

In the above, the line segment GR is represented by coordinates $(-0.0491z^2-1.1544z+38.5, 0.0491z^2+0.1544z+61.5, z)$, and the line segment RH is represented by coordinates $(-0.3123z^2+4.234z+11.06, 0.3123z^2-5.234z+88.94, z)$.

The points on the line segment GR are determined from three points, i.e., point G, Example 5, and point R, by using the least-square method.

The points on the line segment RH are determined from three points, i.e., point R, Example 7, and point H, by using the least-square method.

In contrast, as shown in, for example, Comparative Examples 8, 9, 13, 15, 17, and 18, when R32 is not contained, the concentrations of HFO-1132(E) and HFO-1123, which have a double bond, become relatively high; this undesirably leads to deterioration, such as decomposition, or polymerization in the refrigerant compound.

(6) First Embodiment

Figure 16:
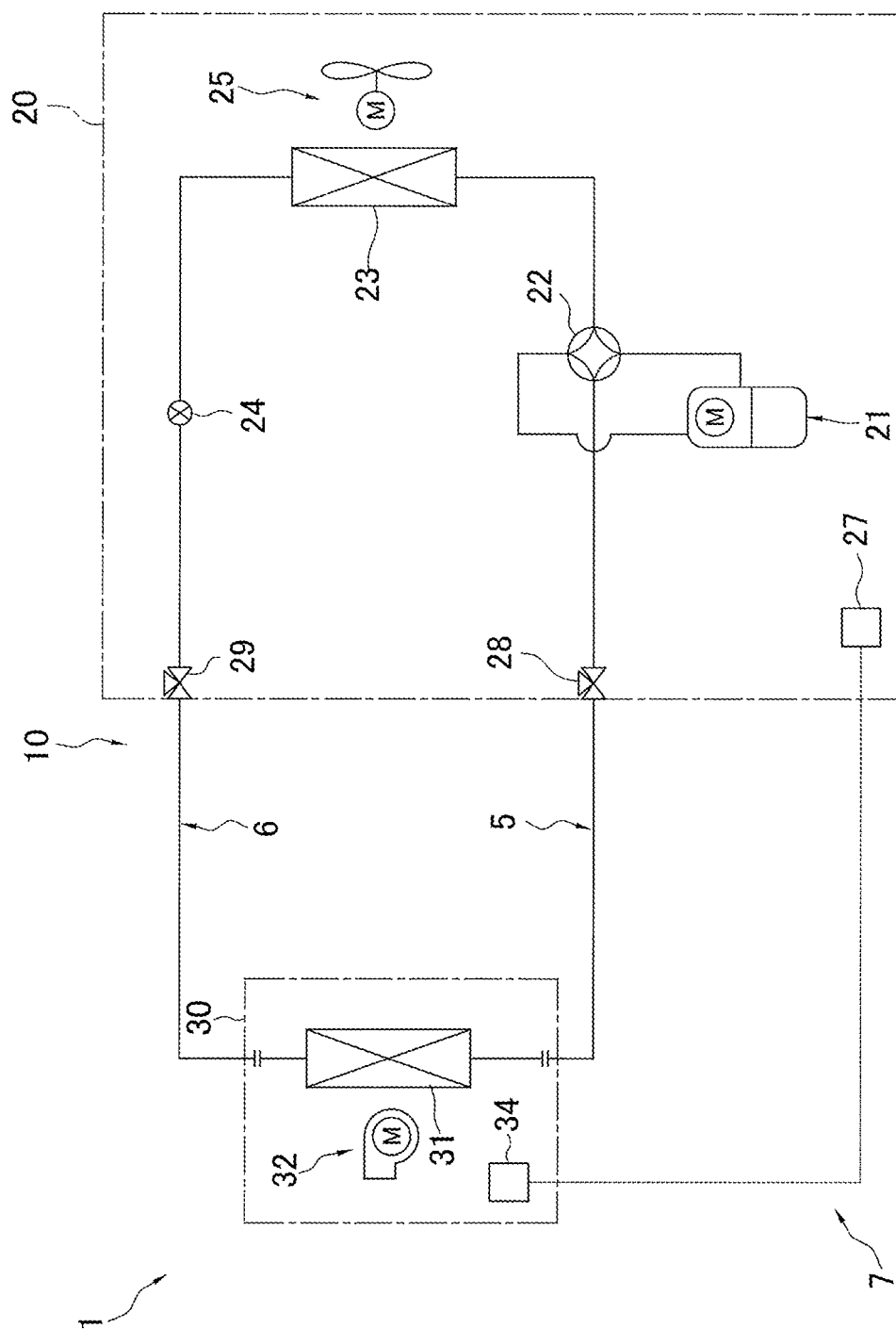
FIG. 16 is a schematic configuration diagram of a refrigerant circuit according to a first embodiment.
Figure 17:
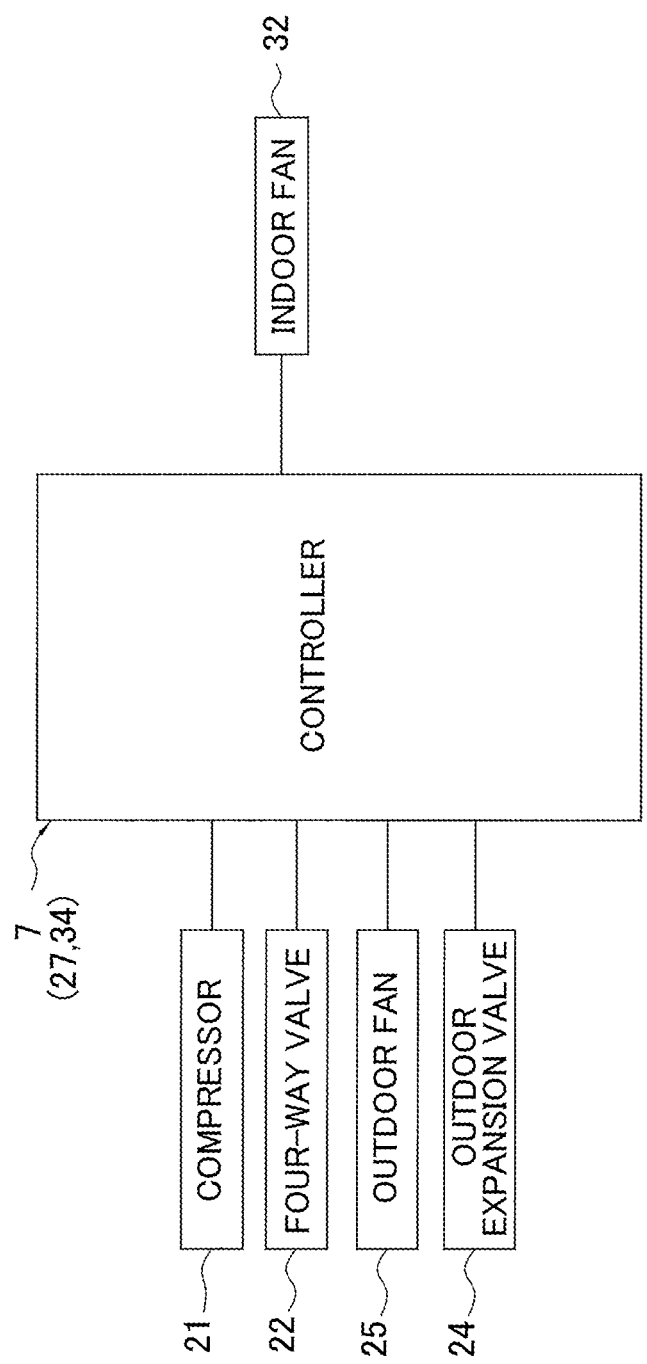
FIG. 17 is a schematic control block configuration diagram of a refrigeration cycle apparatus according to the first embodiment.

Hereinafter, an air conditioner 1 that serves as a refrigeration cycle apparatus including an outdoor unit 20 as a heat source unit according to a first embodiment will be described with reference to FIG. 16 that is the schematic configuration diagram of a refrigerant circuit and FIG. 17 that is a schematic control block configuration diagram.

The air conditioner 1 is an apparatus that air-conditions a space to be air-conditioned by performing a vapor compression refrigeration cycle.

The air conditioner 1 mainly includes an outdoor unit 20, an indoor unit 30, a liquid-side connection pipe 6 and a gas-side connection pipe 5 connecting the outdoor unit 20 and the indoor unit 30, a remote control unit (not shown) serving as an input device and an output device, and a controller 7 that controls the operation of the air conditioner 1. The design pressure of each of the liquid-side connection pipe 6 and the gas-side connection pipe 5 may be, for example, higher than or equal to 4.5 MPa (for the one having a diameter of ⅜ inches) and lower than or equal to 5.0 MPa (for the one having a diameter of ⅘ inches).

In the air conditioner 1, the refrigeration cycle in which refrigerant sealed in a refrigerant circuit 10 is compressed, cooled or condensed, decompressed, heated or evaporated, and then compressed again is performed. In the present embodiment, the refrigerant circuit 10 is filled with refrigerant for performing a vapor compression refrigeration cycle. The refrigerant is a refrigerant containing 1,2-difluoroethylene, and any one of the above-described refrigerants A to E may be used. The refrigerant circuit 10 is filled with refrigerating machine oil together with the refrigerant.

(6-1) Outdoor Unit 20

The outdoor unit 20 has substantially a rectangular parallelepiped box shape from its appearance, and has a structure in which a fan chamber and a machine chamber are formed (so-called, trunk structure) when the inside is divided by a partition plate, or the like.

The outdoor unit 20 is connected to the indoor unit 30 via the liquid-side connection pipe 6 and the gas-side connection pipe 5, and makes up part of the refrigerant circuit 10. The outdoor unit 20 mainly includes a compressor 21, a four-way valve 22, an outdoor heat exchanger 23, an outdoor expansion valve 24, an outdoor fan 25, a liquid-side stop valve 29, and a gas-side stop valve 28.

The outdoor unit 20 has a design pressure (gauge pressure) that is lower than 1.5 times the design pressure of each of the liquid-side connection pipe 6 and the gas-side connection pipe 5 (the withstanding pressure of each of the liquid-side connection pipe 6 and the gas-side connection pipe 5). The design pressure of the outdoor unit 20 may be, for example, higher than or equal to 4.0 MPa and lower than or equal to 4.5 MPa.

The compressor 21 is a device that compresses low-pressure refrigerant into high pressure in the refrigeration cycle. Here, the compressor 21 is a hermetically sealed compressor in which a positive-displacement, such as a rotary type and a scroll type, compression element (not shown) is driven for rotation by a compressor motor. The compressor motor is used to change the displacement. The operation frequency of the compressor motor is controllable with an inverter. The compressor 21 is provided with an attached accumulator (not shown) at its suction side. The outdoor unit 20 of the present embodiment does not have a refrigerant container larger than the attached accumulator (a low-pressure receiver disposed at the suction side of the compressor 21, a high-pressure receiver disposed at a liquid side of the outdoor heat exchanger 23, or the like).

The four-way valve 22 is able to switch between a cooling operation connection state and a heating operation connection state by switching the status of connection. In the cooling operation connection state, a discharge side of the compressor 21 and the outdoor heat exchanger 23 are connected, and the suction side of the compressor 21 and the gas-side stop valve 28 are connected. In the heating operation connection state, the discharge side of the compressor 21 and the gas-side stop valve 28 are connected, and the suction side of the compressor 21 and the outdoor heat exchanger 23 are connected.

The outdoor heat exchanger 23 is a heat exchanger that functions as a condenser for high-pressure refrigerant in the refrigeration cycle during cooling operation and that functions as an evaporator for low-pressure refrigerant in the refrigeration cycle during heating operation. The outdoor heat exchanger 23 includes a plurality of heat transfer fins and a plurality of heat transfer tubes fixedly extending through the heat transfer fins.

The outdoor fan 25 takes outdoor air into the outdoor unit 20, causes the air to exchange heat with refrigerant in the outdoor heat exchanger 23, and then generates air flow for emitting the air to the outside. The outdoor fan 25 is driven for rotation by an outdoor fan motor. In the present embodiment, only one outdoor fan 25 is provided.

The outdoor expansion valve 24 is able to control the valve opening degree, and is provided between a liquid-side end portion of the outdoor heat exchanger 23 and the liquid-side stop valve 29.

The liquid-side stop valve 29 is a manual valve disposed at a connection point at which the outdoor unit 20 is connected to the liquid-side connection pipe 6.

The gas-side stop valve 28 is a manual valve disposed at a connection point at which the outdoor unit 20 is connected to the gas-side connection pipe 5.

The outdoor unit 20 includes an outdoor unit control unit 27 that controls the operations of parts that make up the outdoor unit 20. The outdoor unit control unit 27 includes a microcomputer including a CPU, a memory, and the like. The outdoor unit control unit 27 is connected to an indoor unit control unit 34 of indoor unit 30 via a communication line, and sends or receives control signals, or the like, to or from the indoor unit control unit 34. The outdoor unit control unit 27 is electrically connected to various sensors (not shown), and receives signals from the sensors.

In the outdoor unit control unit 27 (and the controller 7 including this unit), an upper limit of a controlled pressure (gauge pressure) of refrigerant is set so as to be lower than 1.5 times the design pressure of each of the liquid-side connection pipe 6 and the gas-side connection pipe 5 (the withstanding pressure of each of the liquid-side connection pipe 6 and the gas-side connection pipe 5).

(6-2) Indoor Unit 30

The indoor unit 30 is placed on a wall surface, or the like, in a room that is the space to be air-conditioned. The indoor unit 30 is connected to the outdoor unit 20 via the liquid-side connection pipe 6 and the gas-side connection pipe 5, and makes up part of the refrigerant circuit 10. The design pressure of the indoor unit 30, as well as the outdoor unit 20, may be, for example, higher than or equal to 4.0 MPa and lower than or equal to 4.5 MPa.

The indoor unit 30 includes an indoor heat exchanger 31, an indoor fan 32, and the like.

A liquid side of the indoor heat exchanger 31 is connected to the liquid-side connection pipe 6, and a gas side of the indoor heat exchanger 31 is connected to the gas-side connection pipe 5. The indoor heat exchanger 31 is a heat exchanger that functions as an evaporator for low-pressure refrigerant in the refrigeration cycle during cooling operation and that functions as a condenser for high-pressure refrigerant in the refrigeration cycle during heating operation. The indoor heat exchanger 31 includes a plurality of heat transfer fins and a plurality of heat transfer tubes fixedly extending through the heat transfer fins.

The indoor fan 32 takes indoor air into the indoor unit 30, causes the air to exchange heat with refrigerant in the indoor heat exchanger 31, and then generates air flow for emitting the air to the outside. The indoor fan 32 is driven for rotation by an indoor fan motor (not shown).

The indoor unit 30 includes an indoor unit control unit 34 that controls the operations of the parts that make up the indoor unit 30. The indoor unit control unit 34 includes a microcomputer including a CPU, a memory, and the like. The indoor unit control unit 34 is connected to the outdoor unit control unit 27 via a communication line, and sends or receives control signals, or the like, to or from the outdoor unit control unit 27.

The indoor unit control unit 34 is electrically connected to various sensors (not shown) provided inside the indoor unit 30, and receives signals from the sensors.

(6-3) Details of Controller 7

In the air conditioner 1, the outdoor unit control unit 27 and the indoor unit control unit 34 are connected via the communication line to make up the controller 7 that controls the operation of the air conditioner 1.

The controller 7 mainly includes a CPU (central processing unit) and a memory such as a ROM and a RAM. Various processes and controls made by the controller 7 are implemented by various parts included in the outdoor unit control unit 27 and/or the indoor unit control unit 34 functioning together.

(6-4) Operation Mode

Hereinafter, operation modes will be described.

The operation modes include a cooling operation mode and a heating operation mode.

The controller 7 determines whether the operation mode is the cooling operation mode or the heating operation mode and performs the selected operation mode based on an instruction received from the remote control unit, or the like.

(6-4-1) Cooling Operation Mode

In the air conditioner 1, in the cooling operation mode, the status of connection of the four-way valve 22 is set to the cooling operation connection state where the discharge side of the compressor 21 and the outdoor heat exchanger 23 are connected and the suction side of the compressor 21 and the gas-side stop valve 28 are connected, and refrigerant filled in the refrigerant circuit 10 is mainly circulated in order of the compressor 21, the outdoor heat exchanger 23, the outdoor expansion valve 24, and the indoor heat exchanger 31.

More specifically, when the cooling operation mode is started, refrigerant is taken into the compressor 21, compressed, and then discharged in the refrigerant circuit 10.

In the compressor 21, displacement control commensurate with a cooling load that is required from the indoor unit 30 is performed. Gas refrigerant discharged from the compressor 21 passes through the four-way valve 22 and flows into the gas-side end of the outdoor heat exchanger 23.

Gas refrigerant having flowed into the gas-side end of the outdoor heat exchanger 23 exchanges heat in the outdoor heat exchanger 23 with outdoor-side air that is supplied by the outdoor fan 25 to condense into liquid refrigerant and flows out from the liquid-side end of the outdoor heat exchanger 23.

Refrigerant having flowed out from the liquid-side end of the outdoor heat exchanger 23 is decompressed when passing through the outdoor expansion valve 24. The outdoor expansion valve 24 is controlled such that the degree of sub cooling of refrigerant that passes through a liquid-side outlet of the outdoor heat exchanger 23 satisfies a predetermined condition.

Refrigerant decompressed in the outdoor expansion valve 24 passes through the liquid-side stop valve 29 and the liquid-side connection pipe 6 and flows into the indoor unit 30.

Refrigerant having flowed into the indoor unit 30 flows into the indoor heat exchanger 31, exchanges heat in the indoor heat exchanger 31 with indoor air that is supplied by the indoor fan 32 to evaporate into gas refrigerant, and flows out from the gas-side end of the indoor heat exchanger 31. Gas refrigerant having flowed out from the gas-side end of the indoor heat exchanger 31 flows to the gas-side connection pipe 5.

Refrigerant having flowed through the gas-side connection pipe 5 passes through the gas-side stop valve 28 and the four-way valve 22, and is taken into the compressor 21 again.

(6-4-2) Heating Operation Mode

In the air conditioner 1, in the heating operation mode, the status of connection of the four-way valve 22 is set to the heating operation connection state where the discharge side of the compressor 21 and the gas-side stop valve 28 are connected and the suction side of the compressor 21 and the outdoor heat exchanger 23 are connected, and refrigerant filled in the refrigerant circuit 10 is mainly circulated in order of the compressor 21, the indoor heat exchanger 31, the outdoor expansion valve 24, and the outdoor heat exchanger 23.

More specifically, when the heating operation mode is started, refrigerant is taken into the compressor 21, compressed, and then discharged in the refrigerant circuit 10.

In the compressor 21, displacement control commensurate with a heating load that is required from the indoor unit 30 is performed. Here, for example, at least any one of the drive frequency of the compressor 21 and the volume of air of the outdoor fan 25 is controlled such that the maximum value of the pressure in the refrigerant circuit 10 is lower than 1.5 times the design pressure of the gas-side connection pipe 5. Gas refrigerant discharged from the compressor 21 flows through the four-way valve 22 and the gas-side connection pipe 5 and then flows into the indoor unit 30.

Refrigerant having flowed into the indoor unit 30 flows into the gas-side end of the indoor heat exchanger 31, exchanges heat in the indoor heat exchanger 31 with indoor air that is supplied by the indoor fan 32 to condense into refrigerant in a gas-liquid two-phase state or liquid refrigerant, and flows out from the liquid-side end of the indoor heat exchanger 31. Refrigerant having flowed out from the liquid-side end of the indoor heat exchanger 31 flows into the liquid-side connection pipe 6.

Refrigerant having flowed through the liquid-side connection pipe 6 is decompressed to a low pressure in the refrigeration cycle in the liquid-side stop valve 29 and the outdoor expansion valve 24. The outdoor expansion valve 24 is controlled such that the degree of subcooling of refrigerant that passes through a liquid-side outlet of the indoor heat exchanger 31 satisfies a predetermined condition. Refrigerant decompressed in the outdoor expansion valve 24 flows into the liquid-side end of the outdoor heat exchanger 23.

Refrigerant having flowed in from the liquid-side end of the outdoor heat exchanger 23 exchanges heat in the outdoor heat exchanger 23 with outdoor air that is supplied by the outdoor fan 25 to evaporate into gas refrigerant, and flows out from the gas-side end of the outdoor heat exchanger 23.

Refrigerant having flowed out from the gas-side end of the outdoor heat exchanger 23 passes through the four-way valve 22 and is taken into the compressor 21 again.

(6-5) Characteristics of First Embodiment

In the above-described air conditioner 1, since refrigerant containing 1,2-difluoroethylene is used, a GWP can be sufficiently reduced.

The air conditioner 1 uses the outdoor unit 20 of which the design pressure is lower than 1.5 times the design pressure of each of the liquid-side connection pipe 6 and the gas-side connection pipe 5. In the outdoor unit control unit 27 of the outdoor unit 20 of the air conditioner 1, the upper limit of the controlled pressure of the refrigerant is set so as to be lower than 1.5 times the design pressure of each of the liquid-side connection pipe 6 and the gas-side connection pipe 5. Therefore, even when the above-described specific refrigerants A to E are used, damage to the liquid-side connection pipe 6 or the gas-side connection pipe 5 can be reduced.

(6-6) Modification A of First Embodiment

In the above-described first embodiment, the air conditioner including only one indoor unit is described as an example; however, the air conditioner may include a plurality of indoor units (with no indoor expansion valve) connected in parallel with each other.

(6-7) Modification B of First Embodiment

In the above-described first embodiment, the case where the design pressure of the outdoor unit 20 is lower than 1.5 times the design pressure of each of the liquid-side connection pipe 6 and the gas-side connection pipe 5 and the outdoor unit control unit 27 of the outdoor unit 20 is set such that the upper limit of the controlled pressure of the refrigerant is lower than 1.5 times the design pressure of each of the liquid-side connection pipe 6 and the gas-side connection pipe 5 is described as an example.

In contrast to this, for example, even when the outdoor unit 20 has a design pressure higher than or equal to 1.5 times the design pressure of each of the liquid-side connection pipe 6 and the gas-side connection pipe 5 but the outdoor unit 20 includes the outdoor unit control unit 27 that is configured to be able to select the upper limit of the controlled pressure of the refrigerant from among multiple types and that is able to set the upper limit of the controlled pressure of the refrigerant such that the upper limit is lower than 1.5 times the design pressure of each of the liquid-side connection pipe 6 and the gas-side connection pipe 5, the outdoor unit 20 can be used in the air conditioner 1 of the above-described embodiment.

(7) Second Embodiment

Figure 18:
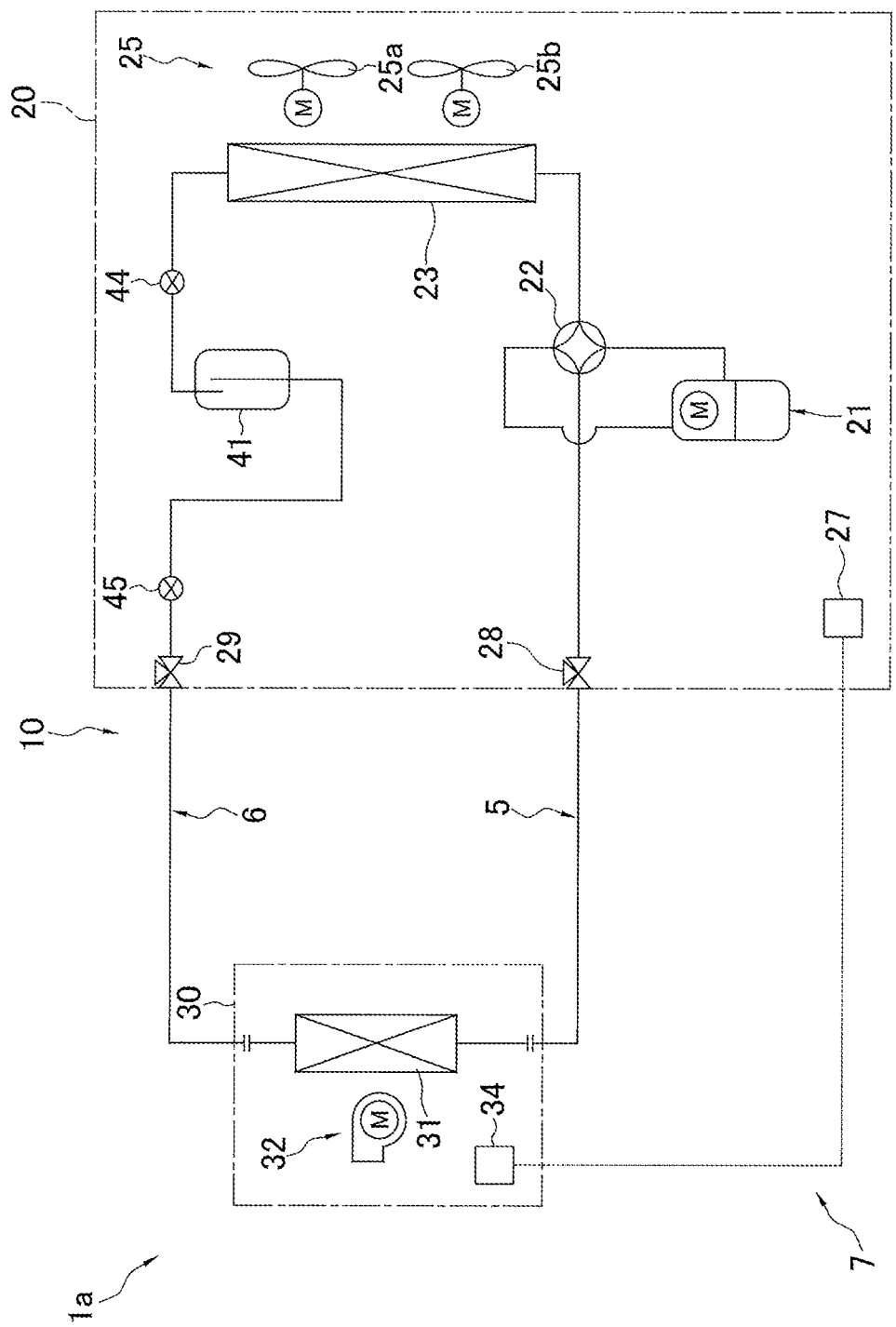
FIG. 18 is a schematic configuration diagram of a refrigerant circuit according to a second embodiment.
Figure 19:
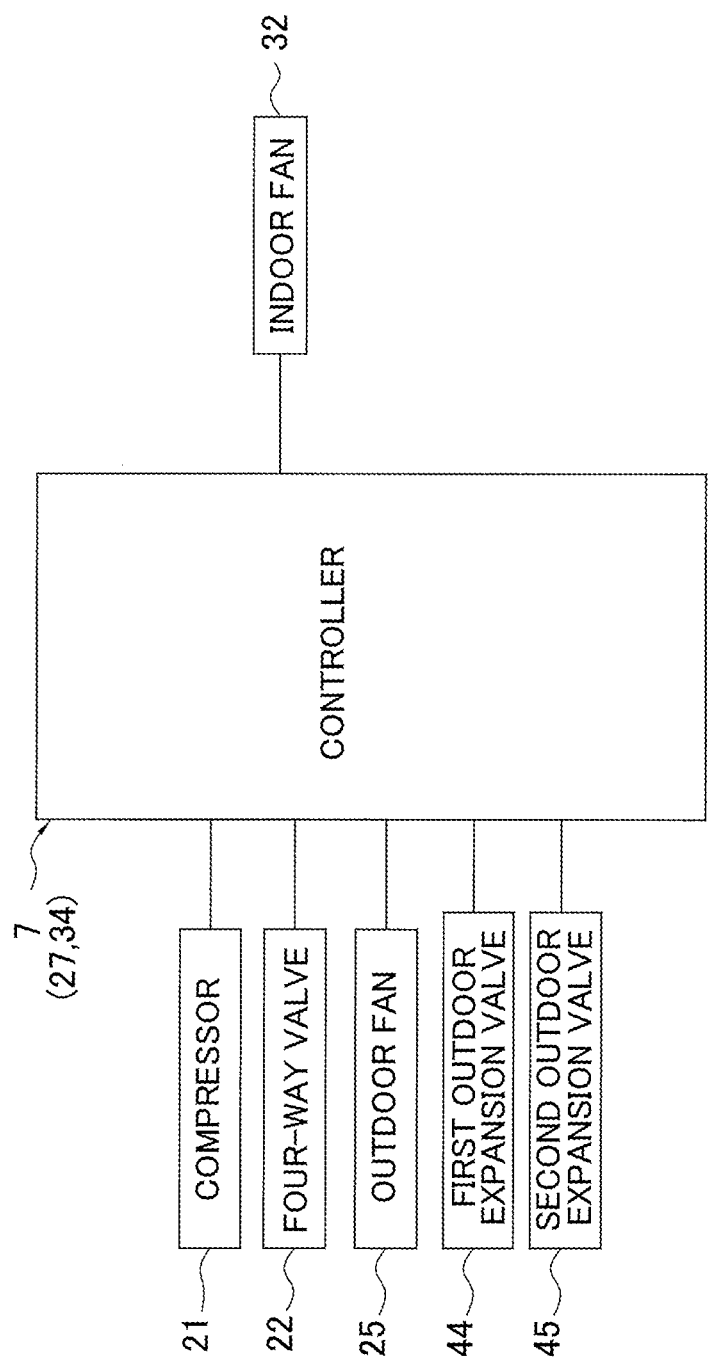
FIG. 19 is a schematic control block configuration diagram of a refrigeration cycle apparatus according to the second embodiment.

Hereinafter, an air conditioner 1a that serves as a refrigeration cycle apparatus including the outdoor unit 20 as a heat source unit according to a second embodiment will be described with reference to FIG. 18 that is the schematic configuration diagram of a refrigerant circuit and FIG. 19 that is a schematic control block configuration diagram.

Hereinafter, mainly, the air conditioner 1a of the second embodiment will be described with a focus on a portion different from the air conditioner 1 of the first embodiment.

In the air conditioner 1a as well, the refrigerant circuit 10 is filled with a refrigerant mixture that contains 1,2-difluoroethylene and that is any one of the above-described refrigerants A to E as a refrigerant for performing a vapor compression refrigeration cycle. The refrigerant circuit 10 is filled with refrigerating machine oil together with the refrigerant.

(7-1) Outdoor Unit 20

In the outdoor unit 20 of the air conditioner 1a of the second embodiment, a first outdoor fan 25a and a second outdoor fan 25b are provided as the outdoor fans 25. The outdoor heat exchanger 23 of the outdoor unit 20 of the air conditioner 1a has a wide heat exchange area so as to adapt to air flow coming from the first outdoor fan 25a and the second outdoor fan 25b. The outdoor unit 20, as in the case of the above-described first embodiment, has a design pressure (gauge pressure) that is lower than 1.5 times the design pressure of each of the liquid-side connection pipe 6 and the gas-side connection pipe 5 (the withstanding pressure of each of the liquid-side connection pipe 6 and the gas-side connection pipe 5). The design pressure of the outdoor unit 20 may be, for example, higher than or equal to 4.0 MPa and lower than or equal to 4.5 MPa.

In the outdoor unit 20 of the air conditioner 1a, instead of the outdoor expansion valve 24 of the outdoor unit 20 in the above-described first embodiment, a first outdoor expansion valve 44, an intermediate pressure receiver 41, and a second outdoor expansion valve 45 are sequentially provided between the liquid side of the outdoor heat exchanger 23 and the liquid-side stop valve 29. The first outdoor expansion valve 44 and the second outdoor expansion valve 45 each are able to control the valve opening degree. The intermediate pressure receiver 41 is a container that is able to store refrigerant. Both an end portion of a pipe extending from the first outdoor expansion valve 44 side and an end portion of a pipe extending from the second outdoor expansion valve 45 side are located in the internal space of the intermediate pressure receiver 41. The internal volume of the intermediate pressure receiver 41 is greater than the internal volume of the attached accumulator attached to the compressor 21 and is preferably greater than or equal to twice.

The outdoor unit 20 of the second embodiment has substantially a rectangular parallelepiped shape and has a structure in which a fan chamber and a machine chamber are formed (so-called, trunk structure) when divided by a partition plate, or the like, extending vertically.

The outdoor heat exchanger 23 includes, for example, a plurality of heat transfer fins and a plurality of heat transfer tubes fixedly extending through the heat transfer fins. The outdoor heat exchanger 23 is disposed in an L-shape in plan view.

For the outdoor unit 20 of the second embodiment as well, in the outdoor unit control unit 27 (and the controller 7 including this unit), the upper limit of the controlled pressure (gauge pressure) of the refrigerant is set so as to be lower than 1.5 times the design pressure of each of the liquid-side connection pipe 6 and the gas-side connection pipe 5 (the withstanding pressure of each of the liquid-side connection pipe 6 and the gas-side connection pipe 5).

In the above air conditioner 1a, in the cooling operation mode, the first outdoor expansion valve 44 is, for example, controlled such that the degree of subcooling of refrigerant that passes through the liquid-side outlet of the outdoor heat exchanger 23 satisfies a predetermined condition. In the cooling operation mode, the second outdoor expansion valve 45 is, for example, controlled such that the degree of superheating of refrigerant that the compressor 21 takes in satisfies a predetermined condition. In the heating operation mode, for example, at least any one of the drive frequency of the compressor 21 and the volume of air of the outdoor fan 25 is controlled such that the maximum value of the pressure in the refrigerant circuit 10 is lower than 1.5 times the design pressure of the gas-side connection pipe 5.

(7-2) Indoor Unit 30

The indoor unit 30 of the second embodiment is placed so as to be suspended in an upper space in a room that is a space to be air-conditioned or placed at a ceiling surface or placed on a wall surface and used. The indoor unit 30 is connected to the outdoor unit 20 via the liquid-side connection pipe 6 and the gas-side connection pipe 5, and makes up part of the refrigerant circuit 10. The design pressure of the indoor unit 30, as well as the outdoor unit 20, may be, for example, higher than or equal to 4.0 MPa and lower than or equal to 4.5 MPa.

The indoor unit 30 includes the indoor heat exchanger 31, the indoor fan 32, and the like.

The indoor heat exchanger 31 of the second embodiment includes a plurality of heat transfer fins and a plurality of heat transfer tubes fixedly extending through the heat transfer fins.

(7-3) Characteristics of Second Embodiment

In the above-described air conditioner 1a according to the second embodiment as well, as well as the air conditioner 1 according to the first embodiment, since refrigerant containing 1,2-difluoroethylene is used, a GWP can be sufficiently reduced.

The air conditioner 1a uses the outdoor unit 20 of which the design pressure is lower than 1.5 times the design pressure of each of the liquid-side connection pipe 6 and the gas-side connection pipe 5. In the outdoor unit control unit 27 of the outdoor unit 20 of the air conditioner 1a, the upper limit of the controlled pressure of the refrigerant is set so as to be lower than 1.5 times the design pressure of each of the liquid-side connection pipe 6 and the gas-side connection pipe 5. Therefore, even when the above-described specific refrigerants A to E are used, damage to the liquid-side connection pipe 6 or the gas-side connection pipe 5 can be reduced.

(7-4) Modification A of Second Embodiment

In the above-described second embodiment, the air conditioner including only one indoor unit is described as an example; however, the air conditioner may include a plurality of indoor units (with no indoor expansion valve) connected in parallel with each other.

(7-5) Modification B of Second Embodiment

In the above-described second embodiment, the case where the design pressure of the outdoor unit 20 is lower than 1.5 times the design pressure of each of the liquid-side connection pipe 6 and the gas-side connection pipe 5 and the outdoor unit control unit 27 of the outdoor unit 20 is set such that the upper limit of the controlled pressure of the refrigerant is lower than 1.5 times the design pressure of each of the liquid-side connection pipe 6 and the gas-side connection pipe 5 is described as an example.

In contrast to this, for example, even when the outdoor unit 20 has a design pressure higher than or equal to 1.5 times the design pressure of each of the liquid-side connection pipe 6 and the gas-side connection pipe 5 but the outdoor unit 20 includes the outdoor unit control unit 27 that is configured to be able to select the upper limit of the controlled pressure of the refrigerant from among multiple types and that is able to set the upper limit of the controlled pressure of the refrigerant such that the upper limit is lower than 1.5 times the design pressure of each of the liquid-side connection pipe 6 and the gas-side connection pipe 5, the outdoor unit 20 can be used in the air conditioner 1a of the above-described embodiment.

(8) Third Embodiment

Figure 20:
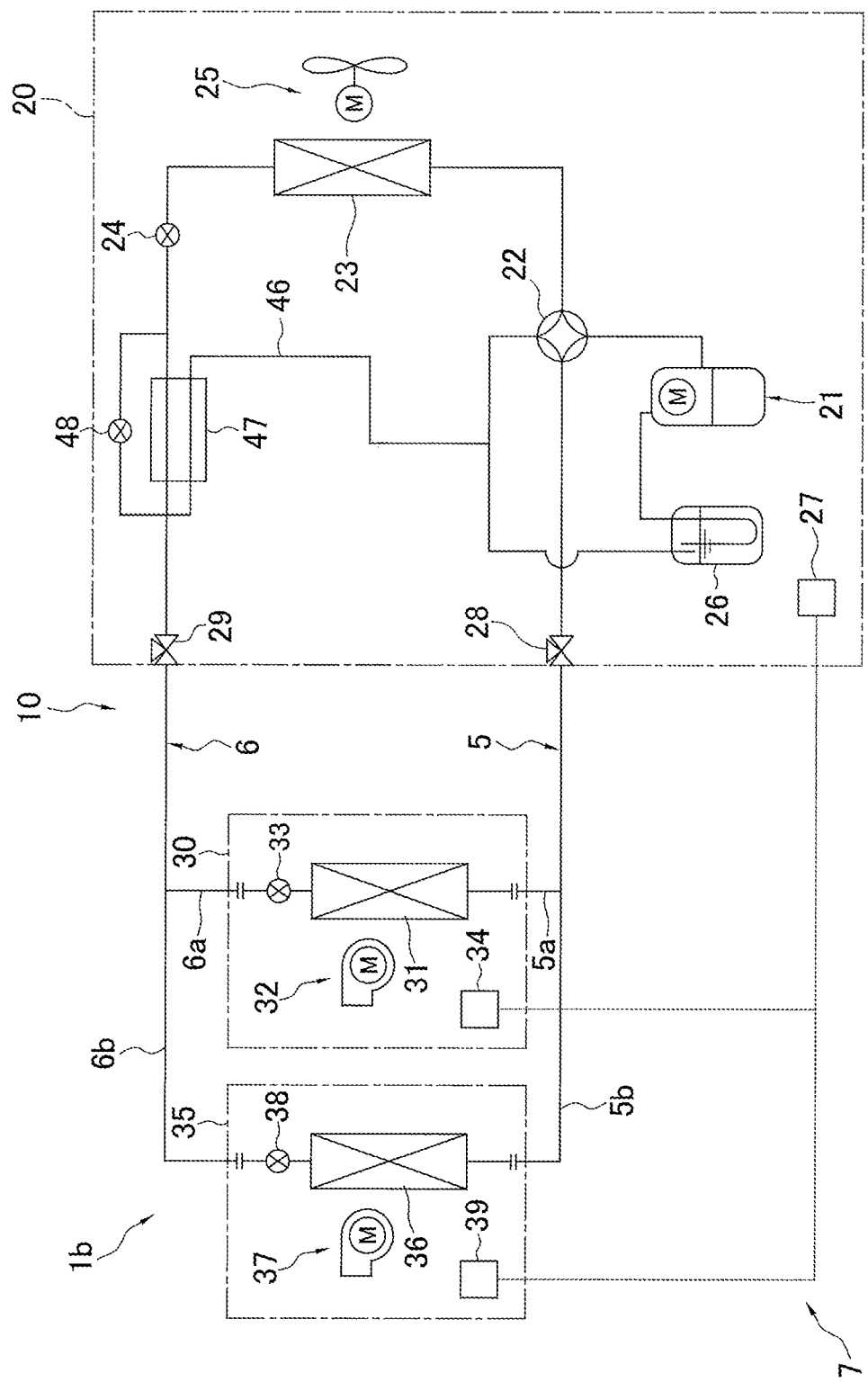
FIG. 20 is a schematic configuration diagram of a refrigerant circuit according to a third embodiment.
Figure 21:
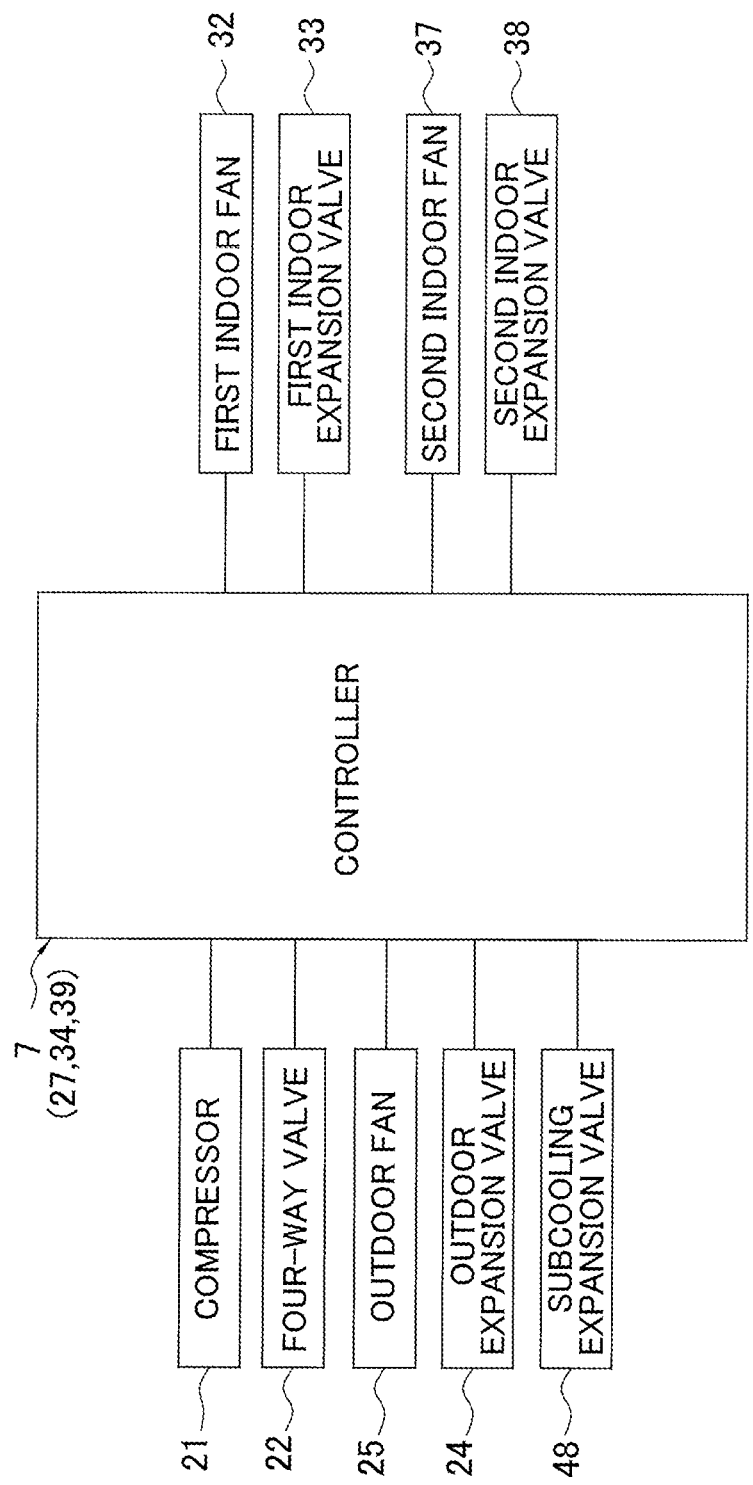
FIG. 21 is a schematic control block configuration diagram of a refrigeration cycle apparatus according to the third embodiment.

Hereinafter, an air conditioner 1b that serves as a refrigeration cycle apparatus including the outdoor unit 20 as a heat source unit according to a third embodiment will be described with reference to FIG. 20 that is the schematic configuration diagram of a refrigerant circuit and FIG. 21 that is a schematic control block configuration diagram.

Hereinafter, mainly, the air conditioner 1b of the third embodiment will be described with a focus on a portion different from the air conditioner 1 of the first embodiment.

In the air conditioner 1b as well, the refrigerant circuit 10 is filled with a refrigerant that contains 1,2-difluoroethylene and that is any one of the above-described refrigerants A to E as a refrigerant for performing a vapor compression refrigeration cycle. The refrigerant circuit 10 is filled with refrigerating machine oil together with the refrigerant.

(8-1) Outdoor Unit 20

In the outdoor unit 20 of the air conditioner 1b of the third embodiment, a low-pressure receiver 26, a subcooling heat exchanger 47, and a subcooling circuit 46 are provided in the outdoor unit 20 in the above-described first embodiment. Preferably, the outdoor unit 20, as in the case of the above-described first embodiment, has a design pressure (gauge pressure) that is lower than 1.5 times the design pressure of each of the liquid-side connection pipe 6 and the gas-side connection pipe 5 (the withstanding pressure of each of the liquid-side connection pipe 6 and the gas-side connection pipe 5) and that is lower than the design pressure of each of branch pipes 5a, 5b, 6a, 6b (described later) in the air conditioner 1b of the present embodiment, including a plurality of indoor units 30, 35. The design pressure of the outdoor unit 20 may be, for example, higher than or equal to 4.0 MPa and lower than or equal to 4.5 MPa.

The low-pressure receiver 26 is a container that is provided between one of connection ports of the four-way valve 22 and the suction side of the compressor 21 and that is able to store refrigerant. In the present embodiment, the low-pressure receiver 26 is provided separately from the attached accumulator of the compressor 21. The internal volume of the low-pressure receiver 26 is greater than the internal volume of the attached accumulator attached to the compressor 21 and is preferably greater than or equal to twice.

The subcooling heat exchanger 47 is provided between the outdoor expansion valve 24 and the liquid-side stop valve 29.

The subcooling circuit 46 is a circuit that branches off from a main circuit between the outdoor expansion valve 24 and the subcooling heat exchanger 47 and that merges with a portion halfway from one of the connection ports of the four-way valve 22 to the low-pressure receiver 26. A subcooling expansion valve 48 that decompresses refrigerant passing therethrough is provided halfway in the subcooling circuit 46. Refrigerant flowing through the subcooling circuit 46 and decompressed by the subcooling expansion valve 48 exchanges heat with refrigerant flowing through the main circuit side in the subcooling heat exchanger 47. Thus, refrigerant flowing through the main circuit side is further cooled, and refrigerant flowing through the subcooling circuit 46 evaporates.

The outdoor unit 20 of the air conditioner 1b according to the third embodiment may have, for example, a so-called up-blow structure that takes in air from the lower side and discharges air outward from the upper side.

Preferably, for the outdoor unit 20 of the third embodiment as well, in the outdoor unit control unit 27 (and the controller 7 including this unit), the upper limit of the controlled pressure (gauge pressure) of the refrigerant is set so as to be lower than 1.5 times the design pressure of each of the liquid-side connection pipe 6 and the gas-side connection pipe 5 (the withstanding pressure of each of the liquid-side connection pipe 6 and the gas-side connection pipe 5) and is set so as to be lower than the design pressure of each of the branch pipes 5a, 5b, 6a, 6b (described later) in the air conditioner 1b of the present embodiment, including the plurality of indoor units 30, 35.

(8-2) First Indoor Unit 30 and Second Indoor Unit 35

In the air conditioner 1b according to the third embodiment, instead of the indoor unit 30 in the above-described first embodiment, a first indoor unit 30 and a second indoor unit 35 are provided in parallel with each other. The design pressures of the first indoor unit 30 and second indoor unit 35, as well as the outdoor unit 20, each may be, for example, higher than or equal to 4.0 MPa and lower than or equal to 4.5 MPa.

The first indoor unit 30, as well as the indoor unit 30 in the above-described first embodiment, includes a first indoor heat exchanger 31, a first indoor fan 32, and a first indoor unit control unit 34, and further includes a first indoor expansion valve 33 at the liquid side of the first indoor heat exchanger 31. The first indoor expansion valve 33 is able to control the valve opening degree. The liquid side of the first indoor unit 30 is connected to the first liquid-side branch pipe 6a that branches and extends from an indoor unit-side end portion of the liquid-side connection pipe 6, and the gas side of the first indoor unit 30 is connected to the first gas-side branch pipe 5a that branches and extends from an indoor unit-side end portion of the gas-side connection pipe 5.

The second indoor unit 35, as well as the first indoor unit 30, includes a second indoor heat exchanger 36, a second indoor fan 37, a second indoor unit control unit 39, and a second indoor expansion valve 38 provided at the liquid side of the second indoor heat exchanger 36. The second indoor expansion valve 38 is able to control the valve opening degree. The liquid side of the second indoor unit 35 is connected to the second liquid-side branch pipe 6b that branches and extends from the indoor unit-side end portion of the liquid-side connection pipe 6, and the gas side of the second indoor unit 35 is connected to the second gas-side branch pipe 5b that branches and extends from the indoor unit-side end portion of the gas-side connection pipe 5.

The design pressures of the first liquid-side branch pipe 6a, second liquid-side branch pipe 6b, first gas-side branch pipe 5a, and second gas-side branch pipe 5b each may be set to, for example, 4.5 MPa.

The specific structures of the first indoor unit 30 and second indoor unit 35 of the air conditioner 1b according to the third embodiment each have a similar configuration to the indoor unit 30 of the second embodiment except the above-described first indoor expansion valve 33 and second indoor expansion valve 38.

The controller 7 of the third embodiment is made up of the outdoor unit control unit 27, the first indoor unit control unit 34, and the second indoor unit control unit 39 communicably connected to one another.

In the above air conditioner 1b, in the cooling operation mode, the outdoor expansion valve 24 is controlled such that the degree of subcooling of refrigerant that passes through the liquid-side outlet of the outdoor heat exchanger 23 satisfies a predetermined condition. In the cooling operation mode, the subcooling expansion valve 48 is controlled such that the degree of superheating of refrigerant that the compressor 21 takes in satisfies a predetermined condition. In the cooling operation mode, the first indoor expansion valve 33 and the second indoor expansion valve 38 are controlled to a fully open state.

In the heating operation mode, the first indoor expansion valve 33 is controlled such that the degree of subcooling of refrigerant that passes through the liquid-side outlet of the first indoor heat exchanger 31 satisfies a predetermined condition. Similarly, the second indoor expansion valve 38 is also controlled such that the degree of subcooling of refrigerant that passes through the liquid-side outlet of the second indoor heat exchanger 36 satisfies a predetermined condition. In the heating operation mode, the outdoor expansion valve 45 is controlled such that the degree of superheating of refrigerant that the compressor 21 takes in satisfies a predetermined condition. In the heating operation mode, the subcooling expansion valve 48 is controlled such that the degree of superheating of refrigerant that the compressor 21 takes in satisfies a predetermined condition. In the heating operation mode, for example, at least any one of the drive frequency of the compressor 21 and the volume of air of the outdoor fan 25 is controlled such that the maximum value of the pressure in the refrigerant circuit 10 is lower than 1.5 times the design pressure of the gas-side connection pipe 5. Preferably, at least any one of the drive frequency of the compressor 21 and the volume of air of the outdoor fan 25 is controlled such that the maximum value of the pressure in the refrigerant circuit 10 is lower than the design pressure of each of the first gas-side branch pipe 5a and the second gas-side branch pipe 5b.

(8-3) Characteristics of Third Embodiment

In the above-described air conditioner 1b according to the third embodiment as well, as well as the air conditioner 1 according to the first embodiment, since refrigerant containing 1,2-difluoroethylene is used, a GWP can be sufficiently reduced.

The air conditioner 1b uses the outdoor unit 20 of which the design pressure is lower than 1.5 times the design pressure of each of the liquid-side connection pipe 6 and the gas-side connection pipe 5. In the outdoor unit control unit 27 of the outdoor unit 20 of the air conditioner 1b, the upper limit of the controlled pressure of the refrigerant is set so as to be lower than 1.5 times the design pressure of each of the liquid-side connection pipe 6 and the gas-side connection pipe 5. Therefore, even when the above-described specific refrigerants A to E are used, damage to the liquid-side connection pipe 6 or the gas-side connection pipe 5 can be reduced.

(8-4) Modification A of Third Embodiment

In the above-described third embodiment, the case where the design pressure of the outdoor unit 20 is lower than 1.5 times the design pressure of each of the liquid-side connection pipe 6 and the gas-side connection pipe 5 and the outdoor unit control unit 27 of the outdoor unit 20 is set such that the upper limit of the controlled pressure of the refrigerant is lower than 1.5 times the design pressure of each of the liquid-side connection pipe 6 and the gas-side connection pipe 5 is described as an example.

In contrast to this, for example, even when the outdoor unit 20 has a design pressure higher than or equal to 1.5 times the design pressure of each of the liquid-side connection pipe 6 and the gas-side connection pipe 5 but the outdoor unit 20 includes the outdoor unit control unit 27 that is configured to be able to select the upper limit of the controlled pressure of the refrigerant from among multiple types and that is able to set the upper limit of the controlled pressure of the refrigerant such that the upper limit is lower than 1.5 times the design pressure of each of the liquid-side connection pipe 6 and the gas-side connection pipe 5, the outdoor unit 20 can be used in the air conditioner 1b of the above-described embodiment.

(9) Fourth Embodiment

In the above-described first to third embodiments and their modifications, the new outdoor unit 20 and air conditioners 1, 1a, 1b in which any one of the above-described refrigerants A to E is used are described as examples.

In contrast to this, an air conditioner according to a fourth embodiment, as will be described below, is an air conditioner modified from an air conditioner in which another refrigerant is used by replacing the refrigerant to be used with any one of the above-described refrigerants A to E while the liquid-side connection pipe 6 and the gas-side connection pipe 5 are reused.

(9-1) Modified Air Conditioner from R22

The air conditioners 1, 1a, 1b in the above-described first to third embodiments and their modifications may be the air conditioners 1, 1a, 1b having used R22 and modified so as to use any one of the refrigerants A to E containing 1,2-difluoroethylene.

Here, the design pressure of each of the liquid-side connection pipe 6 and the gas-side connection pipe 5 in an air conditioner in which refrigerant R22 (refrigerant having a lower design pressure than any one of the above-described refrigerants A to E) has been used is determined based on the outer diameter and thickness of pipes and the material of copper pipes from which the pipes are made. Of copper pipes that are generally used for such the liquid-side connection pipe 6 and the gas-side connection pipe 5, a combination of the outer diameter, thickness, and material of the pipe, of which the design pressure is the lowest, is a combination of $\phi$19.05, 1.0 mm in thickness, and O-material from Copper Pipes for General Refrigerant Piping (JIS B 8607), and the design pressure is 3.72 MPa (gauge pressure).

For this reason, in the outdoor unit 20 of each of the air conditioners 1, 1a, 1b modified so as to use any one of the above-described refrigerants A to E, the heat transfer area of the outdoor heat exchanger 23 and the volume of air in the outdoor heat exchanger 23 (the amount of air that is sent by the outdoor fan 25) are set such that the upper limit of the controlled pressure of the refrigerant is lower than or equal to 3.7 MPa (gauge pressure). Alternatively, in the outdoor unit control unit 27 of the outdoor unit 20 of each of the air conditioners 1, 1a, 1b modified so as to use any one of the above-described refrigerants A to E, the upper limit of the controlled pressure of the refrigerant is set so as to be lower than or equal to 3.7 MPa (gauge pressure). Thus, the outdoor unit control unit 27 adjusts the amount of circulating refrigerant by controlling the operating frequency of the compressor 21 and adjusts the volume of air of the outdoor fan 25 in the outdoor heat exchanger 23.

As described above, the liquid-side connection pipe 6 and gas-side connection pipe 5 that have been used in an air conditioner (old machine) in which refrigerant R22 has been used can be reused when the air conditioners (new machines) 1, 1a, 1b modified so as to use any one of the above-described refrigerants A to E are introduced, and, in that case, damage to the liquid-side connection pipe 6 or the gas-side connection pipe 5 can be reduced.

In this case, preferably, the design pressure of the outdoor unit 20 of each of the air conditioners 1, 1a, 1b modified so as to use any one of the refrigerants A to E is equivalent to the design pressure of an outdoor unit in an air conditioner in which R22 has been used, and is specifically higher than or equal to 3.0 MPa and lower than or equal to 3.7 MPa. An outdoor unit and indoor unit of the air conditioner in which R22 has been used may be reused or may be replaced with new ones.

When a new one is used for the outdoor unit 20, the new one has a design pressure or an upper limit of a controlled pressure of the refrigerant, which is equivalent to the design pressure of the outdoor unit of the air conditioner in which R22 has been used or an upper limit of a controlled pressure of the refrigerant. For example, in the case where the design pressure of the outdoor unit of the air conditioner in which R22 has been used or the upper limit of the controlled pressure of the refrigerant is 3.0 MPa, even when the new outdoor unit 20 has a design pressure equivalent to 3.0 MPa or a further higher design pressure (the one that has a design pressure higher than or equal to 4.0 MPa and lower than or equal to 4.5 MPa and that can be connected to the liquid-side connection pipe 6 and the gas-side connection pipe 5 that are used for any one of the refrigerants A to E), the upper limit of the controlled pressure of the refrigerant is preferably set so as to be equivalent to 3.0 MPa.

For the air conditioner in which the plurality of indoor units 30, 35 is connected via the branch pipes such as the first liquid-side branch pipe 6a, the second liquid-side branch pipe 6b, the first gas-side branch pipe 5a, and the second gas-side branch pipe 5b as described in the third embodiment, the design pressure of each of these branch pipes when R22 is used as a refrigerant is set to 3.4 MPa that is further lower than 3.7 MPa. Therefore, for the air conditioner 1b that includes the plurality of indoor units 30, 35 and in which a refrigerant to be used is replaced from R22 to any one of the above-described refrigerants A to E, preferably, the outdoor unit 20 having a design pressure lower than or equal to 3.4 MPa is used or the upper limit of the controlled pressure of the refrigerant is set by the outdoor unit control unit 27 of the outdoor unit 20 so as to be lower than or equal to 3.4 MPa in order for the pressure of refrigerant flowing through the branch pipes not to exceed 3.4 MPa.

(9-2) Modified Air Conditioner from R407C

The air conditioners 1, 1a, 1b in the above-described first to third embodiments and their modifications may be the air conditioners 1, 1a, 1b having used R407C and modified so as to use any one of the refrigerants A to E containing 1,2-difluoroethylene.

Here, the design pressure of each of the liquid-side connection pipe 6 and the gas-side connection pipe 5 in an air conditioner in which refrigerant R407C (refrigerant having a lower design pressure than any one of the above-described refrigerants A to E) has been used is similar to the case where R22 has been used, and the design pressure of pipes having the lowest design pressure for the liquid-side connection pipe 6 and the gas-side connection pipe 5 is 3.72 MPa (gauge pressure).

For this reason, in the outdoor unit 20 of each of the air conditioners 1, 1a, 1b modified so as to use any one of the above-described refrigerants A to E, as in the case of the modification from R22, the heat transfer area of the outdoor heat exchanger 23 and the volume of air in the outdoor heat exchanger 23 (the amount of air that is sent by the outdoor fan 25) are set such that the upper limit of the controlled pressure of the refrigerant is lower than or equal to 3.7 MPa (gauge pressure). Alternatively, in the outdoor unit control unit 27 of the outdoor unit 20 of each of the air conditioners 1, 1a, 1b modified so as to use any one of the above-described refrigerants A to E, the upper limit of the controlled pressure of the refrigerant is set so as to be lower than or equal to 3.7 MPa (gauge pressure). Thus, the outdoor unit control unit 27 adjusts the amount of circulating refrigerant by controlling the operating frequency of the compressor 21 and adjusts the volume of air of the outdoor fan 25 in the outdoor heat exchanger 23.

As described above, the liquid-side connection pipe 6 and gas-side connection pipe 5 that have been used in an air conditioner (old machine) in which refrigerant R407C has been used can be reused when the air conditioners (new machines) 1, 1a, 1b modified so as to use any one of the above-described refrigerants A to E are introduced, and, in that case, damage to the liquid-side connection pipe 6 or the gas-side connection pipe 5 can be reduced.

In this case, preferably, the design pressure of the outdoor unit 20 of each of the air conditioners 1, 1a, 1b modified so as to use any one of the refrigerants A to E is equivalent to the design pressure of an outdoor unit in an air conditioner in which R407C has been used, and is specifically higher than or equal to 3.0 MPa and lower than or equal to 3.7 MPa. An outdoor unit and indoor unit of the air conditioner in which R407C has been used may be reused or may be replaced with new ones.

When a new one is used for the outdoor unit 20, the new one has a design pressure or an upper limit of a controlled pressure of the refrigerant, which is equivalent to the design pressure of the outdoor unit of the air conditioner in which R407C has been used or an upper limit of a controlled pressure of the refrigerant. For example, in the case where the design pressure of the outdoor unit of the air conditioner in which R407C has been used or the upper limit of the controlled pressure of the refrigerant is 3.0 MPa, even when the new outdoor unit 20 has a design pressure equivalent to 3.0 MPa or a further higher design pressure (the one that has a design pressure higher than or equal to 4.0 MPa and lower than or equal to 4.5 MPa and that can be connected to the liquid-side connection pipe 6 and the gas-side connection pipe 5 that are used for any one of the refrigerants A to E), the upper limit of the controlled pressure of the refrigerant is preferably set so as to be equivalent to 3.0 MPa.

For the air conditioner in which the plurality of indoor units 30, 35 is connected via the branch pipes such as the first liquid-side branch pipe 6a, the second liquid-side branch pipe 6b, the first gas-side branch pipe 5a, and the second gas-side branch pipe 5b as described in the third embodiment, the design pressure of each of these branch pipes when R407C is used as a refrigerant is set to 3.4 MPa, as in the case of R22, that is further lower than 3.7 MPa. Therefore, for the air conditioner 1b that includes the plurality of indoor units 30, 35 and in which a refrigerant to be used is replaced from R407C to any one of the above-described refrigerants A to E, preferably, the outdoor unit 20 having a design pressure lower than or equal to 3.4 MPa is used or the upper limit of the controlled pressure of the refrigerant is set by the outdoor unit control unit 27 of the outdoor unit 20 so as to be lower than or equal to 3.4 MPa in order for the pressure of refrigerant flowing through the branch pipes not to exceed 3.4 MPa.

(9-3) Modified Air Conditioner from R410A

The air conditioners 1, 1a, 1b in the above-described first to third embodiments and their modifications may be the air conditioners 1, 1a, 1b having used R410A and modified so as to use any one of the refrigerants A to E containing 1,2-difluoroethylene.

Here, the design pressure of each of the liquid-side connection pipe 6 and the gas-side connection pipe 5 in an air conditioner in which refrigerant R410A (refrigerant having a design pressure substantially equivalent to that of any one of the above-described refrigerants A to E) has been used is set to 4.3 MPa (gauge pressure) for pipes having an outer diameter of ⅜ inches and 4.8 MPa (gauge pressure) for pipes having an outer diameter of ½ inches.

For this reason, in the outdoor unit 20 of each of the air conditioners 1, 1a, 1b modified so as to use any one of the above-described refrigerants A to E, the heat transfer area of the outdoor heat exchanger 23 and the volume of air in the outdoor heat exchanger 23 (the amount of air that is sent by the outdoor fan 25) are set such that the upper limit of the controlled pressure of the refrigerant is lower than or equal to 4.3 MPa for the case where connection pipes having an outer diameter of ⅜ inches are used or is lower than or equal to 4.8 MPa for the case where connection pipes having an outer diameter of ½ inches are used. Alternatively, in the outdoor unit control unit 27 of the outdoor unit 20 of each of the air conditioners 1, 1a, 1b modified so as to use any one of the above-described refrigerants A to E, the upper limit of the controlled pressure of the refrigerant is set so as to be lower than or equal to 4.3 MPa for the case where connection pipes having an outer diameter of ⅜ inches are used or so as to be lower than or equal to 4.8 MPa for the case where connection pipes having an outer diameter of ½ inches are used. Thus, the outdoor unit control unit 27 adjusts the amount of circulating refrigerant by controlling the operating frequency of the compressor 21 and adjusts the volume of air of the outdoor fan 25 in the outdoor heat exchanger 23.

As described above, the liquid-side connection pipe 6 and gas-side connection pipe 5 that have been used in an air conditioner (old machine) in which refrigerant R410A has been used can be reused when the air conditioners (new machines) 1, 1a, 1b modified so as to use any one of the above-described refrigerants A to E are introduced, and, in that case, damage to the liquid-side connection pipe 6 or the gas-side connection pipe 5 can be reduced.

In this case, preferably, the design pressure of the outdoor unit 20 of each of the air conditioners 1, 1a, 1b modified so as to use any one of the refrigerants A to E is equivalent to the design pressure of an outdoor unit in an air conditioner in which R410A has been used, and is specifically higher than or equal to 4.0 MPa and lower than or equal to 4.8 MPa. An outdoor unit and indoor unit of the air conditioner in which R410A has been used may be reused or may be replaced with new ones.

When a new one is used for the outdoor unit 20, the new one has a design pressure or an upper limit of a controlled pressure of the refrigerant, which is equivalent to the design pressure of the outdoor unit of the air conditioner in which R410A has been used or an upper limit of a controlled pressure of the refrigerant. For example, in the case where the design pressure of the outdoor unit of the air conditioner in which R410A has been used or the upper limit of the controlled pressure of the refrigerant is 4.2 MPa, even when the new outdoor unit 20 has a design pressure equivalent to 4.2 MPa or a further higher design pressure (the one that has a design pressure higher than or equal to 4.2 MPa and lower than or equal to 4.5 MPa and that can be connected to the liquid-side connection pipe 6 and the gas-side connection pipe 5 that are used for any one of the refrigerants A to E), the upper limit of the controlled pressure of the refrigerant is preferably set so as to be equivalent to 4.2 MPa.

For the air conditioner in which the plurality of indoor units 30, 35 is connected via the branch pipes such as the first liquid-side branch pipe 6a, the second liquid-side branch pipe 6b, the first gas-side branch pipe 5a, and the second gas-side branch pipe 5b as described in the third embodiment, the design pressure of each of these branch pipes when R410A is used as a refrigerant is set to 4.2 MPa that is further lower than 4.8 MPa. Therefore, for the air conditioner 1b that includes the plurality of indoor units 30, 35 and in which a refrigerant to be used is replaced from R410A to any one of the above-described refrigerants A to E, preferably, the outdoor unit 20 having a design pressure lower than or equal to 4.2 MPa is used or the upper limit of the controlled pressure of the refrigerant is set by the outdoor unit control unit 27 of the outdoor unit 20 so as to be lower than or equal to 4.2 MPa in order for the pressure of refrigerant flowing through the branch pipes not to exceed 4.2 MPa.

(9-4) Modified Air Conditioner from R32

The air conditioners 1, 1a, 1b in the above-described first to third embodiments and their modifications may be the air conditioners 1, 1a, 1b having used R32 and modified so as to use any one of the refrigerants A to E containing 1,2-difluoroethylene.

Here, the design pressure of each of the liquid-side connection pipe 6 and the gas-side connection pipe 5 in an air conditioner in which refrigerant R32 (refrigerant having a design pressure substantially equivalent to that of any one of the above-described refrigerants A to E) has been used is set to 4.3 MPa (gauge pressure) for pipes having an outer diameter of ⅜ inches and 4.8 MPa (gauge pressure) for pipes having an outer diameter of ½ inches.

For this reason, in the outdoor unit 20 of each of the air conditioners 1, 1a, 1b modified so as to use any one of the above-described refrigerants A to E, the heat transfer area of the outdoor heat exchanger 23 and the volume of air in the outdoor heat exchanger 23 (the amount of air that is sent by the outdoor fan 25) are set such that the upper limit of the controlled pressure of the refrigerant is lower than or equal to 4.3 MPa for the case where connection pipes having an outer diameter of ⅜ inches are used or is lower than or equal to 4.8 MPa for the case where connection pipes having an outer diameter of ½ inches are used. Alternatively, in the outdoor unit control unit 27 of the outdoor unit 20 of each of the air conditioners 1, 1a, 1b modified so as to use any one of the above-described refrigerants A to E, the upper limit of the controlled pressure of the refrigerant is set so as to be lower than or equal to 4.3 MPa for the case where connection pipes having an outer diameter of ⅜ inches are used or so as to be lower than or equal to 4.8 MPa for the case where connection pipes having an outer diameter of ½ inches are used. Thus, the outdoor unit control unit 27 adjusts the amount of circulating refrigerant by controlling the operating frequency of the compressor 21 and adjusts the volume of air of the outdoor fan 25 in the outdoor heat exchanger 23.

As described above, the liquid-side connection pipe 6 and gas-side connection pipe 5 that have been used in an air conditioner (old machine) in which refrigerant R32 has been used can be reused when the air conditioners (new machines) 1, 1a, 1b modified so as to use any one of the above-described refrigerants A to E are introduced, and, in that case, damage to the liquid-side connection pipe 6 or the gas-side connection pipe 5 can be reduced.

In this case, preferably, the design pressure of the outdoor unit 20 of each of the air conditioners 1, 1a, 1b modified so as to use any one of the refrigerants A to E is equivalent to the design pressure of an outdoor unit in an air conditioner in which R32 has been used, and is specifically higher than or equal to 4.0 MPa and lower than or equal to 4.8 MPa. An outdoor unit and indoor unit of the air conditioner in which R32 has been used may be reused or may be replaced with new ones.

When a new one is used for the outdoor unit 20, the new one has a design pressure or an upper limit of a controlled pressure of the refrigerant, which is equivalent to the design pressure of the outdoor unit of the air conditioner in which R32 has been used or an upper limit of a controlled pressure of the refrigerant. For example, in the case where the design pressure of the outdoor unit of the air conditioner in which R32 has been used or the upper limit of the controlled pressure of the refrigerant is 4.2 MPa, even when the new outdoor unit 20 has a design pressure equivalent to 4.2 MPa or a further higher design pressure (the one that has a design pressure higher than or equal to 4.2 MPa and lower than or equal to 4.5 MPa and that can be connected to the liquid-side connection pipe 6 and the gas-side connection pipe 5 that are used for any one of the refrigerants A to E), the upper limit of the controlled pressure of the refrigerant is preferably set so as to be equivalent to 4.2 MPa.

For the air conditioner in which the plurality of indoor units 30, 35 is connected via the branch pipes such as the first liquid-side branch pipe 6a, the second liquid-side branch pipe 6b, the first gas-side branch pipe 5a, and the second gas-side branch pipe 5b as described in the third embodiment, the design pressure of each of these branch pipes when R32 is used as a refrigerant is set to 4.2 MPa that is further lower than 4.8 MPa. Therefore, for the air conditioner 1, 1a, 1b that includes the plurality of indoor units 30, 35 and in which a refrigerant to be used is replaced from R32 to any one of the above-described refrigerants A to E, preferably, the outdoor unit 20 having a design pressure lower than or equal to 4.2 MPa is used or the upper limit of the controlled pressure of the refrigerant is set by the outdoor unit control unit 27 of the outdoor unit 20 so as to be lower than or equal to 4.2 MPa in order for the pressure of refrigerant flowing through the branch pipes not to exceed 4.2 MPa.

The embodiments of the present disclosure are described above; however, it is understood that various modifications of modes and details are applicable without departing from the purport or scope of the present disclosure recited in the claims.

REFERENCE SIGNS LIST

1, 1a, 1b air conditioner (refrigeration cycle apparatus)
5 gas-side connection pipe (connection pipe)
6 liquid-side connection pipe (connection pipe)
7 controller (control device)
10 refrigerant circuit
20 outdoor unit (heat source unit)
21 compressor
27 outdoor unit control unit (control device)
23 outdoor heat exchanger (heat source-side heat exchanger)
30 indoor unit, first indoor unit (service unit)
31 indoor heat exchanger, first indoor heat exchanger (service-side heat exchanger)
35 second indoor unit (service unit)
36 second indoor heat exchanger (service-side heat exchanger)

CITATION LIST

Patent Literature

PTL 1 International Publication No. 2015/141678

The invention claimed is:

1. A heat source unit that is connected via a connection pipe to a service unit including a service-side heat exchanger and that is a component of a refrigeration cycle apparatus, the heat source unit comprising:
   a compressor; and
   a heat source-side heat exchanger, wherein
   a refrigerant is used as a refrigerant, and
   a design pressure of the heat source unit is lower than 1.5 times a design pressure of the connection pipe,
   wherein
      the refrigerant comprises trans-1,2-difluoroethylene (HFO-1132(E)), difluoromethane (R32), and 2,3,3,3-tetrafluoro-1-propene (R1234yf),
   wherein
      when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
   point I (72.0, 0.0, 28.0),
   point J (48.5, 18.3, 33.2),
   point N (27.7, 18.2, 54.1), and
   point E (58.3, 0.0, 41.7),
   or on these line segments (excluding the points on the line segment EI;
      the line segment IJ is represented by coordinates ($0.0236y^2-1.7616y+72.0$, y, $-0.0236y^2+0.7616y+28.0$);
      the line segment NE is represented by coordinates ($0.012y^2-1.9003y+58.3$, y, $-0.012y^2+0.9003y+41.7$); and
      the line segments JN and EI are straight lines.

2. A refrigeration cycle apparatus comprising the service unit, the connection pipe, and the heat source unit according to claim 1, wherein
   the refrigerant is used in the refrigeration cycle apparatus, and
   the design pressure of the heat source unit is equivalent to a design pressure in a refrigeration cycle apparatus in which refrigerant R22 or refrigerant R407C is used.

3. The refrigeration cycle apparatus according to claim 2, wherein
   the design pressure of the heat source unit is higher than or equal to 3.0 MPa and lower than or equal to 3.7 MPa.

4. A refrigeration cycle apparatus comprising the service unit, the connection pipe, and the heat source unit according to claim 1, wherein
   the refrigerant is used in the refrigeration cycle apparatus, and
   the design pressure of the heat source unit is equivalent to a design pressure in a refrigeration cycle apparatus in which refrigerant R410A or refrigerant R32 is used.

5. The refrigeration cycle apparatus according to claim 4, wherein the design pressure of the heat source unit is higher than or equal to 4.0 MPa and lower than or equal to 4.8 MPa.

6. A heat source unit that is connected via a connection pipe to a service unit including a service-side heat exchanger and that is a component of a refrigeration cycle apparatus, the heat source unit comprising:
a compressor;
a heat source-side heat exchanger; and
a control device, wherein
a refrigerant is used as a refrigerant, and
the control device is configured to set or be able to set an upper limit of a controlled pressure of the refrigerant such that the upper limit is lower than 1.5 times a design pressure of the connection pipe,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI;
the line segment IJ is represented by coordinates $(0.0236y^2-1.7616y+72.0, y, -0.0236y^2+0.7616y+28.0)$;
the line segment NE is represented by coordinates $(0.012y^2-1.9003y+58.3, y, -0.012y^2+0.9003y+41.7)$; and
the line segments JN and EI are straight lines.

7. A refrigeration cycle apparatus comprising the service unit, the connection pipe, and the heat source unit according to claim 6, wherein
the refrigerant is used in the refrigeration cycle apparatus, and
the control device is configured to set or be able to set an upper limit of a controlled pressure of the refrigerant such that the upper limit is equivalent to an upper limit of a controlled pressure in a refrigeration cycle apparatus in which refrigerant R22 or refrigerant R407C is used.

8. The refrigeration cycle apparatus according to claim 7, wherein
the upper limit of the controlled pressure is set to be higher than or equal to 3.0 MPa and lower than or equal to 3.7 MPa.

9. A refrigeration cycle apparatus comprising the service unit, the connection pipe, and the heat source unit according to claim 6, wherein
the refrigerant is used in the refrigeration cycle apparatus, and
the control device is configured to set or be able to set an upper limit of a controlled pressure of the refrigerant such that the upper limit is equivalent to an upper limit of a controlled pressure in a refrigeration cycle apparatus in which refrigerant R410A or refrigerant R32 is used.

10. The refrigeration cycle apparatus according to claim 9, wherein
the upper limit of the controlled pressure is set to be higher than or equal to 4.0 MPa and lower than or equal to 4.8 MPa.

11. A heat source unit that is connected via a connection pipe to a service unit including a service-side heat exchanger and that is a component of a refrigeration cycle apparatus, the heat source unit comprising:
a compressor; and
a heat source-side heat exchanger, wherein
a refrigerant is used as a refrigerant, and
a design pressure of the heat source unit is lower than 1.5 times a design pressure of the
connection pipe,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M'(39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment M'N is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines.

12. A heat source unit that is connected via a connection pipe to a service unit including a service-side heat exchanger and that is a component of a refrigeration cycle apparatus, the heat source unit comprising:
a compressor; and
a heat source-side heat exchanger, wherein
a refrigerant is used as a refrigerant, and
a design pressure of the heat source unit is lower than 1.5 times a design pressure of the connection pipe,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6), point N (27.7, 18.2, 54.1), and
point U (3.9, 36.7, 59.4),
or on these line segments;
  the line segment ON is represented by coordinates $(0.0072y^2-0.6701y+37.512,\ y,\ -0.0072y^2-0.3299y+62.488)$;
  the line segment NU is represented by coordinates $(0.0083y^2-1.7403y+56.635,\ y,\ -0.0083y^2+0.7403y+43.365)$; and
  the line segment UO is a straight line.

13. A heat source unit that is connected via a connection pipe to a service unit including a service-side heat exchanger and that is a component of a refrigeration cycle apparatus, the heat source unit comprising:
  a compressor; and
  a heat source-side heat exchanger, wherein
  a refrigerant is used as a refrigerant, and
  a design pressure of the heat source unit is lower than 1.5 times a design pressure of the connection pipe,
  wherein
    the refrigerant comprises trans-1,2-difluoroethylene (HFO-1132(E)), difluoromethane (R32), and 2,3,3,3-tetrafluoro-1-propene (R1234yf),
  wherein
    when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
  the line segment QR is represented by coordinates $(0.0099y^2-1.975y+84.765,\ y,\ -0.0099y^2+0.975y+15.235)$;
  the line segment RT is represented by coordinates $(0.0082y^2-1.8683y+83.126,\ y,\ -0.0082y^2+0.8683y+16.874)$;
  the line segment LK is represented by coordinates $(0.0049y^2-0.8842y+61.488,\ y,\ -0.0049y^2-0.1158y+38.512)$;
  the line segment KQ is represented by coordinates $(0.0095y^2-1.2222y+67.676,\ y,\ -0.0095y^2+0.2222y+32.324)$; and
  the line segment TL is a straight line.

14. A heat source unit that is connected via a connection pipe to a service unit including a service-side heat exchanger and that is a component of a refrigeration cycle apparatus, the heat source unit comprising:
  a compressor; and
  a heat source-side heat exchanger, wherein
  a refrigerant is used as a refrigerant, and
  a design pressure of the heat source unit is lower than 1.5 times a design pressure of the connection pipe,
  wherein
    the refrigerant comprises trans-1,2-difluoroethylene (HFO-1132(E)), difluoromethane (R32), and 2,3,3,3-tetrafluoro-1-propene (R1234yf),
  wherein
    when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;
  the line segment PS is represented by coordinates $(0.0064y^2-0.7103y+40.1,\ y,\ -0.0064y^2-0.2897y+59.9)$;
  the line segment ST is represented by coordinates $(0.0082y^2-1.8683y+83.126,\ y,\ -0.0082y^2+0.8683y+16.874)$; and
  the line segment TP is a straight line.

15. A heat source unit that is connected via a connection pipe to a service unit including a service-side heat exchanger and that is a component of a refrigeration cycle apparatus, the heat source unit comprising:
  a compressor;
  a heat source-side heat exchanger; and
  a control device, wherein
  a refrigerant is used as a refrigerant, and
  the control device is configured to set or be able to set an upper limit of a controlled pressure of the refrigerant such that the upper limit is lower than 1.5 times a design pressure of the connection pipe,
  wherein
    the refrigerant comprises trans-1,2-difluoroethylene (HFO-1132(E)), difluoromethane (R32), and 2,3,3,3-tetrafluoro-1-propene (R1234yf),
  wherein
    when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M'(39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
  the line segment MM' is represented by coordinates $(0.132y^2-3.34y+52.6,\ y,\ -0.132y^2+2.34y+47.4)$;
  the line segment M'N is represented by coordinates $(0.0596y^2-2.2541y+48.98,\ y,\ -0.0596y^2+1.2541y+51.02)$;
  the line segment VG is represented by coordinates $(0.0123y^2-1.8033y+39.6,\ y,\ -0.0123y^2+0.8033y+60.4)$; and
  the line segments NV and GM are straight lines.

16. A heat source unit that is connected via a connection pipe to a service unit including a service-side heat exchanger and that is a component of a refrigeration cycle apparatus, the heat source unit comprising:
  a compressor;
  a heat source-side heat exchanger; and
  a control device, wherein
  a refrigerant is used as a refrigerant, and the control device is configured to set or be able to set an upper limit of a controlled pressure of the refrigerant such that the upper limit is lower than 1.5 times a design pressure of the connection pipe, wherein
the refrigerant comprises trans-1,2-difluoroethylene (HFO-1132(E)), difluoromethane (R32), and 2,3,3,3-tetrafluoro-1-propene (R1234yf), wherein
when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:

point O (22.6, 36.8, 40.6),
point N (27.7, 18.2, 54.1), and
point U (3.9, 36.7, 59.4),
or on these line segments;
the line segment ON is represented by coordinates $(0.0072y^2−0.6701y+37.512, y, −0.0072y^2−0.3299y+62.488)$;
the line segment NU is represented by coordinates $(0.0083y^2−1.7403y+56.635, y, −0.0083y^2+0.7403y+43.365)$; and
the line segment UO is a straight line.

17. A heat source unit that is connected via a connection pipe to a service unit including a service-side heat exchanger and that is a component of a refrigeration cycle apparatus, the heat source unit comprising:
a compressor;
a heat source-side heat exchanger; and
a control device, wherein
a refrigerant is used as a refrigerant, and
the control device is configured to set or be able to set an upper limit of a controlled pressure of the refrigerant such that the upper limit is lower than 1.5 times a design pressure of the connection pipe,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
the line segment QR is represented by coordinates $(0.0099y^2−1.975y+84.765, y, −0.0099y^2+0.975y+15.235)$;
the line segment RT is represented by coordinates $(0.0082y^2−1.8683y+83.126, y, −0.0082y^2+0.8683y+16.874)$;
the line segment LK is represented by coordinates $(0.0049y^2−0.8842y+61.488, y, −0.0049y^2−0.1158y+38.512)$;
the line segment KQ is represented by coordinates $(0.0095y^2−1.2222y+67.676, y, −0.0095y^2+0.2222y+32.324)$; and
the line segment TL is a straight line.

18. A heat source unit that is connected via a connection pipe to a service unit including a service-side heat exchanger and that is a component of a refrigeration cycle apparatus, the heat source unit comprising:
a compressor;
a heat source-side heat exchanger; and
a control device, wherein
a refrigerant is used as a refrigerant, and
the control device is configured to set or be able to set an upper limit of a controlled pressure of the refrigerant such that the upper limit is lower than 1.5 times a design pressure of the connection pipe,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;
the line segment PS is represented by coordinates $(0.0064y^2−0.7103y+40.1, y, −0.0064y^2−0.2897y+59.9)$;
the line segment ST is represented by coordinates $(0.0082y^2−1.8683y+83.126, y, −0.0082y^2+0.8683y+16.874)$; and
the line segment TP is a straight line.

* * * * *